(12) United States Patent
Ikeda et al.

(10) Patent No.: US 9,977,285 B2
(45) Date of Patent: May 22, 2018

(54) DISPLAY DEVICE AND METHOD FOR MANUFACTURING THE SAME

(71) Applicant: Semiconductor Energy Laboratory Co., Ltd., Atsugi-shi, Kanagawa-ken (JP)

(72) Inventors: Hisao Ikeda, Kanagawa (JP); Satoshi Seo, Kanagawa (JP); Hideaki Shishido, Kanagawa (JP); Daisuke Kubota, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days. days.

(21) Appl. No.: 15/657,845

(22) Filed: Jul. 24, 2017

(65) Prior Publication Data

US 2018/0031927 A1    Feb. 1, 2018

(30) Foreign Application Priority Data

Jul. 29, 2016   (JP) ................... 2016-149309
Jul. 29, 2016   (JP) ................... 2016-149618
Jul. 29, 2016   (JP) ................... 2016-149771

(51) Int. Cl.
*G02F 1/1335*    (2006.01)
*G02F 1/1368*    (2006.01)
(Continued)

(52) U.S. Cl.
CPC ...... *G02F 1/133621* (2013.01); *G02F 1/1334* (2013.01); *G02F 1/1337* (2013.01);
(Continued)

(58) Field of Classification Search
CPC ......... G02F 1/133621; G02F 1/133345; G02F 1/1334; G02F 1/1337; G02F 1/1343; G02F 1/1368; G09G 3/36
See application file for complete search history.

(56) References Cited

U.S. PATENT DOCUMENTS 6,714,268 B2    3/2004  Wang et al.
6,911,675 B2 *  6/2005  Kato ................... G02F 1/13454
                                                        257/100
(Continued)

FOREIGN PATENT DOCUMENTS

CN    001403856 A    3/2003
CN    001967328 A    5/2007
(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.
(Continued)

*Primary Examiner* — Anne Hines
(74) *Attorney, Agent, or Firm* — Fish & Richardson P.C.

(57) ABSTRACT

A display device includes a first pixel and a second pixel. The first pixel and the second pixel are adjacent to each other. Each of the first pixel and the second pixel includes a first display region and a second display region. The first display region is configured to reflect incident light. The second display region is positioned inside the first display region and configured to emit light. The second display region has at least two pairs of parallel sides. A position of the second display region inside the first display region in the first pixel and a position of the second display region inside the first display region in the second pixel are different from each other.

22 Claims, 80 Drawing Sheets

(51) Int. Cl.
*G02F 1/1337* (2006.01)
*G09G 3/36* (2006.01)
*G02F 1/1343* (2006.01)
*G02F 1/1333* (2006.01)
*G02F 1/1334* (2006.01)

(52) U.S. Cl.
CPC .......... *G02F 1/1343* (2013.01); *G02F 1/1368* (2013.01); *G02F 1/133345* (2013.01); *G09G 3/36* (2013.01)

(56) References Cited

U.S. PATENT DOCUMENTS

| | | | |
|---|---|---|---|
| 7,038,641 | B2 | 5/2006 | Hirota et al. |
| 7,084,936 | B2 | 8/2006 | Kato |
| 7,102,704 | B2 | 9/2006 | Mitsui et al. |
| 7,176,991 | B2 | 2/2007 | Mitsui et al. |
| 7,239,361 | B2 | 7/2007 | Kato |
| 7,248,235 | B2 | 7/2007 | Fujii et al. |
| 7,385,654 | B2 | 6/2008 | Mitsui et al. |
| 8,981,391 | B2 | 3/2015 | Lin et al. |
| 9,054,199 | B2 * | 6/2015 | Udagawa ............ H01L 27/3262 |
| 9,349,325 | B2 | 5/2016 | Yamazaki et al. |
| 9,837,478 | B2 * | 12/2017 | Ikeda .................. H01L 27/3267 |
| 9,851,820 | B2 * | 12/2017 | Yamazaki ........... G06F 3/03547 |
| 2003/0201960 | A1 | 10/2003 | Fujieda |
| 2006/0017875 | A1 * | 1/2006 | Perner .................. G02F 1/1362 349/139 |
| 2006/0072047 | A1 | 4/2006 | Sekiguchi |
| 2006/0245040 | A1 * | 11/2006 | Betrabet ........... G02F 1/133377 359/318 |
| 2008/0180618 | A1 | 7/2008 | Fujieda |
| 2009/0256830 | A1 | 10/2009 | Klinghult et al. |
| 2010/0171905 | A1 | 7/2010 | Huang et al. |
| 2013/0299789 | A1 | 11/2013 | Yamazaki et al. |
| 2013/0341659 | A1 | 12/2013 | Lin et al. |
| 2015/0108508 | A1 | 4/2015 | Wu et al. |

FOREIGN PATENT DOCUMENTS

| | | |
|---|---|---|
| JP | 2001-066593 A | 3/2001 |
| JP | 2002-196702 A | 7/2002 |
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 2008-225381 A | 9/2008 |
| JP | 4161574 | 10/2008 |
| JP | 2011-519432 | 7/2011 |
| JP | 2011-248351 A | 12/2011 |
| JP | 2013-221965 A | 10/2013 |
| KR | 2003-0022049 A | 3/2003 |
| KR | 2004-0074658 A | 8/2004 |
| TW | 588185 | 5/2004 |
| TW | 201401238 | 1/2014 |
| TW | 201401549 | 1/2014 |
| WO | WO-2004/053819 | 6/2004 |
| WO | WO-2009/127917 | 10/2009 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.
Kusunoki.K et al., "Transmissive OLED and Reflective LC Hybrid (TR-Hybrid) Display", SID Digest '16 : SID International Symposium Digest of Technical Papers, May 22, 2016, vol. 47, pp. 57-60.
Sakuishi.T et al., "Transmissive OLED and Reflective LC Hybrid (TR-Hybrid) Display with High Visibility and Low Power Consumption", SID Digest '16 : SID International Symposium Digest of Technical Papers, May 22, 2016, vol. 47, pp. 735-738.
Ohide.T et al., "Application of Transfer Technology to Manufacturing of Transmissive OLED and Reflective LC Hybrid (TR-Hybrid) Display", SID Digest '16 : SID International Symposium Digest of Technical Papers, May 22, 2016, vol. 47, pp. 1002-1004.
International Search Report (Application No. PCT/IB2017/052787) dated Aug. 29, 2017.
Written Opinion (Application No. PCT/IB2017/052787) dated Aug. 29, 2017.

* cited by examiner

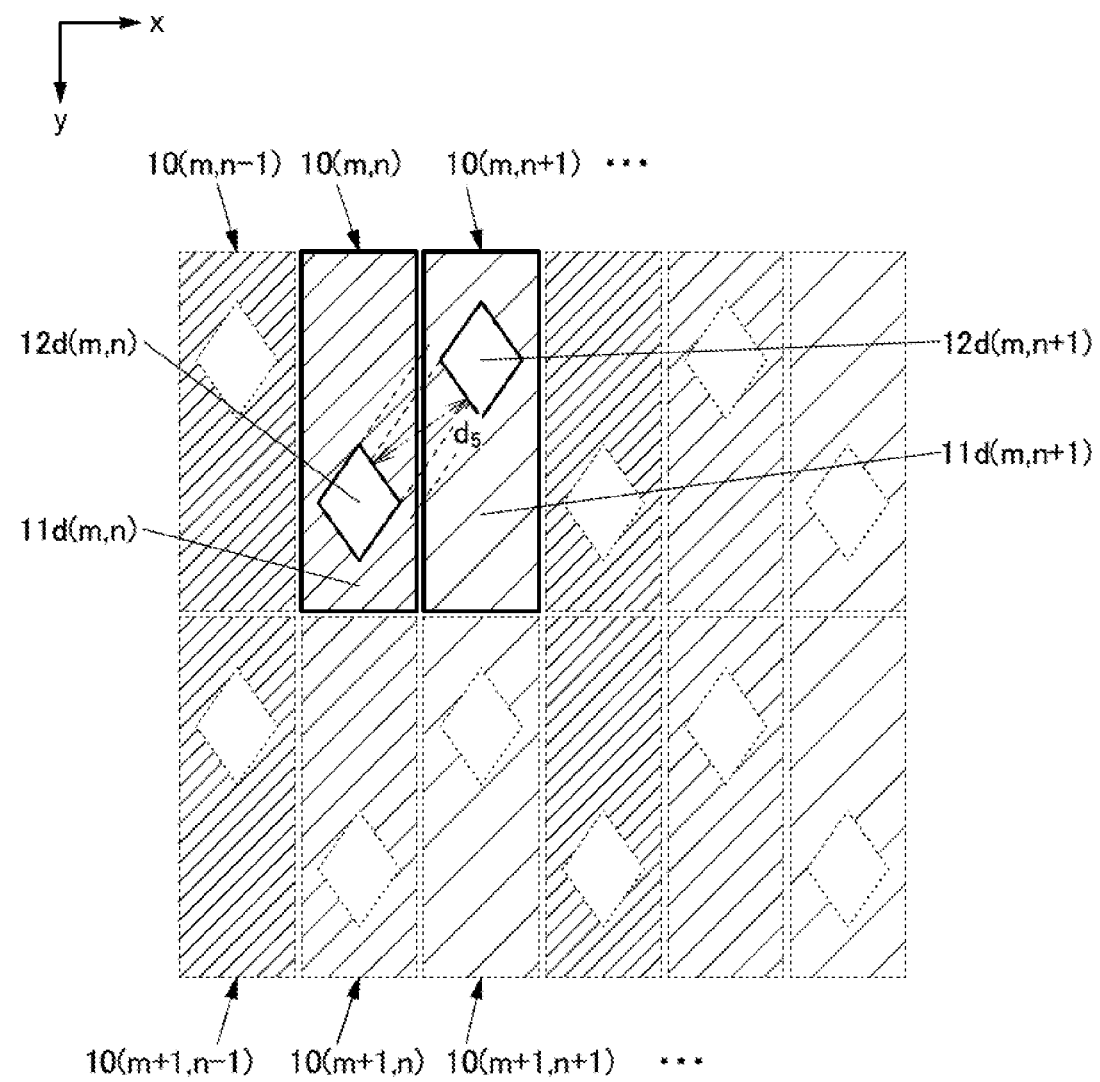

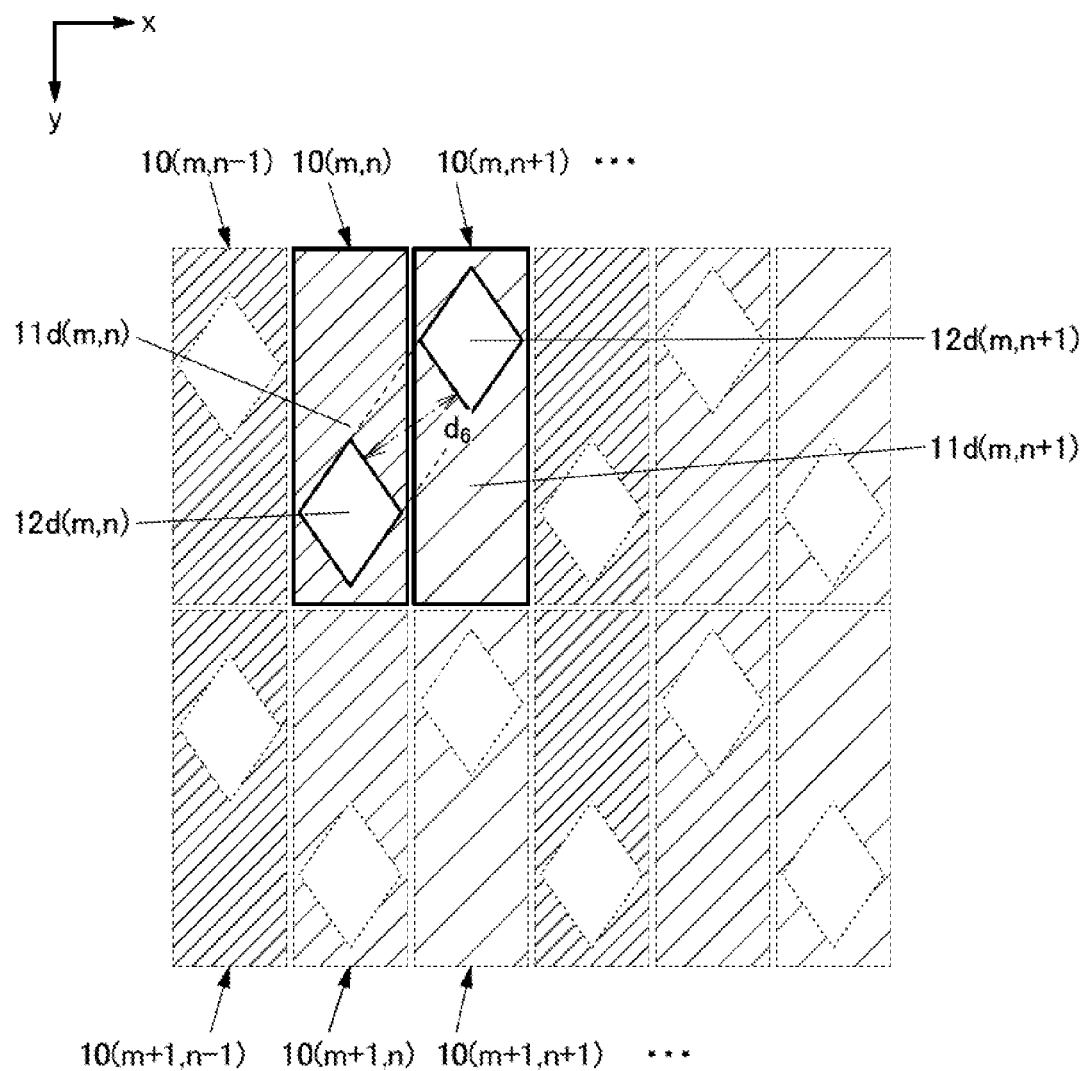

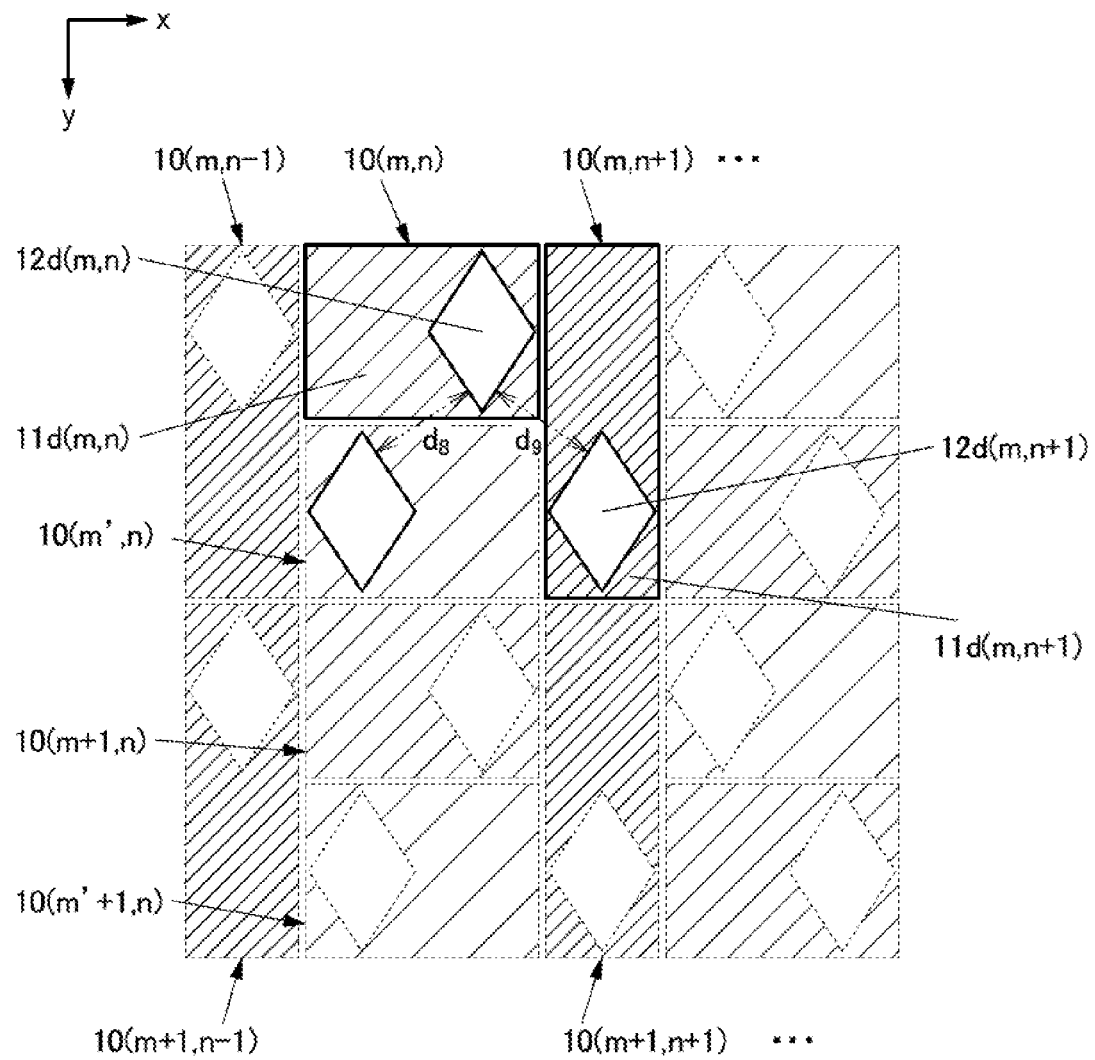

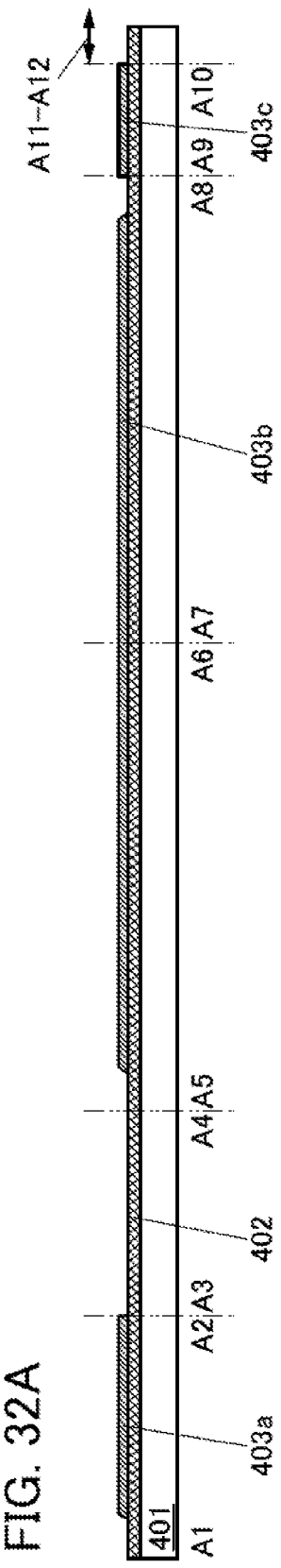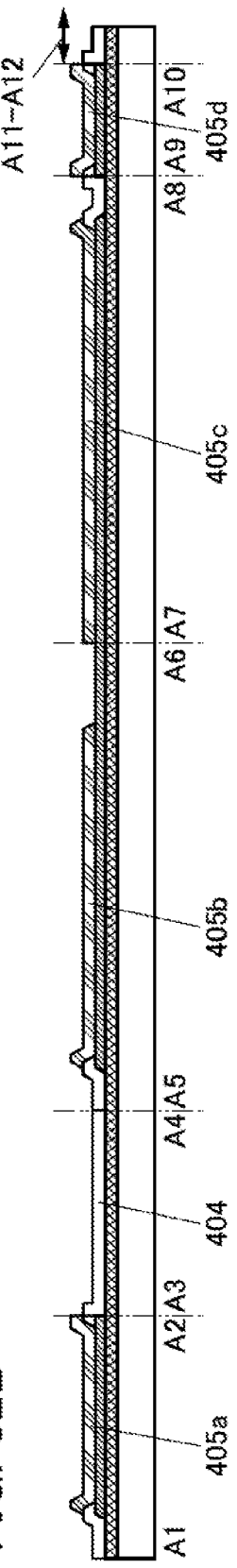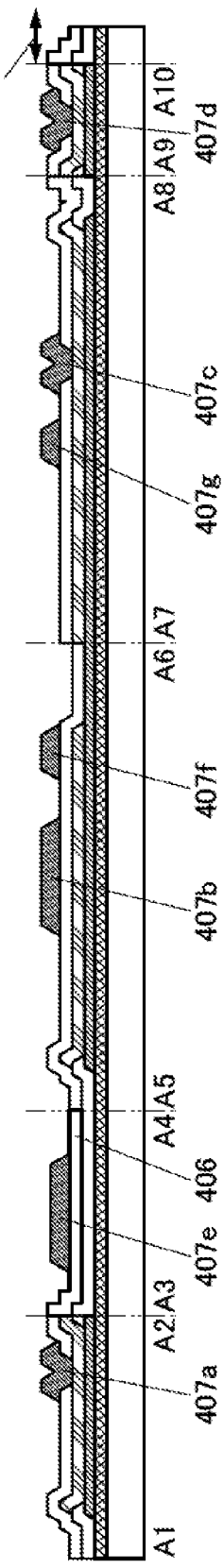

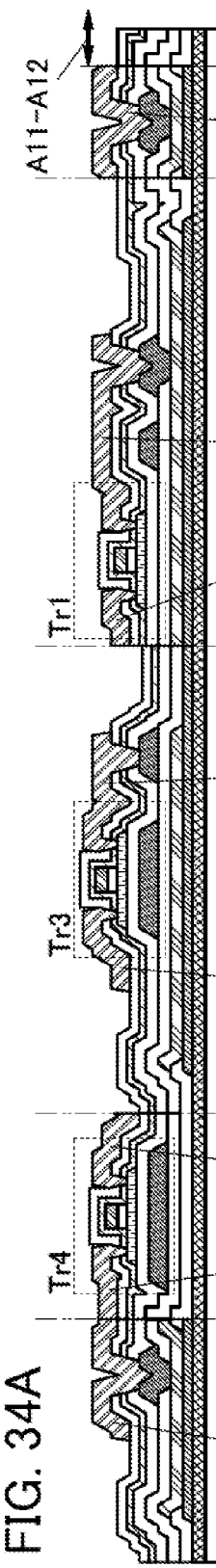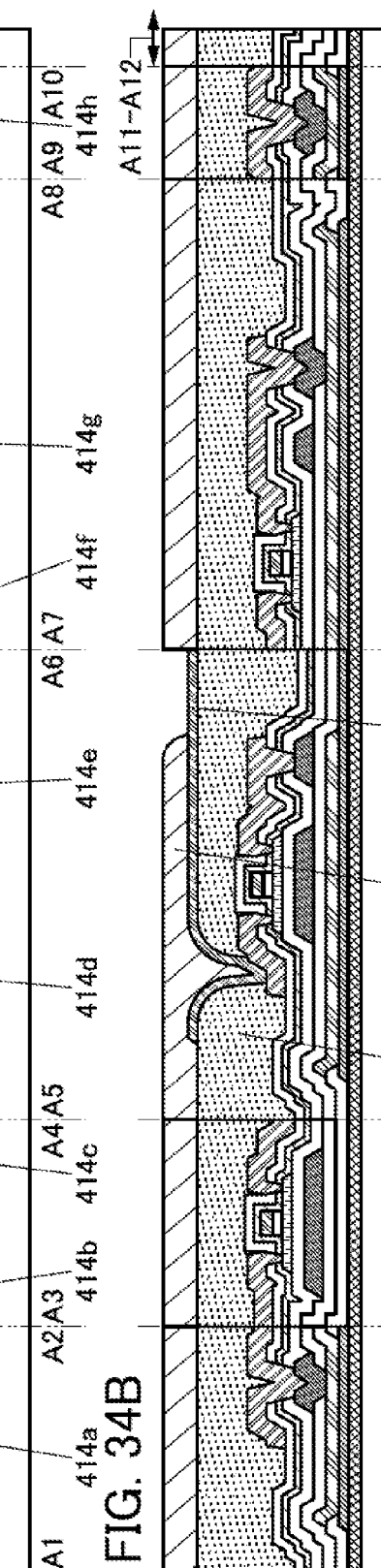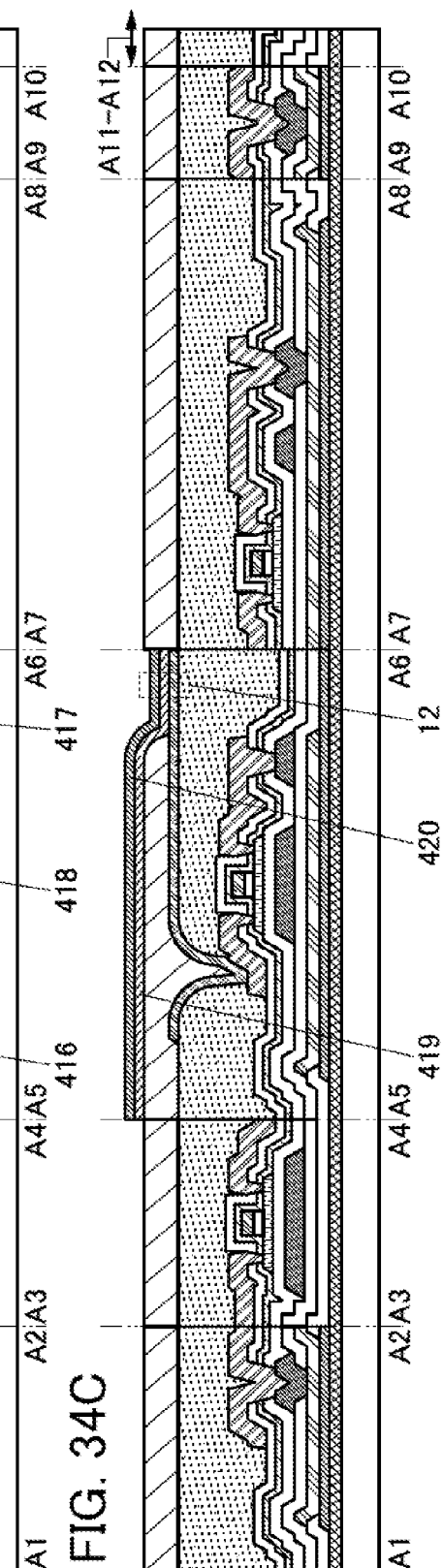

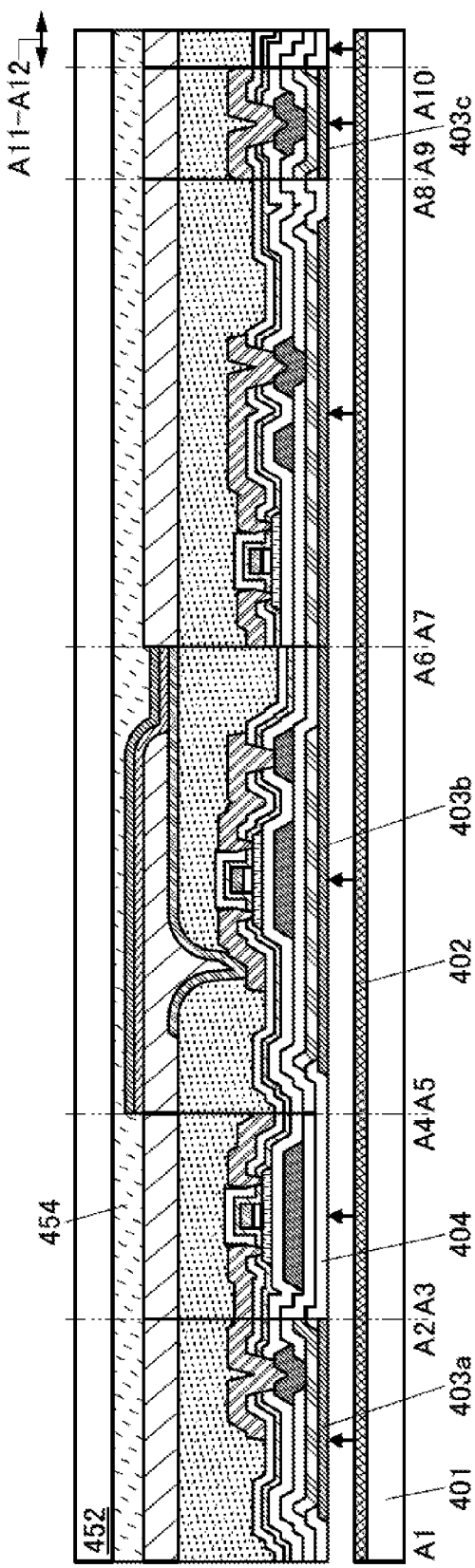
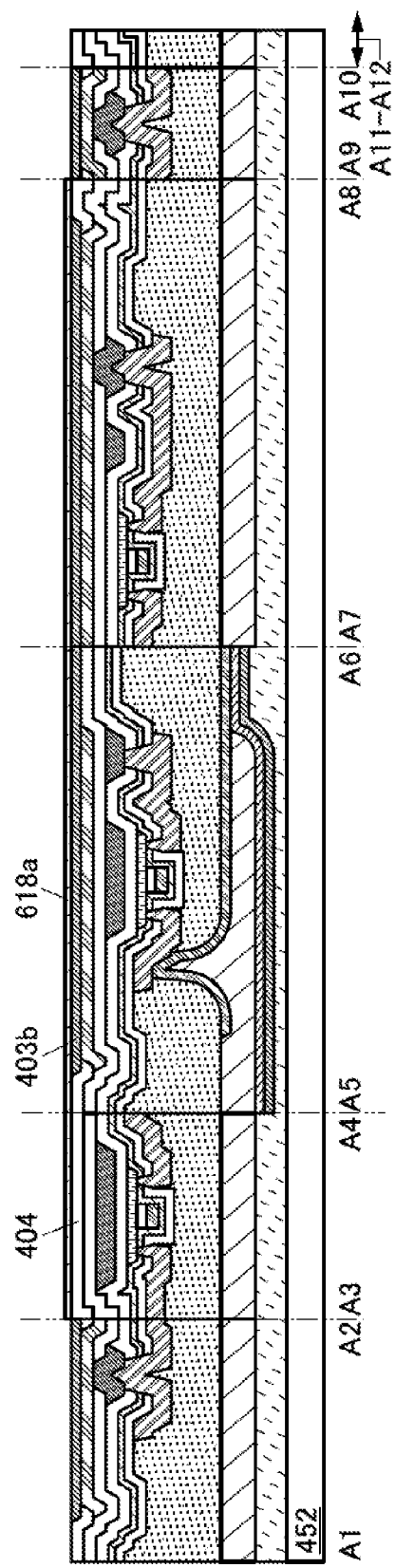
FIG. 36A
FIG. 36B

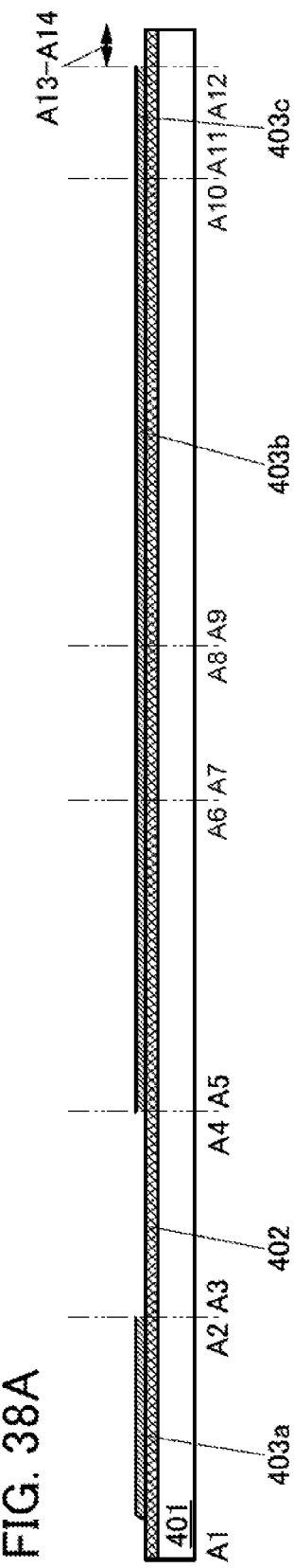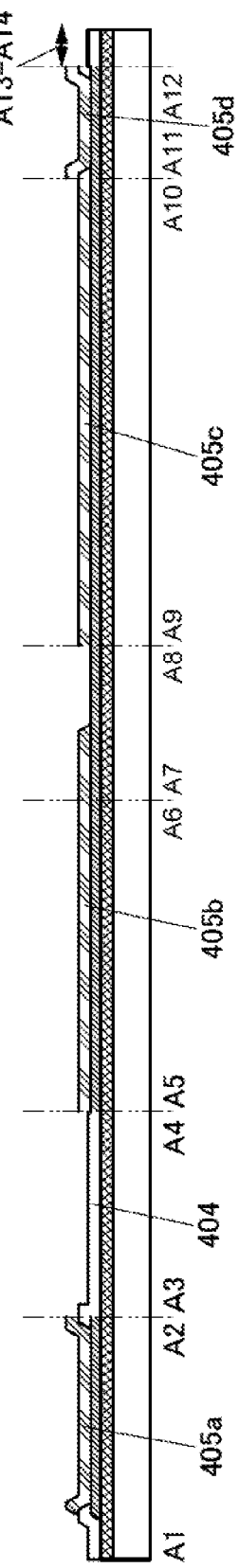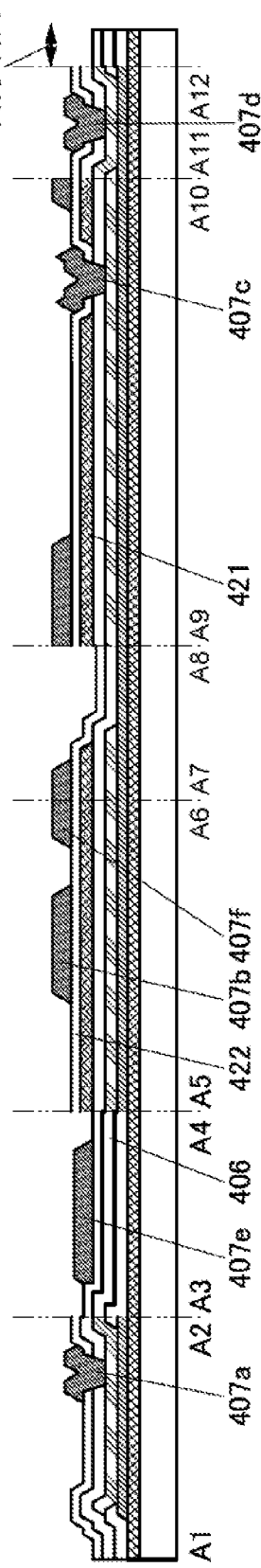

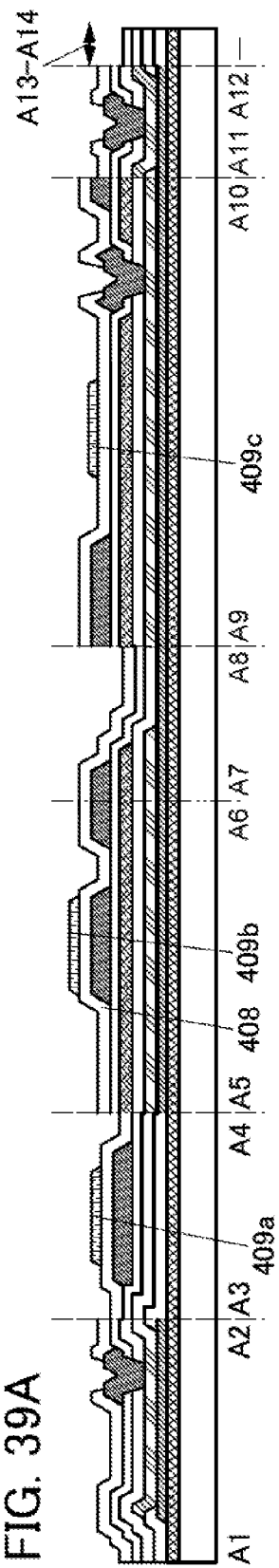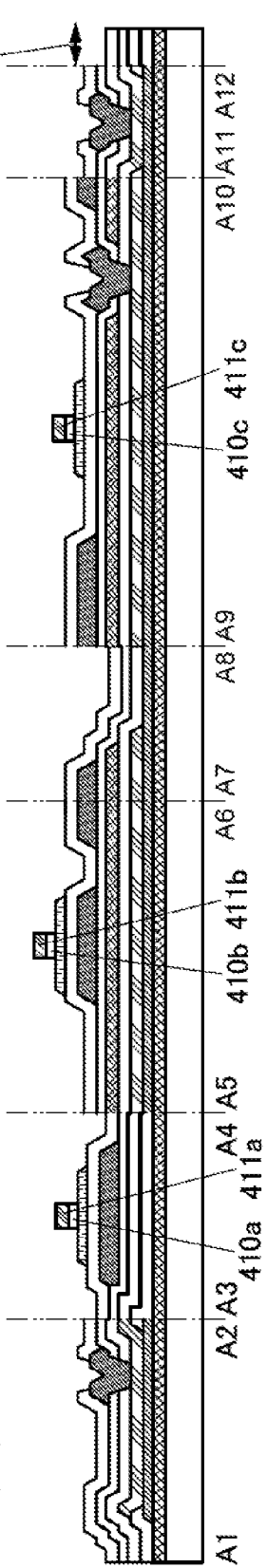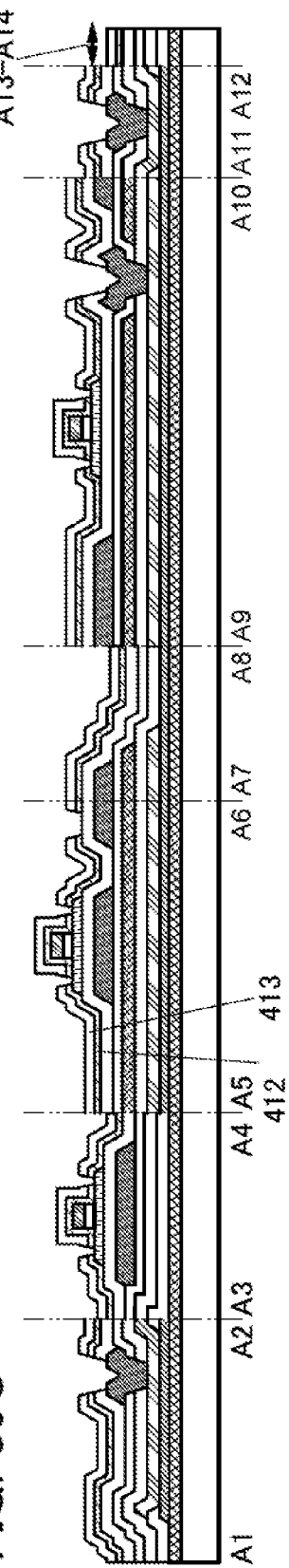
FIG. 39A
FIG. 39B
FIG. 39C

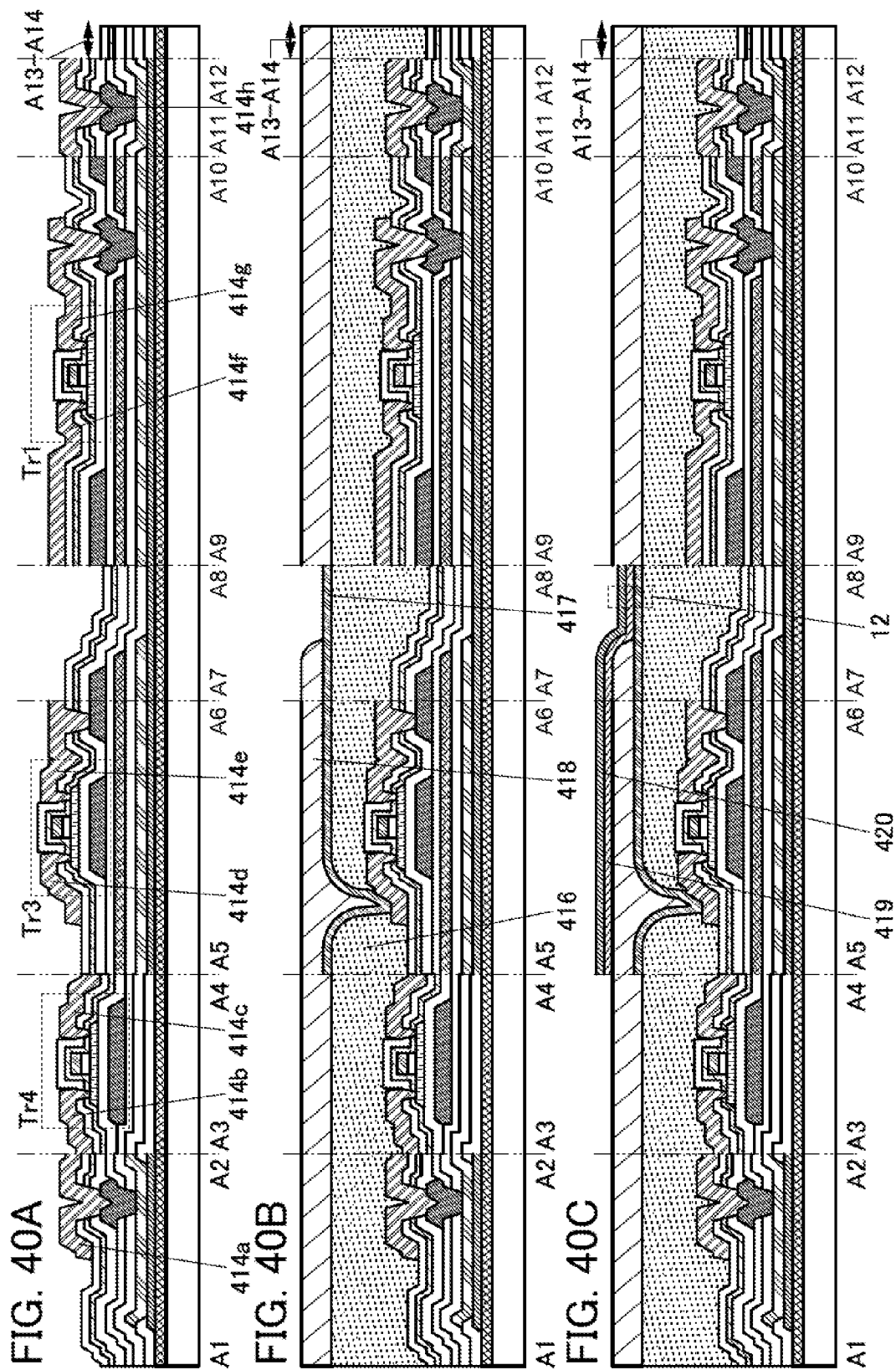

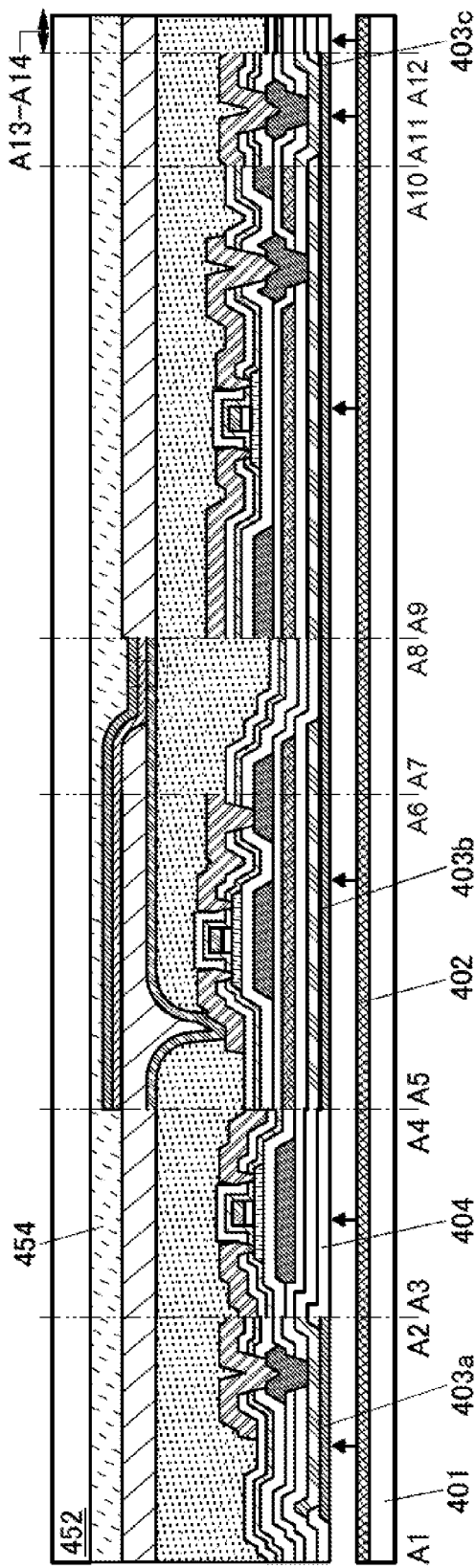
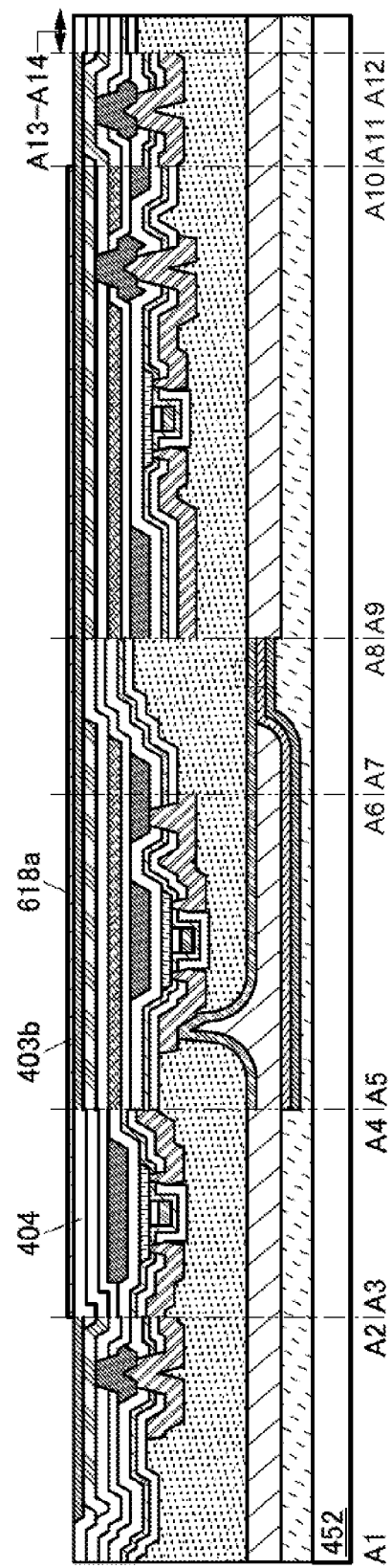
FIG. 42A
FIG. 42B

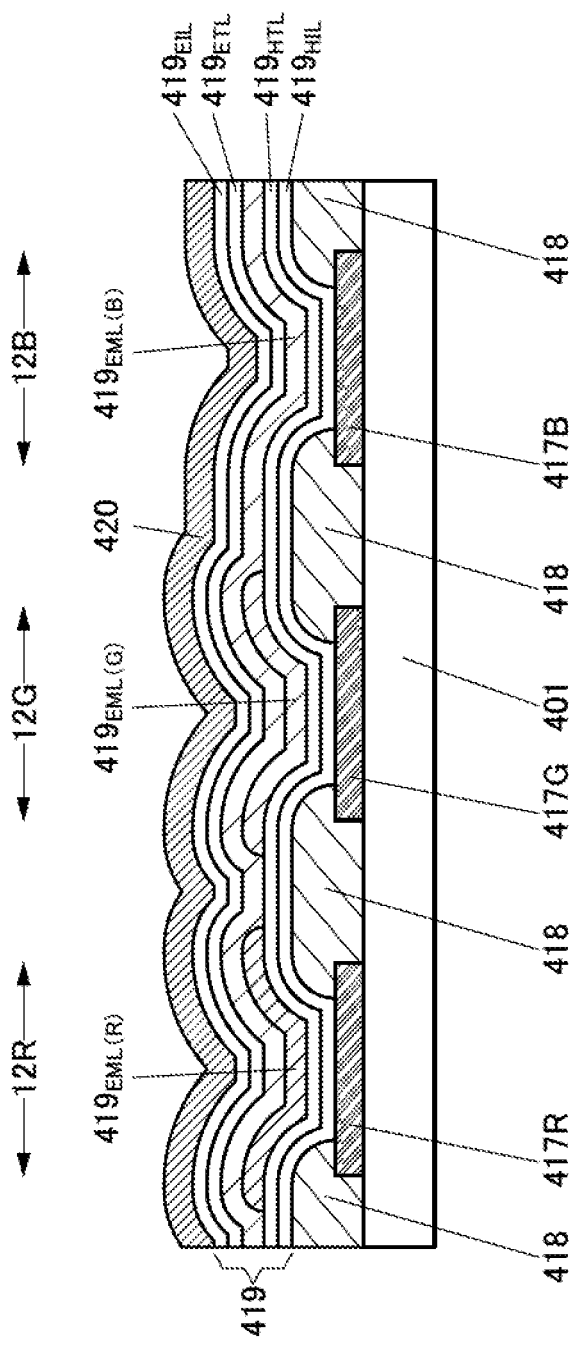

300B

300B

300B

300C

300C

300C

300D

300D

300D

300E

300E

300F

300F

DISPLAY DEVICE AND METHOD FOR MANUFACTURING THE SAME

TECHNICAL FIELD

One embodiment of the present invention relates to a display device and a method for manufacturing the display device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specific examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

A liquid crystal display device in which a surface-emitting light source is provided as a backlight and combined with a transmissive liquid crystal display device in order to reduce power consumption and suppress a reduction in display quality is known (see Patent Document 1).

REFERENCE

Patent Document

[Patent Document 1] Japanese Published Patent Application No. 2011-248351

DISCLOSURE OF INVENTION

An object of one embodiment of the present invention is to provide a novel display device that is highly convenient or reliable.

Another object of one embodiment of the present invention is to provide a display device with low power consumption and high display quality. Another object of one embodiment of the present invention is to provide a novel display device.

Another object of one embodiment of the present invention is to provide a display device with high display quality, a high manufacturing yield, and excellent productivity. Another object of one embodiment of the present invention is to provide a method for manufacturing a display device with high productivity.

Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is a display device including a first pixel, a second pixel, and a third pixel. The first pixel and the second pixel are adjacent to each other. The first pixel and the third pixel are adjacent to each other. The third pixel is provided in a direction different from a direction in which the first pixel and the second pixel are provided. Each of the first pixel, the second pixel, and the third pixel includes a first display region and a second display region. The second display region is positioned inside an outer periphery of the first display region in a horizontal plane of pixel arrangement in a top view of the first display region. A position of the second display region in the first pixel and a position of the second display region in the second pixel are different from each other. The position of the second display region in the first pixel and a position of the second display region in the third pixel are the same. A planar shape of the second display region is a rhombic shape.

In the above embodiment, a linear direction that is parallel to the direction in which the first pixel and the second pixel are provided is an X axis, and a linear direction that is parallel to the direction in which the first pixel and the third pixel are provided is a Y axis. A center of the second display region in the second pixel is provided in a region in the second pixel in order that a straight line that connects a center of the second display region in the first pixel and a center of the second display region in the second pixel is parallel to neither the X axis nor the Y axis. A center of the second display region in the third pixel is provided in a region in the third pixel in order that a straight line that connects the center of the second display region in the first pixel and a center of the second display region in the third pixel is parallel to the Y axis.

In the above embodiment, the second display region having the rhombic shape includes a first vertex, a second vertex, a third vertex, and a fourth vertex. In the horizontal plane of the pixel arrangement, the first vertex and the third vertex are in a straight line that is parallel to an X axis direction, and a center of the rhombic shape is positioned in the straight line between the first vertex and the third vertex. In the horizontal plane of the pixel arrangement, the second vertex and the fourth vertex are in a straight line that is parallel to a Y axis direction and are opposite to each other with the center of the rhombic shape positioned therebetween.

Another embodiment of the present invention is a display device including a first pixel, a second pixel, and a fourth pixel. A linear direction that is parallel to a direction in which the first pixel and the second pixel are provided is an X axis. The second pixel is adjacent to the first pixel in the X-axis direction. The fourth pixel is adjacent to the first pixel in the X-axis direction on a side opposite to a side on which the second pixel is provided. The fourth pixel includes a first display region and a second display region. The second display region is positioned inside an outer periphery of the first display region in a horizontal plane of pixel arrangement in a top view of the first display region. A position of the second display region in the first pixel and a position of the second display region in the fourth pixel are different from each other. The position of the second display region in the second pixel and a position of the second display region in the fourth pixel are the same. A planar shape of the second display region is a rhombic shape having two pairs of parallel sides. A pair of parallel lines of the second display region in the first pixel are parallel to a straight line that connects a center of the second display region in the first pixel and a center of the second display region in the second pixel. Another pair of parallel lines of the second display region in the first pixel are parallel to a straight line that connects the center of the second display region in the first pixel and a center of the second display region in the fourth pixel.

In the above embodiment, descriptions of the second pixel and the fourth pixel can be interchanged with each other.

In the above embodiment, the length of a longer diagonal line of a rhombic outer peripheral shape of the second display region is 1.1 times to 3 times, more preferably 1.2 times to 2 times the length of a shorter diagonal line of the rhombic outer peripheral shape.

Another embodiment of the present invention is a display device including a first display element and a second display element. The first display element is included in a first display region and the second display element is included in a second display region. The first display element is positioned to overlap with the first display region and the second display element is positioned to overlap with the second display region.

In the above embodiment, in the case where positions in the film thickness direction of the first display element and the second display element are different, the second display element may have a region overlapping with the first display region or part of the first display element in a top view of the display region or the display elements.

In the above embodiment, in a top view of the display region or the display element, the second display element is not necessarily provided to overlap with the whole second display region. In other words, the second display element may be provided to overlap with only part of the second display region. That is, the second display region may have a region that does not overlap with the second display element.

In the above embodiment, it is preferable that the first display region have a function of reflecting light and the second display region have a function of emitting light.

In the above embodiment, it is preferable that the first display element include a liquid crystal layer and the second display element include a light-emitting layer.

In the above structure, colors of light emitted from the second display element in the first pixel and the second display element in the second pixel are preferably different. In the above structure, it is preferable that the first display element and the second display element be connected to different transistors and separately controlled.

In the above embodiment, the transistor preferably includes a metal oxide film as a semiconductor layer.

In the above embodiment, the distance between the second display region in the first pixel and the second display region in the second pixel is preferably greater than or equal to 20 μm.

One embodiment of the present invention is a display device including a first pixel, a second pixel, and a third pixel. The first pixel and the second pixel are adjacent to each other. The first pixel and the third pixel are adjacent to each other. Each of the first pixel, the second pixel, and the third pixel includes a first display region and a second display region. The first display region is configured to reflect light. The second display region is positioned inside the first display region and configured to emit light. A position of the second display region inside the first display region in the first pixel and a position of the second display region inside the first display region in the second pixel are the same. A position of the second display region inside the first display region in the first pixel and a position of the second display region inside the first display region in the third pixel are different from each other. The second display region has at least three pairs of parallel sides.

Another embodiment of the present invention is a display device including a first pixel, a second pixel, and a third pixel. The first pixel and the second pixel are adjacent to each other. The first pixel and the third pixel are adjacent to each other. Each of the first pixel, the second pixel, and the third pixel includes a first display region, a second display region, a first display element, and a second display element. The first display region is configured to reflect light. The second display region is positioned inside the first display region and configured to emit light. The first display element is provided in a position overlapping with the first display region. The second display element is provided in a position overlapping with the second display region. A position of the second display region inside the first display region in the first pixel and a position of the second display region inside the first display region in the second pixel are the same. A position of the second display region inside the first display region in the first pixel and a position of the second display region inside the first display region in the third pixel are different from each other. The second display region has at least three pairs of parallel sides.

In the above embodiment, it is preferable that the first display element include a liquid crystal layer and the second display element include a light-emitting layer.

In the above embodiment, it is preferable that the second display element included in the first pixel and the second display element included in the second pixel have the same structure of the light-emitting layer, and the second display element included in the first pixel and the second display element included in the third pixel have different structures of the light-emitting layer. In the above embodiment, it is preferable that the first display element and the second display element be connected to different transistors and separately controlled.

In the above embodiment, the transistor preferably includes a metal oxide film as a semiconductor layer.

In the above embodiment, the distance between the second display region in the first pixel and the second display region in the second pixel is preferably greater than or equal to 30 μm.

In the above embodiment, the distance between the second display region in the first pixel and the second display region in the third pixel is preferably greater than or equal to 20 μm.

One embodiment of the present invention is a display device including a first pixel and a second pixel. The first pixel and the second pixel are adjacent to each other. Each of the first pixel and the second pixel includes a first display region and a second display region. The first display region is configured to reflect incident light. The second display region is positioned inside the first display region and configured to emit light. The second display region has at least three pairs of parallel sides. A position of the second display region inside the first display region in the first pixel and a position of the second display region inside the first display region in the second pixel are different from each other.

Another embodiment of the present invention is a display device in which the distance between a side of the second display region in the first pixel (the side is part of an outline of the second display region in the first pixel) which is in a direction perpendicular to a direction in which the first pixel and the second pixel adjoin and which is closer to the second display region in the second pixel and a side of the second display region in the second pixel (the side is part of an outline of the second display region in the second pixel) which is in the direction perpendicular to a direction in which the first pixel and the second pixel adjoin and which is closer to the second display region in the first pixel is greater than or equal to 10 μm and less than or equal to 30 μm in a direction parallel to the direction in which the first pixel and the second pixel adjoin.

Another embodiment of the present invention is a display device in which the distance between a side of the second display region in the first pixel (the side is part of an outline of the second display region in the first pixel) which is in a direction parallel to a direction in which the first pixel and the second pixel adjoin and which is closer to the second display region in the second pixel and a side of the second display region in the second pixel (the side is part of an outline of the second display region in the second pixel) which is in the direction parallel to the direction in which the first pixel and the second pixel adjoin and which is closer to the second display region in the first pixel is greater than or equal to 10 µm and less than or equal to 30 µm in a direction perpendicular to the direction in which the first pixel and the second pixel adjoin.

In the display device of any of the above embodiments, the distance between the second display region in the first pixel and the second display region in the second pixel is greater than or equal to 20 µm.

The display device of any of the above embodiments includes a first display element and a second display element. The first display element is provided in a position overlapping with the first display region. The second display element is provided in a position overlapping with the second display region.

In the display device of the above embodiment, the first display element includes a liquid crystal layer, and the second display element includes a light-emitting layer.

In the display device of any of the above embodiments, colors of light emitted from the second display element in the first pixel and the second display element in the second pixel are different.

In the display device of any of the above embodiments, the first display element is electrically connected to the first transistor, the second display element is electrically connected to the second transistor, and the first display element and the second display element are separately controlled.

In the display device of the above embodiment, the second display region overlaps with neither a wiring connected to the first transistor nor a wiring connected to the second transistor.

In the display device of any of the above embodiments, the second display element can emit light toward the second transistor side.

In the display device of any of the above embodiments, each of the first transistor and the second transistor includes a metal oxide film in a semiconductor layer.

Another embodiment of the present invention is a display module including a touch sensor and the display device with any one of the above embodiments.

Another embodiment of the present invention is an electronic device including a battery and the display device with any one of the above embodiments or the display module of the above embodiment.

With one embodiment of the present invention, a novel display device that is highly convenient or reliable can be provided. With one embodiment of the present invention, a display device with low power consumption and high display quality can be provided. With one embodiment of the present invention, a display device with high display quality, a high manufacturing yield, and high productivity can be provided. With one embodiment of the present invention, a novel display device can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIG. 5 is a schematic view illustrating a display region of a display element.

FIG. 6 is a schematic view illustrating a display region of a display element.

FIG. 8 is a schematic view illustrating a display region of a display element.

FIGS. 32A to 32C are cross-sectional views illustrating a process for manufacturing a display device.

FIGS. 34A to 34C are cross-sectional views illustrating a process for manufacturing a display device.

FIGS. 36A and 36B are cross-sectional views illustrating a process for manufacturing a display device.

FIGS. 38A to 38C are cross-sectional views illustrating a process for manufacturing a display device.

FIGS. 39A to 39C are cross-sectional views illustrating a process for manufacturing a display device.

FIGS. 40A to 40C are cross-sectional views illustrating a process for manufacturing a display device.

FIGS. 42A and 42B are cross-sectional views illustrating a process for manufacturing a display device.

FIG. 60 is a cross-sectional view illustrating a display element.

BEST MODE FOR CARRYING OUT THE INVENTION

Figure 1:
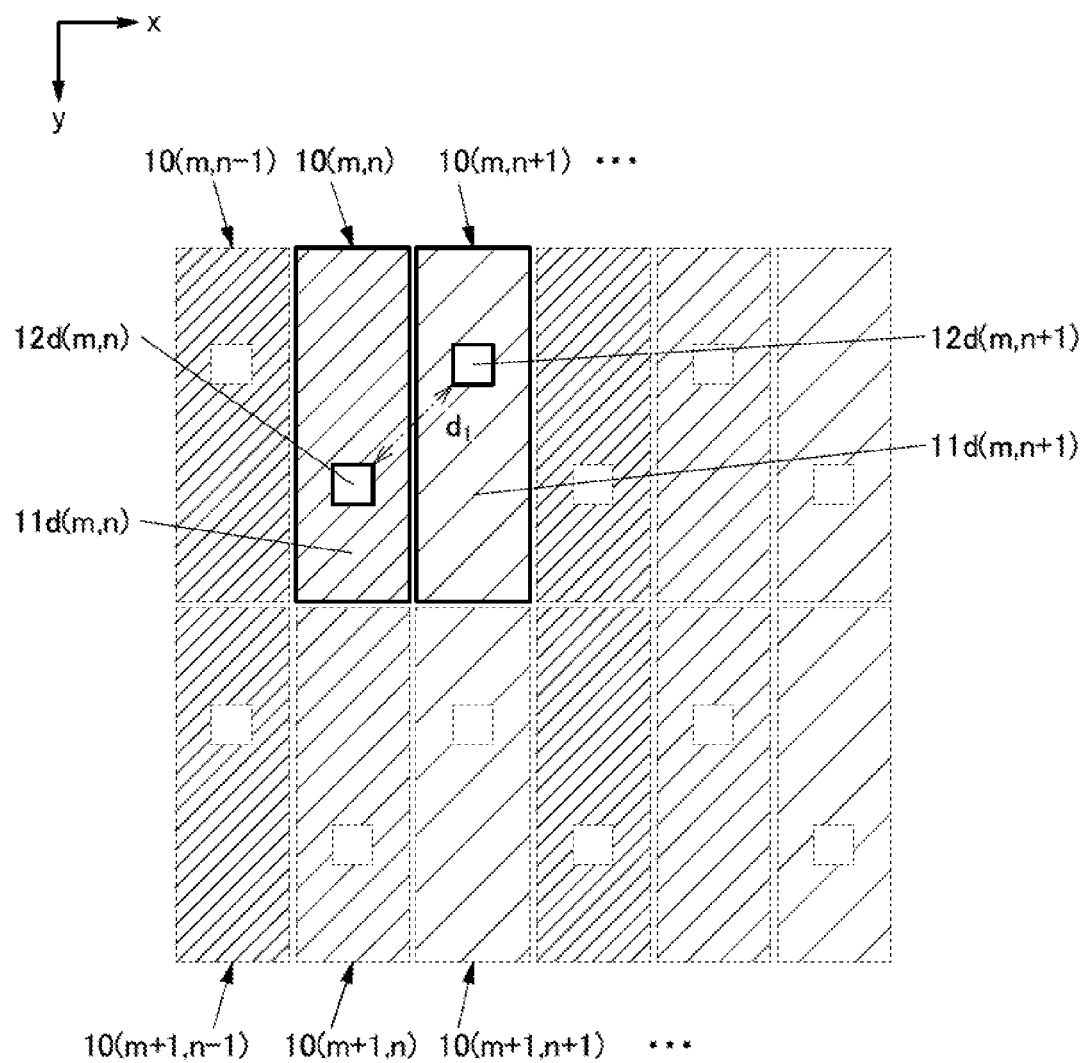
FIG. 1 is a schematic view illustrating a display region of a display element.

Embodiments will be described below with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Note that in structures of the present invention described below, the same portions or portions having similar functions are denoted by the same reference numerals in different drawings, and description thereof is not repeated. Furthermore, the same hatching pattern is applied to portions having similar functions, and the portions are not especially denoted by reference numerals in some cases.

In the drawings, the size, the layer thickness, and the region are exaggerated for clarity in some cases. Therefore, embodiments of the present invention are not limited to such a scale. Note that the drawings are schematic views showing ideal examples, and embodiments of the present invention are not limited to shapes or values shown in the drawings.

Note that in this specification, ordinal numbers such as "first", "second", and "third" are used in order to avoid confusion among components, and the terms do not limit the components numerically.

Note that in this specification, terms for describing arrangement, such as "over" "above", "under", and "below", are used for convenience in describing a positional relation between components with reference to drawings. Furthermore, the positional relation between components is changed as appropriate in accordance with a direction in which each component is described. Thus, there is no limitation on terms used in this specification, and description can be made appropriately depending on the situation.

In this specification and the like, a transistor is an element having at least three terminals of a gate, a drain, and a source. In addition, the transistor has a channel region between a drain (a drain terminal, a drain region, or a drain electrode) and a source (a source terminal, a source region, or a source electrode), and current can flow between the drain and the source through the channel region. Note that in this specification and the like, the channel region refers to a region in which a current mainly flows and whose conductivity can be switched by a gate voltage.

Furthermore, functions of a source and a drain might be switched when transistors having different polarities are employed or a direction of current flow is changed in circuit operation, for example. Therefore, the terms "source" and "drain" can be switched in this specification and the like.

Note that in this specification and the like, the expression "electrically connected" includes the case where components are connected through an "object having any electric function". There is no particular limitation on an "object having any electric function" as long as electric signals can be transmitted and received between components that are connected through the object. Examples of an "object having any electric function" are a switching element such as a transistor, a resistor, an inductor, a capacitor, and elements with a variety of functions as well as an electrode and a wiring.

In this specification and the like, the term "parallel" indicates that in a plane including two straight lines, the angle formed between two straight lines is greater than or equal to −10° and less than or equal to 10°, and accordingly also includes the case where the angle is greater than or equal to −5° and less than or equal to 5°. The term "perpendicular" indicates that in one plane or different planes, the angle formed between two straight lines is greater than or equal to 80° and less than or equal to 100°, and accordingly also includes the case where the angle is greater than or equal to 85° and less than or equal to 95°.

In a closed planar region formed by connecting end portions of curves, line segments, or both, the term "center" in this specification and the like refers to a point positioned inside the region and substantially uniformly distanced from any point in the outer periphery of the region. Accordingly, "center" is not extremely close to a certain portion of the outer periphery and not extremely far from a certain portion of the outer periphery. For example, "center" can be defined by the barycenter of the planar region, the incenter of the planar region, which is the center of the incircle of the planar region, the circumcenter of the planar region, which is the center of the circumscribed circle of the planar region, or the like. In the case where the planar region is a convex quadrilateral, "center" may be defined by a point of intersection of two diagonal lines. However, "center" in this specification and the like can be defined only in the case where these points are positioned inside the region. If these points are not positioned inside the region or are extremely close to a certain portion of the outer periphery, the center may be defined by another point that is substantially uniformly distanced from any point in the outer periphery. Note that when the longest and the shortest sides of the planar region are significantly different and the center is set to a point that is substantially uniformly distanced from any point in the outer periphery, the distance from the center to a point of the outer periphery in the shortest side may be extremely shorter than the distance from the center to a point of the outer periphery in the longest side.

In this specification and the like, the term "planar-view" or "horizontal plane" of the display region, the display element, or the display device means that the shape thereof looks like a plane or a horizontal plane when seen from the above. Accordingly, the term "plan-view" or "horizontal plane" does not mean that the actual surface shape of the display region, the display element, or the display device is a plane or a horizontal plane, unless otherwise specified.

That is, the actual display region, the actual display element, or the actual display device may have unevenness or a gradient even in the case where the shape of the display region, the display element, or the display device looks like a plane or a horizontal plane when seen from the above.

In this specification and the like, the terms "film" and "layer" can be interchanged with each other. For example, in some cases, the term "conductive film" can be used instead of the term "conductive layer", and the term "insulating layer" can be used instead of the term "insulating film".

Unless otherwise specified, off-state current in this specification and the like refers to drain current of a transistor in an off state (also referred to as a non-conducting state and a cutoff state). Unless otherwise specified, the off state of an n-channel transistor means that the voltage between its gate and source ($V_{gs}$: gate-source voltage) is lower than the threshold voltage $V_{th}$, and the off state of a p-channel transistor means that the gate-source voltage $V_{gs}$ is higher than the threshold voltage $V_{th}$. For example, the off-state current of an n-channel transistor sometimes refers to drain current that flows when the gate-source voltage $V_{gs}$ is lower than the threshold voltage $V_{th}$.

The off-state current of a transistor depends on $V_{gs}$ in some cases. Therefore, "the off-state current of a transistor is I or lower" may mean that the off-state current of the transistor is I or lower at a certain $V_{gs}$. The off-state current of a transistor may refer to off-state current at a given $V_{gs}$, at $V_{gs}$ in a given range, at $V_{gs}$ at which sufficiently low off-state current is obtained, or the like.

As an example, an assumption is made that an n-channel transistor has a threshold voltage $V_{th}$ of 0.5 V and a drain current of $1\times10^{-9}$ A at $V_{gs}$ of 0.5 V, $1\times10^{-13}$ A at $V_{gs}$ of 0.1 V, $1\times10^{-19}$ A at $V_{gs}$ of −0.5 V, and $1\times10^{-22}$ A at $V_{gs}$ of −0.8 V. The drain current of the transistor is $1\times10^{-19}$ A or lower at $V_{gs}$ of −0.5 V or at $V_{gs}$ in the range of −0.8 V to −0.5 V; therefore, it may be said that the off-state current of the transistor is $1\times10^{-19}$ A or lower. Since the drain current of the transistor is $1\times10^{-22}$ A or lower at a certain $V_{gs}$, it may be said that the off-state current of the transistor is $1\times10^{-22}$ A or lower.

In this specification and the like, the off-state current of a transistor with a channel width W is sometimes represented by a current value per channel width W or by a current value per given channel width (e.g., 1 μm). In the latter case, the off-state current may be represented by current per length (e.g., A/μm).

The off-state current of a transistor depends on temperature in some cases. Unless otherwise specified, the off-state current in this specification may be off-state current at room temperature, 60° C., 85° C., 95° C., or 125° C. Alternatively, the off-state current may be off-state current at a temperature at which the reliability of a semiconductor device or the like including the transistor is ensured or a temperature at which the semiconductor device or the like including the transistor is used (e.g., a temperature in the range of 5° C. to 35° C.). The state in which the off-state current of a transistor is I or lower may indicate that the off-state current of the transistor at room temperature, 60° C., 85° C., 95° C., 125° C., a temperature at which the reliability of a semiconductor device or the like including the transistor is ensured, or a temperature at which the semiconductor device or the like including the transistor is used (e.g., a temperature in the range of 5° C. to 35° C.) is I or lower at a certain $V_{gs}$.

The off-state current of a transistor depends on the voltage $V_{ds}$ between its drain and source in some cases. Unless otherwise specified, the off-state current in this specification may be off-state current at $V_{ds}$ of 0.1 V, 0.8 V, 1 V, 1.2 V, 1.8

V, 2.5 V, 3 V, 3.3 V, 10 V, 12 V, 16 V, or 20 V. Alternatively, the off-state current may be off-state current at $V_{ds}$ at which the reliability of a semiconductor device or the like including the transistor is ensured or at $V_{ds}$ used in the semiconductor device or the like including the transistor. The state in which the off-state current of a transistor is I or lower may indicate that the off-state current of the transistor at $V_{ds}$ of 0.1 V, 0.8 V, 1 V, 1.2 V, 1.8 V, 2.5 V, 3 V, 3.3 V, 10 V, 12 V, 16 V, or 20 V, at $V_{ds}$ at which the reliability of a semiconductor device or the like including the transistor is ensured, or at $V_{ds}$ used in the semiconductor device or the like including the transistor is I or lower at a certain $V_{gs}$.

In the above description of the off-state current, a drain may be replaced with a source. That is, the off-state current sometimes refers to current that flows through a source of a transistor in the off state.

In this specification and the like, the term "leakage current" sometimes expresses the same meaning as "off-state current". In this specification and the like, the off-state current sometimes refers to current that flows between a source and a drain of a transistor in the off state, for example.

In this specification and the like, a "semiconductor" includes characteristics of an "insulator" in some cases when the conductivity is sufficiently low, for example. Furthermore, it is difficult to strictly distinguish a "semiconductor" and an "insulator" from each other in some cases because a border between the "semiconductor" and the "insulator" is not clear. Accordingly, a "semiconductor" in this specification and the like can be called an "insulator" in some cases. Similarly, an "insulator" in this specification and the like can be called a "semiconductor" in some cases. Alternatively, an "insulator" in this specification and the like can be called a "semi-insulator" in some cases.

In this specification and the like, a "semiconductor" includes characteristics of a "conductor" in some cases when the conductivity is sufficiently high, for example. Further, it is difficult to strictly distinguish a "semiconductor" and a "conductor" from each other in some cases because a border between the "semiconductor" and the "conductor" is not clear. Accordingly, a "semiconductor" in this specification and the like can be called a "conductor" in some cases. Similarly, a "conductor" in this specification and the like can be called a "semiconductor" in some cases.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. That is, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, pixels are dots that constitute an image and each pixel is a smallest unit of a color element that can control the brightness. For example, in the case of a display device including RGB (R: red, G: green, and B: blue) color elements, an R pixel, a G pixel, and a B pixel are a smallest unit of an image. Note that depending on circumstances, the pixel is called a subpixel in some cases.

In this specification and the like, a blue wavelength range refers to a wavelength range of greater than or equal to 400 nm and less than 490 nm, and blue light emission has at least one emission spectrum peak in the wavelength range. A green wavelength range refers to a wavelength range of greater than or equal to 490 nm and less than 550 nm, and green light emission has at least one emission spectrum peak in the wavelength range. A yellow wavelength range refers to a wavelength range of greater than or equal to 550 nm and less than 590 nm, and yellow light emission has at least one emission spectrum peak in the wavelength range. A red wavelength range refers to a wavelength range of greater than or equal to 590 nm and less than or equal to 740 nm, and red light emission has at least one emission spectrum peak in the wavelength range.

Embodiment 1

In this embodiment, a display device of one embodiment of the present invention is described with reference to FIG. 1 to FIG. 59.

<1-1. Structure of Display Device>

First, the structure of a display device is described with reference to FIG. 17 and FIG. 19. A display device 500 illustrated in FIG. 17 and FIG. 19 includes a pixel portion 502, and gate driver circuit portions 504a and 504b and a source driver circuit portion 506 which are placed outside the pixel portion 502.

[Pixel Portion]

The pixel portion 502 includes pixel circuits 10(1, 1) to 10(X, Y) arranged in X rows (X is a natural number of 2 or more) and Y columns (Y is a natural number of 2 or more). Each of the pixel circuits 10(X, Y) includes two display elements having different functions. One of the two display elements has a function of reflecting incident light, and the other has a function of emitting light. Note that the details of the two display elements are described later.

[Gate Driver Circuit Portion]

Some or all of the gate driver circuit portions 504a and 504b and the source driver circuit portion 506 are preferably formed over a substrate over which the pixel portion 502 is formed. Thus, the number of components and the number of terminals can be reduced. In the case where some or all of the gate driver circuit portions 504a and 504b and the source driver circuit portion 506 are not formed over the substrate over which the pixel portion 502 is formed, a separately prepared driver circuit board (e.g., a driver circuit board formed using a single-crystal semiconductor film or a poly-crystalline semiconductor film) may be formed in the display device 500 by chip on glass (COG) or tape automated bonding (TAB).

The gate driver circuit portions 504a and 504b have a function of outputting a signal (a scan signal) for selecting the pixel 10(X, Y). The source driver circuit portion 506 has a function of supplying a signal (data signal) for driving the display elements included in the pixel 10(X, Y).

The gate driver circuit portion 504a has a function of controlling the potentials of wirings supplied with scan signals (hereinafter, such wirings are referred to as scan lines $G_{E\_1}$ to $G_{E\_X}$ in FIG. 17 and scan lines $G_{E\_1a}$ to $G_{E\_Xa}$ and scan lines $G_{E\_1b}$ to $G_{E\_Xb}$ in FIG. 19) or a function of supplying an initialization signal. The gate driver circuit portion 504b has a function of controlling the potentials of wirings supplied with scan signals (hereinafter, such wirings are referred to as scan lines $G_{L\_1}$ to $G_{L\_X}$) or a function of supplying an initialization signal. Without being limited thereto, the gate driver circuit portions 504a and 504b each can control or supply another signal.

Figure 17:
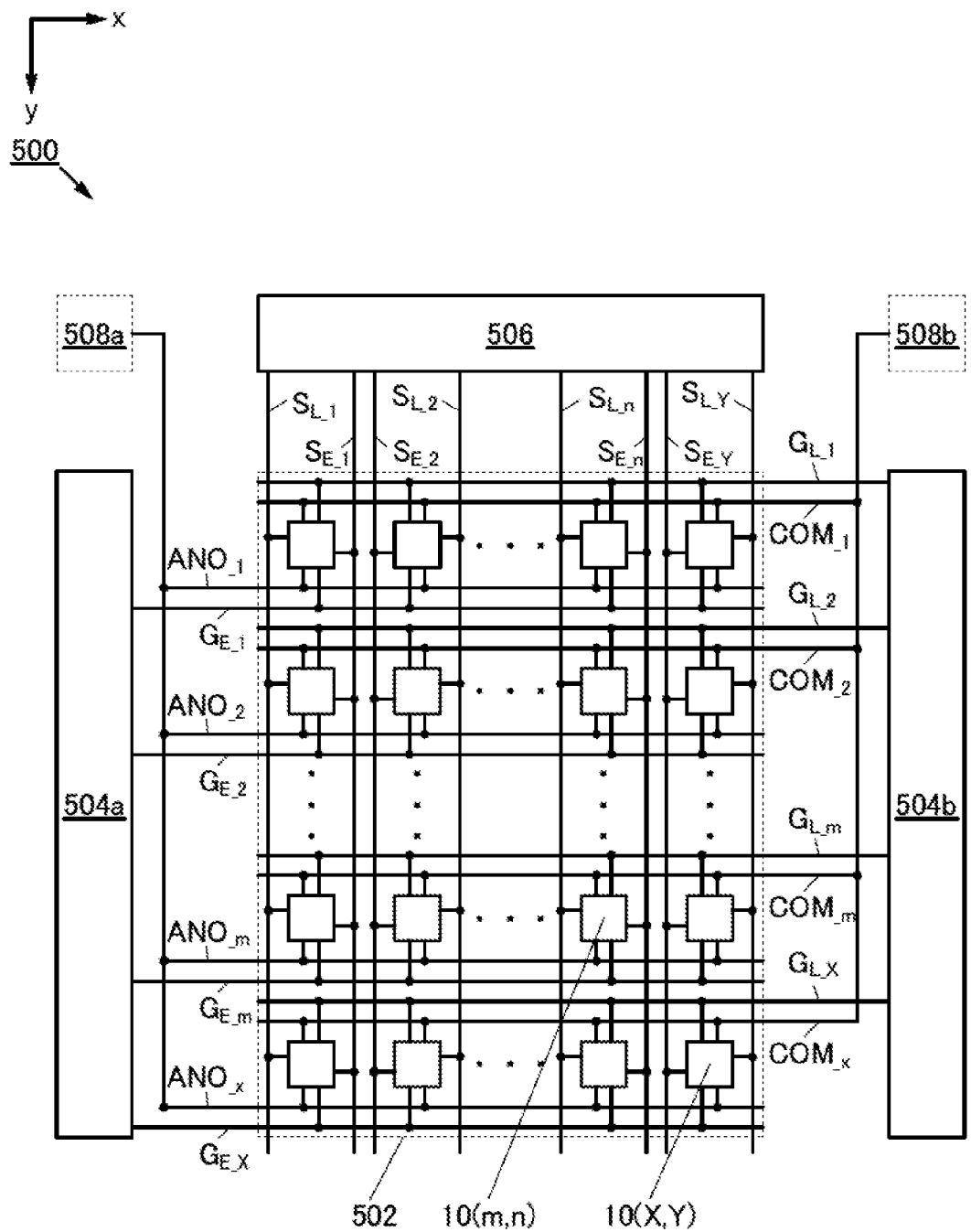
FIG. 17 is a circuit diagram illustrating a display device.
Figure 19:
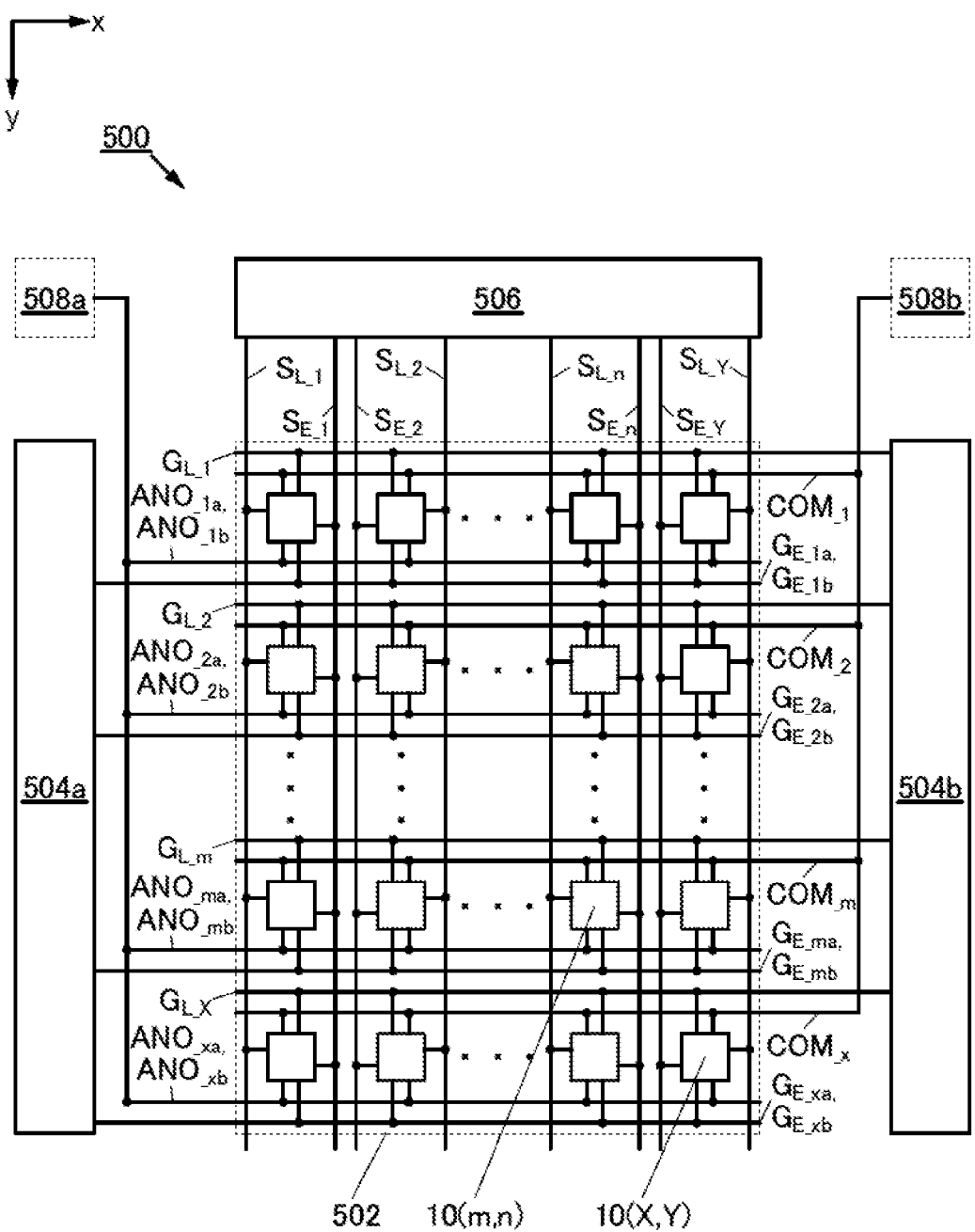
FIG. 19 is a circuit diagram illustrating a display device.

Although the structure in which the two gate driver circuit portions 504a and 504b are provided as gate driver circuit portions is illustrated in FIG. 17 and FIG. 19, the number of the gate driver circuit portions is not limited thereto, and one or three or more gate driver circuit portions may be provided.

[Source Driver Circuit Portion]

The source driver circuit portion 506 has a function of generating a data signal to be written to the pixel 10(X, Y) on the basis of an image signal, a function of controlling the potentials of wirings supplied with data signals (such wirings are hereinafter referred to as signal lines $S_{L\_1}$ to $S_{L\_Y}$ and signal lines $S_{E\_1}$ to $S_{E\_Y}$), or a function of supplying an initialization signal. Without being limited thereto, the source driver circuit portion 506 may have a function of generating, controlling, or supplying another signal.

The source driver circuit portion 506 includes a plurality of analog switches or the like. The source driver circuit portion 506 can output, as data signals, time-divided image signals obtained by sequentially turning on the plurality of analog switches.

Although the structure where one source driver circuit portion 506 is provided is illustrated in FIG. 17 and FIG. 19, the number of the source driver circuit portions is not limited thereto, and a plurality of source driver circuit portions may be provided in the display device 500. For example, two source driver circuit portions may be provided so that the signal lines $S_{L\_1}$ to $S_{L\_Y}$ are controlled by one of the source driver circuit portions and the signal lines $S_{E\_1}$ to $S_{E\_Y}$ are controlled by the other of the source driver circuit portions.

[Pixel]

The pixel 10(X, Y) in FIG. 17 is supplied with a pulse signal from the gate driver circuit portions 504*a* and 504*b* through the scan lines $G_{L\_m}$ and $G_{E\_m}$ and supplied with a data signal from the source driver circuit portion 506 through the signal lines $S_{L\_n}$ and $S_{E\_n}$ in accordance with the potentials of the scan lines $G_{L\_m}$ and $G_{E\_m}$. The pixel 10(X, Y) in FIG. 19 is supplied with a pulse signal through any one of scan lines $G_{L\_1}$ to $G_{L\_X}$ and any one of scan lines $G_{E\_1a}$ to $G_{E\_Xa}$ and any one of scan lines $G_{E\_1b}$ to $G_{E\_Xb}$, and supplied with a data signal through any one of signal lines $S_{L\_1}$ to $S_{L\_Y}$ and any one of signal lines $S_{E\_1}$ to $S_{E\_Y}$.

For example, in FIG. 17, the pixel 10(*m*, *n*) in the m-th row and the n-th column (m is a natural number of X or less, and n is a natural number of Y or less) is supplied with a pulse signal from the gate driver circuit portion 504*a* through the scan lines $G_{L\_m}$ and $G_{E\_m}$ and supplied with a data signal from the source driver circuit portion 506 through the signal lines $S_{L\_n}$ and $S_{E\_n}$ in accordance with the potentials of the scan lines $G_{L\_m}$ and $G_{E\_m}$. In FIG. 19, the pixel 10(*m*, *n*) in the m-th row and the n-th column (m is a natural number of X or less, and n is a natural number of Y or less) is supplied with a pulse signal from the gate driver circuit portion 504*a* through the scan lines $G_{L\_m}$ and $G_{E\_ma}$ and supplied with a data signal from the source driver circuit portion 506 through the signal lines $S_{L\_n}$ and $S_{E\_n}$ in accordance with the potentials of the scan lines $G_{L\_m}$ and $G_{E\_ma}$.

The pixel 10(*m*, *n*) includes two display elements as described above. The scan lines $G_{L\_1}$ to $G_{L\_X}$ are wirings which control the potential of one of the two display elements. The scan lines $G_{E\_1}$ to $G_{E\_X}$ in FIG. 17 and the scan lines $G_{E\_1a}$ to $G_{E\_Xa}$ in FIG. 19 are wirings which control the potential of the other of the two display elements.

The signal lines $S_{L\_1}$ to $S_{L\_Y}$ are wirings which control the potential of a data signal supplied to one of the two display elements. The signal lines $S_{E\_1}$ to $S_{E\_Y}$ are wirings which control the potential of a data signal supplied to the other of the two display elements.

In FIG. 19, the pixel 10(*m*, *n*+1) is supplied with a pulse signal from the gate driver circuit portion 504*a* through the scan lines $G_{L\_m}$ and $G_{E\_mb}$ and supplied with a data signal from the source driver circuit portion 506 through the signal lines $S_{L\_n}$ and $S_{E\_n}$ in accordance with the potentials of the scan lines $G_{L\_m}$ and $G_{E\_mb}$.

In FIG. 19, the pixel 10(*m*, *n*+1) includes two display elements as well as the pixel 10(*m*, *n*). The scan lines $G_{L\_1}$ to $G_{L\_X}$ are wirings which control a potential of one of the two display elements. The scan lines $G_{E\_1b}$ to $G_{E\_Xb}$ are wirings which control a potential of the other of the two display elements.

Figure 20:
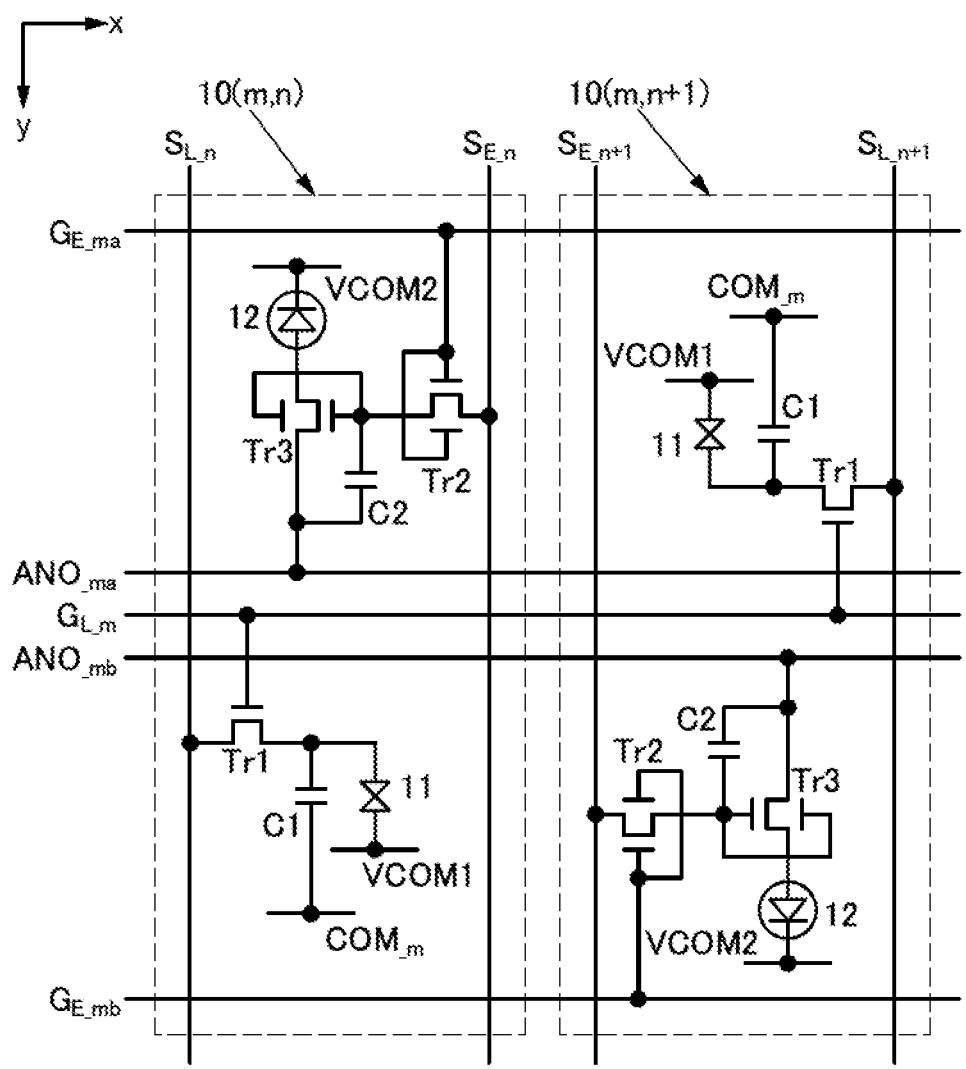
FIG. 20 is a circuit diagram illustrating a pixel.

Note that the scan line $G_{E\_Xa}$ and the scan line $G_{E\_Xb}$ are illustrated as one wiring in FIG. 19. FIG. 20 shows the details.

[External Circuit]

External circuits 508*a* and 508*b* are connected to the display device 500. Note that the external circuits 508*a* and 508*b* may be formed in the display device 500.

As shown in FIG. 17 and FIG. 19, the external circuit 508*a* is electrically connected to wirings supplied with anode potentials (hereinafter referred to as anode lines $ANO\_1$ to $ANO\_x$ in FIG. 17 and anode lines $ANO\_{1a}$ to $ANO\_{xa}$ and anode lines $ANO\_{1b}$ to $ANO\_{xb}$ in FIG. 19), and the external circuit 508*b* is electrically connected to wirings supplied with common potentials (hereinafter referred to as common lines $COM\_1$ to $COM\_x$).

Note that in FIG. 19, the anode lines $ANO\_{1a}$ to $ANO\_{xa}$ and the anode lines $ANO\_{1b}$ to $ANO\_{xb}$ correspond to one wiring. FIG. 20 shows the details.

<1-2. Circuit Configuration of Pixels>

Next, the circuit configuration of the pixel 10(*m*, *n*) is described with reference to FIG. 18 to FIG. 20.

Figure 18:
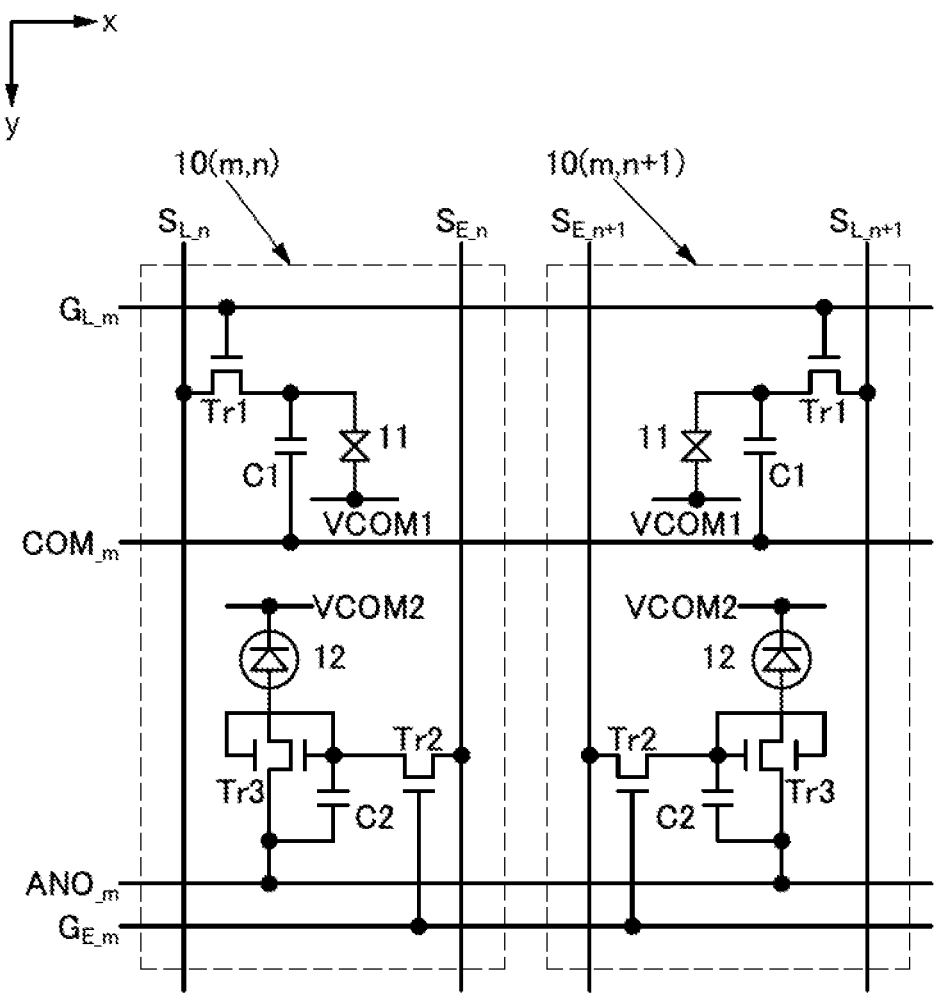
FIG. 18 is a circuit diagram illustrating a pixel.

Each of FIG. 18 and FIG. 20 is a circuit diagram showing the pixel 10(*m*, *n*) and a pixel 10(*m*, *n*+1) that is adjacent to the pixel 10(*m*, *n*) in the column direction. The pixels 10(*m*, *n*) and 10(*m*, *n*+1) are included in the display device 500 of one embodiment of the present invention. In this specification and the like, the column direction is a direction in which the value of n of the signal line $S_{L\_n}$ (or the signal line $S_{E\_n}$) increases and decreases and the row direction is a direction in which the value of m of the scan line $G_{L\_m}$ (or the scan line $G_{E\_m}$) increases and decreases.

In this specification and the like, the pixel 10(*m*, *n*) is called a first pixel and the pixel 10(*m*, *n*+1) is called a second pixel in some cases.

In this specification and the like, a direction parallel to a direction in which the pixel 10(*m*, *n*) and the pixel 10(*m*, *n*+1) are adjacent to each other is referred to as a column direction, and a direction perpendicular to the direction in which the pixel 10(*m*, *n*) and the pixel 10(*m*, *n*+1) are adjacent to each other is referred to as a row direction.

Note that in this specification and the like, the column direction is called an x direction, and the row direction is called a y direction in some cases.

The pixel 10(*m*, *n*) includes a transistor Tr1, a transistor Tr2, a transistor Tr3, a capacitor C1, a capacitor C2, a display element 11, and a display element 12. The pixel 10(*m*, *n*+1) has a similar structure. Note that in this specification and the like, the display element 11 is called a first display element and the display element 12 is called a second display element in some cases.

The display element 11 is electrically connected to the transistor Tr1, and the display element 12 is electrically connected to the transistor Tr2 and the transistor Tr3. Note that in this specification, the transistor Tr1 is called a first transistor in some cases. The transistor Tr2 or the transistor Tr3 is called a second transistor in some cases.

The pixel $10(m, n)$ is electrically connected to the signal line $S_{L\_n}$, the signal line $S_{E\_n}$, the scan line $G_{L\_m}$, the scan line $G_{E\_m}$, a common line COM$\_m$, a common line VCOM1, a common line VCOM2, and an anode line ANO$\_m$. The pixel $10(m, n+1)$ is electrically connected to a signal line $S_{L\_n+1}$, a signal line $S_{E\_n+1}$, the scan line $G_{L\_m}$, the scan line $G_{E\_m}$, the common line COM$\_m$, the common line VCOM1, the common line VCOM2, and an anode line ANO$\_m$. In FIG. 20, the pixel $10(m, n)$ is electrically connected to the signal line $S_{L\_n}$, the signal line $S_{E\_n}$, the scan line $G_{L\_m}$, the scan line $G_{E\_ma}$, a common line COM$\_m$, a common line VCOM1, a common line VCOM2, and an anode line ANO$\_ma$. The pixel $10(m, n+1)$ is electrically connected to a signal line $S_{L\_n+1}$, a signal line $S_{E\_n+1}$, the scan line $G_{L\_m}$, the scan line $G_{E\_mb}$, the common line COM$\_m$, the common line VCOM1, the common line VCOM2, and the anode line ANO$\_mb$.

In FIG. 18, each of the signal lines $S_{L\_n}$ and $S_{L\_n+1}$, the scan line $G_{L\_m}$, the common line COM$\_m$, and the common line VCOM1 is a wiring for driving the display element 11. Each of the signal lines $S_{E\_n}$ and $S_{E\_n+1}$, the scan line $G_{E\_m}$, the common line VCOM2, and the anode line ANO$\_m$ is a wiring for driving the display element 12. In FIG. 20, each of the signal lines $S_{L\_n}$ and $S_{L\_n+1}$, the scan line $G_{L\_m}$, the common line COM$\_m$, and the common line VCOM1 is a wiring for driving the display element 11. Each of the signal lines $S_{E\_n}$ and $S_{E\_n+1}$, the scan lines $G_{E\_ma}$ and $G_{E\_mb}$, the common line VCOM2, and the anode lines ANO$\_ma$ and ANO$\_mb$ is a wiring for driving the display element 12.

In the case where a potential supplied to the signal lines $S_{E\_n}$ and $S_{E\_n+1}$ is different from a potential supplied to the signal lines $S_{L\_n}$ and $S_{L\_n+1}$, the signal line $S_{E\_n}$ and the signal line $S_{L\_n+1}$ are preferably positioned apart from each other as shown in FIG. 20. In other words, the signal line $S_{E\_n}$ is preferably positioned adjacent to the signal line $S_{E\_n+1}$. With this arrangement, an influence of the potential difference between the signal lines $S_{L\_n}$ and $S_{L\_n+1}$ and signal lines $S_{E\_n}$ and $S_{E\_n+1}$ can be reduced.

<1-3. Structure Example of First Display Element>

The display element 11 has a function of controlling transmission or reflection of light. In particular, the display element 11 is preferably a reflective display element which controls reflection of light. The display element 11 serving as a reflective display element can reduce power consumption of the display device because display can be performed with the use of external light. For example, the display element 11 may have a combined structure of a reflective film, a liquid crystal element, and a polarizing plate.

A reflective display element other than a reflective liquid crystal element can be used as the display element 11. For example, as the display element 11, a Micro Electro Mechanical Systems (MEMS) shutter element, an optical interference type MEMS element, a display element using a microcapsule method, an electrophoretic method, an electrowetting method, an Electronic Liquid Powder (registered trademark) method, or the like can be used.

<1-4. Structure Example of Second Display Element>

The display element 12 has a function of emitting light. Therefore, the display element 12 may be rephrased as a light-emitting element. For example, an electroluminescent element (also referred to as an EL element) such as an organic light-emitting diode (OLED) or a quantum-dot light-emitting diode (QLED), a light-emitting diode, or a semiconductor laser may be used as the display element 12.

As described above, in the display device of one embodiment of the present invention, display elements with different functions like the display elements 11 and 12 are used. In the case where a reflective liquid crystal element is used as one of the display elements and a transmissive EL element is used as the other of the display elements, a novel display device that is highly convenient or reliable can be provided. Furthermore, a display device with low power consumption and high display quality can be provided when a reflective liquid crystal element is used in an environment with bright external light and a transmissive EL element is used in an environment with dark external light.

<1-5. Driving Method of Display Element>

Next, a method for driving the display element 11 and the display element 12 is described. Note that a structure including a liquid crystal element as the display element 11 and a light-emitting element as the display element 12 is used in the description below.

[Driving Method of First Display Element]

In the pixel $10(m, n)$, a gate electrode of the transistor Tr1 is electrically connected to the scan line $G_{L\_m}$. One of a source electrode and a drain electrode of the transistor Tr1 is electrically connected to the signal line $S_{L\_n}$, and the other is electrically connected to one of a pair of electrodes of the display element 11. The transistor Tr1 has a function of controlling writing of a data signal.

The other of the pair of electrodes of the display element 11 is electrically connected to the common line VCOM1.

One of a pair of electrodes of the capacitor C1 is electrically connected to the common line COM$\_m$, and the other of the pair of electrodes of the capacitor C1 is electrically connected to the other of the source electrode and the drain electrode of the transistor Tr1 and the one of the pair of electrodes of the display element 11. The capacitor C1 has a function of storing data written to the pixel $10(m, n)$.

For example, the gate driver circuit portion 504b in FIG. 19 sequentially selects the pixels $10(1, 1)$ to $10(m, n)$ row by row to turn on the transistor Tr1, and data of data signals are written. When the transistor Tr1 is turned off, the pixel $10(m, n)$ to which the data has been written is brought into a holding state. This operation is sequentially performed row by row; thus, an image is displayed.

[Driving Method of Second Display Element]

A gate electrode of the transistor Tr2 is electrically connected to the scan line $G_{E\_ma}$ in the pixel $10(m, n)$. One of a source electrode and a drain electrode of the transistor Tr2 is electrically connected to the signal line $S_{E\_n}$ and the other of the source electrode and the drain electrode is electrically connected to a gate electrode of the transistor Tr3. The transistor Tr2 has a function of controlling writing of a data signal. The transistor Tr2 includes a back gate electrode. The back gate electrode is electrically connected to the gate electrode of the transistor Tr2.

One of a pair of electrodes of the capacitor C2 is electrically connected to the anode line ANO$\_ma$. The other of the pair of electrodes of the capacitor C2 is electrically connected to the other of the source electrode and the drain electrode of the transistor Tr2. The capacitor C2 has a function of storing data written to the pixel $10(m, n)$.

The gate electrode of the transistor Tr3 is electrically connected to the other of the source electrode and the drain electrode of the transistor Tr2. One of a source electrode and a drain electrode of the transistor Tr3 is electrically connected to the anode line ANO$\_ma$. The other of the source electrode and the drain electrode of the transistor Tr3 is electrically connected to one of a pair of electrodes of the display element 12. The transistor Tr3 includes a back gate electrode. The back gate electrode is electrically connected to the gate electrode of the transistor Tr3.

The other of the pair of electrodes of the display element 12 is electrically connected to the common line VCOM2.

For example, the gate driver circuit portion 504a in FIG. 19 sequentially selects the pixels 10(1, 1) to 10(m, n) row by row to turn on the transistors Tr2, and data of data signals are written. When the transistor Tr2 is turned off, the pixel 10(m, n) to which the data has been written is brought into a holding state. Furthermore, the amount of current flowing between the source electrode and the drain electrode of the transistor Tr3 is controlled in accordance with the potential of the written data signal. The display element 12 emits light with a luminance corresponding to the amount of flowing current. This operation is sequentially performed row by row; thus, an image is displayed.

When the scan line $G_{E\_ma}$ and the anode line ANO_$_{ma}$ in a display element in the pixel 10(m, n) are rephrased to the scan line $G_{E\_mb}$ and the anode line ANO_$_{mb}$ in the pixel 10(m, n+1), respectively, a display element in the pixel 10(m, n+1) can be driven in a manner similar to that of the display element in the pixel 10(m, n).

In this manner, two display elements can be controlled separately with the use of different transistors in the display device of one embodiment of the present invention. Accordingly, a display device having high display quality can be provided.

Transistors used in the display device of one embodiment of the present invention (the transistors Tr1, Tr2, and Tr3) each include a metal oxide film as a semiconductor layer. The transistor including a metal oxide film can have relatively high field-effect mobility and thus can operate at high speed. The off-state current of the transistor including a metal oxide film is extremely low. Therefore, the luminance of the display device can be maintained even when the refresh rate of the display device is lowered, so that power consumption can be lowered.

Transistors (e.g., the first transistor and the second transistor) used in the display device of one embodiment of the present invention are preferably formed over the same layer, in which case the total thickness of the display device can be reduced and a decrease in light extraction efficiency of the display element can be suppressed.

The small total thickness of the display device is advantageous in the case where the display device of one embodiment of the present invention has flexibility.

Furthermore, by forming transistors (e.g., the first transistor and the second transistor) used in the display device of one embodiment of the present invention over the same layer, the number of steps for forming the transistors can be reduced.

Moreover, the display element 12 used in the display device of one embodiment of the present invention is preferably a bottom emission type display element from which light is emitted toward the second transistor electrically connected to the display element 12.

In the display device of one embodiment of the present invention, it is preferable that light be emitted toward the second transistor electrically connected to the display element 12, and transistors (e.g., the first transistor and the second transistor) be formed over the same layer because a reduction in the number of manufacturing steps and high display quality can be achieved.

A progressive type display, an interlace type display, or the like can be employed as the display type of the display element 11 and the display element 12. Further, as color elements controlled in the pixel at the time of color display, three colors of R (red), G (green), and B (blue) can be given. Note that color elements are not limited to the three colors of R, G, and B. For example, one or more colors of yellow, cyan, magenta, white, and the like may be added to RGB. Further, the sizes of display regions may be different between respective dots of color elements. However, the display device of one embodiment of the present invention is not limited to a color display device and can be applied to a monochrome display device.

<1-6-1. Display Region (1) of Display Element>

The display regions of the display elements 11 and 12 in the pixel 10(m, n) in the display device of one embodiment of the present invention are described with reference to FIG. 1 to FIG. 8.

FIG. 1 is a schematic view illustrating display regions of the pixel 10(m, n) and pixels 10(m, n−1) and 10(m, n+1) which are adjacent to the pixel 10(m, n) in the column direction. FIG. 1 illustrates a pixel 10(m+1, n−1), a pixel 10(m+1, n), a pixel 10(m+1, n+1), and the like positioned near the pixel 10(m, n). Note that in this specification and the like, the pixel 10(m, n) is called a first pixel, the pixel 10(m, n+1) is called a second pixel, the pixel 10(m+1, n) is called a third pixel, and the pixel 10(m, n−1) is called a fourth pixel in some cases.

The pixel 10(m, n) illustrated in FIG. 1 includes a display region 11d(m, n) that functions as a display region of the display element 11 and a display region 12d(m, n) that functions as a display region of the display element 12. The pixel 10(m, n+1) illustrated in FIG. 1 includes a display region 11d(m, n+1) that functions as a display region of the display element 11 and a display region 12d(m, n+1) that functions as a display region of the display element 12.

In the following description, the display region 11d(m, n) and the display region 11d(m, n+1) are collectively described as display regions 11d in some cases when they are not distinguished. Similarly, the display region 12d(m, n) and the display region 12d(m, n+1) are described as display regions 12d in some cases. In this specification and the like, the display region 11d is called a first display region and the display region 12d is called a second display region in some cases.

For example, the display region 11d has a function of reflecting light and the display region 12d has a function of emitting light. The display region 12d is provided inside the display region 11d. The display element 11 is provided to overlap with the display region 11d and the display element 12 is provided to overlap with the display region 12d.

The area of the display region 12d is preferably smaller than that of the display region 11d, in which case power consumption of the display device can be reduced. For example, in an environment with bright external light, the display element 11 reflects light and displays an image in the display region 11d, and in an environment with dark external light, the display element 12 emits light and displays an image in the display region 12d. With this structure, a display device with low power consumption and high display quality can be provided.

Here, the position where the display region 12d is provided is described below.

For example, in the case where an EL element is used as the display element 12 disposed to overlap with the display region 12d, as methods for forming the EL element, two methods are given: a color filter method in which the same EL element is used for pixels and emission colors of the pixels are changed with use of color films (color filters); and a separate coloring method in which EL elements for the respective pixels are separately formed to have different emission colors. In order to improve the color purity, a separate coloring method and a color film may be combined.

In the case of a separate coloring method, an EL element needs to be formed for each pixel, and high accuracy for forming (aligning) an opening in a desired position in a shadow mask (also referred to as a fine metal mask) is required. When a display device has high pixel density (i.e., high resolution), the alignment accuracy needs to be high, which decreases the manufacturing yield of the display device.

However, by employing, for example, arrangement of the display regions 12d illustrated in FIG. 1 in which positions of the display regions 12d in adjacent pixels are different, the distance between the display regions 12d in adjacent pixels can be increased, which increases the manufacturing yield in the case where the display elements 12 are separately formed.

In FIG. 1, the distance between the display region 12d(m, n) and the display region 12d(m, n+1) is indicated as a distance $d_1$. The distance $d_1$ is greater than or equal to 20 μm, preferably greater than or equal to 25 μm, more preferably greater than or equal to 30 μm, in which case the manufacturing yield of the display device can be increased. Note that in the case where the distance $d_1$ is less than 20 μm, the manufacturing yield of the display device is decreased.

Figure 2:
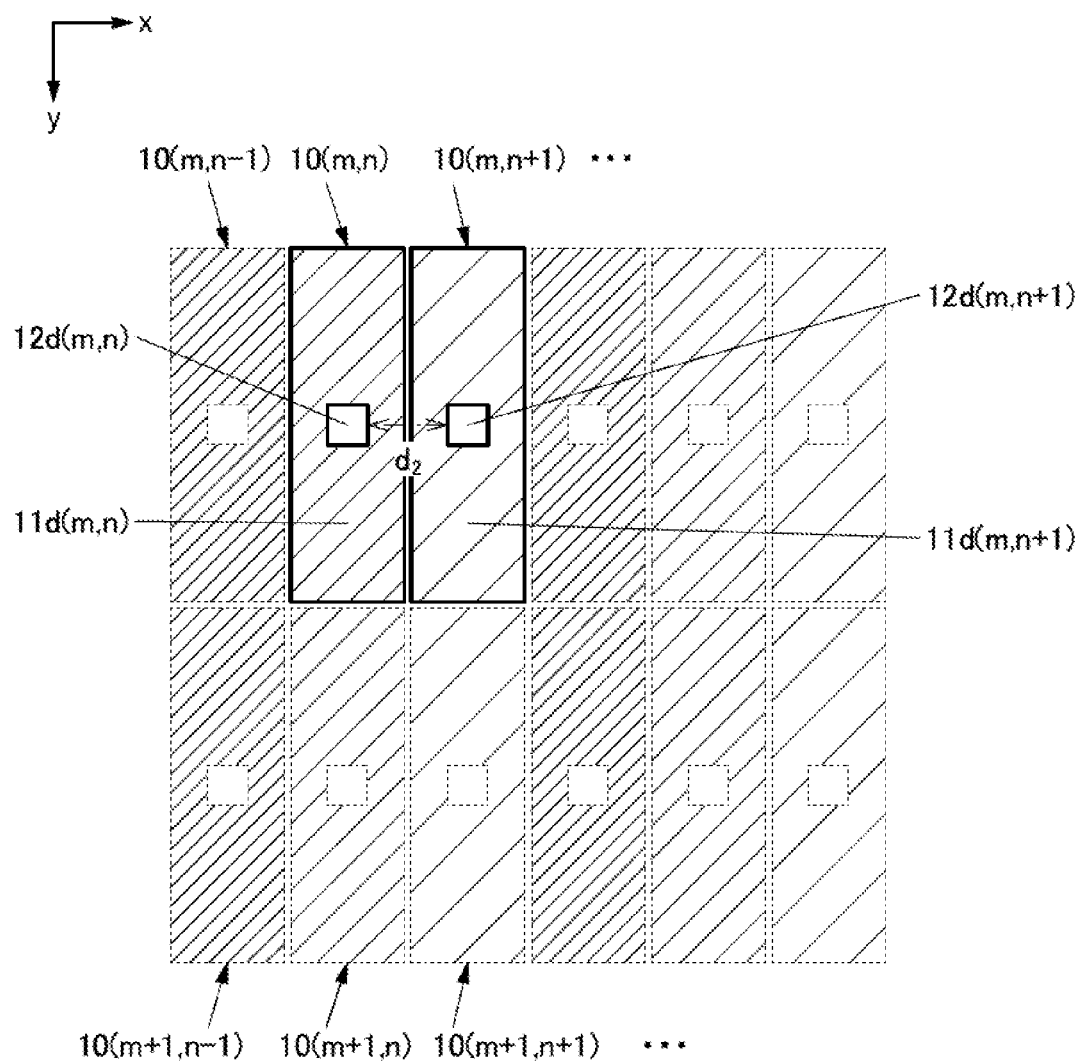
FIG. 2 is a schematic view illustrating a display region of a display element.

FIG. 2 illustrates an example in which positions of the second display regions 12d in adjacent pixels are the same. In FIG. 2, a distance between the display region 12d(m, n) and the display region 12d(m, n+1) is indicated as a distance $d_2$.

When the distance $d_1$ in FIG. 1 and the distance $d_2$ in FIG. 2 are compared, a relation $d_1 > d_2$ is established. Thus, the distance in the case where the positions of the display regions 12d in adjacent pixels are different can be larger than that in the case where the positions of the display regions 12d in adjacent pixels are the same by approximately 10% or more.

With the arrangement of the display regions 12d in FIG. 1, an interference of light emitted from adjacent display elements 12 can be suppressed.

Figure 3:
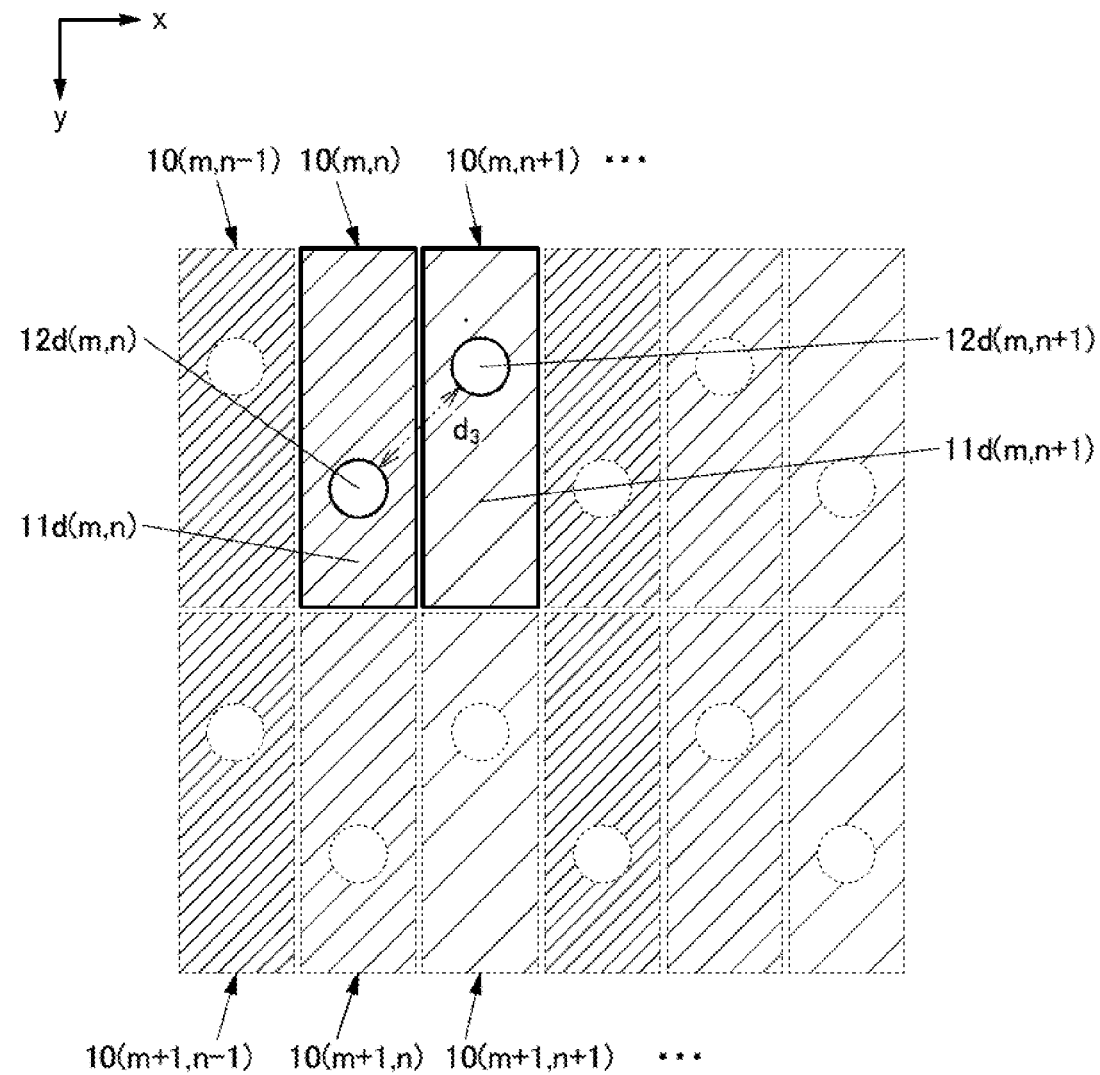
FIG. 3 is a schematic view illustrating a display region of a display element.

Note that FIG. 1 illustrates an example in which the display region 12d has a rectangular shape, but one embodiment of the present invention is not limited thereto. The display region 12d can have a non-rectangular shape. FIG. 3 illustrates an example in which the display region 12d has a non-rectangular shape.

FIG. 3 is a schematic view illustrating an example of pixel arrangement. The display region 12d in FIG. 3 has a circular shape. In FIG. 3, a distance between the display region 12d(m, n) and the display region 12d(m, n+1) is indicated as a distance $d_3$. When a diagonal line of the rectangular shape of the display region 12d and a diameter of the circular shape of the display region 12d have the same length, the area of the display region 12d with a circular shape in FIG. 3 can be larger than the area of the display region 12d with a rectangular shape in FIG. 1.

As described above, the display region 12d can have various shapes (for example, polygonal shapes such as a triangle and a rectangle, circular shapes such as a circle and an ellipse, and a combination of a polygonal shape and a circular shape).

In addition, when the area of the display region 12d can be increased, an element with a higher aperture ratio can be formed. Thus, a display device with higher luminance and a longer lifetime can be manufactured. Alternatively, when the area of the display region 12d is not changed, by reducing the distance between pixels, a display element with higher resolution can be formed while maintaining its luminance.

Although FIG. 3 illustrates an example in which the display region 12d has a circular shape, the area of the display region 12d can be increased by equalizing the distances $d_3$. In the display device of one embodiment of the present invention, the display region 12d has a rhombic shape. This case is illustrated in FIG. 4.

Figure 4:
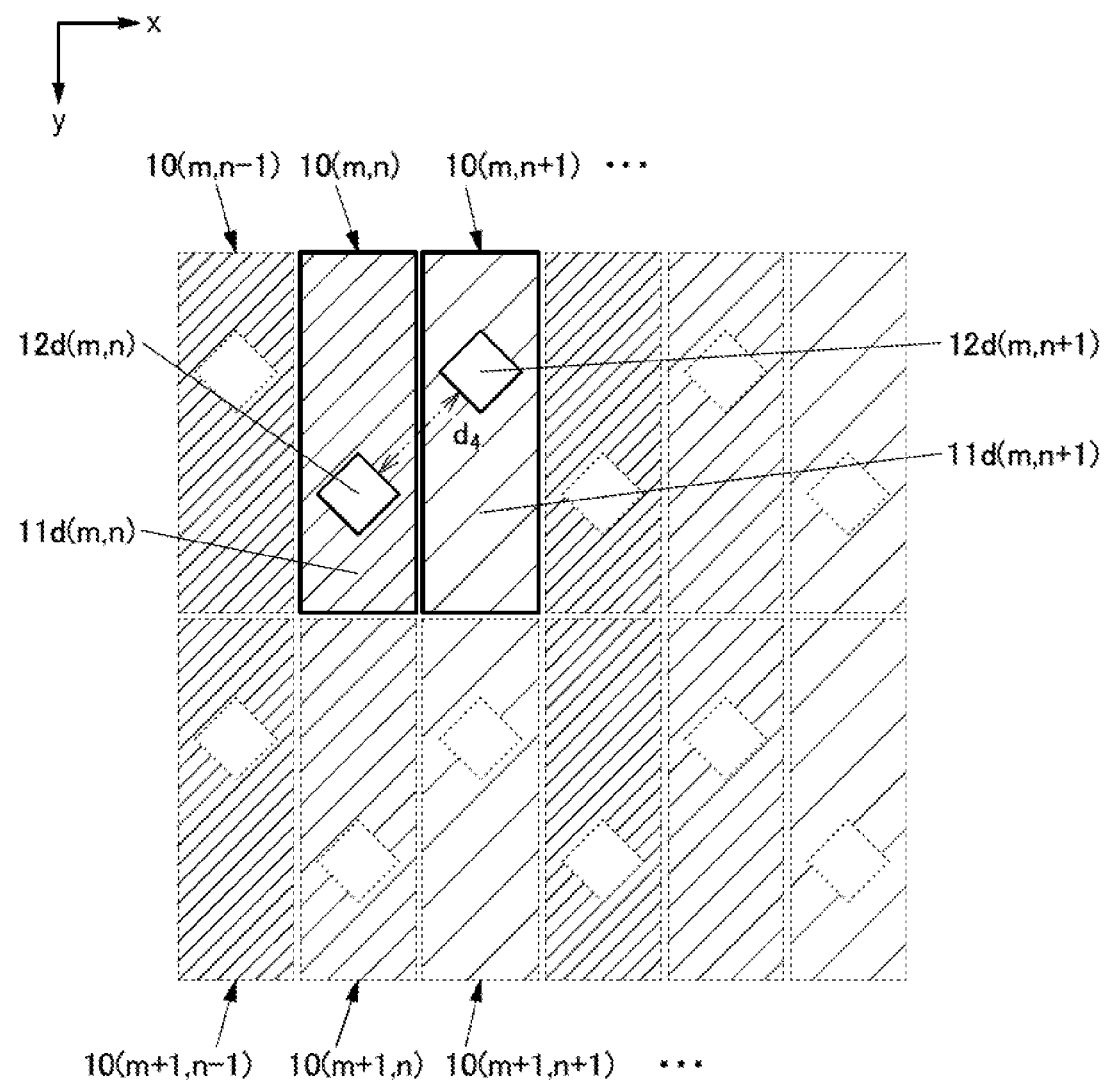
FIG. 4 is a schematic view illustrating a display region of a display element.

FIG. 4 is a schematic view illustrating an example of pixel arrangement in the display device of one embodiment of the present invention. The display region 12d in FIG. 4 has a square shape. In FIG. 4, a distance between the display region 12d(m, n) and the display region 12d(m, n+1) is indicated as a distance $d_4$. When the diameter of the circular shape of the display region 12d in FIG. 3 and a side of the square shape of the display region 12d in FIG. 4 have the same length and $d_4$ in FIG. 4 equals to $d_3$ in FIG. 3, the square display region 12d in FIG. 4 can have a larger area than the circular display region 12d in FIG. 3.

Although FIG. 4 illustrates an example in which the display region 12d has a square shape, the shape of the display region 12d which enables the display region 12d to have a larger area and maintain the distance between pixels is not limited to the square shape. For example, by changing the position of the display region 12d inside an outer periphery of the display region 11d, the display region 12d can have an increased area while maintain the distance between pixels. This case is illustrated in FIG. 5.

FIG. 5 is a schematic view illustrating an example of pixel arrangement in the display device of one embodiment of the present invention. This pixel arrangement is more suitable than that in FIG. 4. FIG. 5 illustrates an example in which the display region 12d has a rhombic shape. In FIG. 5, a distance between the display region 12d(m, n) and the display region 12d(m, n+1) is indicated as a distance $d_5$. In FIG. 5, an upper right side of the display region 12d(m, n) and a lower left side of the display region 12d(m, n+1) are parallel lines apart from each other by the distance $d_5$. Here, an arrow direction that denotes the distance $d_5$ is perpendicular to the parallel lines.

Although FIG. 5 illustrates an example in which upper left sides of the adjacent display regions 12d(m, n) and 12d(m, n+1) are not in the same straight line and lower right sides thereof are not in the same straight line, the structure is not limited to this. For example, a structure illustrated in FIG. 6 may be employed.

FIG. 6 is a schematic view illustrating an example of pixel arrangement in the display device of one embodiment of the present invention. This pixel arrangement is more suitable than that in FIG. 5 and the most suitable pixel arrangement. Note that FIG. 6 illustrates the case where the display region 12d has a rhombic shape, the upper left sides of the display regions 12d(m, n) and 12d(m, n+1) are in the same straight line, the lower right sides thereof are in the same straight line, the upper right sides of the display regions 12d(m, n) and 12d(m, n−1) are in the same straight line, and the lower left sides thereof are in the same straight line. With such a structure, the area of the display region 12d in FIG. 6 can be larger than that in FIG. 5 without making the distance $d_6$ in FIG. 6 shorter than the distance $d_5$ in FIG. 5.

By employing the pixel arrangement in FIG. 6, the opening in the shadow mask used for manufacturing the display device can have a simpler shape, so that the design accuracy and mechanical strength of the shadow mask can be increased. The shadow mask with high mechanical strength is less likely to be deformed due to, for example, bending, distortion, expansion, or contraction, increasing the manufacturing yield.

Figure 7A:
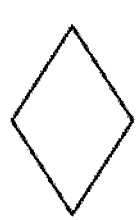
FIGS. 7A to 7D are schematic views each illustrating a display region of a display element.

In the examples illustrated in FIG. 4 to FIG. 6 where the planar shape of the display region 12d is a rhombic shape or a square shape, planar shapes of portions corresponding to vertexes of the display region 12d have acute angles, right angles, or obtuse angles as illustrated in FIG. 7A. The planar shapes of the portions corresponding to the vertexes of the display region 12d that is substantially rhombic or square may be shapes other than these depending on the accuracy of forming the display region. Therefore, the shapes of portions corresponding to the vertexes of the display region 12d are not limited to acute angles, right angles, and obtuse angles. For example, shapes illustrated in FIGS. 7B to 7D may be employed.

Figure 7B:
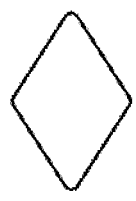
Figure 7C:
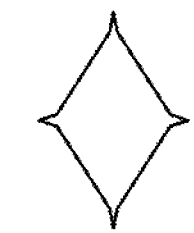
Figure 7D:
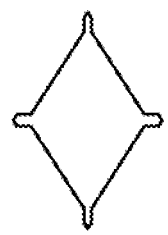

FIGS. 7A to 7D are schematic views illustrating portions corresponding to the vertexes of the display region 12d. As illustrated in FIG. 7B, the portions corresponding to the vertexes may be curved without having edge points. Alternatively, as illustrated in FIG. 7C or FIG. 7D, the portions corresponding to the vertexes may be projecting toward the outer direction. The shapes of the projecting portions are not limited to the shapes in FIGS. 7C and 7D.

In FIG. 4 to FIG. 6, the pixel 10(m, n−1), the pixel 10(m, n), and the pixel 10(m, n+1) are arranged in stripes in the column direction, but one embodiment of the present invention is not limited thereto. For example, a structure illustrated in FIG. 8 may be employed.

FIG. 8 is a schematic view of a display region including the pixel 10(m, n) and the pixels 10(m, n−1) and 10(m, n+1) which are adjacent to the pixel 10(m, n) in the column direction. In FIG. 8, pixels near the pixel 10(m, n) such as the pixel 10(m+1, n−1), a pixel 10(m', n), the pixel 10(m+1, n), a pixel 10(m'+1, n), and the pixel 10(m+1, n+1) are illustrated.

In the structure in FIG. 8, the display region 11d(m, n) and the display region 11d(m, n+1) have different areas. In this way, the areas of the display regions 11d in adjacent pixels may be different. This applies to the display regions 12d which are not illustrated.

When the structure of FIG. 8 is employed, the pixel 10(m, n+1) in FIG. 1 is disposed in the position of the pixel 10(m', n) in FIG. 8.

Note that in FIG. 8, a distance between the pixel 10(m, n) and the pixel 10(m, n+1) is indicated as a distance $d_8$, and a distance between the pixel 10(m, n) and the pixel 10(m', n) is indicated as a distance $d_9$. The distance $d_8$ and the distance $d_9$ preferably have the same length, in other words, the display regions 12d are preferably provided at equal intervals. With such a structure, openings in the shadow mask can be equally spaced, which increases the mechanical strength of the shadow mask and thus distortion of the shadow mask at evaporation can be suppressed.

As illustrated in FIG. 8, the positions of the display regions 12d in the pixel 10(m, n+1) adjacent to the pixel 10(m, n) in the column direction and in the pixel 10(m', n) are different from the position of the display region 12d in the pixel 10(m, n). In other words, the pixel 10(m, n) and the pixel 10(m, n+1) are provided adjacent to each other, and the display region 12d(m, n) included in the pixel 10(m, n) and the display region 12d(m, n+1) included in the pixel 10(m, n+1) are provided in different portions inside the respective display regions 11d.

With the arrangement of the display regions 12d as illustrated in FIG. 8, the manufacturing yield in the case where the display elements 12 are separately formed can be increased. In addition, with the arrangement of the display regions 12d as illustrated in FIG. 8, an interference of light emitted from adjacent display elements 12 can be suppressed.

Although not illustrated, one embodiment of the present invention can be applied to pixels in delta arrangement or pentile arrangement.

<1-6-2. Display Region (2) of Display Element>

The display regions of the display elements 11 and 12 in the pixel 10(m, n) in the display device of one embodiment of the present invention are described with reference to FIG. 9 to FIG. 13.

Figure 9:
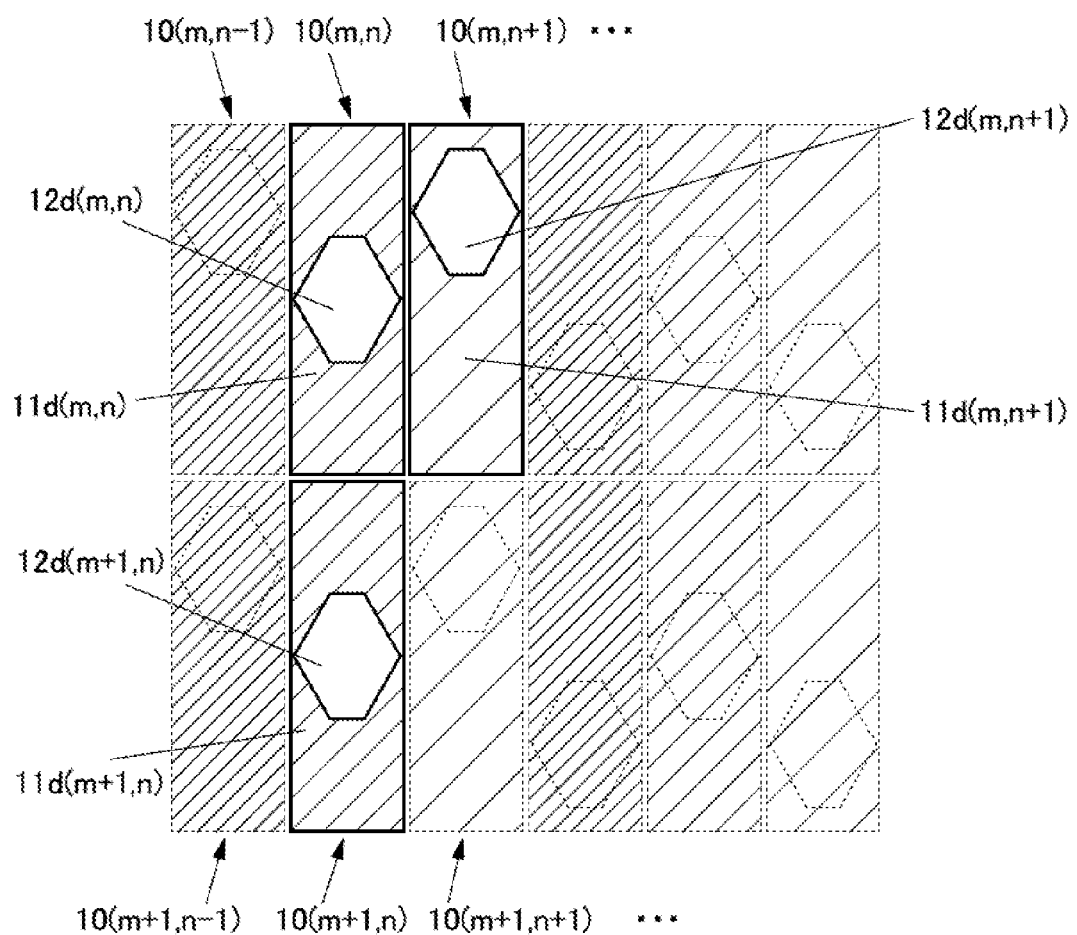
FIG. 9 is a schematic view illustrating a display region of a display element.

FIG. 9 is a schematic view illustrating display regions of the pixel 10(m, n) and pixels 10(m, n−1) and 10(m, n+1) which are adjacent to the pixel 10(m, n) in the column direction. FIG. 9 illustrates a pixel 10(m+1, n−1), a pixel 10(m+1, n), a pixel 10(m+1, n+1), and the like positioned near the pixel 10(m, n). Note that in this specification and the like, the pixel 10(m, n) is called a first pixel, the pixel 10(m, n+1) is called a second pixel, and the pixel 10(m+1, n) is called a third pixel in some cases.

The pixel 10(m, n) illustrated in FIG. 9 includes a display region 11d(m, n) that functions as a display region of the display element 11 and a display region 12d(m, n) that functions as a display region of the display element 12. The pixel 10(m, n+1) illustrated in FIG. 9 includes a display region 11d(m, n+1) that functions as a display region of the display element 11 and a display region 12d(m, n+1) that functions as a display region of the display element 12. The pixel 10(m+1, n) illustrated in FIG. 9 includes a display region 11d(m+1, n) that functions as a display region of the display element 11 and a display region 12d(m+1, n) that functions as a display region of the display element 12.

In the following description, the display region 11d(m, n), the display region 11d(m, n+1), and the display region 11d(m+1, n) are collectively described as display regions 11d in some cases when they are not distinguished. Similarly, the display region 12d(m, n), the display region 12d(m, n+1), and the display region 12d(m+1, n) are described as display regions 12d in some cases. In this specification and the like, the display region 11d is called a first display region and the display region 12d is called a second display region in some cases.

For example, the display region 11d has a function of reflecting light and the display region 12d has a function of emitting light. The display region 12d is provided inside the display region 11d. The display element 11 is provided to overlap with the display region 11d and the display element 12 is provided to overlap with the display region 12d.

The display device that includes the display region 11d and the display region 12d can have low power consumption. For example, in an environment with bright external light, the display element 11 reflects light and displays an image in the display region 11d, and in an environment with dark external light, the display element 12 emits light and displays an image in the display region 12d. With this structure, a display device with low power consumption and high display quality can be provided.

Here, the position where the display region 12d is provided is described below.

For example, in the case where an EL element is used as the display element 12 disposed to overlap with the display region 12d, as methods for forming the EL element, two methods are given: a color filter method in which the same EL element is used for pixels and emission colors of the pixels are changed with use of color films (color filters); and a separate coloring method in which EL elements for the respective pixels are separately formed to have different emission colors. In order to improve the color purity, a separate coloring method and a color film may be combined.

In the case of a separate coloring method, EL elements need to be formed for each pixel. In order to separately form pixels for respective colors, openings need to be formed in appropriate positions in the shadow mask (also referred to as a fine metal mask). When the density of pixels in the display device is high (i.e., high resolution), the distance between openings is short and the strength of the shadow mask is decreased.

When the shadow mask has low strength, the shadow mask is deformed (due to, for example, bending, distortion, expansion, or contraction) at the time of evaporation, decreasing the yield of manufacturing a display device.

In the display device of one embodiment of the present invention, however, the display region 12d has at least three pairs of parallel sides as illustrated in FIG. 9. Although an example in which the display region 12d has a hexagonal shape in this specification and the like, the shape of the display region 12d is not limited to this. Furthermore, positions of the display region 12d in the first pixel and in the third pixel are made different. Such a structure enables the shadow mask to have a larger area of the openings and to maintain mechanical strength, and can increase a manufacturing yield in the case where the display elements 12 are separately formed.

Figure 10:
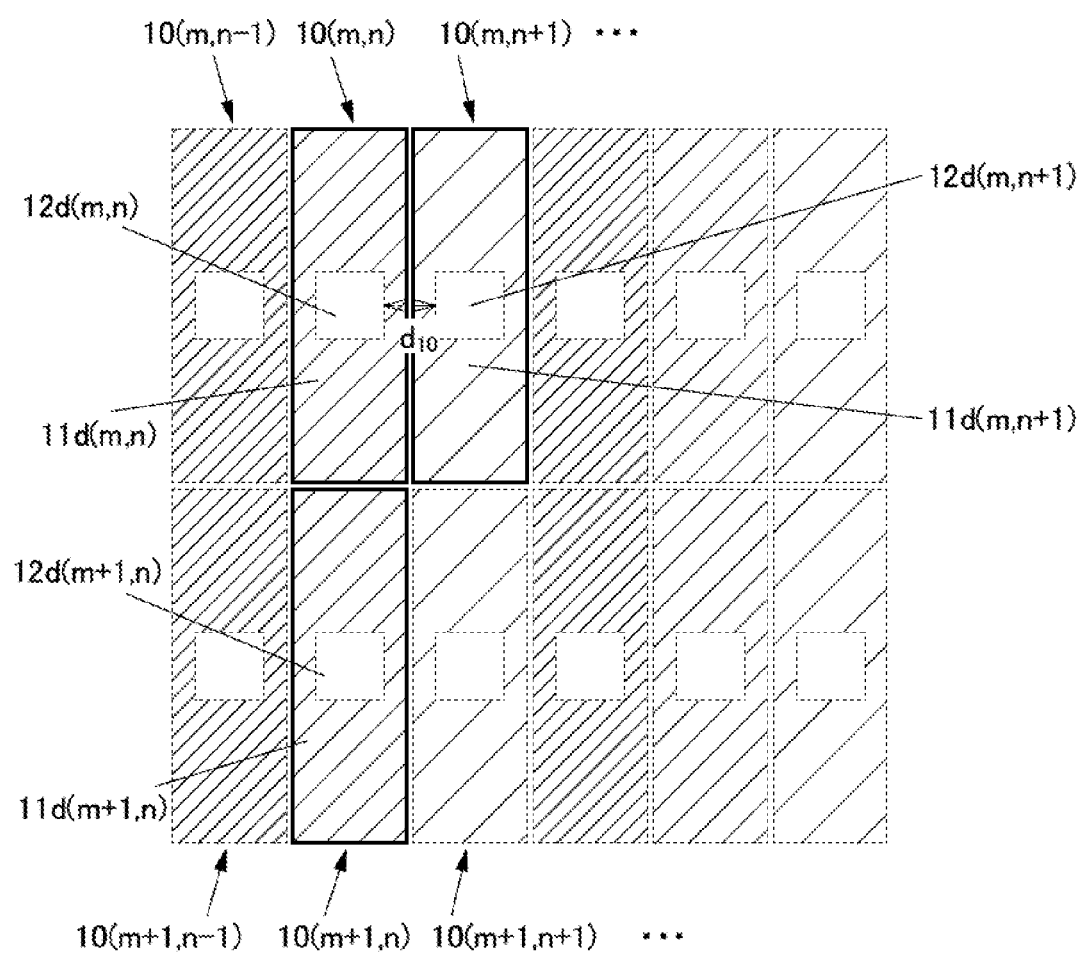
FIG. 10 is a schematic view illustrating a display region of a display element.
Figure 11:
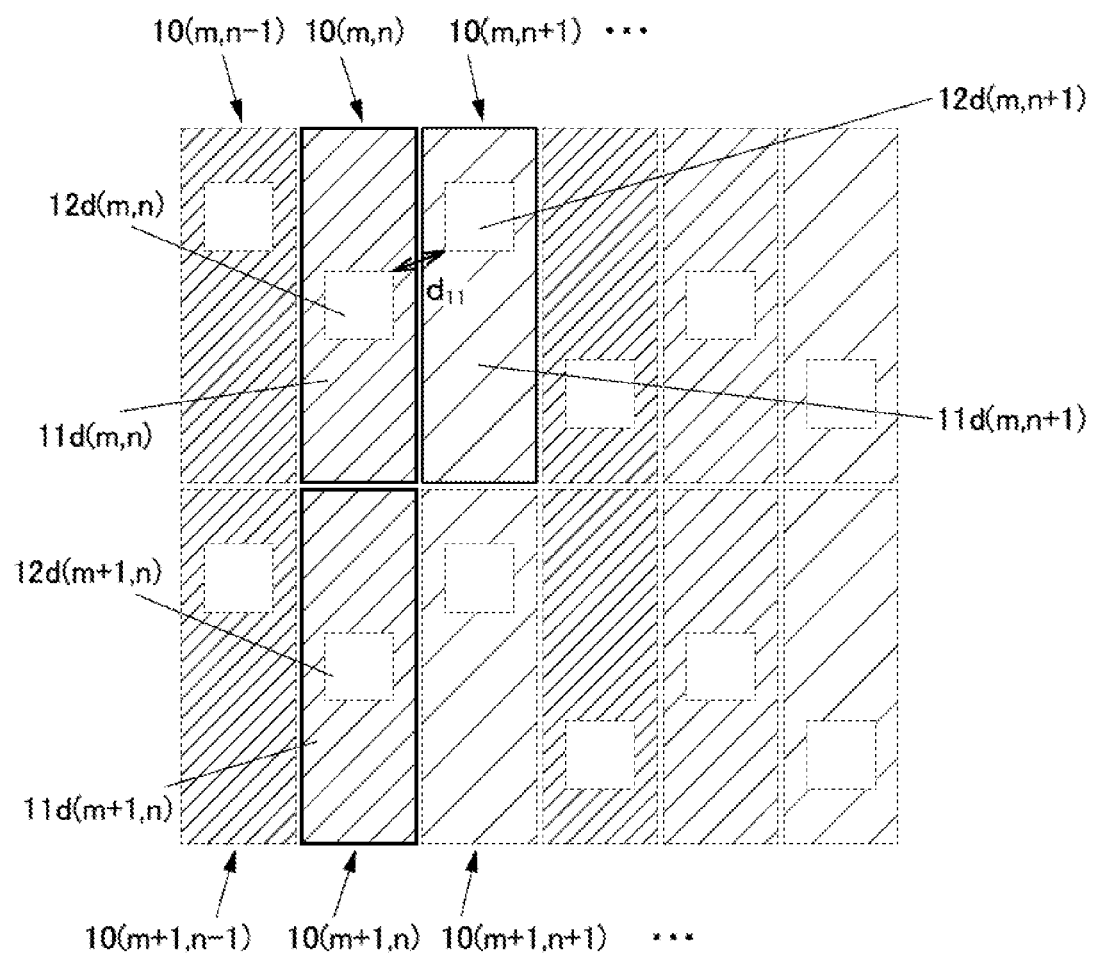
FIG. 11 is a schematic view illustrating a display region of a display element.

FIG. 10 illustrates an example in which positions of the second display regions 12d in adjacent pixels are the same, and FIG. 11 illustrates an example in which positions of the second display regions 12d in adjacent pixels are different. The distance between the display region 12d(m, n) and the display region 12d(m, n+1) is indicated as a distance $d_{10}$ in FIG. 10 and as a distance $d_{11}$ in FIG. 11.

When the distance $d_{10}$ in FIG. 10 and the distance $d_{11}$ in FIG. 11 are compared, a relation $d_{11} > d_{10}$ is established. Thus, the distance in the case where the positions of the display regions 12d in adjacent pixels are different can be larger than that in the case where the positions of the display regions 12d in adjacent pixels are the same by approximately 10% or more.

Figure 12:
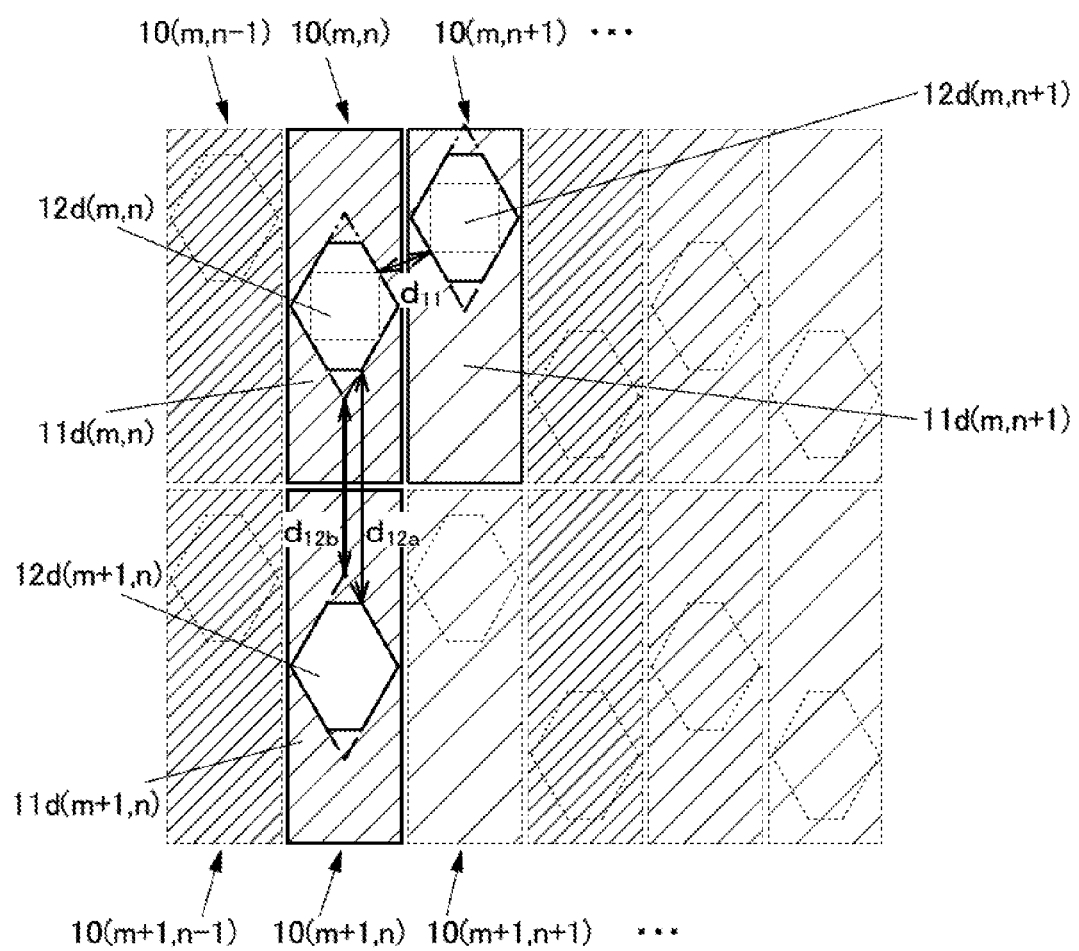
FIG. 12 is a schematic view illustrating a display region of a display element.

FIG. 12 illustrates an example of pixel arrangement in the case where the display region 12d has a hexagonal shape. For comparison, FIG. 12 also illustrates the display region 12d having a rhombic shape denoted by dashed-dotted lines. A distance between the display region 12d(m, n) and the display region 12d(m, n+1) is indicated as the distance $d_{11}$, and a distance between the display region 12d(m, n) and the display region 12d(m+1, n) is indicated as a distance $d_{12a}$. The area of the display region 12d can be increased without changing $d_{11}$ regardless of the shape of the display region 12d. Accordingly, a display device with high display quality can be provided.

The distance $d_{12}a$ between the display region 12d(m, n) and the display region 12d(m+1, n) in the case where the display region 12d has a hexagonal shape is longer than that in the case where the display region 12d has a rhombic shape. Here, the distance $d_{12a}$ between the second display regions in the first pixel and the second pixel is set to greater than or equal to 30 μm, preferably greater than or equal to 40 μm, whereby the shadow mask can have increased mechanical strength. The shadow mask with high mechanical strength is less likely to be deformed at the time of evaporation, increasing the yield of manufacturing a display device.

In the case where the display region 12d has a rhombic shape as illustrated in FIG. 12, a distance din between adjacent display regions 12d is short, decreasing the mechanical strength of the shadow mask. In order to avoid deformation of the shadow mask at the time of evaporation, the display region 12d(m, n) and the display region 12d(m+1, n) need to be formed separately (twice); however, in the case where the display region 12d has a hexagonal shape, the shadow mask can maintain the distance between openings and thus can maintain mechanical strength. For this reason, the display region 12d(m, n) and the display region 12d(m+1, n) can be formed at a time in evaporation, reducing the cost of manufacturing a display device.

In the case of a separate coloring method, the display region 12d needs to be formed for each pixel, and high accuracy for forming (aligning) an opening in a desired position in the shadow mask is required. For example, the distance $d_{11}$ between the second display regions in the first pixel and the third pixel in FIG. 12 is set to greater than or equal to 20 μm, preferably greater than or equal to 25 μm, in which case the yield of manufacturing a display device can be increased.

In FIG. 12, the pixel 10(m, n−1), the pixel 10(m, n), and the pixel 10(m, n+1) are arranged in stripes in the column direction, but one embodiment of the present invention is not limited thereto. For example, a structure illustrated in FIG. 13 may be employed.

Figure 13:
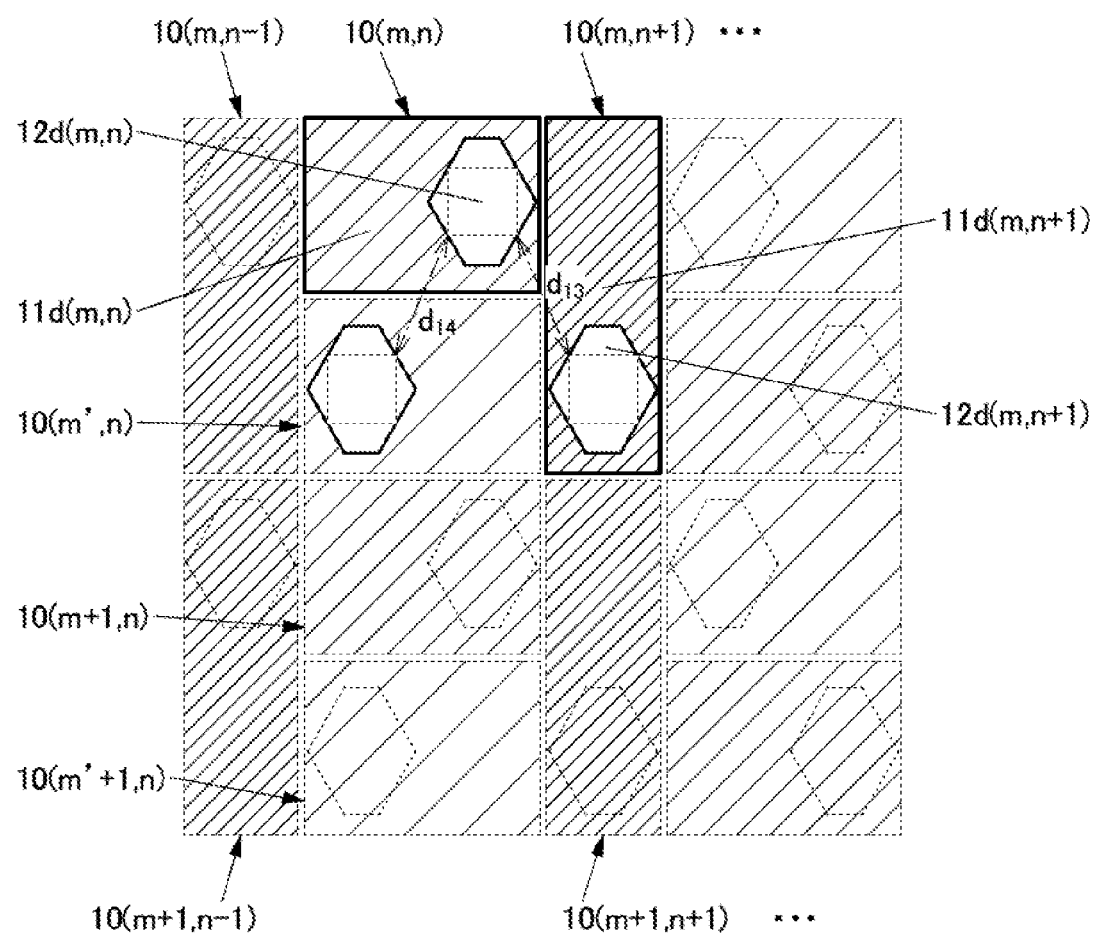
FIG. 13 is a schematic view illustrating a display region of a display element.

FIG. 13 is a schematic view of a display region including the pixel 10(m, n) and the pixels 10(m, n−1) and 10(m, n+1) which are adjacent to the pixel 10(m, n) in the column direction. In FIG. 13, pixels near the pixel 10(m, n) such as the pixel 10(m+1, n−1), a pixel 10(m′, n), the pixel 10(m+1, n), a pixel 10(m′+1, n), and the pixel 10(m+1, n+1) are illustrated.

In the structure in FIG. 13, the display region 11d(m, n) and the display region 11d(m, n+1) have different areas. In this way, the areas of the display regions 11d in adjacent pixels may be different. This applies to the display regions 12d which are not illustrated.

When the structure of FIG. 13 is employed, the pixel 10(m, n+1) in FIG. 9 is disposed in the position of the pixel 10(m′, n) in FIG. 13.

Note that in FIG. 13, a distance between the pixel 10(m, n) and the pixel 10(m, n+1) is indicated as a distance $d_{13}$, and a distance between the pixel 10(m, n) and the pixel 10(m′, n) is indicated as a distance $d_{14}$. The distance $d_{13}$ and the distance $d_{14}$ preferably have the same length, in other words, the display regions 12d are preferably provided at equal intervals. With such a structure, openings in the shadow mask can be equally spaced, which increases the mechanical strength of the shadow mask and thus distortion of the shadow mask at evaporation can be suppressed.

As illustrated in FIG. 13, the positions of the display regions 12d in the pixel 10(m, n+1) adjacent to the pixel 10(m, n) in the column direction and in the pixel 10(m′, n) are different from the position of the display region 12d in the pixel 10(m, n). In other words, the pixel 10(m, n) and the pixel 10(m, n+1) are provided adjacent to each other, and the display region 12d(m, n) included in the pixel 10(m, n) and the display region 12d(m, n+1) included in the pixel 10(m, n+1) are provided in different portions inside the respective display regions 11d.

With the arrangement of the display regions 12d as illustrated in FIG. 13, the manufacturing yield in the case where the display elements 12 are separately formed can be increased. In addition, with the arrangement of the display regions 12d as illustrated in FIG. 13, an interference of light emitted from adjacent display elements 12 can be suppressed.

Although not illustrated, one embodiment of the present invention can be applied to pixels in delta arrangement or pentile arrangement.

<1-6-3. Display Region (3) of Display Element>

The display regions of the display elements 11 and 12 in the pixel 10(m, n) in the display device of one embodiment of the present invention are described with reference to FIG. 14.

Figure 14:
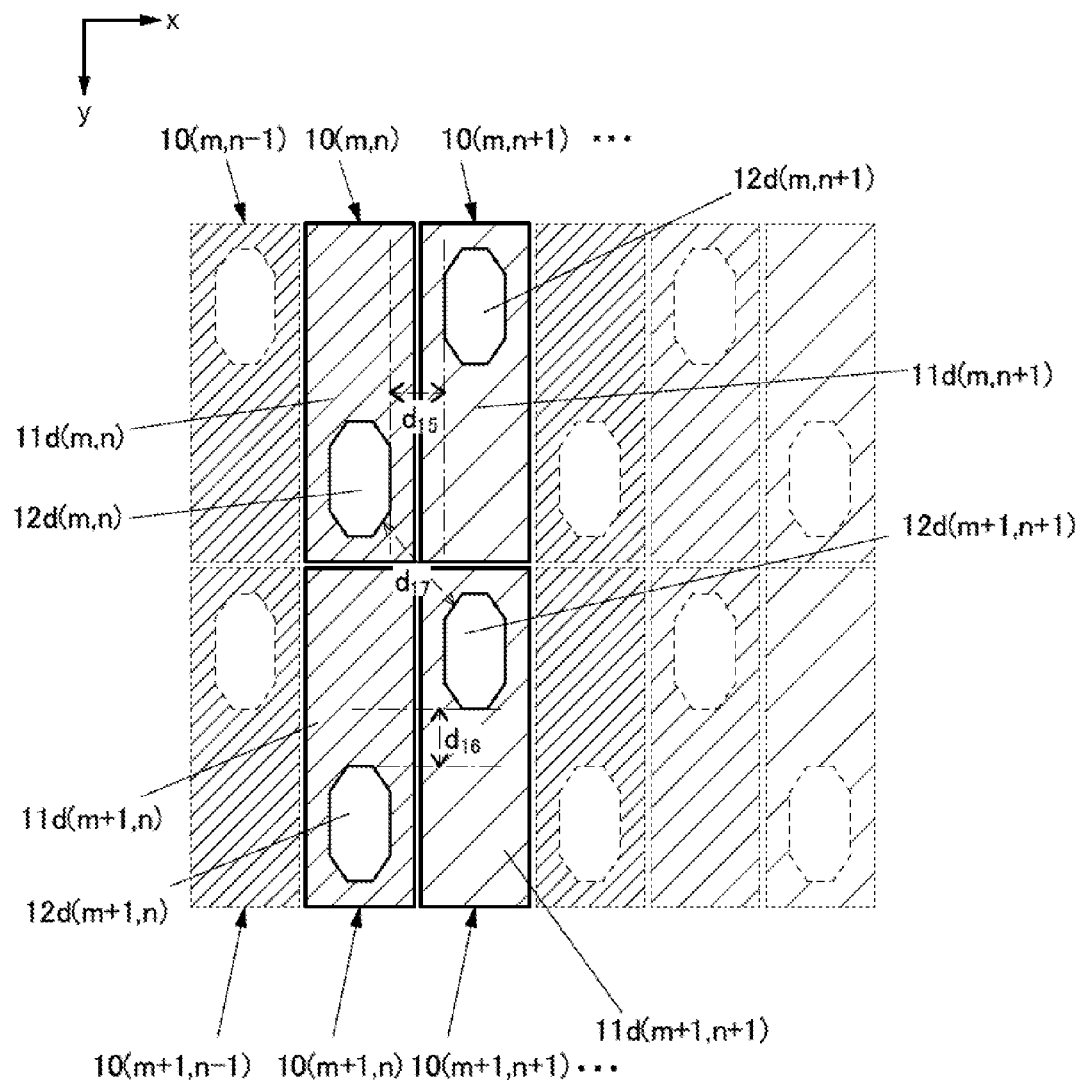
FIG. 14 is a schematic view illustrating a display region of a display element.

FIG. 14 is a schematic view illustrating display regions of the pixel 10(m, n) and the pixels 10(m, n−1) and 10(m, n+1) which are adjacent to the pixel 10(m, n) in the column direction. FIG. 14 illustrates the pixel 10(m+1, n−1), the pixel 10(m+1, n), the pixel 10(m+1, n+1), and the like positioned near the pixel 10(m, n).

The pixel 10(m, n) illustrated in FIG. 14 includes the display region 11d(m, n) that functions as a display region of the display element 11 and the display region 12d(m, n) that functions as a display region of the display element 12. The pixel 10(m, n+1) illustrated in FIG. 14 includes the display region 11d(m, n+1) that functions as a display region of the display element 11 and the display region 12d(m, n+1) that functions as a display region of the display element 12.

In the following description, the display region 11d(m, n) and the display region 11d(m, n+1) are collectively described as display regions 11d in some cases when they are not distinguished. Similarly, the display region 12d(m, n) and the display region 12d(m, n+1) are described as display regions 12d in some cases. In this specification and the like, the display region 11d is called a first display region and the display region 12d is called a second display region in some cases.

For example, the display region 11d has a function of reflecting incident light and the display region 12d has a function of emitting light. The display region 12d is provided inside the display region 11d. The display element 11 is provided to overlap with the display region 11d and the display element 12 is provided to overlap with the display region 12d.

The area of the display region 12d is preferably smaller than that of the display region 11d, in which case power consumption of the display device can be reduced.

For example, in an environment with bright external light, the display element 11 reflects incident light and displays an image in the display region 11d, and in an environment with dark external light, the display element 12 emits light and displays an image in the display region 12d. With this structure, a display device with low power consumption and high display quality can be provided.

Here, the position where the display region 12d is provided is described below.

For example, in the case where an EL element is used as the display element 12 disposed to overlap with the display region 12d, as a method for forming the EL element, a separate coloring method in which EL elements for the respective pixels are separately formed to have different emission colors is given. In order to improve the color purity, a separate coloring method and a color film may be combined.

In the case of a separate coloring method, an EL element needs to be formed for each pixel, and high accuracy for forming (aligning) an opening in a desired position in a shadow mask (also referred to as a fine metal mask) is required. When a display device has high pixel density (i.e., high resolution), the alignment accuracy needs to be high, which decreases the manufacturing yield of the display device.

In the display device of one embodiment of the present invention, however, the positions of the display regions 12d in adjacent pixels are different as illustrated in FIG. 14. With such a structure, the manufacturing yield in the case where the display elements 12 are separately formed can be increased.

Next, shapes of the display region 12d are described below.

Even when the display element 12 is formed with use of a shadow mask having a large area of openings, if the display element 12 is a bottom emission type light-emitting element, the shape of the display region 12d is limited by a wiring connected to the first transistor electrically connected to the display region 11d and a wiring connected to the second transistor electrically connected to the display region 12d.

When the display region 12d has a shape having three or more pairs of parallel sides, the display region 12d can be disposed in a position that overlaps with neither the wiring connected to the first transistor electrically connected to the display region 11d nor the wiring connected to the second transistor electrically connected to the display region 12d. With the shape of the display region 12d having three or more pairs of parallel sides, high-quality display on the display region 12d can be obtained without being hindered by wirings.

With the arrangement and the shape of the display region 12d of one embodiment of the present invention, each of the wiring connected to the first transistor electrically connected to the display region 11d and the wiring connected to the second transistor electrically connected to the display region 12d can have a shape of a straight line and pass between the display regions 12d. Such a simple shape of the wiring is preferred because the yield of manufacturing a display device can be increased.

With the arrangement and the shape of the display region 12d of one embodiment of the present invention, both high display quality and a high yield of manufacturing a display device can be achieved.

Note that in this specification and the like, an example in which the display region 12d has an octagonal shape is described.

In FIG. 14, a distance in the column direction between a side of the display region 12d(m, n) included in the pixel 10(m, n) in the row direction which is closer to the display region 12d(m, n+1) and a side of the display region 12d(m, n+1) in the adjacent pixel 10(m, n+1) in the row direction which is closer to the display region 12d(m, n) is indicated as a distance $d_{15}$. The distance $d_{15}$ is set to greater than or equal to 10 μm and less than 30 μm, preferably greater than or equal to 13 μm and less than 30 μm, in which case the yield of manufacturing a display device can be increased.

In FIG. 14, a distance in the row direction between a side of the display region 12d(m+1, n) included in the pixel 10(m+1, n) in the column direction which is closer to the display region 12d(m+1, n+1) and a side of the display region 12d(m+1, n+1) in the adjacent pixel 10(m+1, n+1) in the column direction which is closer to the display region 12d(m+1, n) is indicated as a distance $d_{16}$. The distance $d_{16}$ is set to greater than or equal to 10 μm and less than 30 μm, preferably greater than or equal to 15 μm and less than 30 μm, in which case the yield of manufacturing a display device can be increased.

In FIG. 14, the distance between the display region 12d(m, n) and the display region 12d(m+1, n+1) is indicated as a distance $d_{17}$. The distance $d_{17}$ is greater than or equal to 20 μm, preferably greater than or equal to 25 μm, more preferably greater than or equal to 30 µm, in which case the manufacturing yield of the display device can be increased. Note that in the case where the distance $d_{17}$ is less than 20 µm, the manufacturing yield of the display device is decreased.

Figure 15:
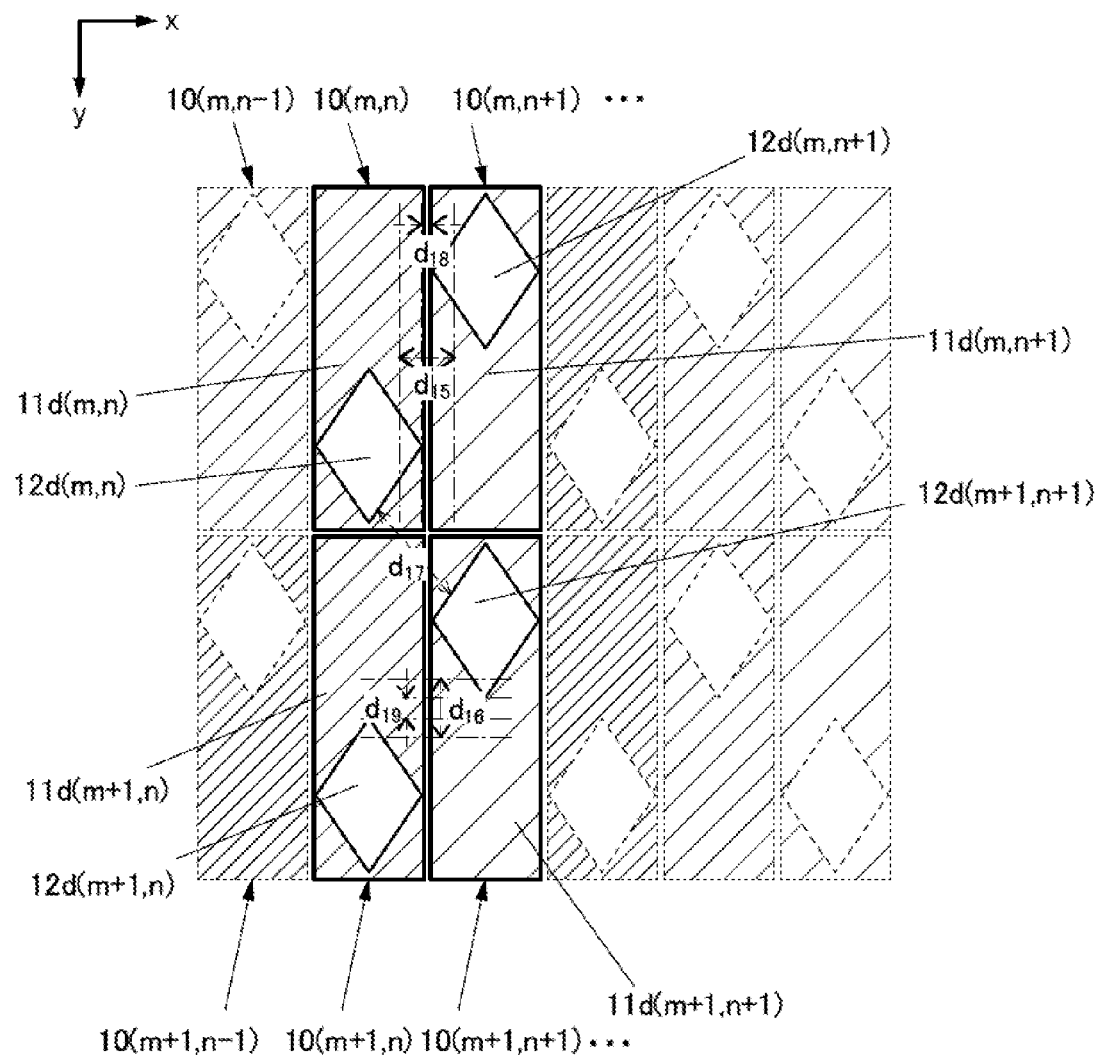
FIG. 15 is a schematic view illustrating a display region of a display element.

FIG. 15 illustrates an example of the shape of the display region $12d$ in the case where the area of the second display region $12d$ is larger than that in FIG. 14 while the distance $d_{17}$ in FIG. 14 is maintained. In FIG. 15, the shortest distance in the column direction between a vertex of the display region $12d(m, n)$ in the pixel $10(m, n)$ and a vertex of the display region $12d(m, n+1)$ in the pixel $10(m, n+1)$ is indicated as a distance $d_{18}$. In addition, the shortest distance in the row direction between a vertex of the display region $12d(m+1, n)$ in the pixel $10(m+1, n)$ and a vertex of the display region $12d(m+1, n+1)$ in the pixel $10(m+1, n+1)$ is indicated as a distance $d_{19}$.

When the distance $d_{15}$ in FIG. 14 and the distance $d_{18}$ in FIG. 15 are compared, a relation $d_{15} > d_{18}$ is established. When the distance $d_{16}$ in FIG. 14 and the distance $d_{19}$ in FIG. 15 are compared, a relation $d_{16} > d_{19}$ is established. Since the distances $d_{18}$ and $d_{19}$ in FIG. 15 are short, it is difficult to linearly arrange the wiring connected to the first transistor electrically connected to the display region $11d$ and the wiring connected to the second transistor electrically connected to the display region $12d$ in the column or row direction in order not to overlap with the display region $12d$.

In one embodiment of the present invention, the display region $12d$ having an octagonal shape enables the wirings to be linearly arranged without changing the distance $d_{17}$ between the display regions $12d$.

Figure 16:
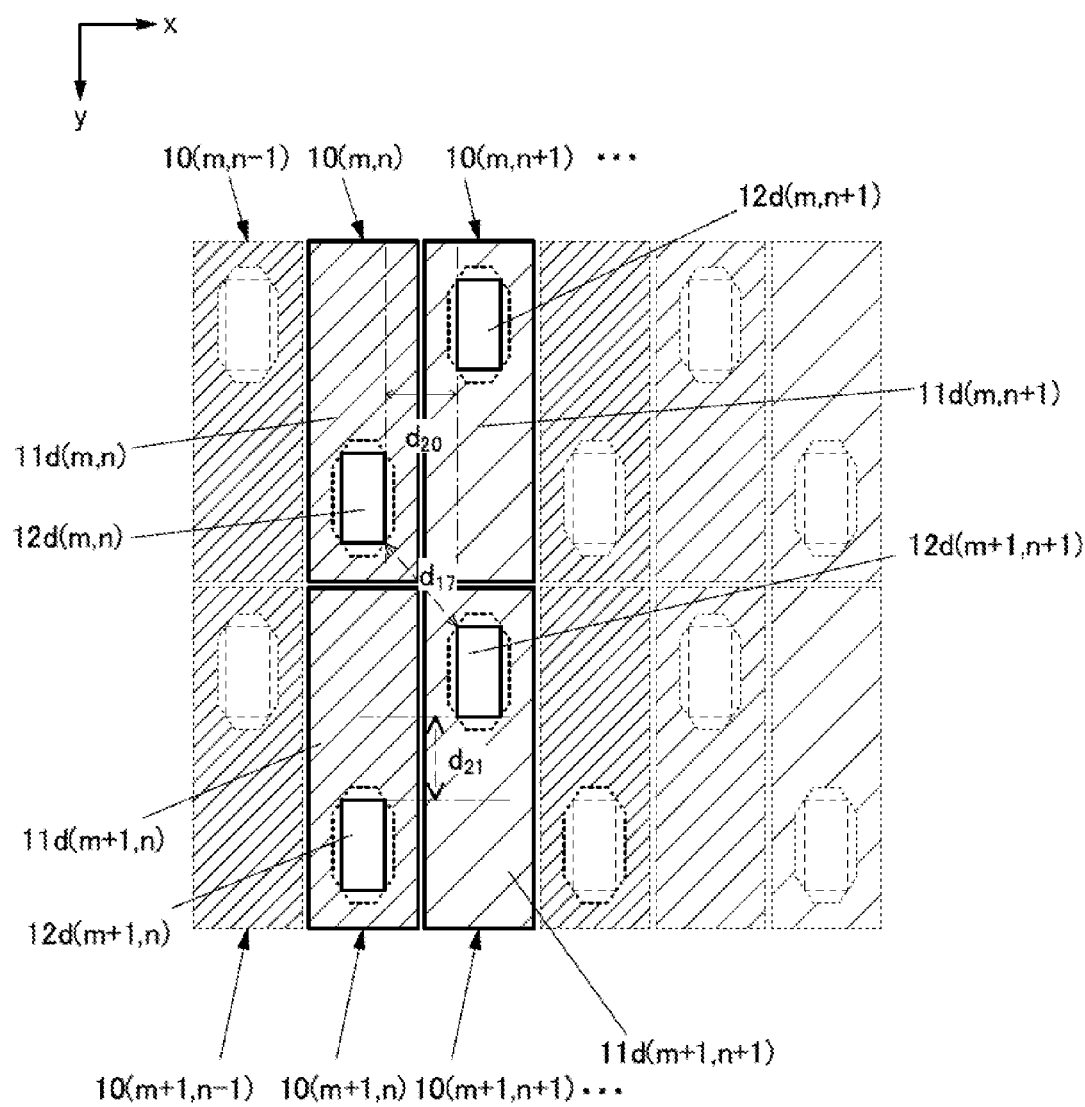
FIG. 16 is a schematic view illustrating a display region of a display element.

FIG. 16 illustrates an example of the shape of the second display region $12d$ in the case where the display region $12d$ overlaps with neither the wiring connected to the first transistor electrically connected to the display region $11d$ nor the wiring connected to the second transistor electrically connected to the display region $12d$ while the distance $d_{17}$ in FIG. 14 is maintained. In FIG. 16, a distance in the column direction between a side of the display region $12d(m, n)$ included in the pixel $10(m, n)$ in the row direction which is closer to the display region $12d(m, n+1)$ and a side of the display region $12d(m, n+1)$ in the adjacent pixel $10(m, n+1)$ in the row direction which is closer to the display region $12d(m, n)$ is indicated as a distance $d_{20}$.

In FIG. 16, a distance in the row direction between a side of the display region $12d(m+1, n)$ included in the pixel $10(m+1, n)$ in the column direction which is closer to the display region $12d(m+1, n+1)$ and a side of the display region $12d(m+1, n+1)$ in the adjacent pixel $10(m+1, n+1)$ in the column direction which is closer to the display region $12d(m+1, n)$ is indicated as a distance $d_{21}$.

When the distance $d_{15}$ in FIG. 14 and the distance $d_{20}$ in FIG. 16 are compared, a relation $d_{20} > d_{15}$ is established. When the distance $d_{16}$ in FIG. 14 and the distance $d_{21}$ in FIG. 16 are compared, a relation $d_{21} > d_{16}$ is established. Since the distances $d_{20}$ and $d_{21}$ in FIG. 16 are short, it is possible to linearly arrange the wiring connected to the first transistor electrically connected to the display region $11d$ and the wiring connected to the second transistor electrically connected to the display region $12d$ in the column or row direction in order not to overlap with the display region $12d$.

However, the area of the display region $12d$ is smaller than that of the octagonal display region $12d$ of one embodiment of the present invention, as illustrated in FIG. 16.

Thus, the display region $12d$ preferably has an octagonal shape because the display region $12d$ overlaps with neither the wiring connected to the first transistor electrically connected to the display region $11d$ nor the wiring connected to the second transistor electrically connected to the display region $12d$ and can have a larger area, leading to high display quality.

In the display device of one embodiment of the present invention, the area of the display region $12d$ is smaller than that of the display region $11d$. Accordingly, in the case where EL elements are formed by a separate coloring method, the opening in the shadow mask can be small. Thus, the mechanical strength of the shadow mask can be increased. The shadow mask with high mechanical strength is less likely to be deformed due to, for example, bending, distortion, expansion, or contraction, increasing the manufacturing yield.

With the arrangement of the display regions $12d$ in FIG. 14, an interference of light emitted from adjacent display elements 12 can be suppressed.

In FIG. 14, the pixel $10(m, n-1)$, the pixel $10(m, n)$, and the pixel $10(m, n+1)$ are arranged in stripes in the column direction, but one embodiment of the present invention is not limited thereto.

For example, the display region $11d(m, n)$ and the display region $11d(m, n+1)$ have different areas. In this way, the areas of the display regions $11d$ in adjacent pixels may be different. This applies to the display regions $12d$.

Although not illustrated, one embodiment of the present invention can be applied to pixels in delta arrangement or pentile arrangement.

<1-7. Structure Example of Display Device (Top View)>

Next, a specific structure example of the display device 500 illustrated in FIG. 19 is described with reference to FIGS. 21A and 21B, FIGS. 22A and 22B, and FIG. 23.

Figure 21A:
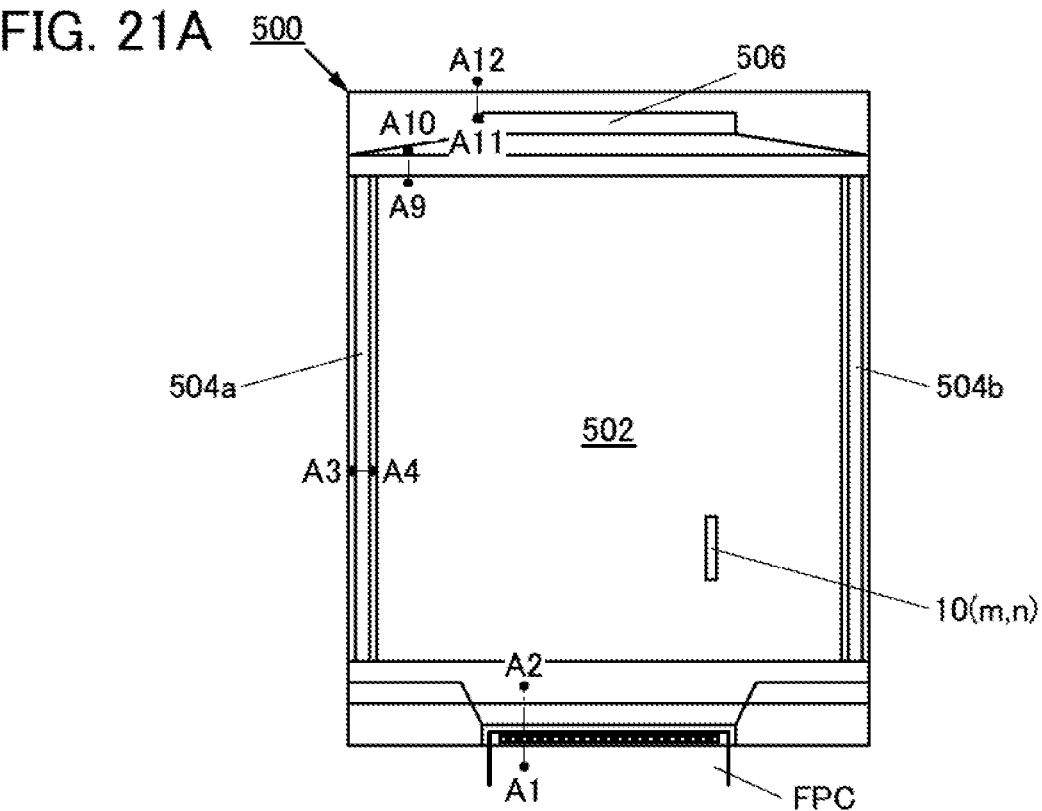
FIGS. 21A and 21B are top views illustrating a display device and a pixel.
Figure 21B:
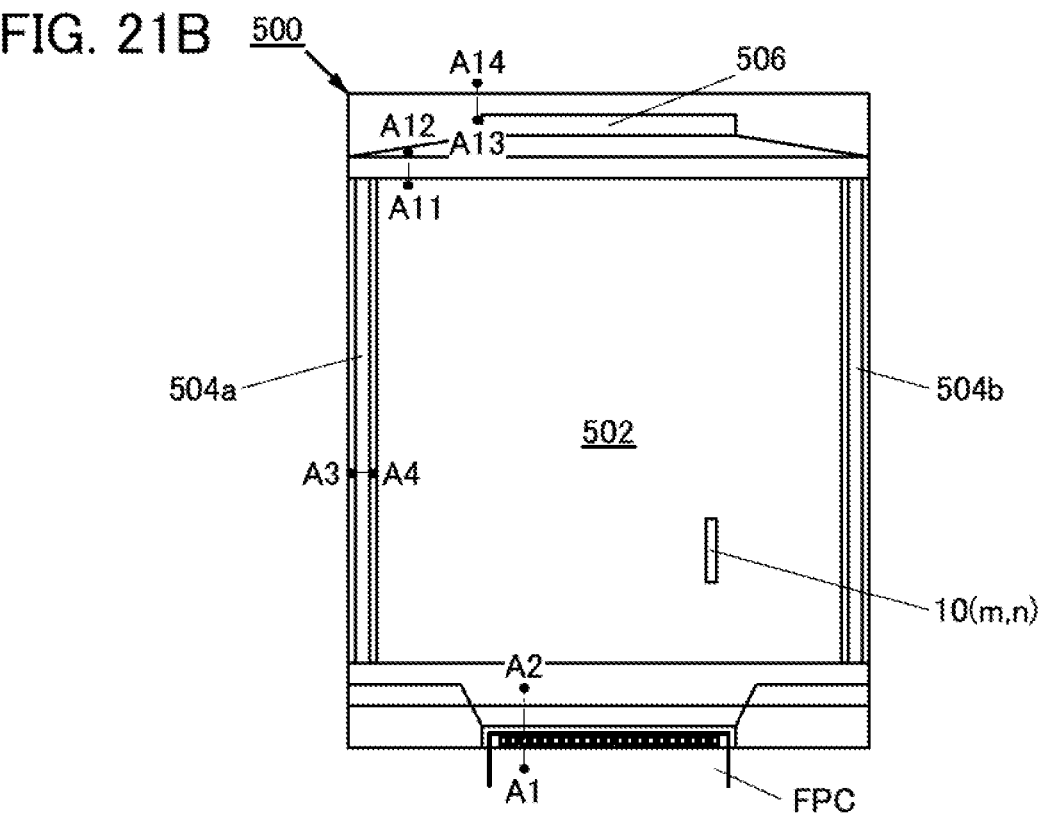

FIGS. 21A and 21B are top views of the display device 500. As described above, the display device 500 includes the pixel portion 502, the gate driver circuit portions 504a and 504b and the source driver circuit portion 506 placed outside the pixel portion 502. FIGS. 21A and 21B each schematically illustrate the pixel $10(m, n)$ included in the pixel portion 502. A flexible printed circuit (FPC) is electrically connected to the display device 500 in FIGS. 21A and 21B.

Figure 22A:
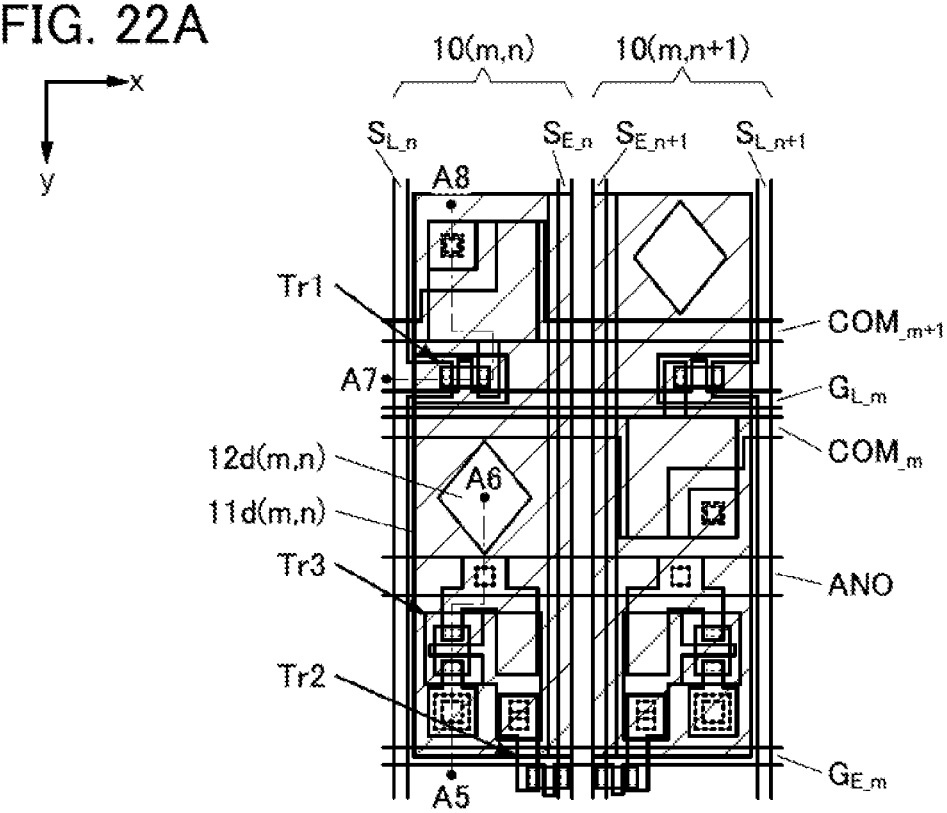
FIGS. 22A and 22B are top views illustrating a display device and pixels.

FIG. 22A is a top view schematically illustrating the pixel $10(m, n)$ shown in FIG. 21A and one mode of the pixel $10(m, n+1)$ adjacent to the pixel $10(m, n)$. The signal lines $S_{L\_n}$, $S_{L\_n+1}$, $S_{E\_n}$, and $S_{E\_n+1}$, the scan lines $G_{L\_m}$ and $G_{E\_m}$, the common line COM_$m$, and the transistors Tr1, Tr2, and Tr3 in FIG. 22A respectively correspond to the reference numerals in FIG. 20. The display region $11d$ and the display region $12d$ in FIG. 22A correspond to the reference numerals in FIG. 1. A common line COM_$m+1$ in FIG. 22A indicates a common line included in the pixel $10(m+1, n)$ adjacent to the pixel $10(m, n)$.

Figure 22B:
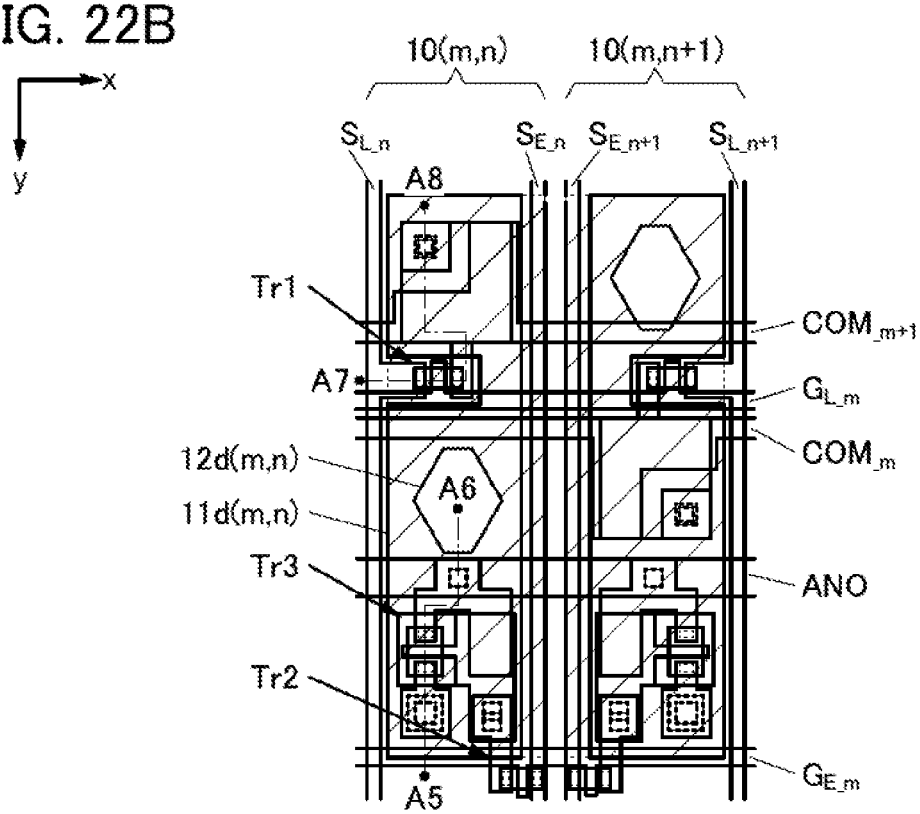

FIG. 22B is a top view schematically illustrating the pixel $10(m, n)$ shown in FIG. 21A and another mode of the pixel $10(m, n+1)$ adjacent to the pixel $10(m, n)$. The signal lines $S_{L\_n}$, $S_{L\_+1}$, $S_{E\_n}$, and $S_{E\_n+1}$, the scan lines $G_{L\_m}$ and $G_{E\_m}$, the common line COM_$m$, and the transistors Tr1, Tr2, and Tr3 in FIG. 22B respectively correspond to the reference numerals in FIG. 20. The display region $11d$ and the display region $12d$ in FIG. 22B correspond to the reference numerals in FIG. 1. A common line COM_$m+1$ in FIG. 22B indicates a common line included in the pixel $10(m+1, n)$ adjacent to the pixel $10(m, n)$.

Figure 23:
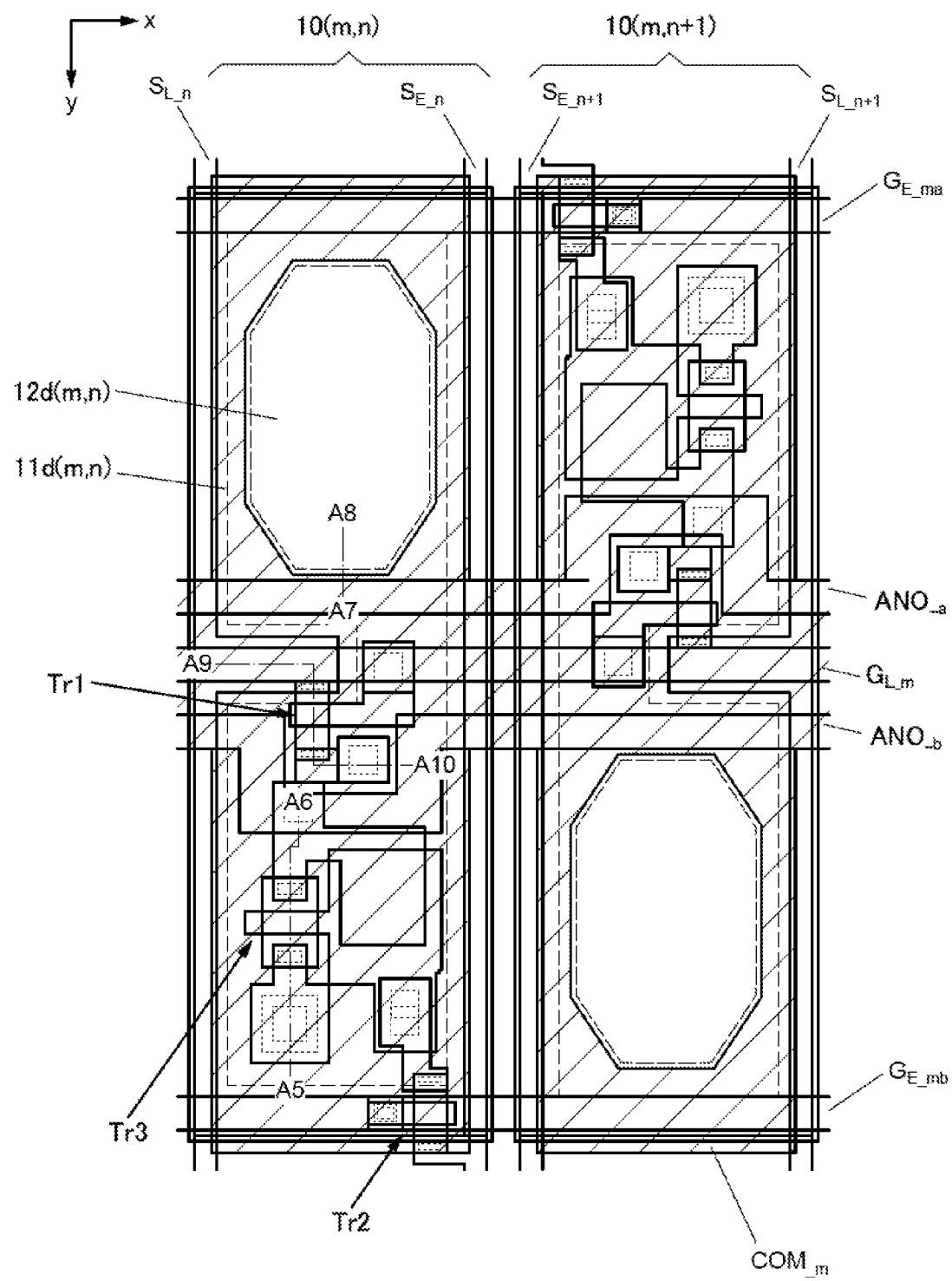
FIG. 23 is a top view illustrating a display device and pixels.

FIG. 23 is a top view schematically illustrating the pixel $10(m, n)$ shown in FIG. 21B and another mode of the pixel $10(m, n+1)$ adjacent to the pixel $10(m, n)$. The signal lines $S_{L\_n}$, $S_{L\_n+1}$, $S_{E\_n}$, and $S_{E\_n+1}$, the scan lines $G_{L\_m}$, $G_{E\_ma}$, and $G_{E\_mb}$, the common line COM_$m$, and the transistors Tr1, Tr2, and Tr3 in FIG. 23 respectively correspond to the reference numerals in FIG. 20. The display region 11d and the display region 12d in FIG. 23 correspond to the reference numerals in FIG. 14.

<1-8. Structure Example of Display Device (Cross Section)>

Next, a cross-sectional structure of the display device 500 is described with reference to FIG. 24 and FIG. 25.

Figure 24:
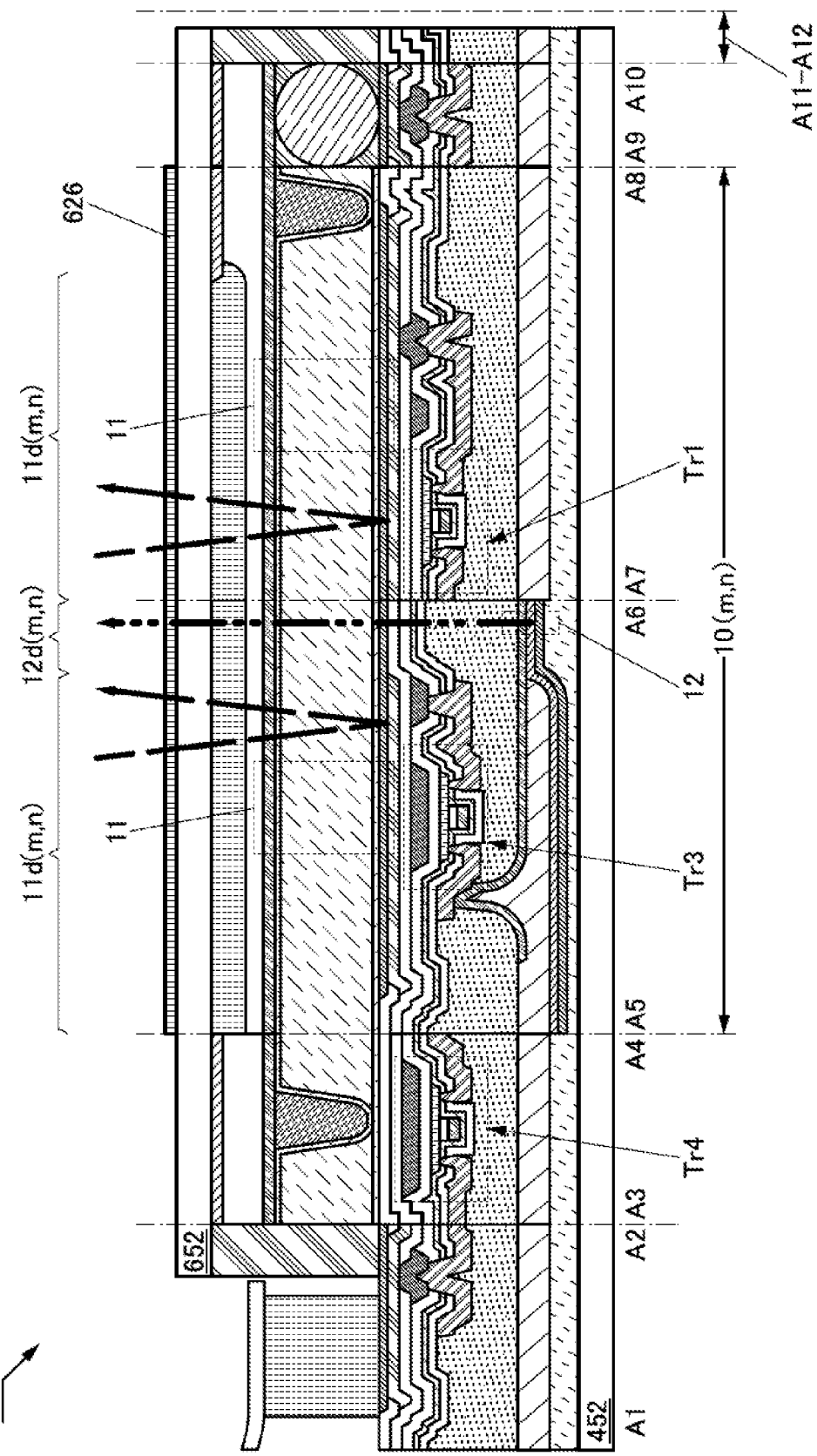
FIG. 24 is a cross-sectional view illustrating a display device.

FIG. 24 is a cross-sectional view corresponding to cross sections taken along the dashed-dotted lines A1-A2, A3-A4, A5-A6, A7-A8, A9-A10, and A11-A12 illustrated in FIG. 21A. FIG. 25 is a cross-sectional view corresponding to cross sections taken along the dashed-dotted lines A1-A2, A3-A4, A5-A6, A7-A8, A9-A10, A11-A12, and A13-A14 illustrated in FIG. 21B and FIG. 23.

In FIG. 24, a cross section taken along the dashed-dotted line A1-A2 corresponds to a region in which the FPC is attached to the display device 500. A cross section taken along the dashed-dotted line A3-A4 corresponds to a region in which the gate driver circuit portion 504a is provided. A cross section taken along the dashed-dotted line A5-A6 corresponds to a region in which the display element 11 and the display element 12 are provided. A cross section taken along the dashed-dotted line A7-A8 corresponds to a region in which the display element 11 is provided. A cross section taken along the dashed-dotted line A9-A10 corresponds to a connection region of the display device 500. A cross section taken along the dashed-dotted line A11-A12 corresponds to the edge of the display device 500 and the vicinity thereof. In FIG. 25, a cross section taken along the dashed-dotted line A1-A2 corresponds to a region in which the FPC is attached to the display device 500. A cross section taken along the dashed-dotted line A3-A4 corresponds to a region in which the gate driver circuit portion 504a is provided. A cross section taken along the dashed-dotted line A5-A6 and the dashed-dotted line A9-A10 corresponds to a region in which the display element 11 is provided. A cross section taken along the dashed-dotted line A7-A8 corresponds to a region in which the display element 12 is provided. A cross section taken along the dashed-dotted line A11-A12 corresponds to a connection region of the display device 500. A cross section taken along the dashed-dotted line A13-A14 corresponds to the edge of the display device 500 and the vicinity thereof.

Figure 25:
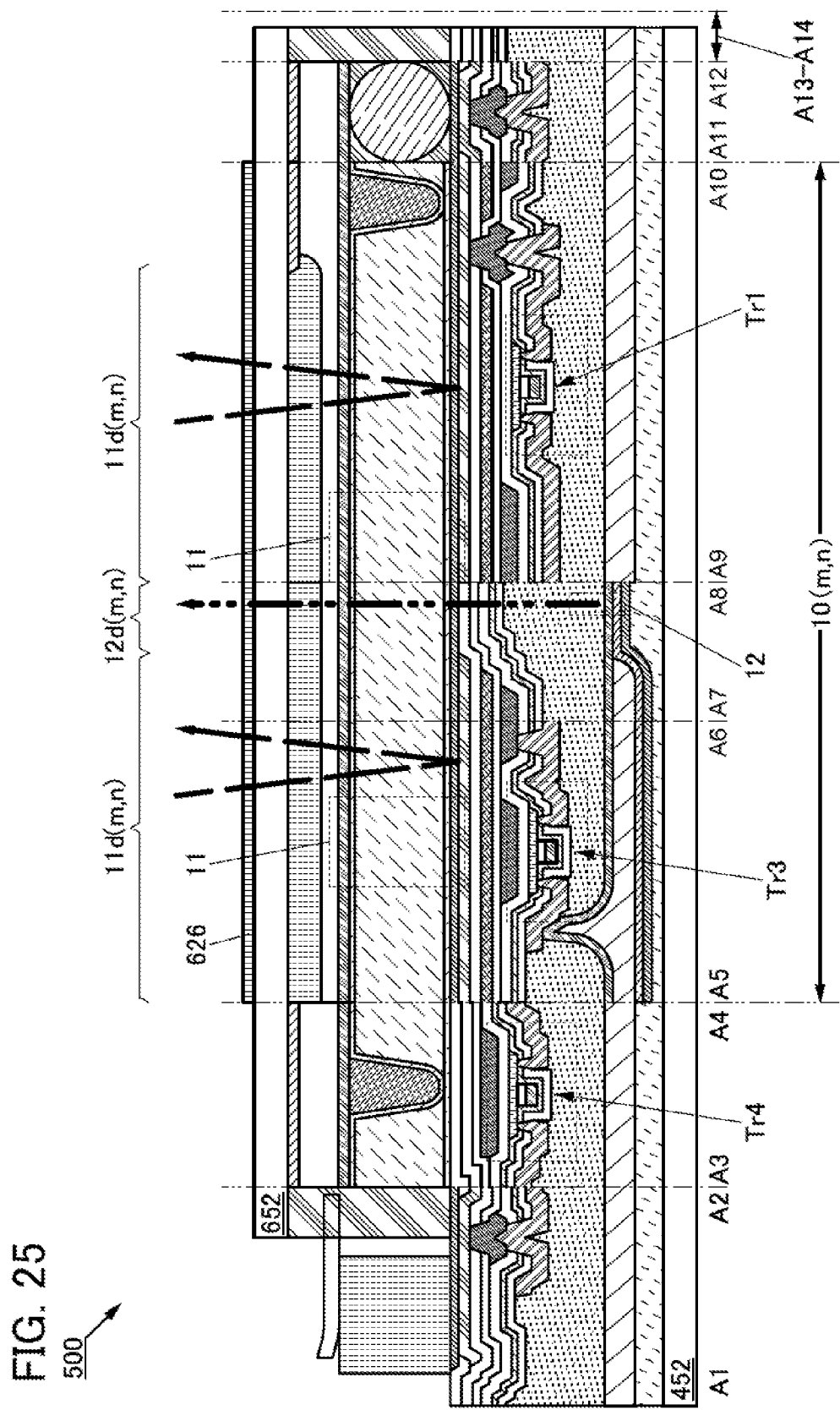
FIG. 25 is a cross-sectional view illustrating a display device.

In FIG. 24 and FIG. 25, the display device 500 includes the display element 11, the display element 12, the transistor Tr1, the transistor Tr3, and a transistor Tr4 between a substrate 452 and a substrate 652. A functional film 626 is provided over the substrate 652.

As described above, the display element 11 has a function of reflecting incident light and the display element 12 has a function of emitting light. In FIG. 24 and FIG. 25, the light entering the display element 11 and the reflected light are schematically denoted by arrows of dashed lines. Furthermore, the light emitted from the display element 12 is schematically denoted by an arrow of a dashed double-dotted line.

[Cross Section of Pixel]

Figure 26:
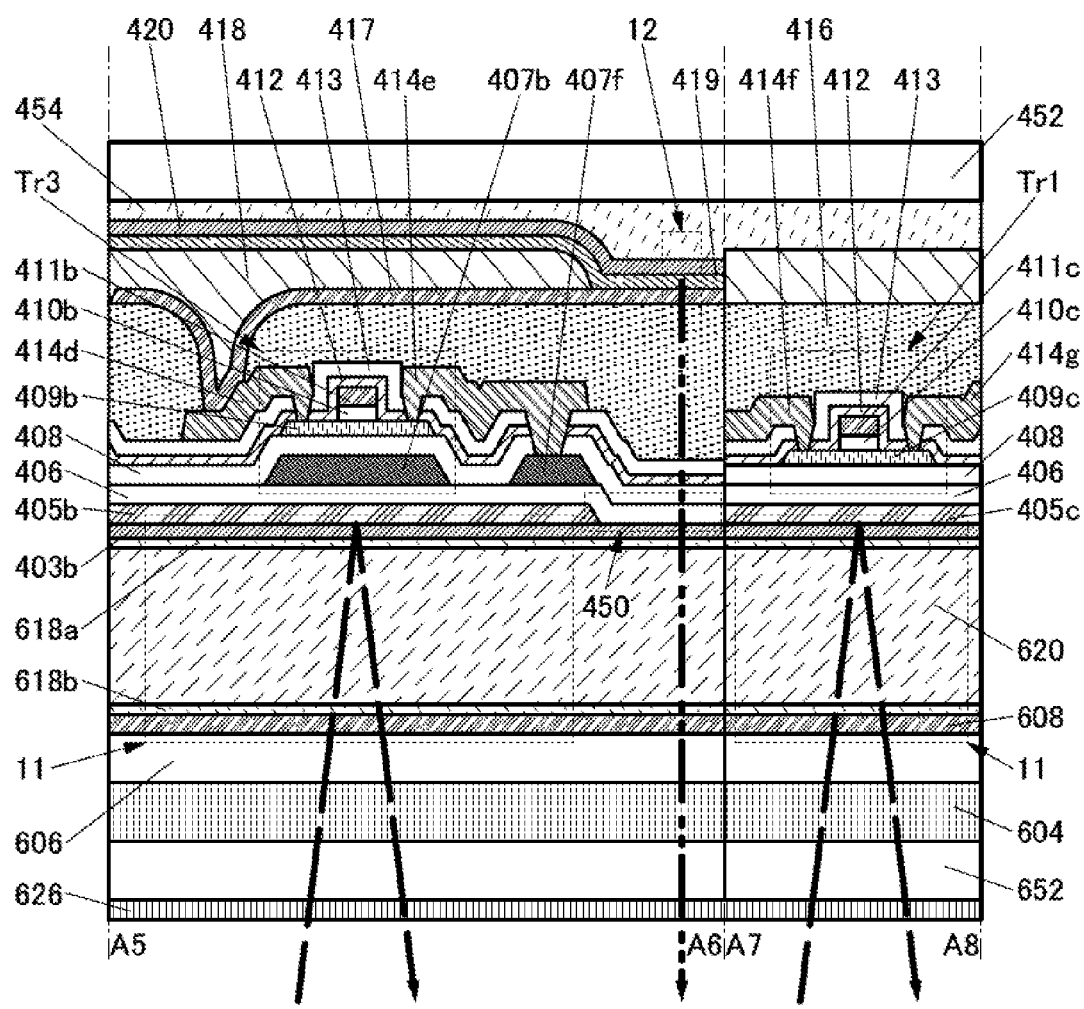
FIG. 26 is a cross-sectional view illustrating a display device.
Figure 27:
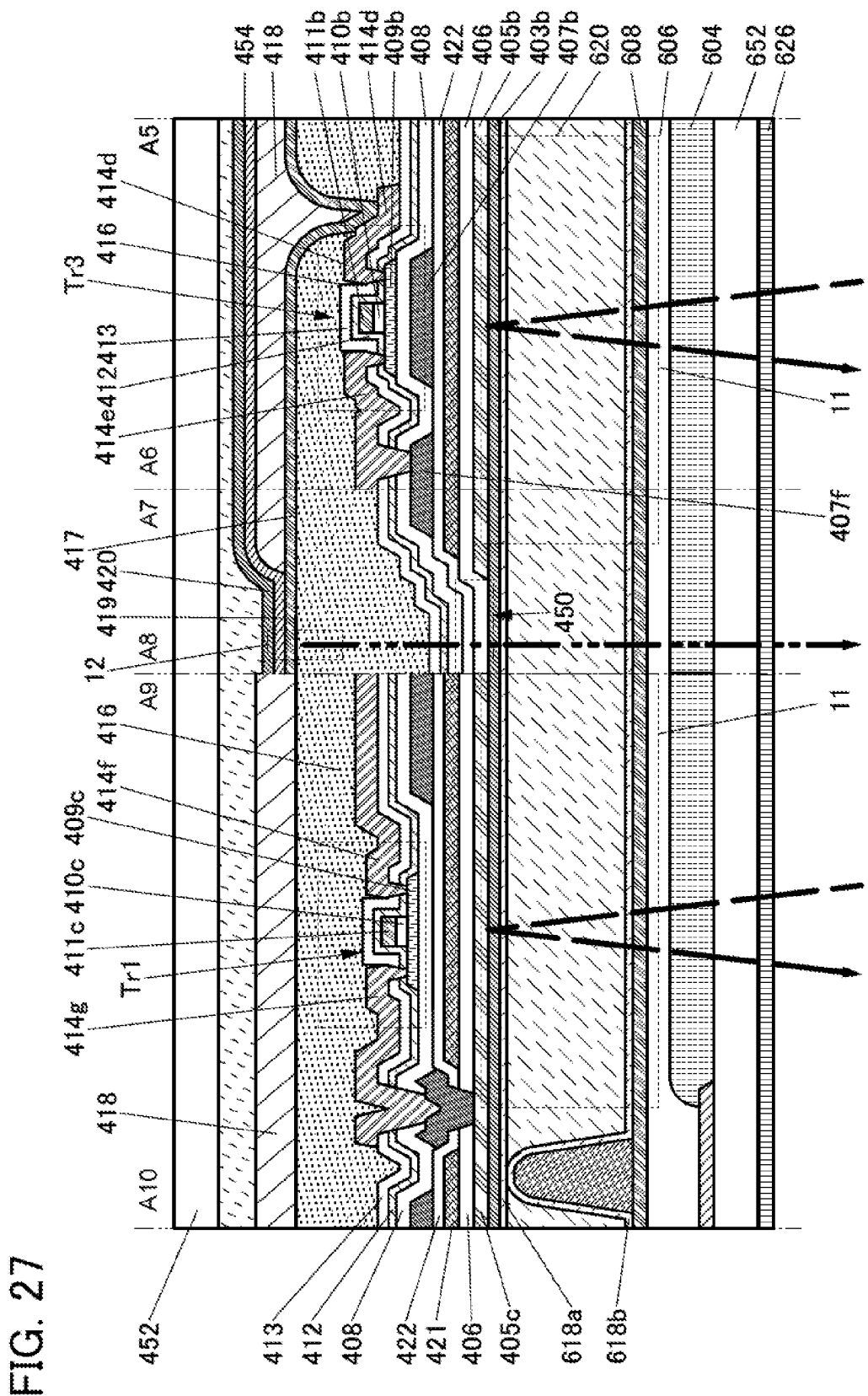
FIG. 27 is a cross-sectional view illustrating a display device.

The cross sections taken along the dashed-dotted lines A5-A6 and A7-A8 in FIG. 24 are described with reference to FIG. 26. FIG. 26 corresponds to an enlarged cross-sectional view of some components taken along the dashed-dotted lines A5-A6 and A7-A8 in FIG. 24. The enlarged cross-sectional view is reversed upside down. The cross sections taken along the dashed-dotted lines A5-A6 and A7-A8 in FIG. 25 are described with reference to FIG. 27. FIG. 27 corresponds to an enlarged cross-sectional view of some components taken along the dashed-dotted lines A5-A6 and A7-A8 in FIG. 25. Note that in FIG. 26 and FIG. 27, some components are not illustrated in order to avoid complexity of the drawing.

The display element 11 includes a conductive film 403b, a liquid crystal layer 620, and a conductive film 608. The conductive film 403b functions as a pixel electrode and the conductive film 608 functions as a counter electrode. The conductive film 403b is electrically connected to the transistor Tr1.

The display element 11 includes conductive films 405b and 405c electrically connected to the conductive film 403b. The conductive films 405b and 405c each have a function of reflecting incident light. That is, the conductive films 405b and 405c function as reflective films. An opening 450 transmitting incident light is provided in the reflective films. In FIG. 26 and FIG. 27, a conductive film functioning as a reflective film is separated into island shapes by the opening 450, whereby the conductive film 405c is positioned below the transistor Tr1 and the conductive film 405b is positioned below the transistor Tr3. Since light of the display element 12 is emitted from the opening 450, the opening 450 corresponds to the display region 12d(m, n) illustrated in FIGS. 22A and 22B and FIG. 23.

The display element 12 has a function of emitting light toward the opening 450. In one embodiment of the present invention, the display element 12 emits light toward the transistor side, that is, the display element 12 is a bottom emission type light-emitting element.

The display element 12 includes a conductive film 417, an EL layer 419, and a conductive film 420. The conductive film 417 functions as a pixel electrode and an anode electrode. The conductive film 420 functions as a counter electrode and a cathode electrode. Although a description is made on a structure where the conductive film 417 functions as an anode electrode and the conductive film 420 functions as a cathode electrode in this embodiment, one embodiment of the present invention is not limited thereto. For example, the conductive film 417 may function as a cathode electrode and the conductive film 420 may function as an anode electrode.

A conductive film 421 is provided between the display element 11 and the display element 12, and forms a storage capacitor of the display element 11. The capacitance and the transistor are preferably provided to overlap with each other, in which case the areas of the display region 11d and the display region 12d can be increased.

The conductive film 417 is electrically connected to the transistor Tr3.

Each of the transistor Tr1 and the transistor Tr3 preferably has a staggered structure (also referred to as a top gate structure) as illustrated in FIG. 26 and FIG. 27. When the staggered structure is employed, parasitic capacitance that can be generated between a gate electrode and a source electrode and between the gate electrode and a drain electrode can be reduced. However, one embodiment of the present invention is not limited to this, and a transistor having an inverted staggered structure (also referred to as a bottom gate structure) may be used.

In FIG. 26, the transistor Tr1 is formed over an insulating film 406 and an insulating film 408 and includes a metal oxide film 409c over the insulating film 408, an insulating film 410c over the metal oxide film 409c, and a metal oxide film 411c over the insulating film 410c. The insulating film 410c functions as a gate insulating film and the metal oxide film 411c functions as a gate electrode. In FIG. 27, the transistor Tr1 is formed over the insulating film 408 and includes the metal oxide film 409c over the insulating film 408, the insulating film 410c over the metal oxide film 409c, and the metal oxide film 411c over the insulating film 410c. The insulating film 410c functions as a gate insulating film and the metal oxide film 411c functions as a gate electrode.

Insulating films 412 and 413 are provided over the metal oxide films 409c and 411c. An opening reaching the metal oxide films 409c is provided in the insulating films 412 and 413 and conductive films 414f and 414g are electrically connected to the metal oxide films 409c through the opening. The conductive films 414f and 414g function as a source electrode and a drain electrode of the transistor Tr1.

Insulating films 416 and 418 are provided over the transistor Tr1.

In FIG. 26, the transistor Tr3 is formed over the insulating film 406, and includes a conductive film 407b over the insulating film 406, the insulating film 408 over the conductive film 407b, a metal oxide film 409b over the insulating film 408, an insulating film 410b over the metal oxide film 409b, and a metal oxide film 411b over the insulating film 410b. In FIG. 27, the transistor Tr3 is formed over the insulating film 422, and includes the conductive film 407b over the insulating film 422, the insulating film 408 over the conductive film 407b, the metal oxide film 409b over the insulating film 408, an insulating film 410b over the metal oxide film 409b, and a metal oxide film 411b over the insulating film 410b. In FIG. 26 and FIG. 27, the conductive film 407b functions as a first gate electrode, and the insulating film 408 functions as a first gate insulating film. The insulating film 410b functions as a second gate insulating film, and the oxide semiconductor film 411b functions as a second gate electrode.

Insulating films 412 and 413 are provided over the metal oxide films 409b and 411b. An opening reaching the metal oxide film 409b is provided in the insulating films 412 and 413 and conductive films 414d and 414e are electrically connected to the metal oxide film 409b through the opening. The conductive films 414d and 414e function as a source electrode and a drain electrode of the transistor Tr3.

A conductive film 414e is electrically connected to a conductive film 407f through an opening provided in the insulating films 408, 412, and 413. The conductive film 407f is formed through the same process as that of the conductive film 407b and functions as a connection electrode.

The insulating film 416 and the conductive film 417 are provided over the transistor Tr3. An opening reaching the conductive film 414d is provided in the insulating film 416, and the conductive film 414d and the conductive film 417 are electrically connected to each other through the opening.

An insulating film 418, the EL layer 419, and the conductive film 420 are provided over the conductive film 417. An opening reaching the conductive film 417 is provided in the insulating film 418, and the conductive film 417 and the EL layer 419 are electrically connected to each other through the opening.

The conductive film 420 is adhered to the substrate 452 with a sealing material 454 placed therebetween.

A color film 604, an insulating film 606, and the conductive film 608 are provided over the substrate 652 that faces the substrate 452. A functional film 626 is provided below the substrate 652. Light reflected by the display element 11 and light emitted from the display element 12 are extracted through the color film 604, the functional film 626, and the like.

The display element 11 includes alignment films 618a and 618b in contact with the liquid crystal layer 620 as illustrated in FIG. 26 and FIG. 27. Note that a structure without the alignment films 618a and 618b may be employed.

With the structures of the transistors Tr1 and Tr3 illustrated in FIG. 26 and FIG. 27, the area of the circuit can be reduced. Specifically, the transistor Tr1 is a single-gate transistor in which the metal oxide film 411c functioning as a gate electrode is provided, whereas the transistor Tr3 is a multi-gate transistor in which the conductive film 407b functioning as a first gate electrode and the metal oxide film 411b functioning as a second gate electrode are provided. Note that there is no limitation on the structure of the transistor that is used in the display device of one embodiment of the present invention. For example, both the transistors Tr1 and Tr3 may have either a single-gate structure or a multi-gate structure.

[Cross Sections of FPC Region and Gate Driver Circuit Portion]

Figure 28:
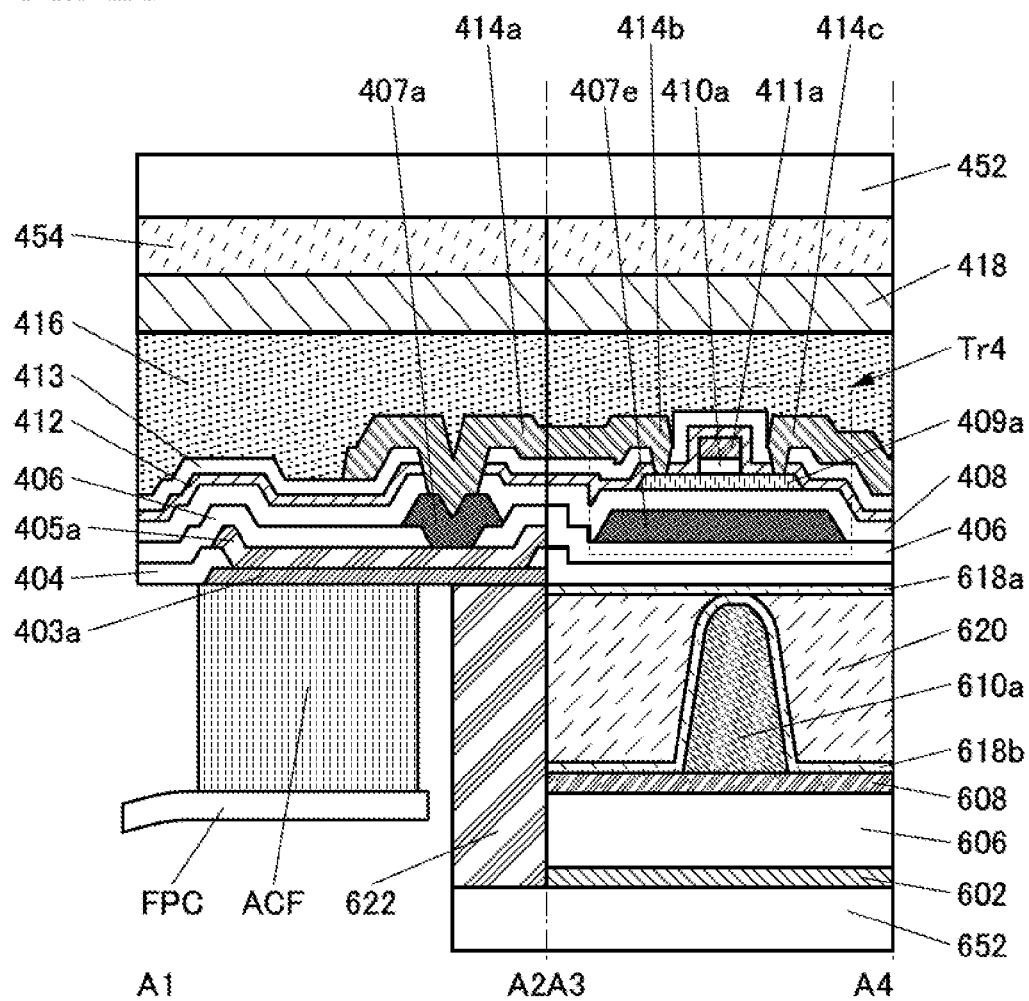
FIG. 28 is a cross-sectional view illustrating a display device.
Figure 29:
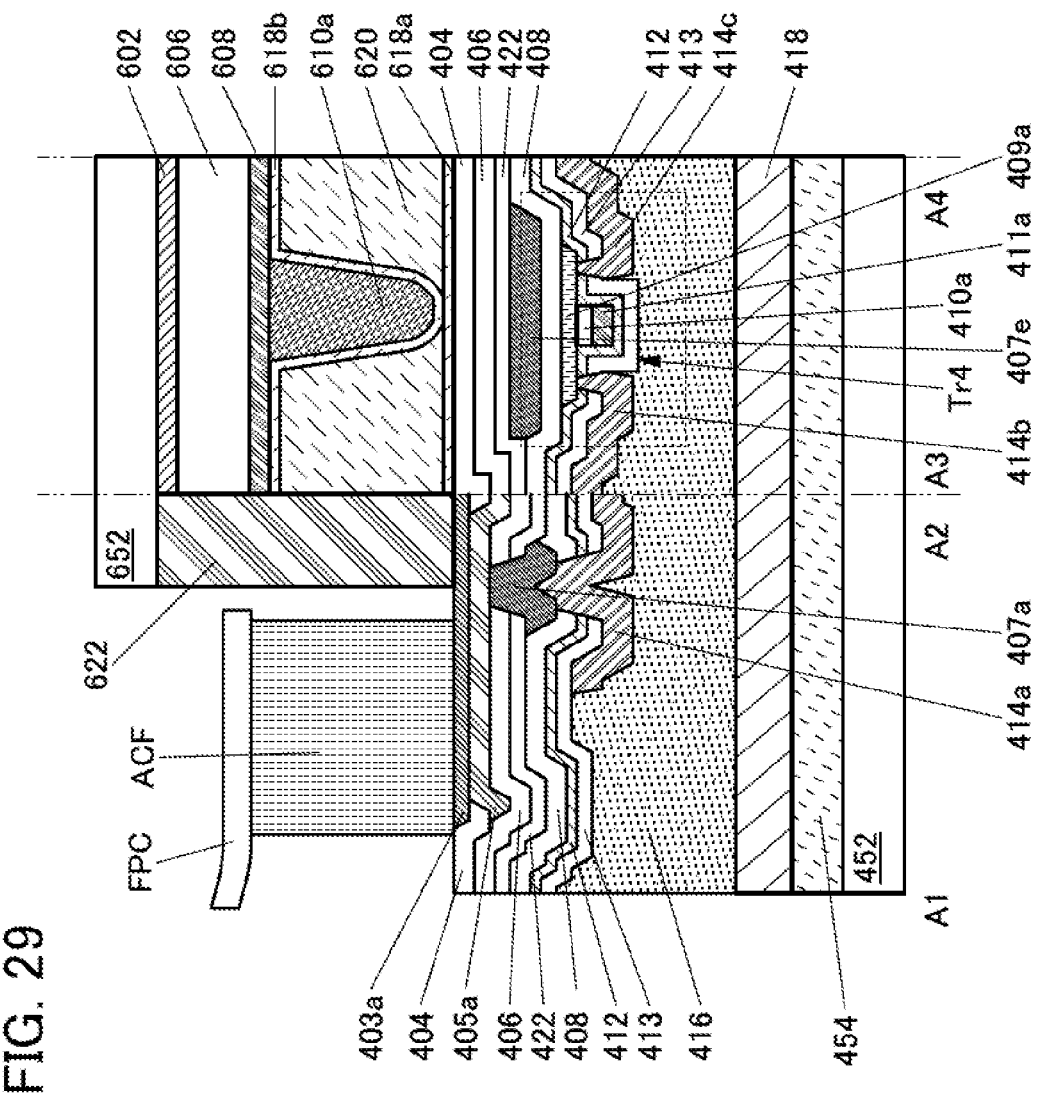
FIG. 29 is a cross-sectional view illustrating a display device.

The cross-sections taken along the dashed-dotted lines A1-A2 and A3-A4 in FIG. 24 are described with reference to FIG. 28. FIG. 28 corresponds to an enlarged cross-sectional view of components taken along the dashed-dotted lines A1-A2 and A3-A4 in FIG. 24. The enlarged cross-sectional view is reversed upside down. The cross-sections taken along the dashed-dotted lines A1-A2 and A3-A4 in FIG. 25 are described with reference to FIG. 29. FIG. 29 corresponds to an enlarged cross-sectional view of components taken along the dashed-dotted lines A1-A2 and A3-A4 in FIG. 25. Note that in FIG. 28 and FIG. 29, some components are not illustrated in order to avoid complexity of the drawings in some cases.

The FPC illustrated in FIG. 28 and FIG. 29 is electrically connected to a conductive film 403a through an anisotropic conductive film (ACF). An insulating film 404 is provided over the conductive film 403a. An opening reaching the conductive film 403a is provided in the insulating film 404, and the conductive film 403a and a conductive film 405a are electrically connected to each other through the opening.

In FIG. 28, the insulating film 406 is provided over the conductive film 405a. An opening reaching the conductive film 405a is provided in the insulating film 406, and the conductive film 405a and a conductive film 407a are electrically connected to each other through the opening. In FIG. 29, the insulating film 406 is provided over the conductive film 405a. Furthermore, the insulating film 422 is provided over the conductive film 405a and the insulating film 406. An opening reaching the conductive film 405a is provided in the insulating films 406 and 422, and the conductive film 405a and a conductive film 407a are electrically connected to each other through the opening.

In FIG. 28 and FIG. 29, the insulating films 408, 412, and 413 are provided over the conductive film 407a. An opening reaching the conductive film 407a is provided in the insulating films 408, 412, and 413 and the conductive film 407a and a conductive film 414a are electrically connected to each other through the opening.

The insulating films 416 and 418 are provided over the insulating film 413 and the conductive film 414a. The insulating film 418 is adhered to the substrate 452 with the sealing material 454 placed therebetween.

The transistor Tr4 illustrated in FIG. 28 corresponds to a transistor included in a gate driver circuit portion 504a.

The transistor Tr4 illustrated in FIG. 29 corresponds to a transistor included in a gate driver circuit portion 404a.

The transistor Tr4 is formed over the insulating film 422 and includes a conductive film 407e over the insulating film 422, the insulating film 408 over the conductive film 407e, an metal oxide film 409a over the insulating film 408, an insulating film 410a over the metal oxide film 409a, and a metal oxide film 411a over the insulating film 410a. The conductive film 407e functions as a first gate electrode. The insulating film 410a functions as a second gate insulating film and the metal oxide film 411a functions as a second gate electrode.

The insulating films 412 and 413 are provided over the metal oxide films 409a and 411a. An opening reaching the metal oxide film 409a is provided in the insulating films 412 and 413 and conductive films 414b and 414c are electrically connected to the metal oxide film 409a through the opening. The conductive films 414b and 414c function as a source electrode and a drain electrode of the transistor Tr4.

The transistor Tr4 is a multi-gate transistor like the transistor Tr3 described above. A multi-gate transistor is preferably used in the gate driver circuit portion 404a because the current drive capability can be improved. Since the use of a multi-gate transistor can improve the current drive capability, the width of the driver circuit can be reduced.

The insulating films 416 and 418 are provided over the transistor Tr4. The insulating film 418 is adhered to the substrate 452 with the sealing material 454 placed therebetween.

A light-blocking film 602, the insulating film 606, and the conductive film 608 are provided over the substrate 652 that faces the substrate 452.

A structure body 610a is formed in a position overlapping with the transistor Tr4 over the conductive film 608. The structure body 610a has a function of controlling the thickness of the liquid crystal layer 620. The alignment films 618a and 618b are formed between the structure body 610a and the insulating film 404 in FIG. 28 and FIG. 29. Note that the alignment films 618a and 618b are not necessarily formed between the structure body 610a and the insulating film 404.

A sealant 622 is provided at an end portion of the substrate 652. Note that the sealant 622 is provided between the substrate 652 and the conductive film 403a.

[Cross Sections of Connection Region and Region in the Vicinity of End Portion]

Figure 30:
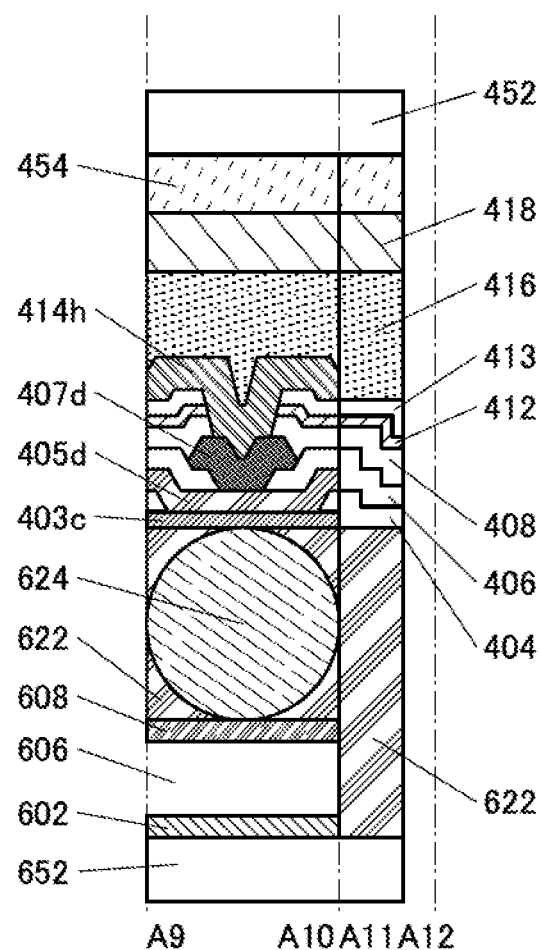
FIG. 30 is a cross-sectional view illustrating a display device.

The cross sections taken along the dashed-dotted lines A9-A10 and A11-A12 in FIG. 24 are described with reference to FIG. 30. FIG. 30 corresponds to an enlarged cross-sectional view of components taken along the dashed-dotted lines A9-A10 and A11-A12 in FIG. 24. The enlarged cross-sectional view is reversed upside down.

Figure 31:
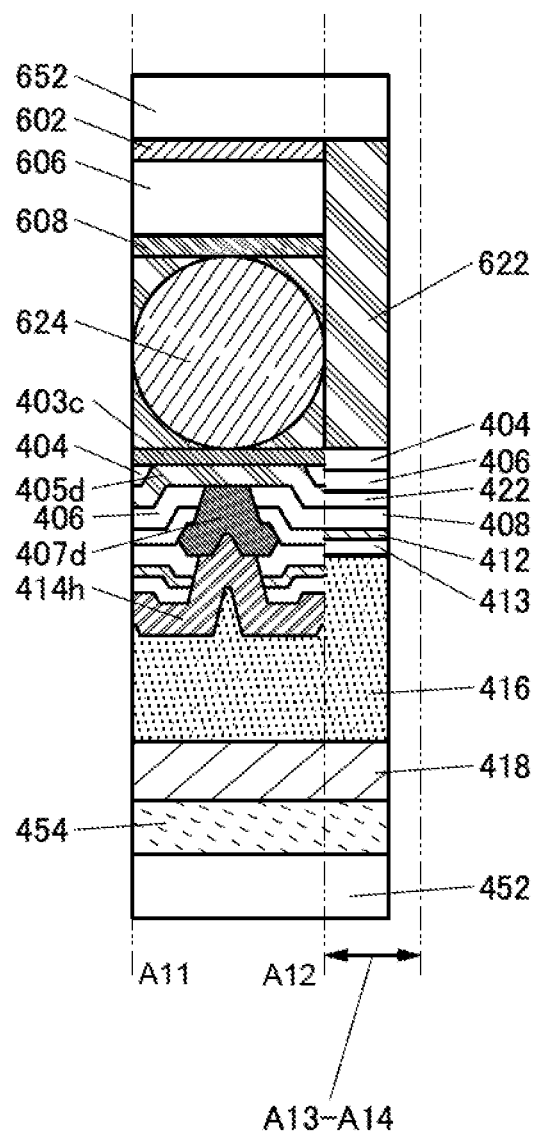
FIG. 31 is a cross-sectional view illustrating a display device.

The cross sections taken along the dashed-dotted lines A11-A12 and A13-A14 in FIG. 25 are described with reference to FIG. 31. FIG. 31 corresponds to an enlarged cross-sectional view of components taken along the dashed-dotted lines A11-A12 and A13-A14 in FIG. 25. Note that in FIG. 30 and FIG. 31, some components are not illustrated in order to avoid complexity of the drawings in some cases.

In FIG. 30 and FIG. 31, the conductive film 608 is electrically connected to a conductive film 403c through a conductor 624. The conductor 624 is included in the sealant 622. The conductive film 608 is provided over the substrate 652, the light-blocking film 602, and the insulating film 606.

In FIG. 30, the insulating film 404 is provided over the conductive film 403c. An opening reaching the conductive film 403c is provided in the insulating film 404, and the conductive film 403c and a conductive film 405d are electrically connected to each other through the opening. The insulating film 406 is provided over the conductive film 405d. An opening reaching the conductive film 405d is provided in the insulating film 406, and the conductive film 405d and a conductive film 407d are electrically connected to each other through the opening.

In FIG. 31, the insulating film 404 is provided over the conductive film 403c. An opening reaching the conductive film 403c is provided in the insulating film 404, and the conductive film 403c and the conductive film 405d are electrically connected to each other through the opening. The insulating film 406 is provided over the conductive film 405d. The insulating film 422 is provided over the insulating film 406. An opening reaching the conductive film 405d is provided in the insulating film 406 and the insulating film 422, and the conductive film 405d and the conductive film 407d are electrically connected to each other through the opening.

The insulating films 408, 412, and 413 are provided over the conductive film 407d. An opening reaching the conductive film 407d is provided in the insulating films 408, 412, and 413 and the conductive film 407d and a conductive film 414h are electrically connected to each other through the opening. The insulating films 416 and 418 are provided over the conductive film 414h. The insulating film 418 is adhered to the substrate 452 with the sealing material 454 placed therebetween.

The sealant 622 is provided at end portions of the substrate 452 and 652. Note that the sealant 622 is provided between the substrate 652 and the insulating film 404.

<1-9-1. Manufacturing Method of Display Device>

Next, a method for manufacturing the display device 500 illustrated in FIG. 24 is described with reference to FIGS. 32A to 32C, FIGS. 33A to 33C, FIGS. 34A to 34C, FIGS. 35A to 35C, FIGS. 36A and 36B, and FIG. 37. FIGS. 32A to 32C to FIG. 37 are cross-sectional views illustrating a method for manufacturing the display device 500.

First, a conductive film 402 is formed over a substrate 401. Then, a conductive film is formed over the conductive film 402 and processed into island shapes, whereby the conductive films 403a, 403b, and 403c are formed (see FIG. 32A).

The conductive film 402 has a function of a separation layer, the conductive films 403a and 403c each have a function of a connection electrode, and the conductive film 403b has a function of a pixel electrode.

An insulating film is formed over the conductive films 402, 403a, 403b, and 403c and openings are formed in desired regions of the insulating film, whereby the insulating film 404 is formed. Then, a conductive film is formed over the conductive films 403a, 403b, and 403c and the insulating film 404 and processed into island shapes, whereby the conductive films 405a, 405b, 405c, and 405d are formed (see FIG. 32B).

The insulating film 404 has openings in regions overlapping with the conductive films 403a, 403b, and 403c. The conductive film 403a is electrically connected to the conductive film 405a through the opening, the conductive film 403b is electrically connected to the conductive films 405b and 405c through the openings, and the conductive film 403c is electrically connected to the conductive film 405d through the opening.

An insulating film is formed over the insulating film 404 and the conductive films 405a, 405b, 405c, and 405d and openings are formed in desired regions of the insulating film, whereby the insulating film 406 is formed. A conductive film is formed over the conductive films 405a, 405b, 405c, and 405d and the insulating film 406 and processed into island shapes, whereby the conductive films 407a, 407b, 407c, 407d, 407e, 407f, and 407g are formed (see FIG. 32C).

The insulating film 406 has openings in regions overlapping with the conductive films 405a, 405c, and 405d. The conductive film 405a, the conductive film 405c, and the conductive film 405d are electrically connected to the conductive film 407a, the conductive film 407c, and the conductive film 407d, respectively, through the openings.

Next, the insulating film 408 is formed over the insulating film 406 and the conductive films 407a, 407b, 407c, 407d, 407e, 407f, and 407g. Then, a metal oxide film is formed over the insulating film 408 and processed into island shapes, whereby the metal oxide films 409a, 409b, and 409c are formed (see FIG. 33A).

Figure 33A:
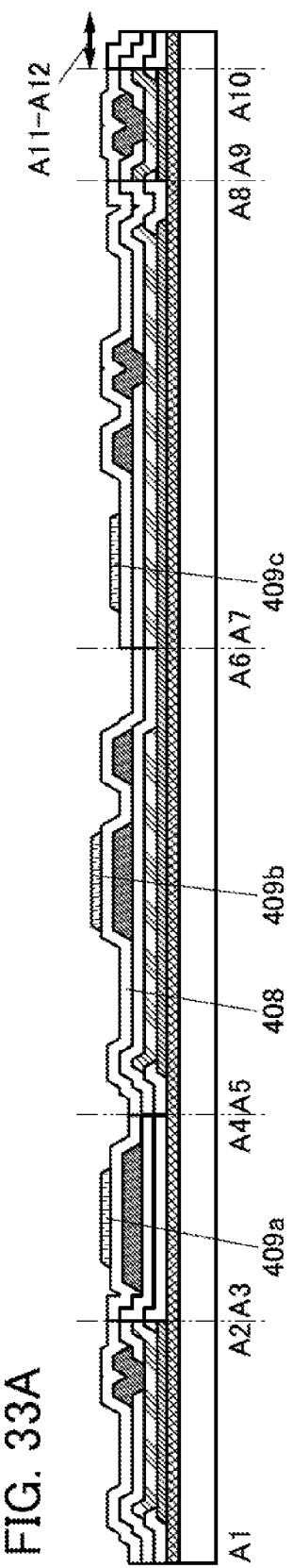
FIGS. 33A to 33C are cross-sectional views illustrating a process for manufacturing a display device.
Figure 33B:
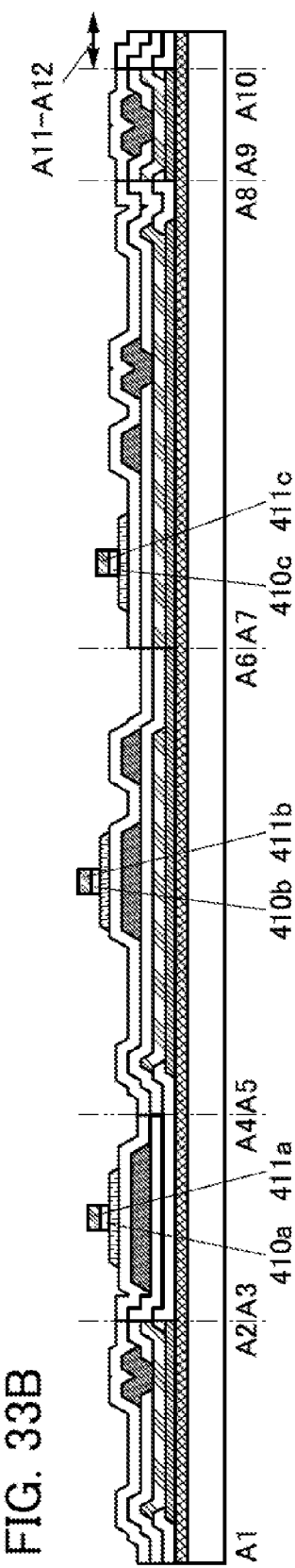

Next, an insulating film and a metal oxide film are formed over the insulating film 408 and the metal oxide films 409a, 409b, and 409c and processed into desired shapes, whereby the island-shaped insulating films 410a, 410b, and 410c and the island-shaped metal oxide films 411a, 411b, and 411c are formed (see FIG. 33B).

Figure 33C:
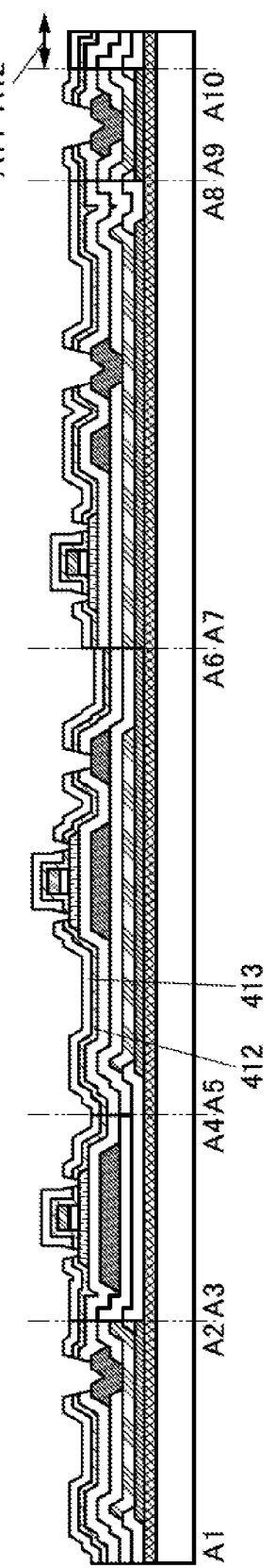

Next, insulating films are formed over the insulating film 408 and the metal oxide films 409a, 409b, and 409c and openings are formed in desired regions of the insulating films, whereby the insulating films 412 and 413 are formed (see FIG. 33C).

Although a two-layer structure of the insulating films 412 and 413 is illustrated in FIG. 33C, the present invention is not limited thereto. For example, a single-layer structure of the insulating film 412, a single-layer structure of the insulating film 413, or a stacked-layer structure of three or more layers in which the insulating films 412 and 413 and another insulating film are stacked may be used. When openings are formed in the insulating films 412 and 413, openings are also formed in part of the insulating film 408. Openings formed in the insulating films 408, 412, and 413 reach the conductive films 407a, 407c, 407d, and 407f.

Next, a conductive film is formed over the insulating film 413 and processed into desired shapes, whereby the conductive films 414a, 414b, 414c, 414d, 414e, 414f, 414g, and 414h are formed (see FIG. 34A).

The conductive films 414b and 414c function as a source electrode and a drain electrode of the transistor Tr4. The conductive films 414d and 414e function as a source electrode and a drain electrode of the transistor Tr3. The conductive films 414f and 414g function as a source electrode and a drain electrode of the transistor Tr1.

In the transistor Tr1, the conductive film 414g is electrically connected to the conductive film 403b with the conductive films 407c and 405c placed therebetween. The transistor Tr1 can control the potential of the conductive film 403b.

Next, the insulating film 416 is formed to cover the transistors Tr1, Tr3, and Tr4. The insulating film 416 has an opening in a region overlapping with the conductive film 414d. Next, a conductive film is formed over the insulating film 416 and the conductive film 414d and processed into a desired shape, whereby the conductive film 417 is formed. Then, the insulating film 418 is formed in a desired region over the insulating film 416 and the conductive film 417. The insulating film 418 has an opening in a region overlapping with the conductive film 417 (see FIG. 34B).

Next, the EL layer 419 is formed over the conductive film 417 and the insulating film 418, and the conductive film 420 is formed over the EL layer 419 (see FIG. 34C).

The conductive film 417, the EL layer 419, and the conductive film 420 forms the display element 12. Note that the conductive film 417 functions as one of a pair of electrodes of the display element 12, and the conductive film 420 functions as the other thereof. Although not illustrated, the EL layers 419 are separately formed for color elements (RGB). Note that details of the method for manufacturing the display element 12 are described in Embodiment 2.

Through the above steps, an element formed over the substrate 401 can be fabricated.

Figure 35A:
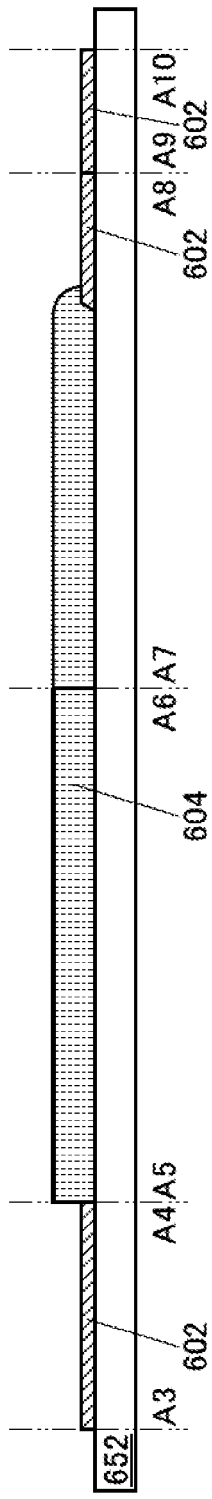
FIGS. 35A to 35C are cross-sectional views illustrating a process for manufacturing a display device.
Figure 35B:
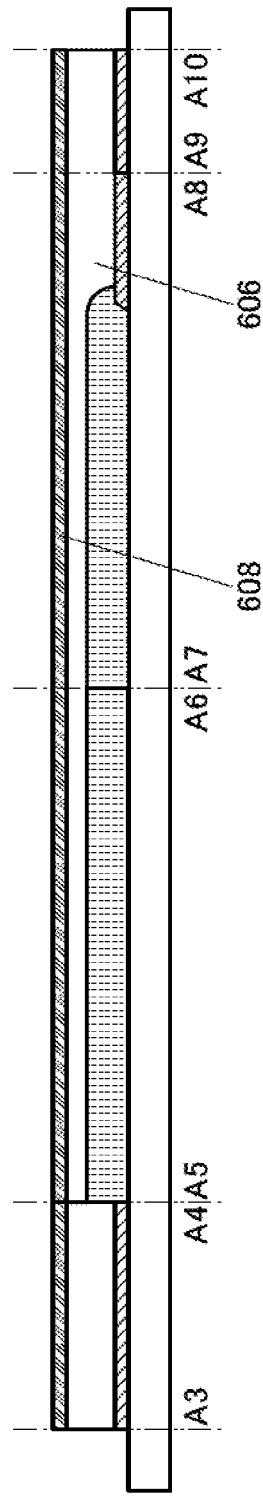
Figure 35C:
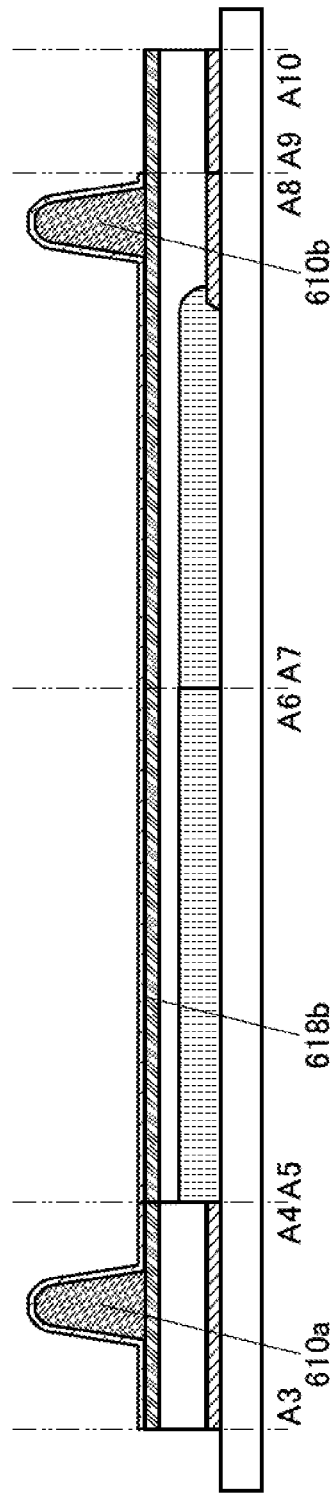

A method for manufacturing the substrate 652 disposed to face the substrate 452 is described with reference to FIGS. 35A to 35C.

First, the light-blocking film 602 is formed over the substrate 652. After that, the color film 604 is formed over the substrate 652 and the light-blocking film 602 (see FIG. 35A).

Next, the insulating film 606 is formed over the light-blocking film 602 and the color film 604. Then, the conductive film 608 is formed over the insulating film 606 (see FIG. 35B).

Next, the structure bodies 610a and 610b are formed in desired regions over the conductive film 608. Then, the alignment film 618b is formed over the conductive film 608 and the structure bodies 610a and 610b (see FIG. 35C).

Note that a structure without the alignment film 618b may be employed. Although the structure bodies 610a and 610b are formed over the substrate 652 in this embodiment, the present invention is not limited thereto. For example, the structure bodies 610a and 610b may be formed over the above-described element formed over the substrate 401.

Through the above steps, an element formed over the substrate 652 can be fabricated.

Next, the element formed over the substrate 401 is separated from the substrate 401. Specifically, separation is conducted at an interface between the conductive film 402 formed over the substrate 401 and the conductive films 403a, 403b, and 403c and the insulating film 404 which are formed over the conductive film 402. For the separation, the sealing material 454 is formed over the element formed over the substrate 401. Then, the substrate 452 is attached to the sealing material 454 and the element is separated at the interface between the element and the conductive film 402 (see FIG. 36A).

When the element is separated at the interface between the element and the conductive film 402, surfaces of the conductive films 403a, 403b, and 403c (bottom surfaces of the conductive films 403a, 403b, and 403c in FIG. 36A) are exposed. In the case where an insulating film, a foreign substance, or the like is attached to the surfaces of the conductive films 403a, 403b, and 403c, the insulating film, the foreign substance, or the like is preferably removed by cleaning treatment, ashing treatment, etching treatment, or the like.

When the element is separated at the interface between the element and the conductive film 402, a polar solvent (typically water), a nonpolar solvent, or the like is preferably added to the interface between the conductive film 402 and the conductive films 403a, 403b, and 403c and the insulating film 404 which are formed over the conductive film 402. For example, it is preferable to use water in separating the element at the interface between the element and the conductive film 402 because damage caused by electrification in separation can be reduced.

As the conductive film 402, any of the following materials can be used. The conductive film 402 can have a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. In the case of a layer containing silicon, the layer containing silicon may have an amorphous, microcrystalline, polycrystalline, or single-crystal structure.

When the conductive film 402 is formed as a stacked layer structure including a layer containing tungsten and a layer containing an oxide of tungsten, the layer containing tungsten may be formed and an insulating layer containing an oxide may be formed thereover so that the layer containing an oxide of tungsten is formed at the interface between the tungsten layer and the insulating layer. Alternatively, the layer containing an oxide of tungsten may be formed by performing thermal oxidation treatment, oxygen plasma treatment, dinitrogen monoxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or dinitrogen monoxide alone, or a mixed gas of any of these gasses and another gas. The surface condition of the conductive film 402 is changed by the plasma treatment or the heat treatment, whereby adhesion between the conductive film 402 and the conductive films 403a, 403b, and 403c and the insulating film 404 which are formed later can be controlled.

Although the structure where the conductive film 402 is provided is described in this embodiment, the present invention is not limited thereto. For example, a structure where the conductive film 402 is not provided may be employed. In that case, an organic resin film may be formed in a region where the conductive film 402 is formed. As the organic resin film, for example, a polyimide-based resin film, a polyamide-based resin film, an acrylic-based resin film, an epoxy-based resin film, or a phenol-based resin film can be used.

In the case where the organic resin film is used instead of the conductive film 402, as a method for separating the element formed over the substrate 401, a laser light is irradiated from the lower side of the substrate 401 to weaken the organic resin film, whereby separation is conducted at an interface between the substrate 401 and the organic resin film or at an interface between the organic resin film and the conductive films 403a, 403b, and 403c and the insulating film 404.

In the case where a laser light is irradiated, a region having strong adhesion and a region having weak adhesion are formed between the substrate 401 and the conductive films 403a, 403b, and 403c and the insulating film 404 by adjustment of the irradiation energy density of the laser light, and then, the element may be separated from the substrate 401.

Next, the element is reversed so that the substrate 452 is placed at the bottom, and the alignment film 618a is formed over the insulating film 404 and the conductive film 403b (see FIG. 36B).

Next, an element over the substrate 452 and an element over the substrate 652 are attached to each other and sealed with the sealant 622. After that, the liquid crystal layer 620 is formed between the substrates 452 and 652, whereby the display element 11 is formed (see FIG. 37).

Note that the conductor 624 is provided in the sealant 622 over the conductive film 403c. As the conductor 624, conductive particles may be dispersed into a desired region in the sealant 622 by a dispenser method or the like. The conductive film 403c and the conductive film 608 are electrically connected to each other through the conductor 624.

Figure 37:
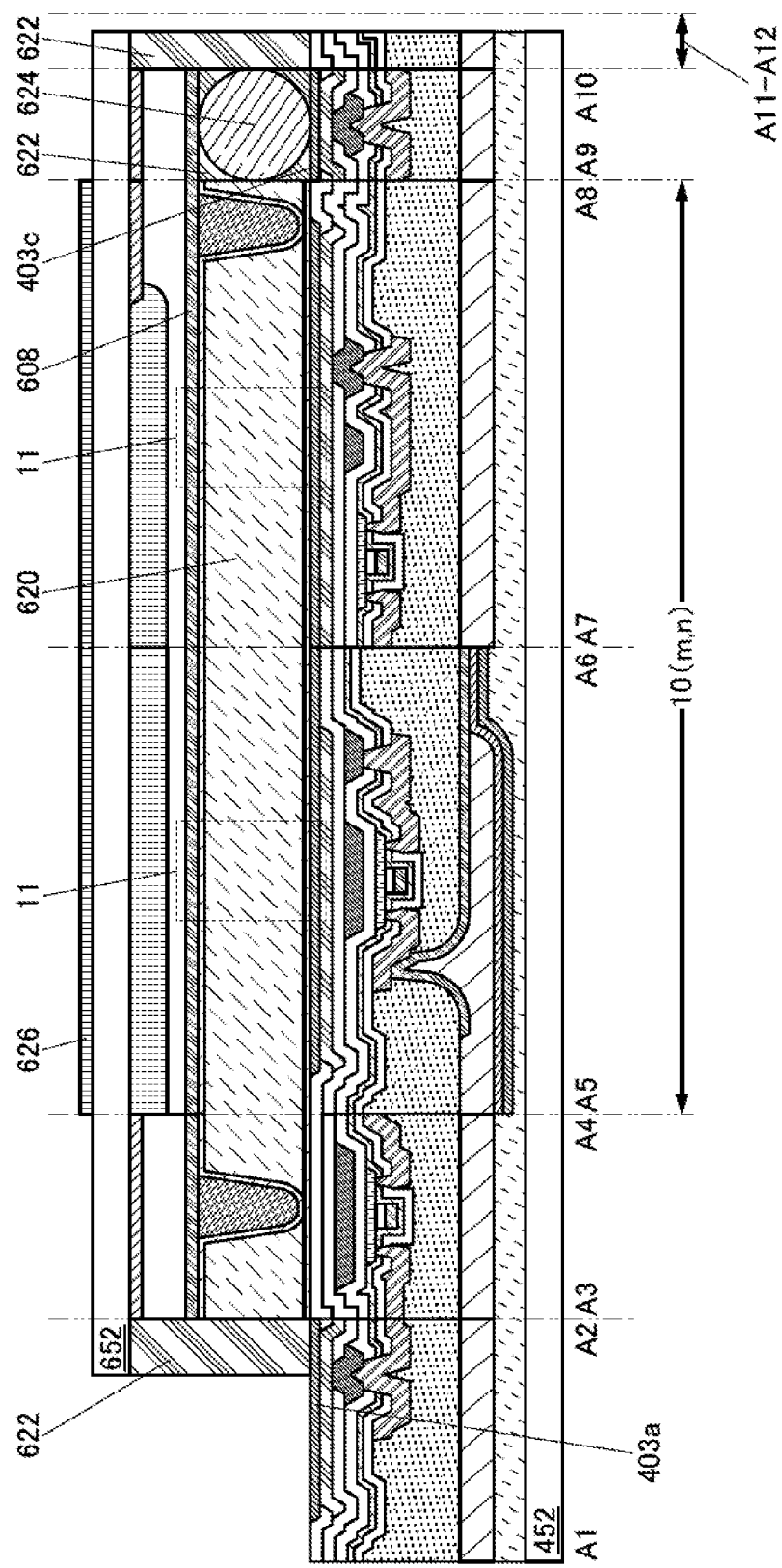
FIG. 37 is a cross-sectional view illustrating a process for manufacturing a display device.

Next, the functional film 626 is formed over the substrate 652 (see FIG. 37). Note that the functional film 626 is not necessarily formed.

After that, the FPC is bonded to the conductive film 403a with the ACF placed therebetween. Note that an anisotropic conductive paste (ACP) may be used instead of the ACF.

Through the above steps, the display device 500 illustrated in FIG. 24 can be fabricated.

<1-9-2. Manufacturing Method of Display Device>

Next, a method for manufacturing the display device 500 illustrated in FIG. 23 is described with reference to FIGS. 38A to 38C, FIGS. 39A to 39C, FIGS. 40A to 40C, FIGS. 41A to 41C, FIGS. 42A and 42B, and FIG. 43. FIGS. 32A to 32C to FIG. 37 are cross-sectional views illustrating a method for manufacturing the display device 500.

First, a conductive film 402 is formed over a substrate 401. Then, a conductive film is formed over the conductive film 402 and processed into island shapes, whereby the conductive films 403a, 403b, and 403c are formed (see FIG. 38A).

The conductive film 402 has a function of a separation layer, the conductive films 403a and 403c each have a function of a connection electrode, and the conductive film 403b has a function of a pixel electrode.

An insulating film is formed over the conductive films 402, 403a, 403b, and 403c and openings are formed in desired regions of the insulating film, whereby the insulating film 404 is formed. Then, a conductive film is formed over the conductive films 403a, 403b, and 403c and the insulating film 404 and processed into island shapes, whereby the conductive films 405a, 405b, 405c, and 405d are formed (see FIG. 38B).

The insulating film 404 has openings in regions overlapping with the conductive films 403a, 403b, and 403c. The conductive film 403a is electrically connected to the conductive film 405a through the opening, the conductive film 403b is electrically connected to the conductive films 405b and 405c through the openings, and the conductive film 403c is electrically connected to the conductive film 405d through the opening.

An insulating film is formed over the insulating film 404 and the conductive films 405a, 405b, 405c, and 405d and openings are formed in desired regions of the insulating film, whereby the insulating film 406 is formed.

Next, a conductive film is formed over the insulating film 406 and processed into an island shape, whereby the conductive film 421 is formed.

Then, an insulating film is formed over the conductive film 421 and an opening is formed in a desired region of the insulating film, whereby the insulating film 422 is formed.

After that, a conductive film is formed over the conductive film 421 and the insulating film 422 and processed into island shapes, whereby the conductive films 407a, 407b, 407c, 407d, 407e, and 407f are formed (see FIG. 38C).

The insulating film 406 and the insulating film 422 have openings in regions overlapping with the conductive films 405a, 405c, and 405d. The conductive film 405a, the conductive film 405c, and the conductive film 405d are electrically connected to the conductive film 407a, the conductive film 407c, and the conductive film 407d, respectively, through the openings.

Next, the insulating film 408 is formed over the insulating film 422 and the conductive films 407a, 407b, 407c, 407d, 407e, and 407f. Then, a metal oxide film is formed over the insulating film 408 and processed into island shapes, whereby the metal oxide films 409a, 409b, and 409c are formed (see FIG. 39A).

Next, an insulating film and a metal oxide film are formed over the insulating film 408 and the metal oxide films 409a, 409b, and 409c and processed into desired shapes, whereby the island-shaped insulating films 410a, 410b, and 410c and the island-shaped metal oxide films 411a, 411b, and 411c are formed (see FIG. 39B).

Next, insulating films are formed over the insulating film 408 and the metal oxide films 409a, 409b, and 409c and openings are formed in desired regions of the insulating films, whereby the insulating films 412 and 413 are formed (see FIG. 39C).

Although a two-layer structure of the insulating films 412 and 413 is illustrated in FIG. 39C, the present invention is not limited thereto. For example, a single-layer structure of the insulating film 412, a single-layer structure of the insulating film 413, or a stacked-layer structure of three or more layers in which the insulating films 412 and 413 and another insulating film are stacked may be used. When openings are formed in the insulating films 412 and 413, openings are also formed in part of the insulating film 408. Openings formed in the insulating films 408, 412, and 413 reach the conductive films 407a, 407c, 407d, and 407f.

Next, a conductive film is formed over the insulating film 413 and processed into desired shapes, whereby the conductive films 414a, 414b, 414c, 414d, 414e, 414f, 414g, and 414h are formed (see FIG. 40A).

The conductive films 414b and 414c function as a source electrode and a drain electrode of the transistor Tr4. The conductive films 414d and 414e function as a source electrode and a drain electrode of the transistor Tr3. The conductive films 414f and 414g function as a source electrode and a drain electrode of the transistor Tr1.

In the transistor Tr1, the conductive film 414g is electrically connected to the conductive film 403b with the conductive films 407c and 405c placed therebetween. The transistor Tr1 can control the potential of the conductive film 403b.

Next, the insulating film 416 is formed to cover the transistors Tr1, Tr3, and Tr4. The insulating film 416 has an opening in a region overlapping with the conductive film 414d. Next, a conductive film is formed over the insulating film 416 and the conductive film 414d and processed into a desired shape, whereby the conductive film 417 is formed. Then, the insulating film 418 is formed in a desired region over the insulating film 416 and the conductive film 417. The insulating film 418 has an opening in a region overlapping with the conductive film 417 (see FIG. 40B).

Next, the EL layer 419 is formed over the conductive film 417 and the insulating film 418, and the conductive film 420 is formed over the EL layer 419 (see FIG. 40C).

The conductive film 417, the EL layer 419, and the conductive film 420 forms the display element 12. Note that the conductive film 417 functions as one of a pair of electrodes of the display element 12, and the conductive film 420 functions as the other thereof. Although not illustrated, the EL layers 419 are separately formed for color elements (RGB). Note that details of the method for manufacturing the display element 12 are described in Embodiment 2.

Through the above steps, an element formed over the substrate 401 can be fabricated.

Figure 41A:
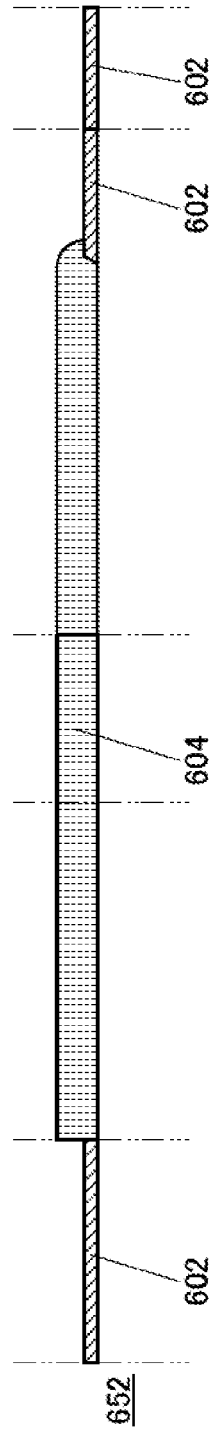
FIGS. 41A to 41C are cross-sectional views illustrating a process for manufacturing a display device.
Figure 41B:
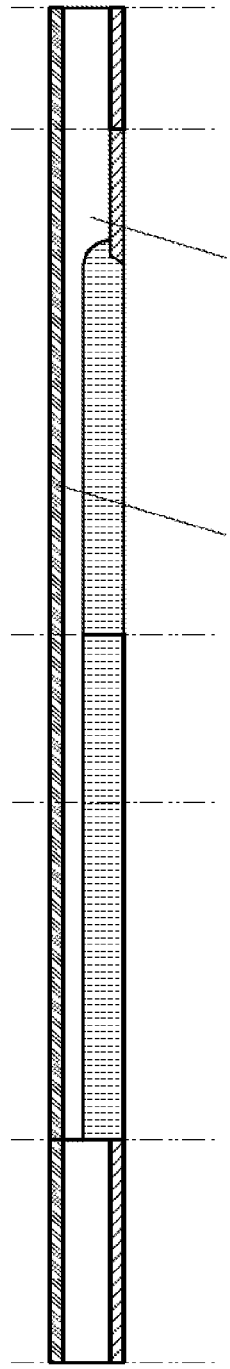
Figure 41C:
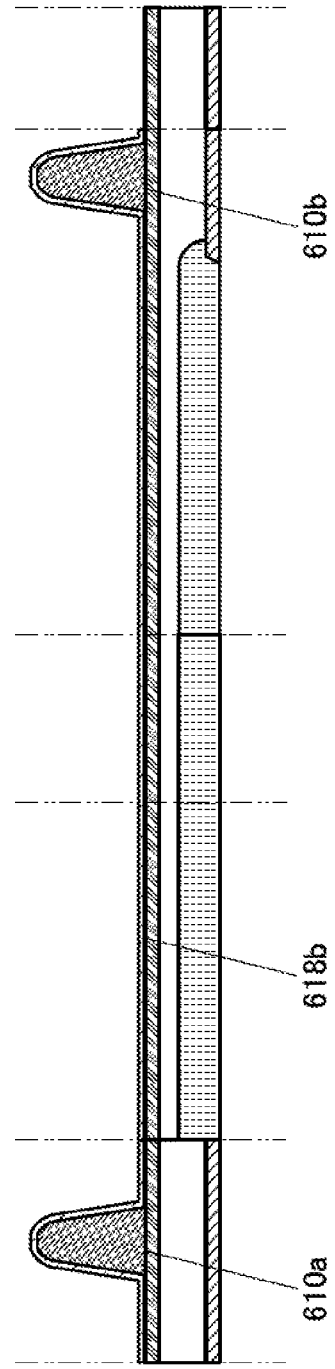

A method for manufacturing the substrate 652 disposed to face the substrate 452 is described with reference to FIGS. 41A to 41C.

First, the light-blocking film 602 is formed over the substrate 652. After that, the color film 604 is formed over the substrate 652 and the light-blocking film 602 (see FIG. 41A).

Next, the insulating film 606 is formed over the light-blocking film 602 and the color film 604. Then, the conductive film 608 is formed over the insulating film 606 (see FIG. 41B).

Next, the structure bodies 610a and 610b are formed in desired regions over the conductive film 608. Then, the alignment film 618b is formed over the conductive film 608 and the structure bodies 610a and 610b (see FIG. 41C).

Note that a structure without the alignment film 618b may be employed. Although the structure bodies 610a and 610b are formed over the substrate 652 in this embodiment, the present invention is not limited thereto. For example, the structure bodies 610a and 610b may be formed over the above-described element formed over the substrate 401.

Through the above steps, an element formed over the substrate 652 can be fabricated.

Next, the element formed over the substrate 401 is separated from the substrate 401. Specifically, separation is conducted at an interface between the conductive film 402 formed over the substrate 401 and the conductive films 403a, 403b, and 403c and the insulating film 404 which are formed over the conductive film 402. For the separation, the sealing material 454 is formed over the element formed over the substrate 401. Then, the substrate 452 is attached to the sealing material 454 and the element is separated at the interface between the element and the conductive film 402 (see FIG. 42A).

When the element is separated at the interface between the element and the conductive film 402, surfaces of the conductive films 403a, 403b, and 403c (bottom surfaces of the conductive films 403a, 403b, and 403c in FIG. 42A) are exposed. In the case where an insulating film, a foreign substance, or the like is attached to the surfaces of the conductive films 403a, 403b, and 403c, the insulating film, the foreign substance, or the like is preferably removed by cleaning treatment, ashing treatment, etching treatment, or the like.

When the element is separated at the interface between the element and the conductive film 402, a polar solvent (typically water), a nonpolar solvent, or the like is preferably added to the interface between the conductive film 402 and the conductive films 403a, 403b, and 403c and the insulating film 404 which are formed over the conductive film 402. For example, it is preferable to use water in separating the element at the interface between the element and the conductive film 402 because damage caused by electrification in separation can be reduced.

As the conductive film 402, any of the following materials can be used. The conductive film 402 can have a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. In the case of a layer containing silicon, the layer containing silicon may have an amorphous, microcrystalline, polycrystalline, or single-crystal structure.

When the conductive film 402 is formed as a stacked layer structure including a layer containing tungsten and a layer containing an oxide of tungsten, the layer containing tungsten may be formed and an insulating layer containing an oxide may be formed thereover so that the layer containing an oxide of tungsten is formed at the interface between the tungsten layer and the insulating layer. Alternatively, the layer containing an oxide of tungsten may be formed by performing thermal oxidation treatment, oxygen plasma treatment, dinitrogen monoxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or dinitrogen monoxide alone, or a mixed gas of any of these gasses and another gas. The surface condition of the conductive film 402 is changed by the plasma treatment or the heat treatment, whereby adhesion between the conductive film 402 and the conductive films 403a, 403b, and 403c and the insulating film 404 which are formed later can be controlled.

Although the structure where the conductive film 402 is provided is described in this embodiment, the present invention is not limited thereto. For example, a structure where the conductive film 402 is not provided may be employed. In that case, an organic resin film may be formed in a region where the conductive film 402 is formed. As the organic resin film, for example, a polyimide-based resin film, a polyamide-based resin film, an acrylic-based resin film, an epoxy-based resin film, or a phenol-based resin film can be used.

In the case where the organic resin film is used instead of the conductive film 402, as a method for separating the element formed over the substrate 401, a laser light is irradiated from the lower side of the substrate 401 to weaken the organic resin film, whereby separation is conducted at an interface between the substrate 401 and the organic resin film or at an interface between the organic resin film and the conductive films 403a, 403b, and 403c and the insulating film 404.

In the case where a laser light is irradiated, a region having strong adhesion and a region having weak adhesion are formed between the substrate 401 and the conductive films 403a, 403b, and 403c and the insulating film 404 by adjustment of the irradiation energy density of the laser light, and then, the element may be separated from the substrate 401.

Next, the element is reversed so that the substrate 452 is placed at the bottom, and the alignment film 618a is formed over the insulating film 404 and the conductive film 403b (see FIG. 42B).

Next, an element over the substrate 452 and an element over the substrate 652 are attached to each other and sealed with the sealant 622. After that, the liquid crystal layer 620 is formed between the substrates 452 and 652, whereby the display element 11 is formed (see FIG. 43).

Note that the conductor 624 is provided in the sealant 622 over the conductive film 403c. As the conductor 624, conductive particles may be dispersed into a desired region in the sealant 622 by a dispenser method or the like. The conductive film 403c and the conductive film 608 are electrically connected to each other through the conductor 624.

Figure 43:
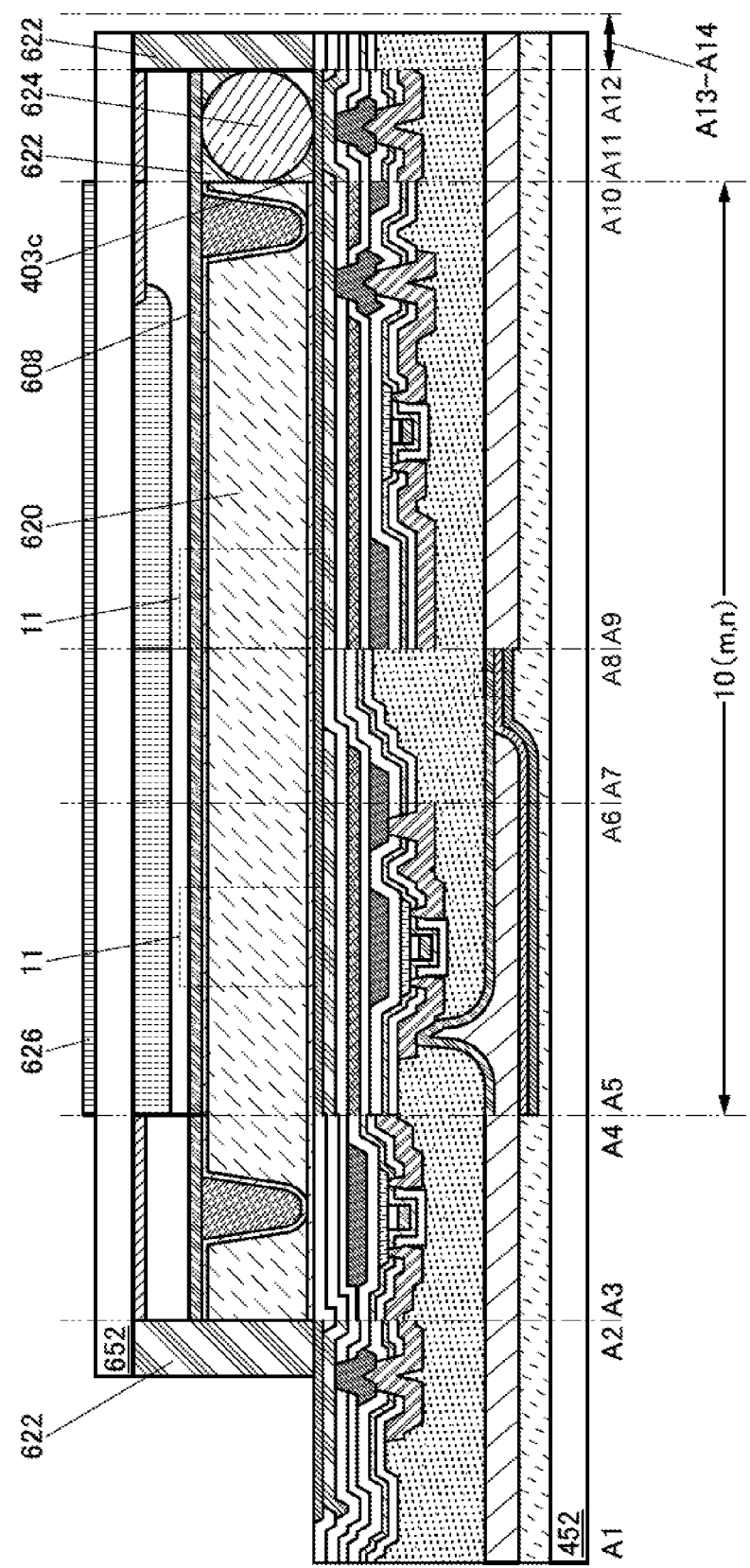
FIG. 43 is a cross-sectional view illustrating a process for manufacturing a display device.

Next, the functional film 626 is formed over the substrate 652 (see FIG. 43). Note that the functional film 626 is not necessarily formed.

After that, the FPC is bonded to the conductive film 403a with the ACF placed therebetween. Note that an anisotropic conductive paste (ACP) may be used instead of the ACF.

Through the above steps, the display device 500 illustrated in FIG. 25 can be fabricated.

<1-10-1. Modification Example 1 (1) of Display Device>

A touch panel may be provided in the display device 500 illustrated in FIG. 24. As the touch panel, a capacitive touch panel (a surface capacitive touch panel or a projected capacitive touch panel) can be preferably used.

A structure in which a touch panel is provided in the display device 500 is described with reference to FIG. 44 to FIG. 46.

Figure 44:
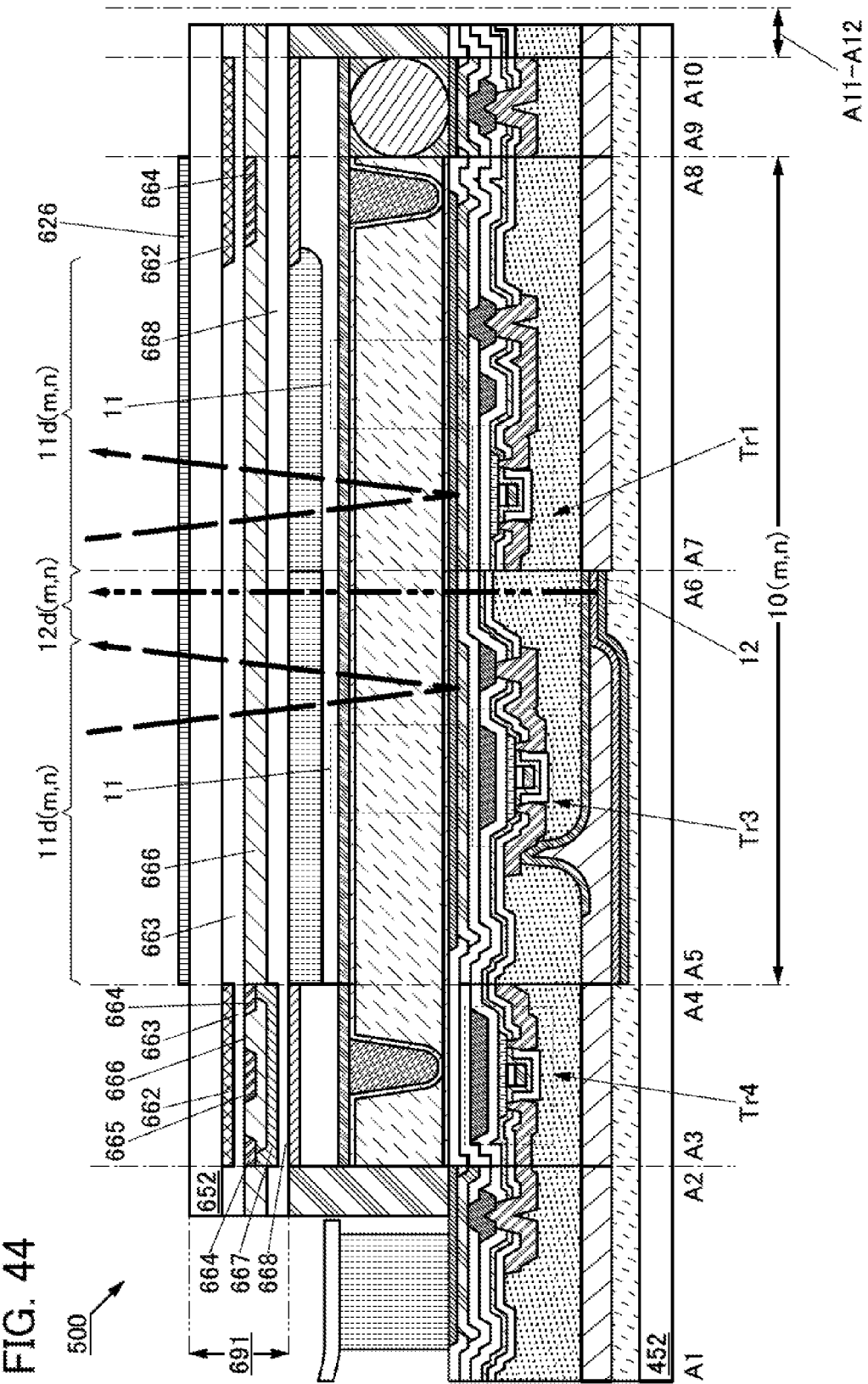
FIG. 44 is a cross-sectional view illustrating a display device.

FIG. 44 is a cross-sectional view of a structure in which a touch panel 691 is provided in the display device 500. FIG. 45 is a cross-sectional view of a structure in which a touch panel 692 is provided in the display device 500. FIG. 46 is a cross-sectional view of a structure in which a touch panel 693 is provided in the display device 500.

First, the touch panel 691 illustrated in FIG. 44 is described below.

The touch panel 691 illustrated in FIG. 44 is an in-cell touch panel that is provided between the substrate 652 and the color film 604. The touch panel 691 is formed over the substrate 652 before the light-blocking film 602 and the color film 604 are formed.

The touch panel 691 includes a light-blocking film 662, an insulating film 663, an electrode 664, an electrode 665, an insulating film 666, an electrode 667, and an insulating film 668. Changes in the mutual capacitance in the electrodes 664 and 665 can be detected when an object such as a finger or a stylus approaches, for example.

An intersection portion of the electrode 664 and the electrode 665 is shown above the transistor Tr4 illustrated in FIG. 44. The electrode 667 is electrically connected to the two electrodes 664 between which the electrode 665 is sandwiched through openings provided in the insulating film 666. Although a region in which the electrode 667 is provided is located in a region corresponding to the gate driver circuit portion 504a in FIG. 44, it is not limited thereto, and the region in which the electrode 667 is provided may be located in a region where the pixel 10(m, n) is provided, for example.

The electrodes 664 and 665 are provided in a region overlapping with the light-blocking film 662. As illustrated in FIG. 44, it is preferable that the electrode 664 do not overlap with the display element 12. In other words, the electrode 664 has openings in regions overlapping with the display element 12. That is, the electrode 664 has a mesh shape. With this structure, the electrode 664 does not block light emitted from the display element 12. Therefore, since luminance is hardly reduced even when the touch panel 691 is provided, a display device with high visibility and low power consumption can be obtained. Note that the electrode 665 can have a structure similar to that of the electrode 664.

Since the electrodes 664 and 665 do not overlap with the display element 12, a metal material whose transmittance of visible light is low can be used for the electrodes 664 and 665. Therefore, as compared with the case of using an oxide material whose transmittance of visible light is high, resistance of the electrodes 664 and 665 can be reduced, whereby sensitivity of the sensor of the touch panel can be increased.

Figure 45:
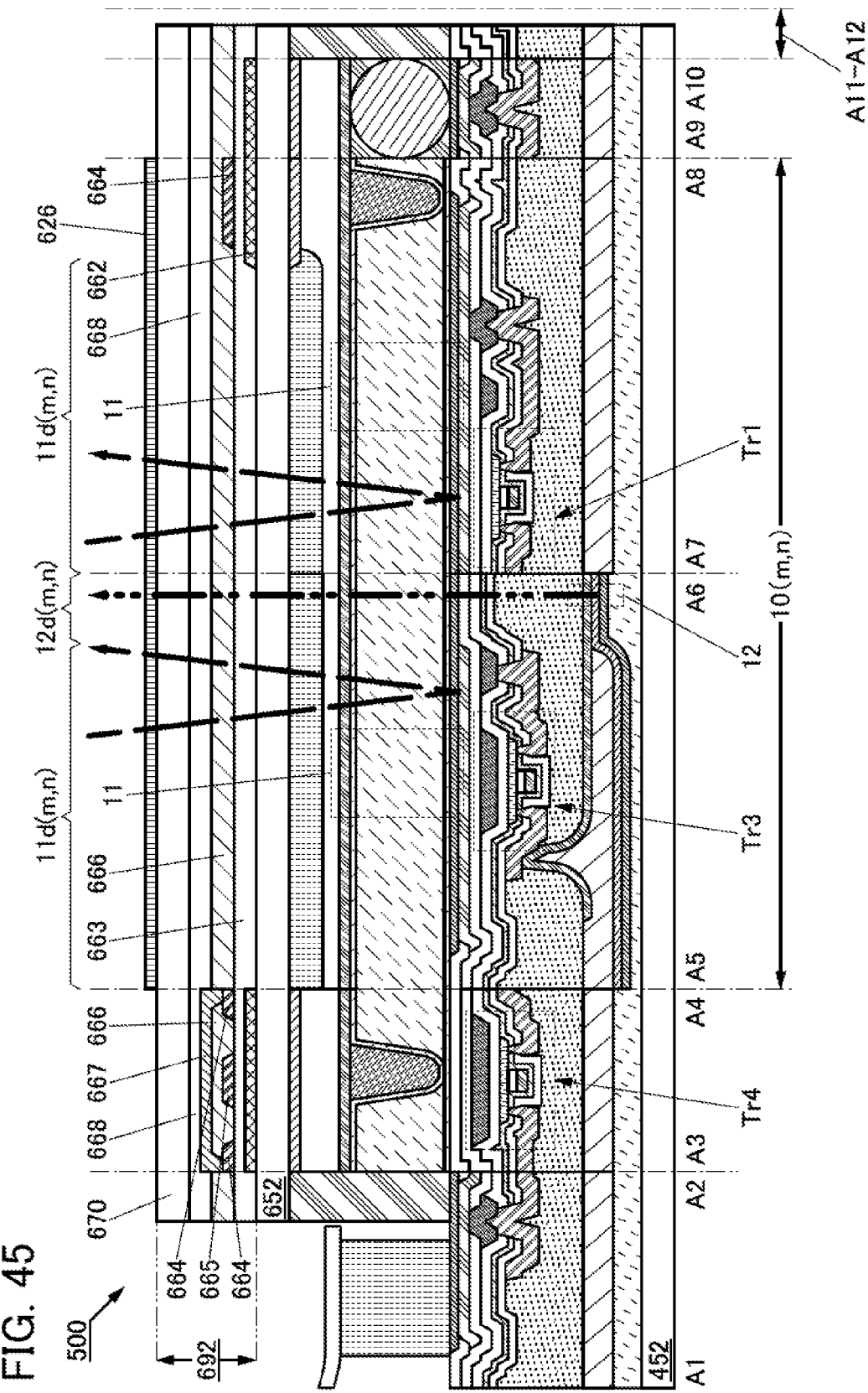
FIG. 45 is a cross-sectional view illustrating a display device.
Figure 46:
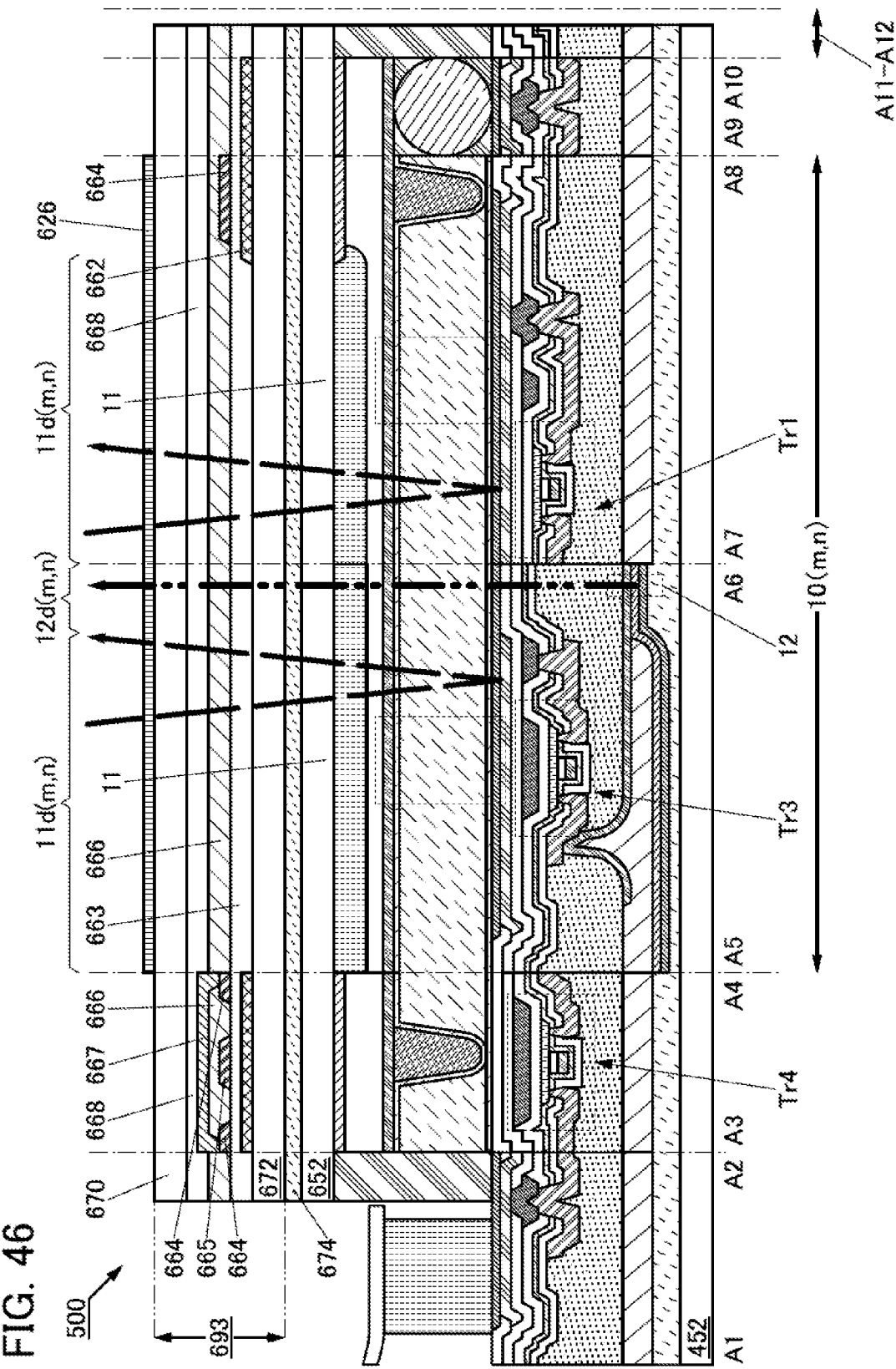
FIG. 46 is a cross-sectional view illustrating a display device.

Next, the touch panel 692 illustrated in FIG. 45 and the touch panel 693 illustrated in FIG. 46 are described below.

The touch panel 692 illustrated in FIG. 45 is an on-cell touch panel that is provided above the substrate 652. The touch panel 692 has a structure similar to that of the touch panel 691.

The touch panel 693 illustrated in FIG. 46 is provided over a substrate 672 and is bonded to the substrate 652 with a bonding material 674. The touch panel 693 is an out-cell touch panel (also referred to as an externally attached touch panel). The touch panel 693 has a structure similar to that of the touch panel 691. The touch panel 693 further includes a substrate 670, in addition to the components included in the touch panel 691. The substrate 670 has a function of protecting the touch panel 693. Note that the substrate 670 is not necessarily provided.

In this manner, the display device of one embodiment of the present invention can be combined with various types of touch panels.

<1-10-2. Modification Example 1 (2) of Display Device>

A touch panel may be provided in the display device 500 illustrated in FIG. 25. As the touch panel, a capacitive touch panel (a surface capacitive touch panel or a projected capacitive touch panel) can be preferably used.

A structure in which a touch panel is provided in the display device 500 is described with reference to FIG. 47 to FIG. 49.

Figure 47:
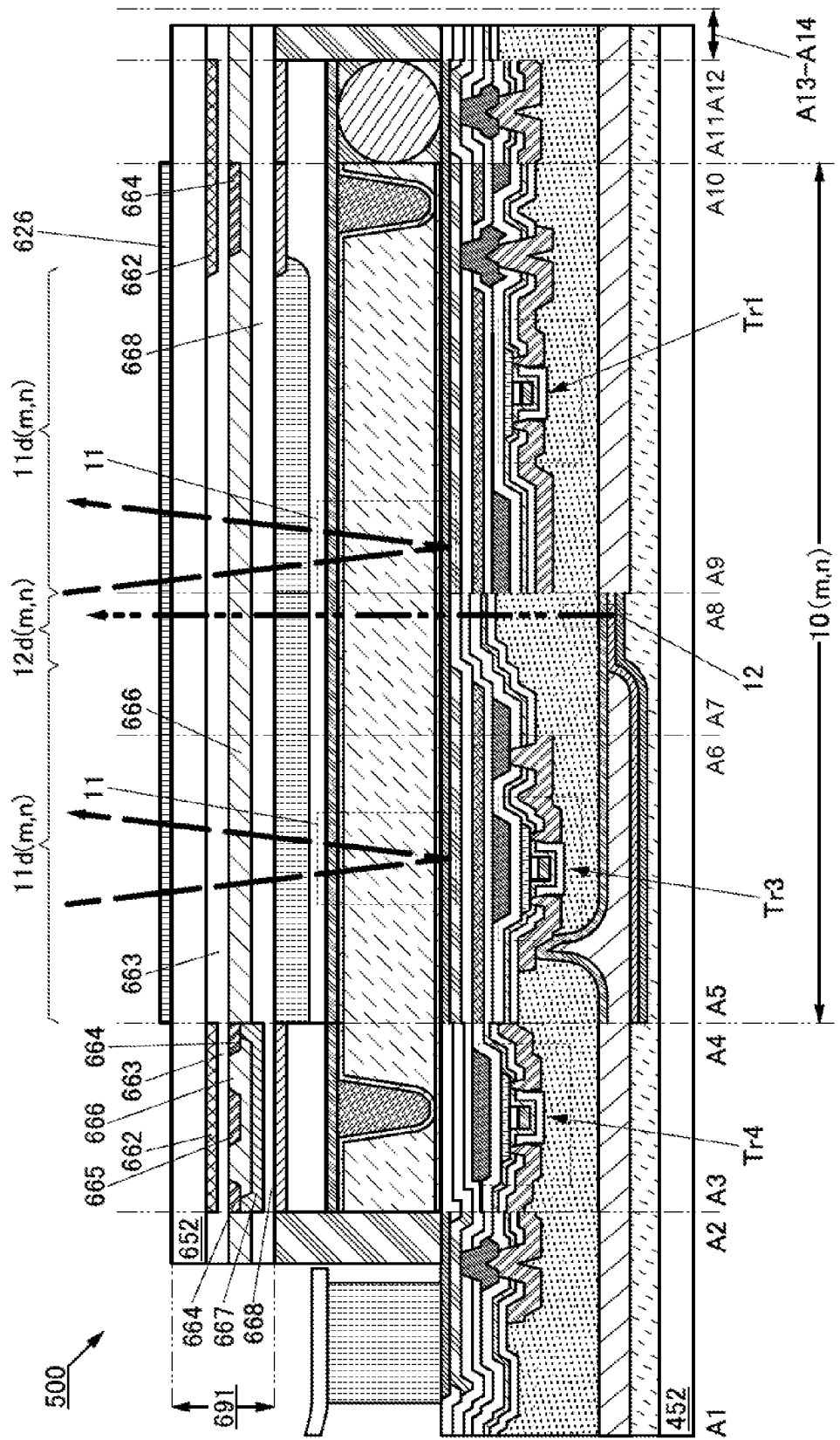
FIG. 47 is a cross-sectional view illustrating a display device.

FIG. 47 is a cross-sectional view of a structure in which a touch panel 691 is provided in the display device 500. FIG. 48 is a cross-sectional view of a structure in which a touch panel 692 is provided in the display device 500. FIG. 49 is a cross-sectional view of a structure in which a touch panel 693 is provided in the display device 500.

First, the touch panel 691 illustrated in FIG. 47 is described below.

The touch panel 691 illustrated in FIG. 47 is an in-cell touch panel that is provided between the substrate 652 and the color film 604. The touch panel 691 is formed over the substrate 652 before the light-blocking film 602 and the color film 604 are formed.

The touch panel 691 includes a light-blocking film 662, an insulating film 663, an electrode 664, an electrode 665, an insulating film 666, an electrode 667, and an insulating film 668. Changes in the mutual capacitance in the electrodes 664 and 665 can be detected when an object such as a finger or a stylus approaches, for example.

An intersection portion of the electrode 664 and the electrode 665 is shown above the transistor Tr4 illustrated in FIG. 47. The electrode 667 is electrically connected to the two electrodes 664 between which the electrode 665 is sandwiched through openings provided in the insulating film 666. Although a region in which the electrode 667 is provided is located in a region corresponding to the gate driver circuit portion 404a in FIG. 47, it is not limited thereto, and the region in which the electrode 667 is provided may be located in a region where the pixel 10(m, n) is provided, for example.

The electrodes 664 and 665 are provided in a region overlapping with the light-blocking film 662. As illustrated in FIG. 47, it is preferable that the electrode 664 do not overlap with the display element 12. In other words, the electrode 664 has openings in regions overlapping with the display element 12. That is, the electrode 664 has a mesh shape. With this structure, the electrode 664 does not block light emitted from the display element 12. Therefore, since luminance is hardly reduced even when the touch panel 691 is provided, a display device with high visibility and low power consumption can be obtained. Note that the electrode 665 can have a structure similar to that of the electrode 664.

Since the electrodes 664 and 665 do not overlap with the display element 12, a metal material whose transmittance of visible light is low can be used for the electrodes 664 and 665. Therefore, as compared with the case of using an oxide material whose transmittance of visible light is high, resistance of the electrodes 664 and 665 can be reduced, whereby sensitivity of the sensor of the touch panel can be increased.

Figure 48:
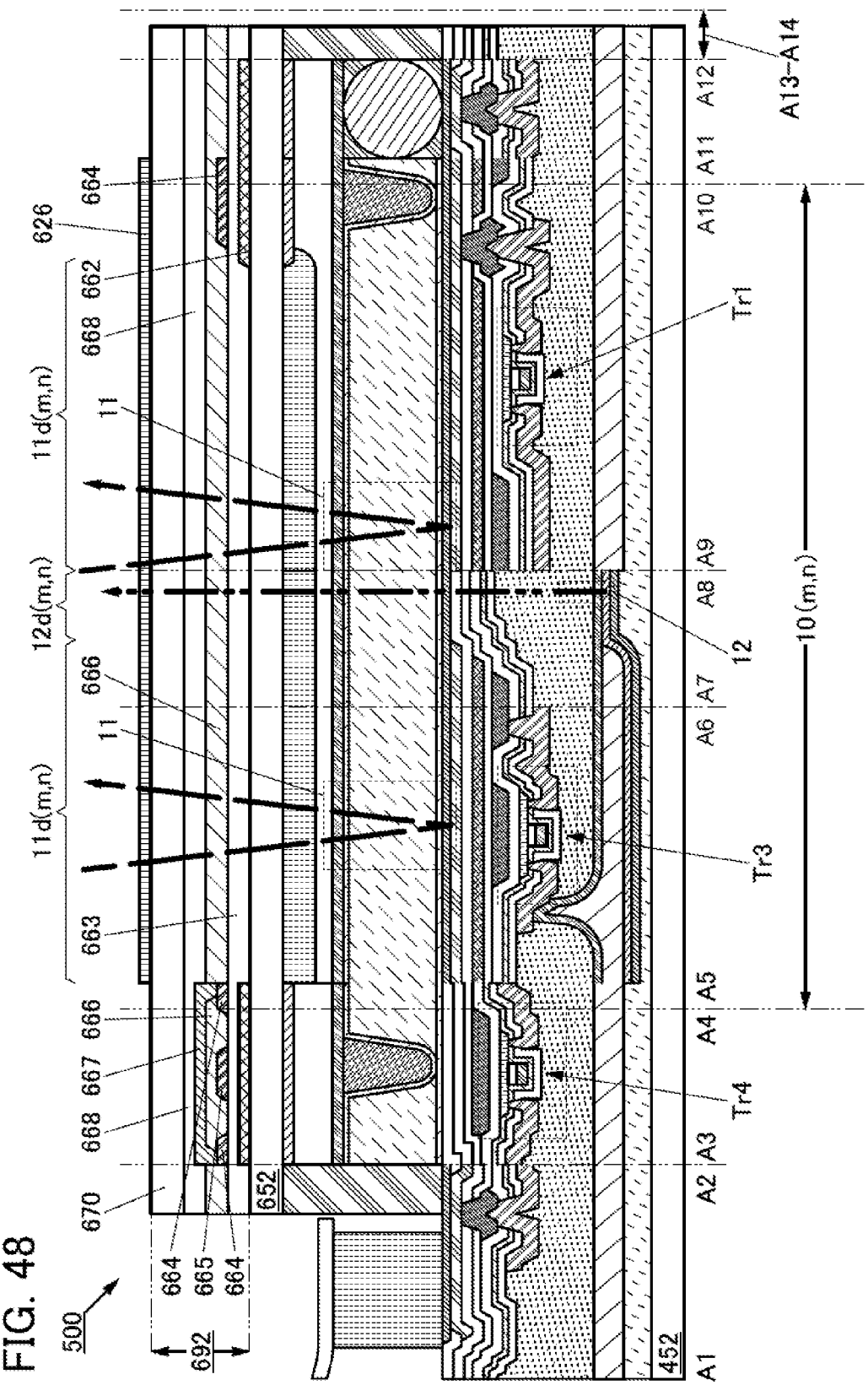
FIG. 48 is a cross-sectional view illustrating a display device.
Figure 49:
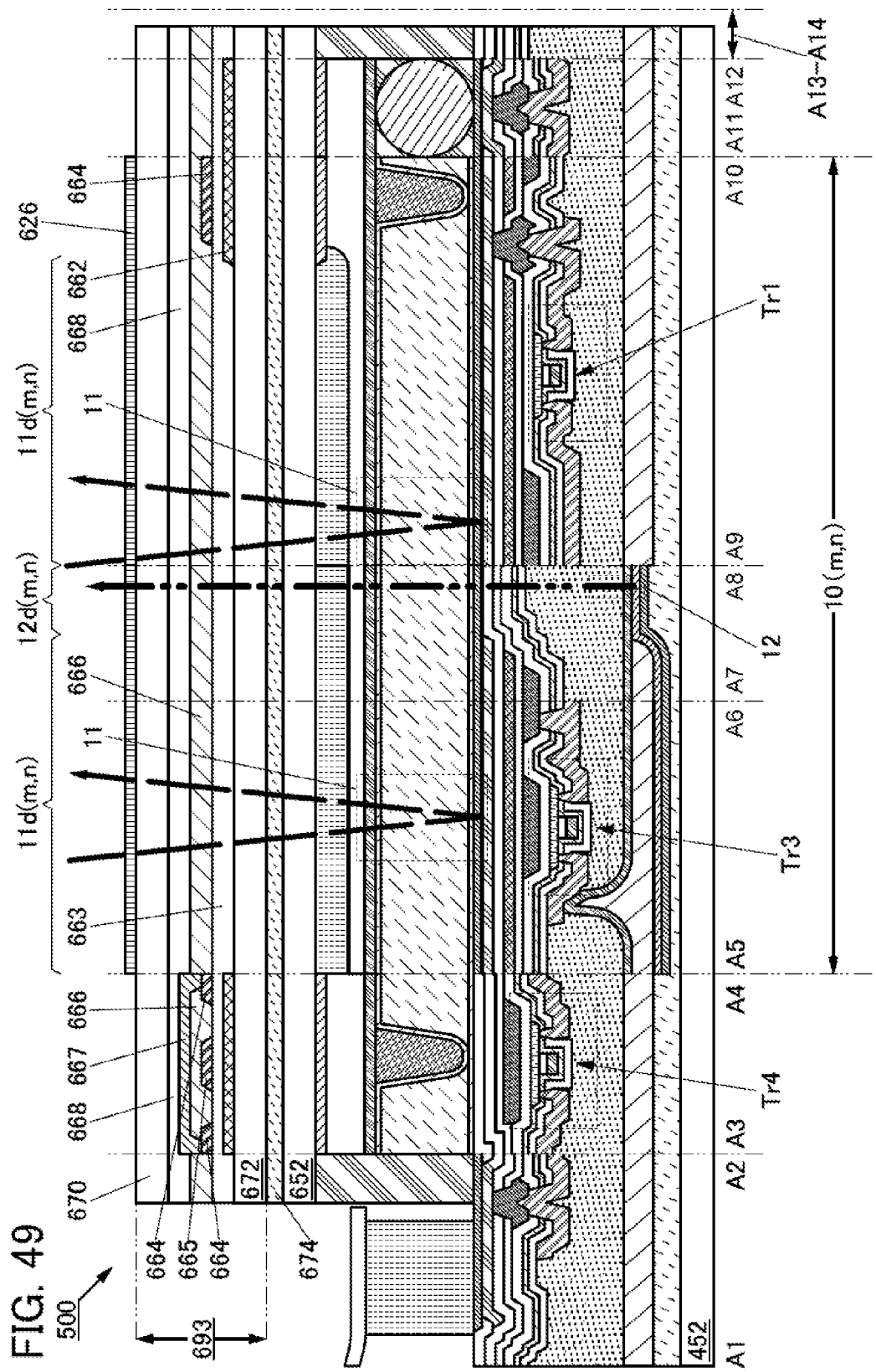
FIG. 49 is a cross-sectional view illustrating a display device.

Next, the touch panel 692 illustrated in FIG. 48 and the touch panel 693 illustrated in FIG. 49 are described below.

The touch panel 692 illustrated in FIG. 48 is an on-cell touch panel that is provided above the substrate 652. The touch panel 692 has a structure similar to that of the touch panel 691.

The touch panel 693 illustrated in FIG. 49 is provided over a substrate 672 and is bonded to the substrate 652 with a bonding material 674. The touch panel 693 is an out-cell touch panel (also referred to as an externally attached touch panel). The touch panel 693 has a structure similar to that of the touch panel 691. The touch panel 693 further includes a substrate 670, in addition to the components included in the touch panel 691. The substrate 670 has a function of protecting the touch panel 693. Note that the substrate 670 is not necessarily provided.

In this manner, the display device of one embodiment of the present invention can be combined with various types of touch panels.

<1-11-1. Modification Example 2 (1) of Display Device>

FIG. 24 and FIG. 44 to FIG. 46 illustrate examples in which the functional film 626 is positioned outside the substrate 652, but one embodiment of the present invention is not limited to these structures. For example, a structure in which the substrate 652 is not provided may be employed, and examples of the structure without the substrate 652 are illustrated in FIG. 50 to FIG. 53.

Figure 50:
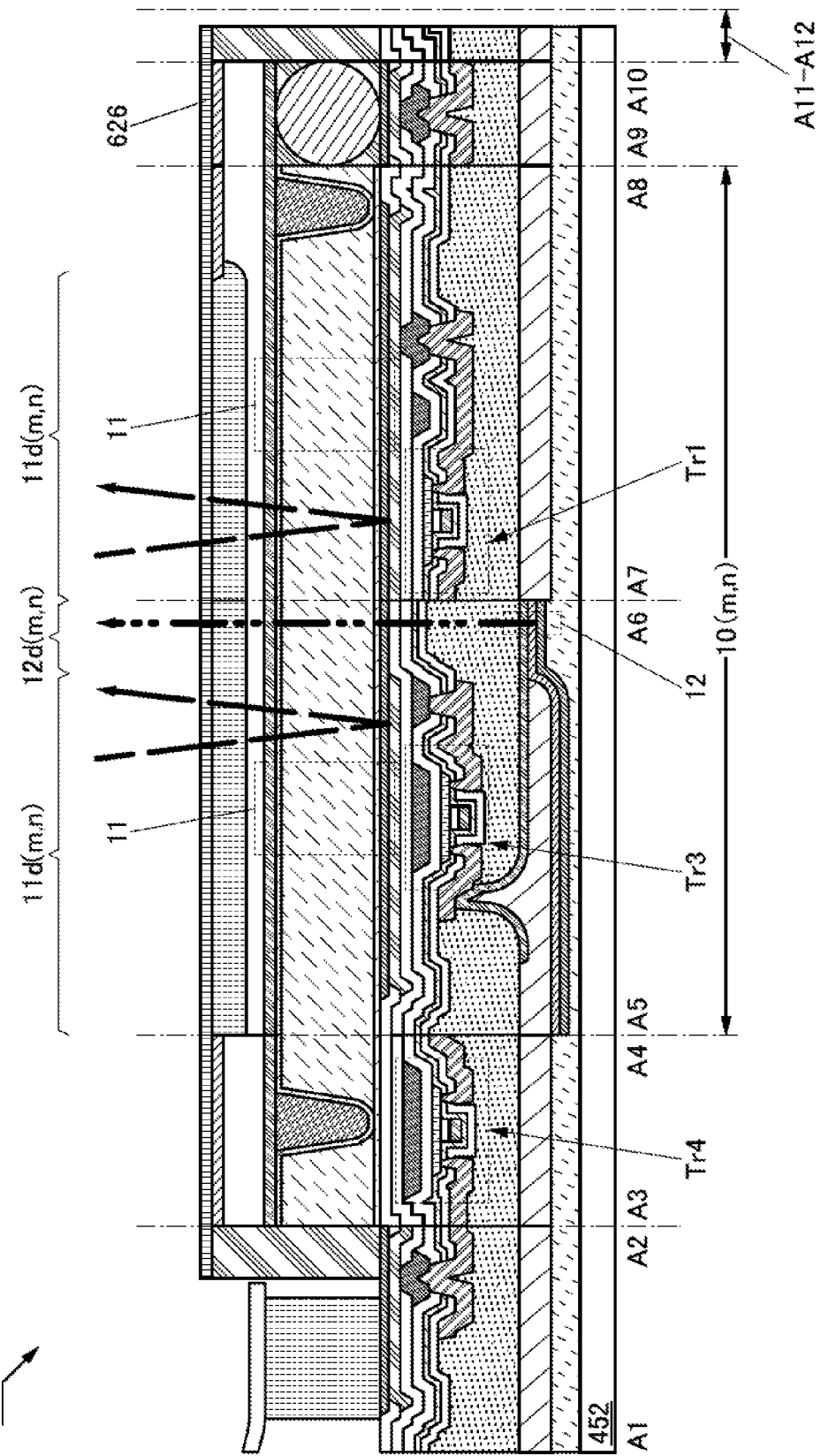
FIG. 50 is a cross-sectional view illustrating a display device.

FIG. 50 illustrates a modification example of the display device 500 illustrated in FIG. 24. In FIG. 50, the substrate 652 is not provided and sealing is performed by the functional film 626. In this case, a material used for a circularly polarizing plate can be suitably used for the functional film 626.

Figure 51:
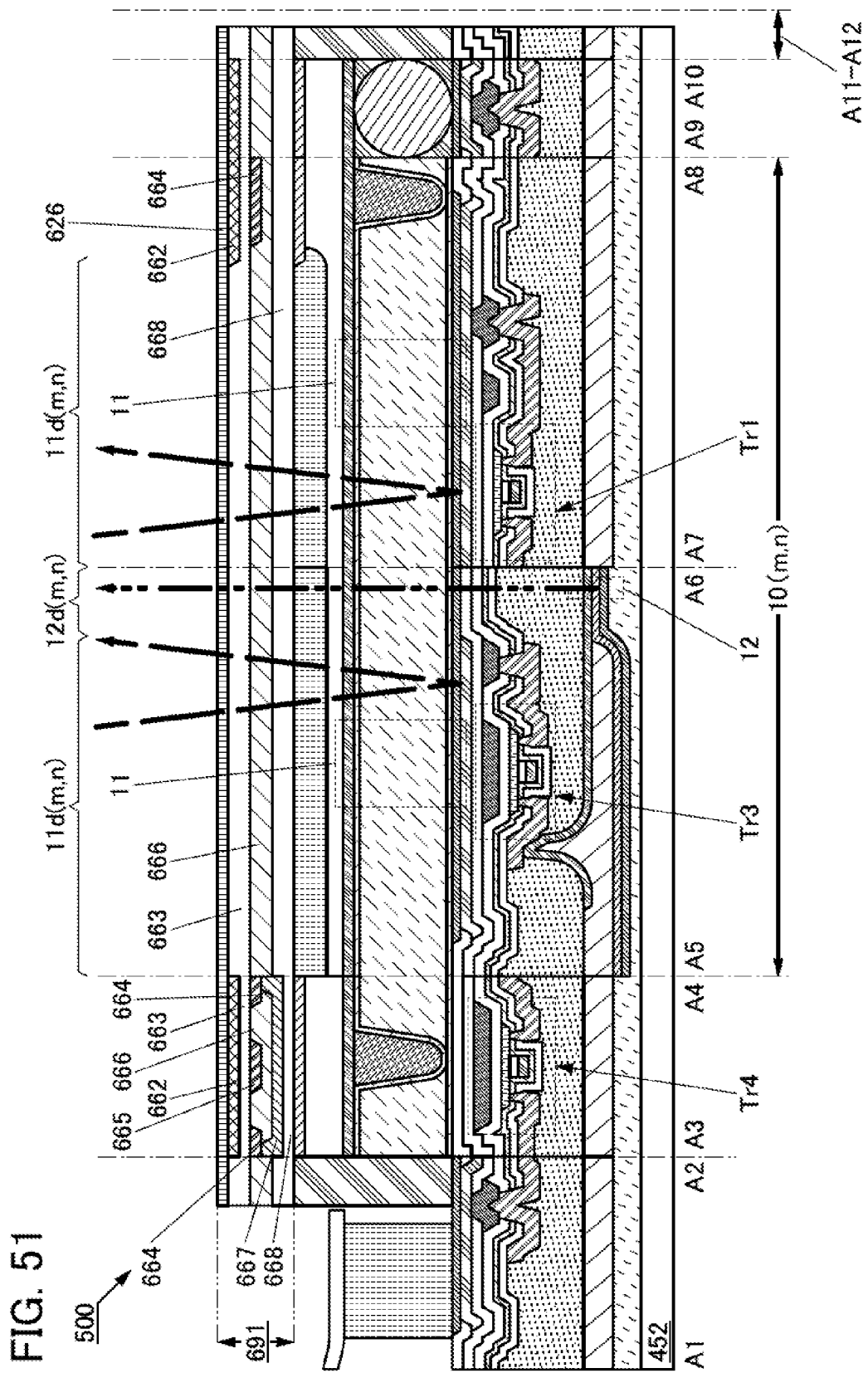
FIG. 51 is a cross-sectional view illustrating a display device.

FIG. 51 illustrates a modification example of the display device 500 illustrated in FIG. 44. In FIG. 51, the substrate 652 is not provided and the functional film 626 functions as part of the touch panel 691.

Figure 52:
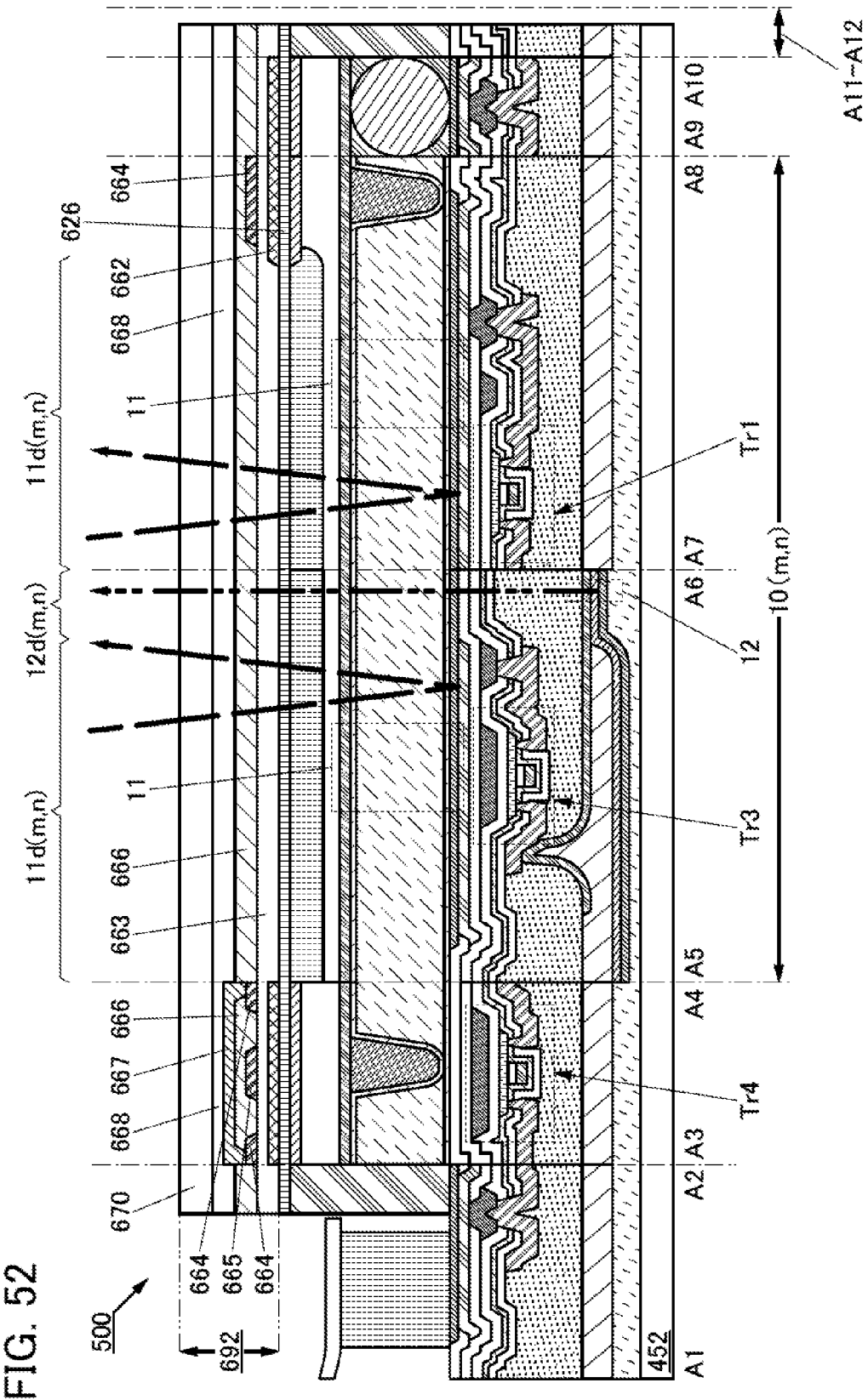
FIG. 52 is a cross-sectional view illustrating a display device.

FIG. 52 illustrates a modification example of the display device 500 illustrated in FIG. 45. In FIG. 52, the functional film 626 is provided inside the touch panel 692.

Figure 53:
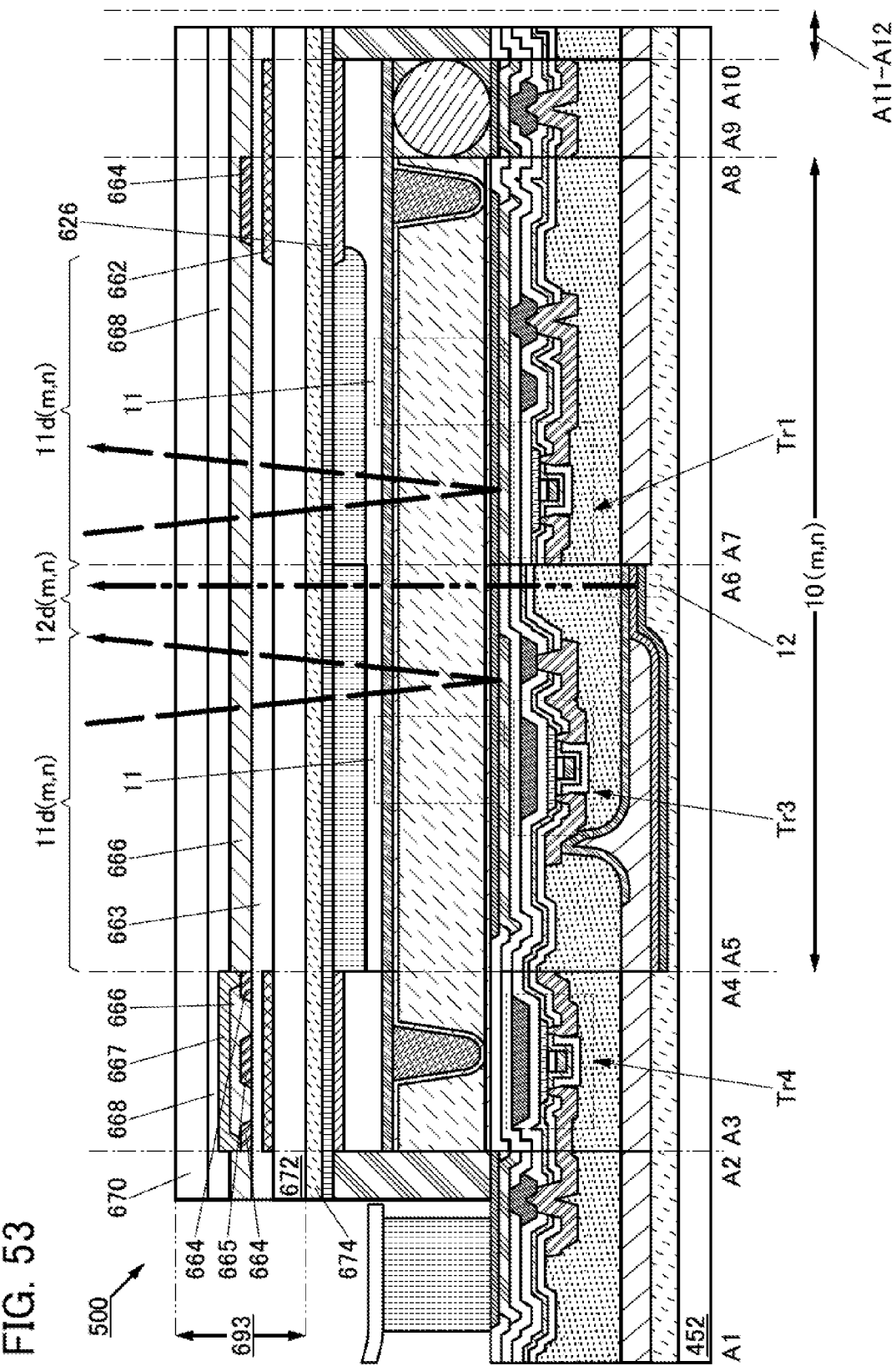
FIG. 53 is a cross-sectional view illustrating a display device.

FIG. 53 illustrates a modification example of the display device 500 illustrated in FIG. 46. In FIG. 53, the substrate 652 is not provided, and the functional film 626 is bonded to the touch panel 693 with the bonding material 674 interposed therebetween.

The structures as illustrated in FIG. 50 to FIG. 53 in which the substrate 652 is not provided are preferred because the thickness of the display device 500 can be small.

<1-11-2. Modification Example 2 (2) of Display Device>

FIG. 25 and FIG. 47 to FIG. 49 illustrate examples in which the functional film 626 is positioned outside the substrate 652, but one embodiment of the present invention is not limited to these structures. For example, a structure in which the substrate 652 is not provided may be employed, and examples of the structure without the substrate 652 are illustrated in FIG. 54 to FIG. 57.

Figure 54:
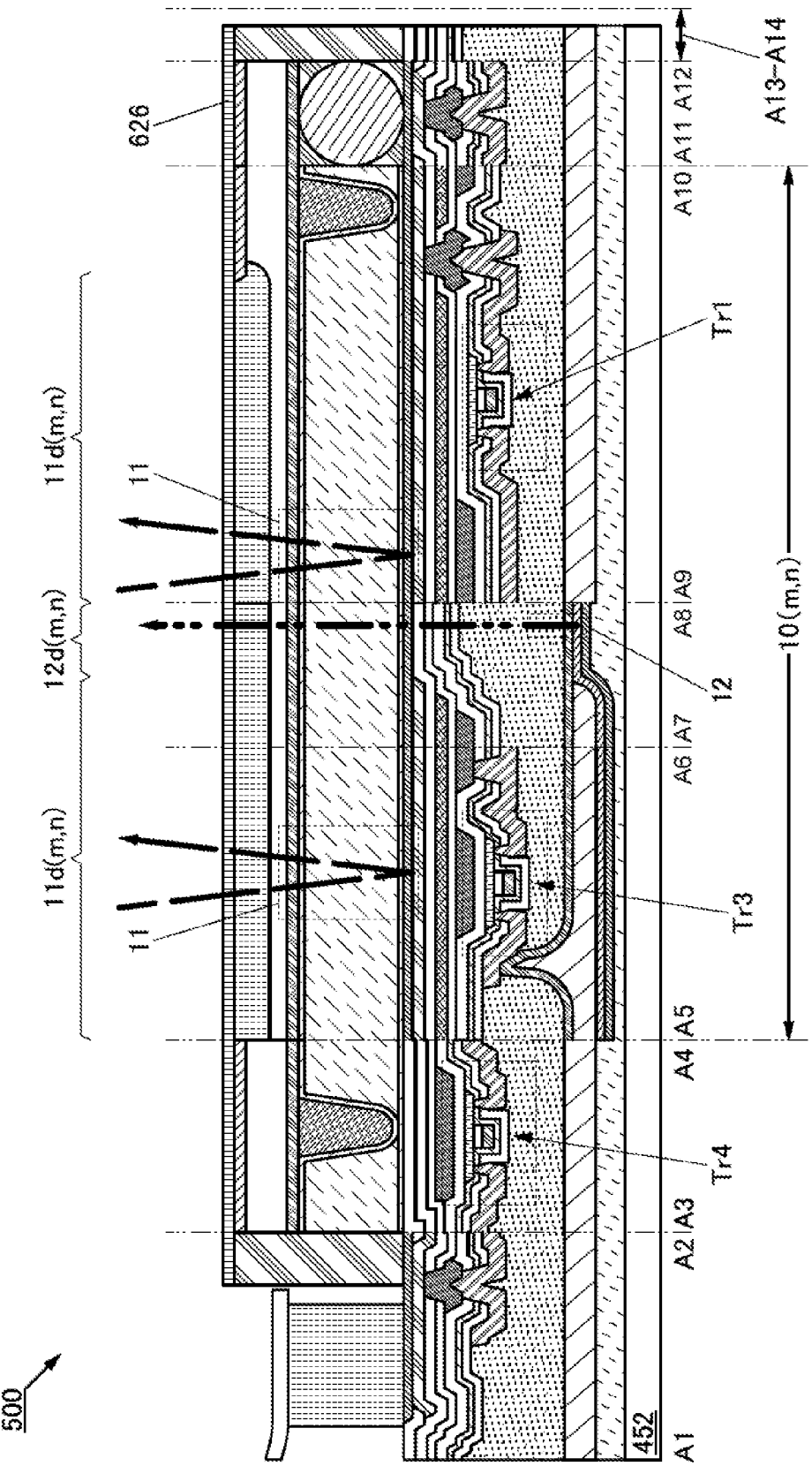
FIG. 54 is a cross-sectional view illustrating a display device.

FIG. 54 illustrates a modification example of the display device 500 illustrated in FIG. 25. In FIG. 54, the substrate 652 is not provided and sealing is performed by the functional film 626. In this case, a material used for a circularly polarizing plate can be suitably used for the functional film 626.

Figure 55:
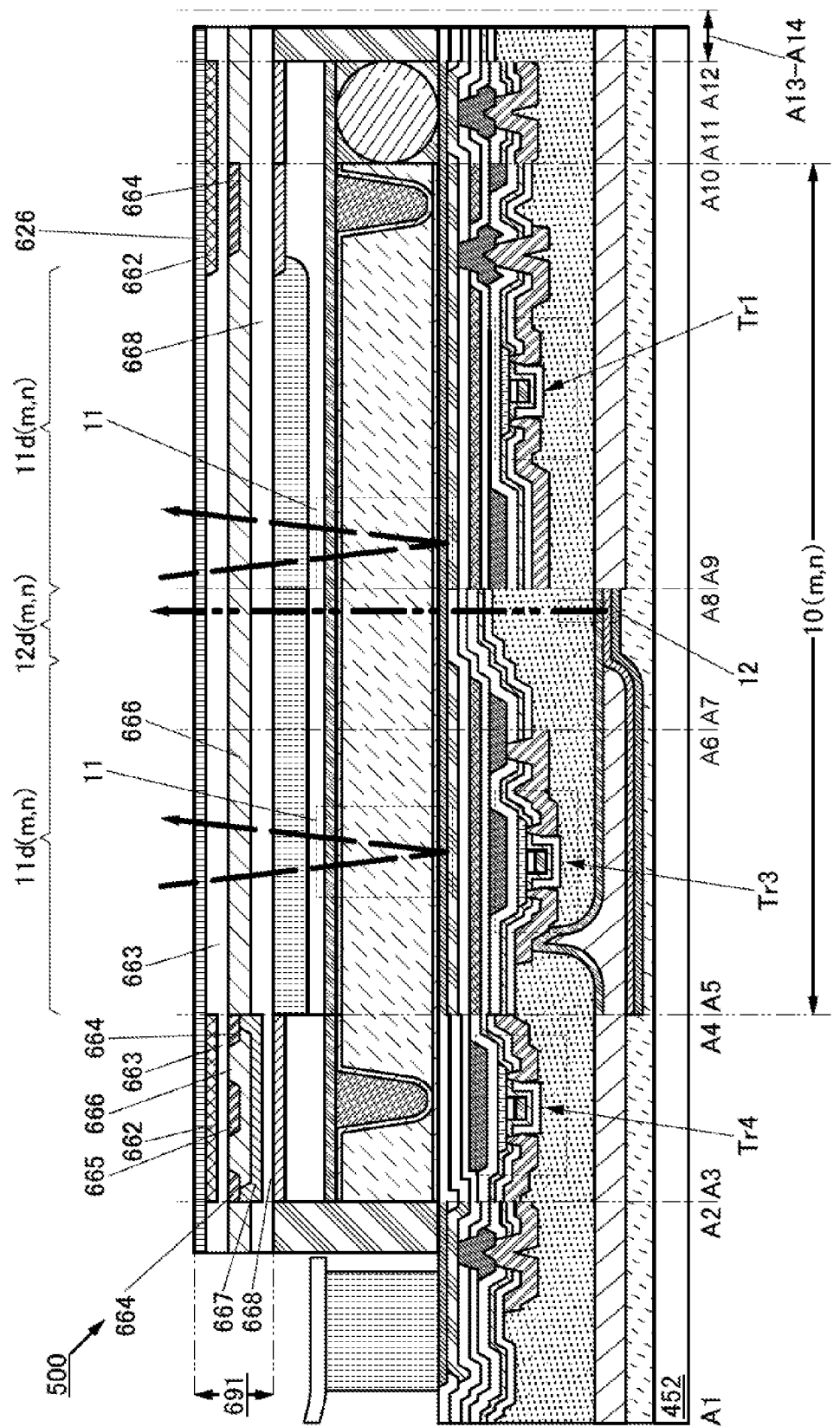
FIG. 55 is a cross-sectional view illustrating a display device.

FIG. 55 illustrates a modification example of the display device 500 illustrated in FIG. 47. In FIG. 51, the substrate 652 is not provided and the functional film 626 functions as part of the touch panel 691.

Figure 56:
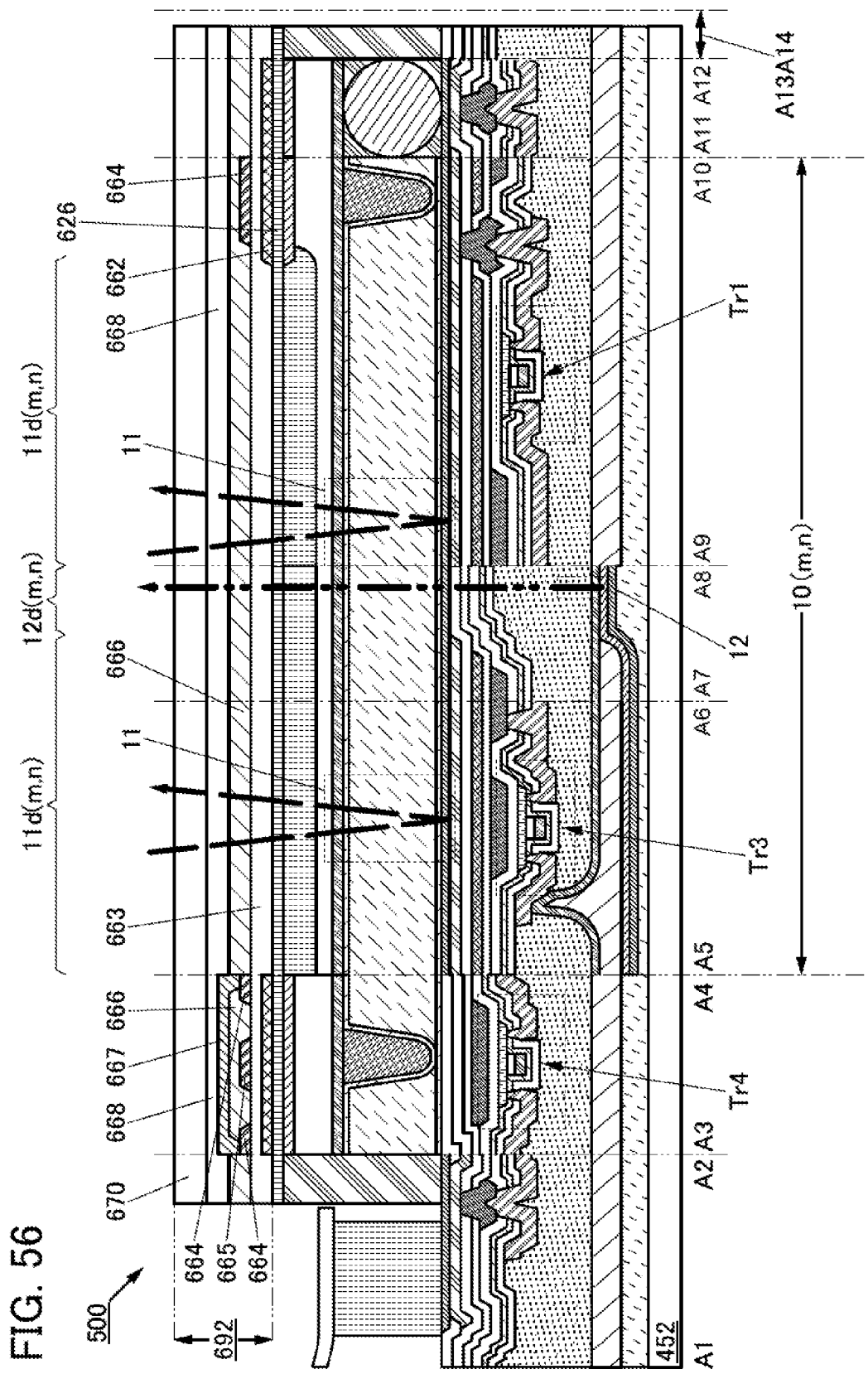
FIG. 56 is a cross-sectional view illustrating a display device.

FIG. 56 illustrates a modification example of the display device 500 illustrated in FIG. 48. In FIG. 56, the functional film 626 is provided inside the touch panel 692.

Figure 57:
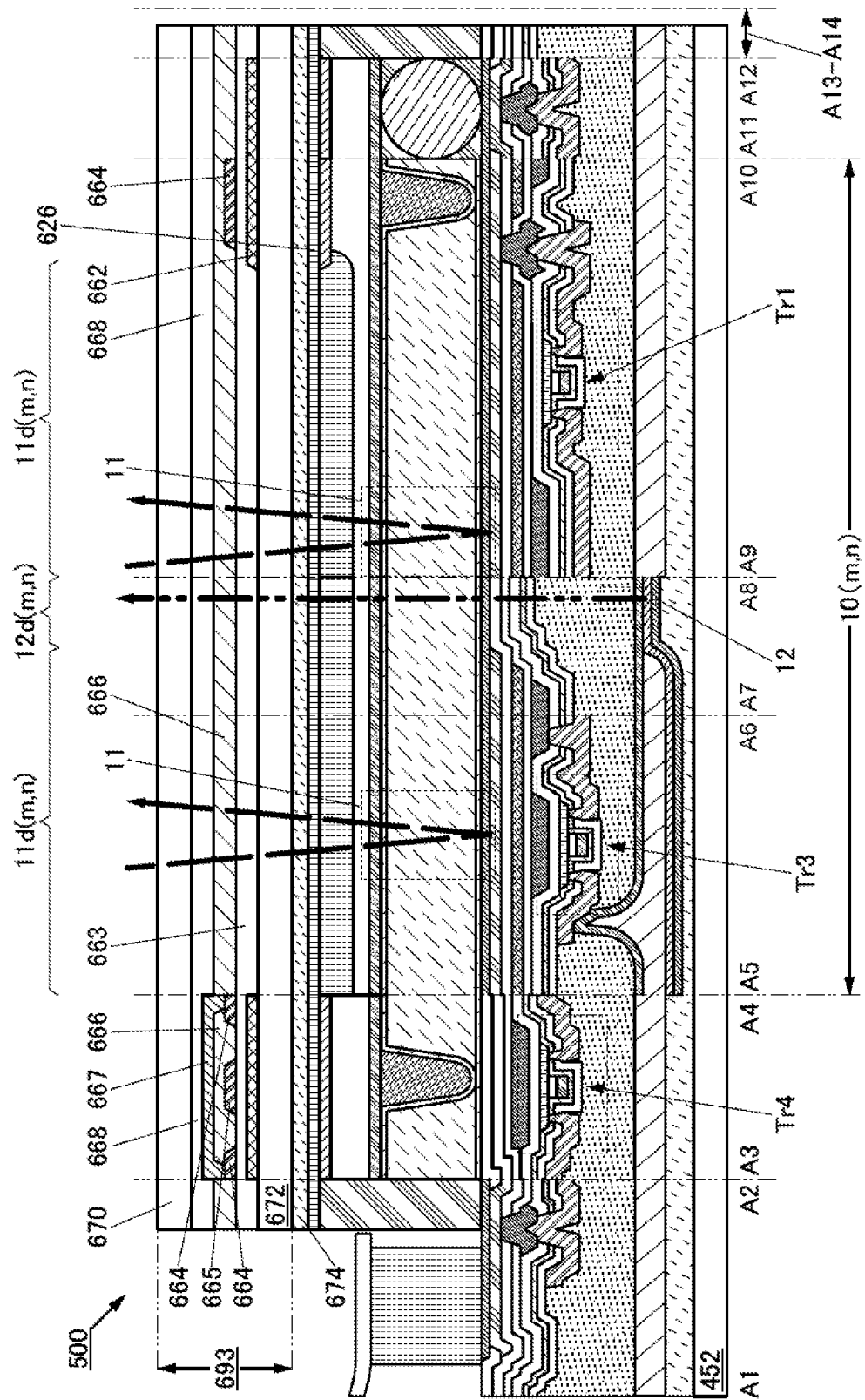
FIG. 57 is a cross-sectional view illustrating a display device.

FIG. 57 illustrates a modification example of the display device 500 illustrated in FIG. 49. In FIG. 57, the substrate 652 is not provided, and the functional film 626 is bonded to the touch panel 693 with the bonding material 674 interposed therebetween.

The structures as illustrated in FIG. 54 to FIG. 57 in which the substrate 652 is not provided are preferred because the thickness of the display device 500 can be small.

<1-12. Modification Example 3 of Display Device>

Figure 58:
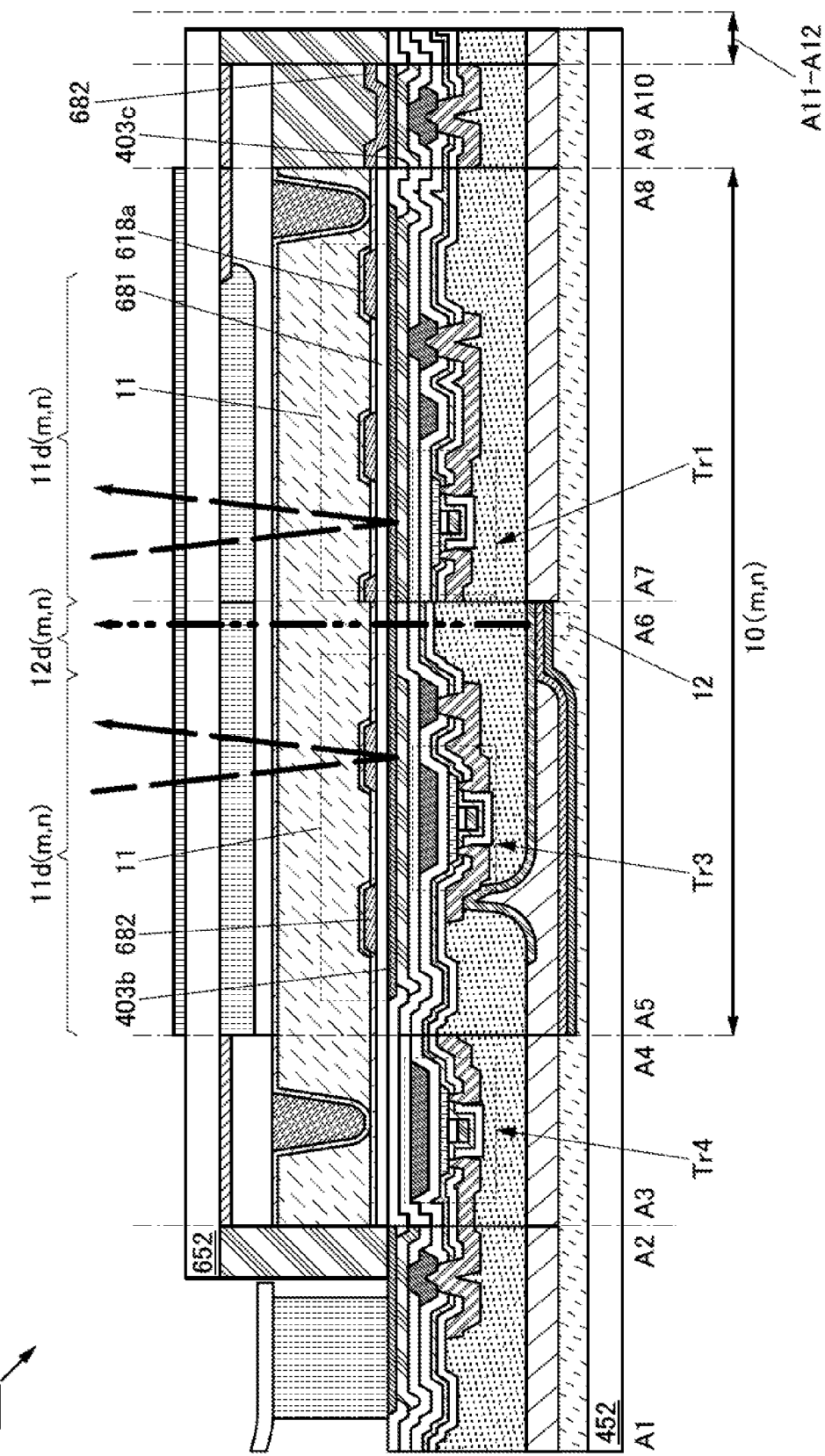
FIG. 58 is a cross-sectional view illustrating a display device.

An example of a structure where the liquid crystal element of the display device 500 illustrated in FIG. 24 is a horizontal electric field mode liquid crystal element, (here, a fringe field switching (FFS) mode liquid crystal element) is shown in FIG. 58. An example of a structure where the liquid crystal element of the display device 500 illustrated in FIG. 25 is a horizontal electric field mode liquid crystal element, (here, a fringe field switching (FFS) mode liquid crystal element) is shown in FIG. 59.

Figure 59:
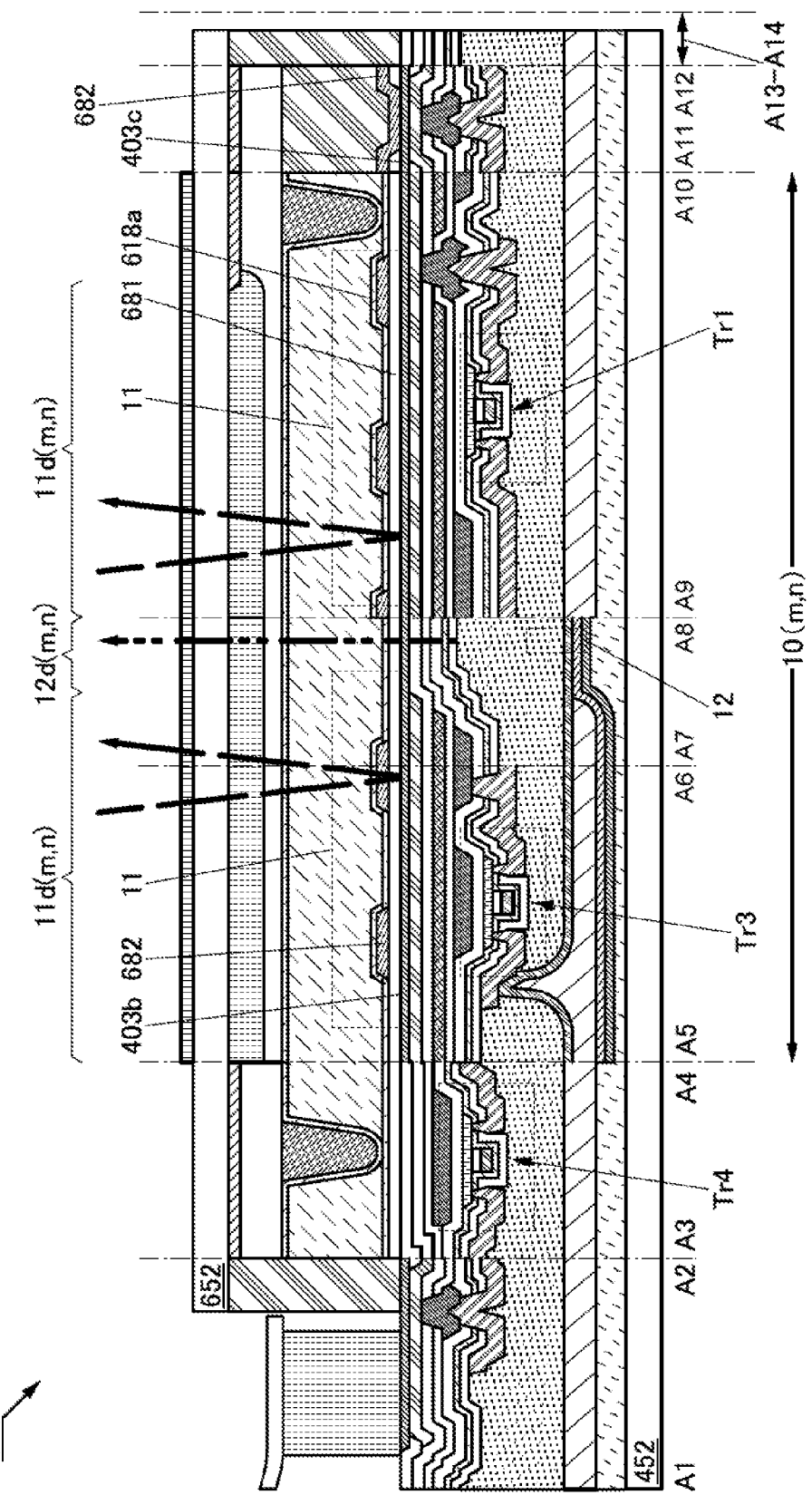
FIG. 59 is a cross-sectional view illustrating a display device.

The display device 500 illustrated in FIG. 58 and FIG. 59 includes an insulating film 681 over the conductive films 403b and 403c and a conductive film 682 over the insulating film 681 in addition to the above-mentioned components.

The insulating film 681 has an opening in a connection region taken along the dashed-dotted line A9-A10 in FIG. 24 and the dashed-dotted line A11-A12 in FIG. 25, and the conductive film 682 is electrically connected to the conductive film 403c through the opening. In FIG. 58 and FIG. 59, the conductor 624 included in the sealant 622 is not provided.

The conductive film 682 functions as a common electrode. The conductive film 682 may have a comb-like shape or a shape having a slit when seen from the above. Since the conductive film 682 is provided in the display device 500 illustrated in FIG. 58 and FIG. 59, the conductive film 608 provided on the substrate 652 side is not provided. Note that the conductive film 682 may be provided and the conductive film 608 may be further provided on the substrate 652 side.

When the conductive film 682 is formed using a light-transmitting material, a light-transmitting capacitor can be formed. The light-transmitting capacitor includes the conductive film 682, the insulating film 681 overlapping with the conductive film 682, and the conductive film 403c. This structure is preferable because the amount of charge accumulated in the capacitor can be increased.

<1-13. Components of Display Device>

Next, the components of the display device 500 illustrated in FIG. 24 to FIG. 59 and a method for manufacturing the display device 500 are described below.

[Substrate]

The substrates 401, 452, 652 and 670 can be formed using a material having heat resistance high enough to withstand heat treatment in the manufacturing process.

Specifically, non-alkali glass, soda-lime glass, potash glass, crystal glass, quartz, sapphire, or the like can be used. Alternatively, an inorganic insulating film may be used. Examples of the inorganic insulating film include a silicon oxide film, a silicon nitride film, a silicon oxynitride film, and an aluminum oxide film.

The non-alkali glass preferably has a thickness of greater than or equal to 0.2 mm and less than or equal to 0.7 mm, for example. The non-alkali glass may be polished to obtain the above thickness.

Using the non-alkali glass, a large-sized glass substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

Alternatively, as the substrates 401, 452, 652, and 670, a single-crystal semiconductor substrate or a polycrystalline semiconductor substrate made of silicon or silicon carbide, a compound semiconductor substrate made of silicon germanium or the like, an SOI substrate, or the like may be used.

Alternatively, for the substrates 401, 452, 652, and 670, an inorganic material such as a metal may be used. Examples of the inorganic material such as a metal include stainless steel and aluminum.

Alternatively, for the substrates 401, 452, 652, and 670, an organic material such as a resin, a resin film, or plastic may be used. Examples of the resin film include polyester, polyolefin, polyamide (e.g., nylon or aramid), polyimide, polycarbonate, polyurethane, an acrylic resin, an epoxy resin, polyethylene terephthalate (PET), polyethylene naphthalate (PEN), polyether sulfone (PES), and a resin having a siloxane bond such as silicone.

Alternatively, for the substrates 401, 452, 652, and 670, a composite material of a combination of an inorganic material and an organic material may be used. Examples of the composite material include a resin film to which a metal plate or a thin glass plate is bonded, a resin film into which a fibrous or particulate metal or a fibrous or particulate glass is dispersed, and an inorganic material into which a fibrous or particulate resin is dispersed.

[Conductive Film]

In FIG. 26, a metal film having conductivity, a conductive film having a function of reflecting visible light, or a conductive film having a function of transmitting visible light may be used as the conductive films 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 417, 420, 608, and 682. In FIG. 27, a metal film having conductivity, a conductive film having a function of reflecting visible light, or a conductive film having a function of transmitting visible light may be used as the conductive films 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 420, 421, 608, and 682.

In FIG. 27, a conductive film having a function of transmitting visible light is used as the conductive film 417.

A material containing a metal element selected from aluminum, gold, platinum, silver, copper, chromium, tantalum, titanium, molybdenum, tungsten, nickel, iron, cobalt, palladium, and manganese can be used for the metal film having conductivity. Alternatively, an alloy containing any of the above metal elements may be used.

For the metal film having conductivity, specifically a two-layer structure in which a copper film is stacked over a titanium film, a two-layer structure in which a copper film is stacked over a titanium nitride film, a two-layer structure in which a copper film is stacked over a tantalum nitride film, or a three-layer structure in which a titanium film, a copper film, and a titanium film are stacked in this order may be used. In particular, a conductive film containing a copper element is preferably used because the resistance can be reduced. As an example of the conductive film containing a copper element, an alloy film containing copper and manganese is given. The alloy film is preferable because it can be processed by a wet etching method.

As the conductive film having conductivity, a conductive macromolecule or a conductive polymer may be used.

For the conductive film having a function of reflecting visible light, a material containing a metal element selected from gold, silver, copper, and palladium can be used. In particular, a conductive film containing a silver element is preferably used because reflectance of visible light can be improved.

For the conductive film having a function of transmitting visible light, a material containing an element selected from indium, tin, zinc, gallium, and silicon can be used. Specifically, an In oxide, a Zn oxide, an In—Sn oxide (also referred to as ITO), an In—Sn—Si oxide (also referred to as ITSO), an In—Zn oxide, an In—Ga—Zn oxide, or the like can be used.

As the conductive film having a function of transmitting visible light, a film containing graphene or graphite may be used. The film containing graphene can be formed in the following manner: a film containing graphene oxide is formed and is reduced. As a reducing method, a method with application of heat, a method using a reducing agent, or the like can be employed.

Note that the conductive films 403c and 417 each having a function of a pixel electrode contain at least one metal element contained in the metal oxide films 409a, 409b, and 409c. For example, in the case where the metal oxide films 409a, 409b, and 409c include a metal oxide such as an In-M-Zn oxide (M is Al, Ga, Y, or Sn), the conductive film 403c and the conductive film 417 each contain any one of In, M (M is Al, Ga, Y, or Sn), and Zn.

[Insulating Film]

In FIG. 26, for the insulating films 404, 406, 408, 410a, 410b, 410c, 412, 413, 416, 418, 606, 663, 666, 668, and 681, an inorganic insulating material, an organic insulating material, or an insulating composite material including an insulating inorganic material and an insulating organic material can be used. In FIG. 27, for the insulating films 404, 406, 408, 410a, 410b, 410c, 412, 413, 416, 418, 422, 606, 663, 666, 668, and 681, an inorganic insulating material, an organic insulating material, or an insulating composite material including an insulating inorganic material and an insulating organic material can be used.

Examples of the insulating inorganic material include a silicon oxide film, a silicon nitride film, a silicon oxynitride film, a silicon nitride oxide film, and an aluminum oxide film. Alternatively, a plurality of the above inorganic materials may be stacked.

As the above insulating organic material, for example, materials that include polyester, polyolefin, polyamide (e.g., nylon or aramid), polyimide, polycarbonate, polyurethane, an acrylic-based resin, an epoxy-based resin, or a resin having a siloxane bond such as silicone can be used. As the insulating organic material, a photosensitive material may be used.

[Metal Oxide Film]

The metal oxide films 409a, 409b, and 409c are formed using a metal oxide such as an In-M-Zn oxide (M is Al, Ga, Y, or Sn). Alternatively, an In—Ga oxide or an In—Zn oxide may be used for the metal oxide films 409a, 409b, and 409c.

In the case where the metal oxide films 409a, 409b, and 409c include an In-M-Zn oxide, the proportions of In and M, the summation of which is assumed to be 100 atomic %, are as follows: the proportion of In is higher than 25 atomic % and the proportion of M is lower than 75 atomic %, or the proportion of In is higher than 34 atomic % and the proportion of M is lower than 66 atomic %.

The energy gap of the metal oxide films 409a, 409b, and 409c is preferably 2 eV or more, 2.5 eV or more, or 3 eV or more.

The thickness of each of the metal oxide films 409a, 409b, and 409c is greater than or equal to 3 nm and less than or equal to 200 nm, preferably greater than or equal to 3 nm and less than or equal to 100 nm, further preferably greater than or equal to 3 nm and less than or equal to 60 nm.

In the case where the metal oxide films 409a, 409b, and 409c include an In-M-Zn oxide, the atomic ratio of metal elements in a sputtering target used for depositing the In-M-Zn oxide preferably satisfies In≥M and/or Zn≥M. As the atomic ratio of metal elements in such a sputtering target, In:M:Zn=1:1:1, In:M:Zn=1:1:1.2, In:M:Zn=2:1:1.5, In:M:Zn=2:1:2.3, In:M:Zn=2:1:3, In:M:Zn=3:1:2, In:M:Zn=4:2:4.1, In:M:Zn=5:1:7, or the like is preferable. Note that the atomic ratio of metal elements in each of the deposited metal oxide films 409a, 409b, and 409c may vary from the above atomic ratio of metal elements in the sputtering target within a range of approximately ±40%. For example, when a sputtering target whose atomic ratio of In to Ga and Zn is 4:2:4.1 is used, the atomic ratio of In to Ga and Zn in each of the deposited metal oxide films may be approximately 4:2:3. In the case where a sputtering target whose atomic ratio of In to Ga and Zn is 5:1:7 is used, the atomic ratio of In to Ga and Zn in each of the deposited metal oxide films may be approximately 5:1:6.

When silicon or carbon is contained in the metal oxide films 409a, 409b, and 409c, oxygen vacancies are increased and the metal oxide films 409a, 409b, and 409c have n-type conductivity in some cases. Thus, the concentration of carbon in each of the metal oxide films 409a, 409b, and 409c, particularly in the channel region, is set to be lower than or equal to $2 \times 10^{18}$ atoms/cm$^3$, or lower than or equal to $2 \times 10^{17}$ atoms/cm$^3$. As a result, the transistor has a positive threshold voltage (normally-off characteristics). Note that the concentration of carbon can be measured by secondary ion mass spectrometry (SIMS), for example.

Furthermore, the concentration of alkali metal or alkaline earth metal in the metal oxide films 409a, 409b, and 409c, which is measured by SIMS, can be lower than or equal to $1 \times 10^{18}$ atoms/cm$^3$ or lower than or equal to $2 \times 10^{16}$ atoms/cm$^3$. Alkali metal might generate carriers when bonded to a metal oxide, in which case the off-state current of the transistor might be increased. Therefore, it is preferable to reduce the concentration of alkali metal or alkaline earth metal in the metal oxide films 409a, 409b, and 409c. As a result, the transistor has a positive threshold voltage (normally-off characteristics).

Furthermore, when nitrogen is contained in the metal oxide films 409a, 409b, and 409c, electrons serving as carriers are generated and carrier density is increased and the metal oxide films 409a, 409b, and 409c have n-type conductivity in some cases. Thus, a transistor including a metal oxide film that contains nitrogen is likely to have normally-on characteristics. For this reason, nitrogen in the metal oxide films 409a, 409b, and 409c is preferably reduced as much as possible. For example, the nitrogen concentration measured by SIMS may be $5 \times 10^{18}$ atoms/cm$^3$ or lower.

When impurity elements in the metal oxide films 409a, 409b, and 409c are reduced, the carrier density of the metal oxide films can be lowered. Therefore, the metal oxide films 409a, 409b, and 409c can have a carrier density less than or equal to $1 \times 10^{17}$ cm$^{-3}$, less than or equal to $1 \times 10^{15}$ cm$^{-3}$, less than or equal to $1 \times 10^{13}$ cm$^{-3}$, or less than or equal to $1 \times 10^{11}$ cm$^{-3}$.

When a metal oxide film with a low impurity concentration and a low density of defect states is used as the metal oxide films 409a, 409b, and 409c, the transistor can have more excellent electrical characteristics. Here, the state in which the impurity concentration is low and the density of defect states is low (the number of oxygen vacancies is small) is referred to as "highly purified intrinsic", "substantially highly purified intrinsic", "intrinsic", or "substantially intrinsic". A highly purified intrinsic or substantially highly purified intrinsic metal oxide has few carrier generation sources and thus can have a low carrier density in some cases. Thus, a transistor whose channel region is formed in the metal oxide film is likely to have a positive threshold voltage (normally-off characteristics). The highly purified intrinsic or substantially highly purified intrinsic metal oxide film has a low density of defect states and accordingly has a low density of trap states in some cases. Furthermore, the highly purified intrinsic or substantially highly purified intrinsic metal oxide film enables extremely low off-state current. Thus, the transistor whose channel region is formed in the metal oxide film has little variation in electrical characteristics and high reliability in some cases.

Each of the metal oxide films 409*a*, 409*b*, and 409*c* may have a non-single-crystal structure. The non-single-crystal structure includes a c-axis aligned crystalline oxide semiconductor (CAAC-OS) described later, a polycrystalline structure, a microcrystalline structure described later, or an amorphous structure, for example. Among the non-single-crystal structures, the amorphous structure has the highest density of defect states, whereas the CAAC-OS has the lowest density of defect states.

Note that each of the metal oxide films 409*a*, 409*b*, and 409*c* may be a single film or stacked films including two or more of the following regions: a region having an amorphous structure, a region having a microcrystalline structure, a region having a polycrystalline structure, a CAAC-OS region, and a region having a single-crystal structure.

Note that a cloud-aligned composite OS (CAC-OS) may be used for the metal oxide films 409*a*, 409*b*, and 409*c*.

[Liquid Crystal Layer]

As examples of the liquid crystal layer 620, thermotropic liquid crystal, low-molecular liquid crystal, high-molecular liquid crystal, polymer dispersed liquid crystal, ferroelectric liquid crystal, and anti-ferroelectric liquid crystal are given. Alternatively, a liquid crystal material which exhibits a cholesteric phase, a smectic phase, a cubic phase, a chiral nematic phase, an isotropic phase, or the like may be used. Furthermore, a liquid crystal material exhibiting a blue phase may be used.

For a driving method of the liquid crystal layer 620, an in-plane switching (IPS) mode, a twisted nematic (TN) mode, an FFS mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used. In addition, the liquid crystal layer 620 can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

[EL Layer]

The EL layer 419 includes at least a light-emitting material. Examples of the light-emitting material include an organic compound and an inorganic compound such as a quantum dot.

The organic compound and the inorganic compound can be formed by an evaporation method (including a vacuum evaporation method), an ink-jet method, a coating method, or gravure printing, for example.

Examples of materials that can be used for the organic compound include a fluorescent material and a phosphorescent material. A fluorescent material is preferably used in terms of the lifetime, while a phosphorescent material is preferably used in terms of the efficiency. Furthermore, both of a fluorescent material and a phosphorescent material may be used.

A quantum dot is a semiconductor nanocrystal with a size of several nanometers and contains approximately $1 \times 10^3$ to $1 \times 10^6$ atoms. Since energy shift of quantum dots depend on their size, quantum dots made of the same substance emit light with different wavelengths depending on their size; thus, emission wavelengths can be easily adjusted by changing the size of quantum dots.

Since a quantum dot has an emission spectrum with a narrow peak, emission with high color purity can be obtained. In addition, a quantum dot is said to have a theoretical internal quantum efficiency of approximately 100%, which far exceeds that of a fluorescent organic compound, i.e., 25%, and is comparable to that of a phosphorescent organic compound. Therefore, a quantum dot can be used as a light-emitting material to obtain a light-emitting element having high light-emitting efficiency. Furthermore, since a quantum dot which is an inorganic compound has high inherent stability, a light-emitting element which is favorable also in terms of lifetime can be obtained.

Examples of a material of a quantum dot include a Group 14 element in the periodic table, a Group 15 element in the periodic table, a Group 16 element in the periodic table, a compound of a plurality of Group 14 elements in the periodic table, a compound of an element belonging to any of Groups 4 to 14 in the periodic table and a Group 16 element in the periodic table, a compound of a Group 2 element in the periodic table and a Group 16 element in the periodic table, a compound of a Group 13 element in the periodic table and a Group 15 element in the periodic table, a compound of a Group 13 element in the periodic table and a Group 17 element in the periodic table, a compound of a Group 14 element in the periodic table and a Group 15 element in the periodic table, a compound of a Group 11 element in the periodic table and a Group 17 element in the periodic table, iron oxides, titanium oxides, spinel chalcogenides, and semiconductor clusters.

Specific examples include, but are not limited to, cadmium selenide; cadmium sulfide; cadmium telluride; zinc selenide; zinc oxide; zinc sulfide; zinc telluride; mercury sulfide; mercury selenide; mercury telluride; indium arsenide; indium phosphide; gallium arsenide; gallium phosphide; indium nitride; gallium nitride; indium antimonide; gallium antimonide; aluminum phosphide; aluminum arsenide; aluminum antimonide; lead selenide; lead telluride; lead sulfide; indium selenide; indium telluride; indium sulfide; gallium selenide; arsenic sulfide; arsenic selenide; arsenic telluride; antimony sulfide; antimony selenide; antimony telluride; bismuth sulfide; bismuth selenide; bismuth telluride; silicon; silicon carbide; germanium; tin; selenium; tellurium; boron; carbon; phosphorus; boron nitride; boron phosphide; boron arsenide; aluminum nitride; aluminum sulfide; barium sulfide; barium selenide; barium telluride; calcium sulfide; calcium selenide; calcium telluride; beryllium sulfide; beryllium selenide; beryllium telluride; magnesium sulfide; magnesium selenide; germanium sulfide; germanium selenide; germanium telluride; tin sulfide; tin selenide; tin telluride; lead oxide; copper fluoride; copper chloride; copper bromide; copper iodide; copper oxide; copper selenide; nickel oxide; cobalt oxide; cobalt sulfide; triiron tetraoxide; iron sulfide; manganese oxide; molybdenum sulfide; vanadium oxide; tungsten oxide; tantalum oxide; titanium oxide; zirconium oxide; silicon nitride; germanium nitride; aluminum oxide; barium titanate; a compound of selenium, zinc, and cadmium; a compound of indium, arsenic, and phosphorus; a compound of cadmium, selenium, and sulfur; a compound of cadmium, selenium, and tellurium; a compound of indium, gallium, and arsenic; a compound of indium, gallium, and selenium; a compound of indium, selenium, and sulfur; a compound of copper, indium, and sulfur; and combinations thereof. What is called an alloyed quantum dot, whose composition is represented by a given ratio, may be used. For example, an alloyed quantum dot of cadmium, selenium, and sulfur is a means effective in obtaining blue light because the emission wavelength can be changed by changing the content ratio of elements.

As the quantum dot, any of a core-type quantum dot, a core-shell quantum dot, a core-multishell quantum dot, and the like can be used. Note that when a core is covered with a shell formed of another inorganic material having a wider band gap, the influence of defects and dangling bonds existing at the surface of a nanocrystal can be reduced. Since such a structure can significantly improve the quantum efficiency of light emission, it is preferable to use a core-shell or core-multishell quantum dot. Examples of the material of a shell include zinc sulfide and zinc oxide.

Quantum dots have a high proportion of surface atoms and thus have high reactivity and easily cohere together. For this reason, it is preferable that a protective agent be attached to, or a protective group be provided at the surfaces of quantum dots. The attachment of the protective agent or the provision of the protective group can prevent cohesion and increase solubility in a solvent. It can also reduce reactivity and improve electrical stability. Examples of the protective agent (or the protective group) include polyoxyethylene alkyl ethers such as polyoxyethylene lauryl ether, polyoxyethylene stearyl ether, and polyoxyethylene oleyl ether; trialkylphosphines such as tripropylphosphine, tributylphosphine, trihexylphosphine, and trioctylphoshine; polyoxyethylene alkylphenyl ethers such as polyoxyethylene n-octyl-phenyl ether and polyoxyethylene n-nonylphenyl ether; tertiary amines such as tri(n-hexyl)amine, tri(n-octyl)amine, and tri(n-decyl)amine; organophosphorus compounds such as tripropylphosphine oxide, tributylphosphine oxide, trihexylphosphine oxide, trioctylphosphine oxide, and tridecylphosphine oxide; polyethylene glycol diesters such as polyethylene glycol dilaurate and polyethylene glycol distearate; organic nitrogen compounds such as nitrogen-containing aromatic compounds, e.g., pyridines, lutidines, collidines, and quinolines; aminoalkanes such as hexylamine, octylamine, decylamine, dodecylamine, tetradecylamine, hexadecylamine, and octadecylamine; dialkylsulfides such as dibutylsulfide; dialkylsulfoxides such as dimethylsulfoxide and dibutylsulfoxide; organic sulfur compounds such as sulfur-containing aromatic compounds, e.g., thiophene; higher fatty acids such as a palmitin acid, a stearic acid, and an oleic acid; alcohols; sorbitan fatty acid esters; fatty acid modified polyesters; tertiary amine modified polyurethanes; and polyethyleneimines.

Since band gaps of quantum dots are increased as their size is decreased, the size is adjusted as appropriate so that light with a desired wavelength can be obtained. Light emission from the quantum dots is shifted to a blue color side, i.e., a high energy side, as the crystal size is decreased; thus, emission wavelengths of the quantum dots can be adjusted over a wavelength region of a spectrum of an ultraviolet region, a visible light region, and an infrared region by changing the size of quantum dots. The range of size (diameter) of quantum dots which is usually used is 0.5 nm to 20 nm, preferably 1 nm to 10 nm. The emission spectra are narrowed as the size distribution of the quantum dots gets smaller, and thus light can be obtained with high color purity. The shape of the quantum dots is not particularly limited and may be spherical shape, a rod shape, a circular shape, or the like. Quantum rods which are rod-like shape quantum dots emit directional light polarized in the c-axis direction; thus, quantum rods can be used as a light-emitting material to obtain a light-emitting element with higher external quantum efficiency.

In most EL elements, to improve luminous efficiency, light-emitting materials are dispersed in host materials and the host materials need to be substances each having a singlet excitation energy or a triplet excitation energy higher than or equal to that of the light-emitting material. In the case of using a blue phosphorescent material, it is particularly difficult to develop a host material which has a triplet excitation energy higher than or equal to that of the blue phosphorescent material and which is excellent in terms of a lifetime. On the other hand, even when a light-emitting layer is composed of quantum dots and made without a host material, the quantum dots enable luminous efficiency to be ensured; thus, a light-emitting element which is favorable in terms of a lifetime can be obtained. In the case where the light-emitting layer is composed of quantum dots, the quantum dots preferably have core-shell structures (including core-multishell structures).

[Alignment Film]

For the alignment films 618a and 618b, a material containing polyimide or the like can be used. For example, a material containing polyimide or the like may be subjected to a rubbing process or an optical alignment process to have alignment in a predetermined direction.

[Light-Blocking Film]

The light-blocking films 602 and 662 function as a black matrix. For the light-blocking films 602 and 662, a material that prevents light transmission is used. Examples of the material that prevents light transmission include a metal material and an organic resin material containing a black pigment.

[Color Film]

The color film 604 functions as a color filter. For the color film 604, a material transmitting light of a predetermined color (e.g., a material transmitting light of blue, green, red, yellow, or white) is used.

[Structure Body]

The structure bodies 610a and 610b have a function of providing a certain space between components between which the structure bodies 610a and 610b are interposed. For each of the structure bodies 610a and 610b, an organic material, an inorganic material, or a composite material of an organic material and an inorganic material can be used. For the inorganic material and the organic material, the materials for the insulating films 404, 406, 408, 410a, 410b, 410c, 412, 413, 416, 418, 422, and 606 can be used.

[Functional Film]

As the functional film 626, a polarizing plate, a retardation plate, a diffusing film, an anti-reflective film, a condensing film, or the like can be used. As the functional film 626, an antistatic film preventing the attachment of a foreign substance, a water repellent film suppressing the attachment of stain, a hard coat film suppressing generation of a scratch in use, or the like can be used.

[Sealing Material]

For the sealing material 454, an inorganic material, an organic material, a composite material of an inorganic material and an organic material, or the like can be used. Examples of the organic material include a thermally fusible resin and a curable resin. As the sealing material 454, an adhesive including a resin material (e.g., a reactive curable adhesive, a photocurable adhesive, a thermosetting adhesive, or an anaerobic adhesive) may be used. Examples of such resin materials include an epoxy-based resin, an acrylic-based resin, a silicone-based resin, a phenol-based resin, a polyimide-based resin, an imide-based resin, a polyvinyl chloride (PVC)-based resin, a polyvinyl butyral (PVB)-based resin, and an ethylene vinyl acetate (EVA)-based resin.

[Sealant]

For the sealant 622, the materials for the sealing material 454 can be used. For the sealant 622, a material such as glass frit may be used in addition to the above materials. As a material used for the sealant 622, a material which is impermeable to moisture or oxygen is preferably used.

[Electrode]

In FIG. 26, for the electrode 664, 665, and 667, the materials for the conductive film 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 417, 420, 608 described above can be used. In FIG. 27, for the electrode 664, 665, and 667, the materials for the conductive film 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 417, 420, 421, 608 described above can be used. Conductive nanowires may be used for the electrode 664, 665, and 667. The average diameter of the nanowire is greater than or equal to 1 nm and less than or equal to 100 nm, preferably greater than or equal to 5 nm and less than or equal to 50 nm, more preferably greater than or equal to 5 nm and less than or equal to 25 nm. As the nanowire, a carbon nanotube or a metal nanowire such as an Ag nanowire, a Cu nanowire, and an Al nanowire can be used. For example, in the case where a Ag nanowire is used for any one of or all of the electrodes 664, 665, and 667, the transmittance of visible light can be greater than or equal to 89% and the sheet resistance can be greater than or equal to 40Ω/square and less than or equal to 100Ω/square.

As described above, the display device of one embodiment of the present invention includes the first display region, the second display region, the first display element, and the second display element. The first display element is provided to overlap with the first display region, and the second display element is provided to overlap with the second display region. Furthermore, in one embodiment of the present invention, the display device includes two transistors for driving the two display elements. One display element functions as a reflective liquid crystal element and the other display element functions as a transmissive EL element; thus, a novel display device that is highly convenient or reliable can be provided. With the transmissive EL elements in adjacent pixels arranged in different positions, the manufacturing yield in the case where the EL elements are separately formed can be increased and a display device with high productivity can be provided. Furthermore, in one embodiment of the present invention, the octagonal second display region enables display without being hindered by a wiring connected to the transistor and enables the wiring to have a simple shape, whereby both a high manufacturing yield and high display quality can be achieved.

The structure described in this embodiment can be used in appropriate combination with any of the structures described in the other embodiments.

Embodiment 2

In this embodiment, a display element having a function of emitting light is described in detail.

<2-1. Structure Example 1 of Display Element>

FIG. 60 is a cross-sectional view illustrating details of the display element 12 described in Embodiment 1.

The display element 12 illustrated in FIG. 60 includes a light-emitting element 12R, a light-emitting element 12G, and a light-emitting element 12B.

The light-emitting element 12R includes a conductive film 417R, the EL layer 419 over the conductive film 417R, and the conductive film 420 over the EL layer 419. The light-emitting element 12G includes a conductive film 417G, the EL layer 419 over the conductive film 417G, and the conductive film 420 over the EL layer 419. The light-emitting element 12B includes a conductive film 417B, the EL layer 419 over the conductive film 417B, and the conductive film 420 over the EL layer 419. The conductive films for the light-emitting elements (the conductive films 417R, 417G, and 417B) are separated by the insulating films 418.

The light-emitting element 12R includes the conductive film 417R over the substrate 401, a hole-injection layer $419_{HIL}$ over the conductive film 417R, the hole-transport layer $419_{HTL}$ over the hole-injection layer $419_{HIL}$, a light-emitting layer $419_{EML(R)}$ over the hole-transport layer $419_{HTL}$, a light-emitting layer $419_{EML(B)}$ over the light-emitting layer $419_{EML(R)}$, an electron-transport layer $419_{ETL}$ over the light-emitting layer $419_{EML(B)}$, and an electron-injection layer $419_{EIL}$ over the electron-transport layer $419_{ETL}$.

The light-emitting element 12G includes the conductive film 417G over the substrate 401, the hole-injection layer $419_{HIL}$ over the conductive film 417G, the hole-transport layer $419_{HTL}$ over the hole-injection layer $419_{HIL}$, a light-emitting layer $419_{EML(G)}$ over the hole-transport layer $419_{HTL}$, the light-emitting layer $419_{EML(B)}$ over the light-emitting layer $419_{EML(G)}$, the electron-transport layer $419_{ETL}$ over the light-emitting layer $419_{EML(B)}$, and the electron-injection layer $419_{EIL}$, over the electron-transport layer $419_{ETL}$.

The light-emitting element 12B includes the conductive film 417B over the substrate 401, the hole-injection layer $419_{HIL}$ over the conductive film 417B, the hole-transport layer $419_{HTL}$ over the hole-injection layer $419_{HIL}$, the light-emitting layer $419_{EML(B)}$ over the hole-transport layer $419_{HTL}$, the electron-transport layer $419_{ETL}$ over the light-emitting layer $419_{EML(B)}$, and the electron-injection layer $419_{EIL}$ over the electron-transport layer $419_{ETL}$.

In the display element 12 illustrated in FIG. 60, the hole-injection layer $419_{HIL}$, the hole-transport layer $419_{HTL}$, the light-emitting layer $419_{EML(B)}$, the electron-transport layer $419_{ETL}$, and the electron-injection layer $419_{EIL}$ are used in common by the light-emitting element 12R, the light-emitting element 12G, and the light-emitting element 12B.

With such a structure, the manufacturing yield of the display element 12 can be increased. Specifically, a separate formation process (i.e., a separate coloring process) of the light-emitting elements in the display element 12 can be two steps, coloring for the light-emitting layer $419_{EML(R)}$ and coloring for the light-emitting layer $419_{EML(G)}$.

Note that the light-emitting layer $419_{EML(B)}$ does not contribute to light emission in the light-emitting element 12R and the light-emitting element 12G. For example, for the light-emitting layer $419_{EML(B)}$, a material with a high electron-transport property and a low hole-transport property or a material whose highest occupied molecular orbital (HOMO) level is lower than the HOMO level of materials used for the light-emitting layer $419_{EML(R)}$ and the light-emitting layer $419_{EML(G)}$ is used. That is, in the light-emitting element 12R and the light-emitting element 12G, the light-emitting layer $419_{EML(B)}$ functions as an electron-transport layer.

For example, in the case where the light-emitting layer $419_{EML(B)}$ includes a host material and a guest material (a light-emitting material), it is preferable that the host material have an electron-transport property and that the guest material have a hole-trap property. With such a structure, carriers can be efficiently recombined in the light-emitting layer $419_{EML(R)}$ and the light-emitting layer $419_{EML(G)}$.

In the case where each of the light-emitting layer $419_{EML(R)}$ and the light-emitting layer $419_{EML(G)}$ includes a host material and a guest material (a light-emitting material), it is preferable that the host material have a hole-transport property and an electron-transport property. With such a structure, each of the light-emitting layer $419_{EML(R)}$ and the light-emitting layer $419_{EML(G)}$ has a bipolar property.

Each of the light-emitting layer $419_{EML(R)}$ and the light-emitting layer $419_{EML(G)}$ includes a phosphorescent material as a guest material. The light-emitting layer $419_{EML(B)}$ includes a fluorescent material as a guest material. With such a structure, a display element with high emission efficiency and high reliability can be provided. For example, a phosphorescent material emitting light in a red wavelength range can be used in the light-emitting layer $419_{EML(R)}$, a phosphorescent material emitting light in a green wavelength range can be used in the light-emitting layer $419_{EML(G)}$, and a fluorescent material emitting light in a blue wavelength range can be used in the light-emitting layer $419_{EML(B)}$. Note that materials that can be used in the light-emitting layer $419_{EML(R)}$, the light-emitting layer $419_{EML(G)}$, and the light-emitting layer $419_{EML(B)}$ are not limited to the above. For example, a phosphorescent material may be used in the light-emitting layer $419_{EML(B)}$.

With the above-described structure, the number of steps of the separate coloring process in manufacturing the light-emitting elements is small; thus, a display element with high productivity can be provided. The light-emitting elements of the display element have low power consumption because of their high emission efficiency. Moreover, the light-emitting elements have high reliability. Therefore, a novel display element with high productivity and low power consumption can be provided.

Next, components in the display element 12 illustrated in FIG. 60 are described below.

[Conductive Film]

For the conductive films 417R, 417G, 417B, and 420, the materials for the conductive films 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 417, 420, 608, and 682 described in Embodiment 1 can be used. In particular, ITO or ITSO is preferably used for the conductive film 417R, the conductive film 417G, and the conductive film 417B. A metal film with high reflectance containing Al or Ag is preferably used for the conductive film 420.

[Insulating Film]

For the insulating film 418, the materials for the insulating films 404, 406, 408, 410a, 410b, 410c, 412, 413, 416, 418, 421, 606, 663, 666, 668, and 681 described in Embodiment 1 can be used.

[Light-Emitting Layer]

Light emitted from the light-emitting layer $419_{EML(R)}$ has a peak in a red wavelength range. Light emitted from the light-emitting layer $419_{EML(G)}$ has a peak in a green wavelength range. Light emitted from the light-emitting layer $419_{EML(B)}$ has a peak in a blue wavelength range. For example, it is preferable that phosphorescent materials be used for the light-emitting layer $419_{EML(R)}$ and the light-emitting layer $419_{EML(G)}$, and a fluorescent material be used for the light-emitting layer $419_{EML(B)}$. Each of the light-emitting layer $419_{EML(R)}$ and the light-emitting layer $419_{EML(G)}$ includes either an electron-transport material or a hole-transport material or both, in addition to the phosphorescent material. The light-emitting layer $419_{EML(B)}$ includes either an electron-transport material or a hole-transport material or both, in addition to the fluorescent material.

[Phosphorescent Material]

As the phosphorescent material, an iridium-, rhodium-, or platinum-based organometallic complex or metal complex can be used; in particular, an organoiridium complex such as an iridium-based ortho-metalated complex is preferable. As an ortho-metalated ligand, a 4H-triazole ligand, a 1H-triazole ligand, an imidazole ligand, a pyridine ligand, a pyrimidine ligand, a pyrazine ligand, an isoquinoline ligand, or the like can be used. As the metal complex, a platinum complex having a porphyrin ligand or the like can be used.

Examples of the substance that has an emission peak in the blue or green wavelength range include organometallic iridium complexes having a 4H-triazole skeleton, such as tris {2-[5-(2-methylphenyl)-4-(2,6-dimethylphenyl)-4H-1, 2,4-triazol-3-yl-κN2]phenyl-κC}iridium(III) (abbreviation: Ir(mpptz-dmp)$_3$), tris(5-methyl-3,4-diphenyl-4H-1,2,4-triazolato)iridium(III) (abbreviation: Ir(Mptz)$_3$), tris[4-(3-biphenyl)-5-isopropyl-3-phenyl-4H-1,2,4-triazolato]iridium (III) (abbreviation: Ir(iPrptz-3b)$_3$), and tris[3-(5-biphenyl)-5-isopropyl-4-phenyl-4H-1,2,4-triazolato]iridium(III) (abbreviation: Ir(iPr5btz)$_3$); organometallic iridium complexes having a 1H-triazole skeleton, such as tris[3-methyl-1-(2-methylphenyl)-5-phenyl-1H-1,2,4-triazolato]iridium (III) (abbreviation: Ir(Mptz1-mp)$_3$) and tris(1-methyl-5-phenyl-3-propyl-1H-1,2,4-triazolato)iridium(III) (abbreviation: Ir(Prptz1-Me)$_3$); organometallic iridium complexes having an imidazole skeleton, such as fac-tris[1-(2, 6-diisopropylphenyl)-2-phenyl-1H-imidazole]iridium(III) (abbreviation: Ir(iPrpmi)$_3$) and tris[3-(2,6-dimethylphenyl)-7-methylimidazo[1,2-f]phenanthridinato]iridium(III) (abbreviation: Ir(dmpimpt-Me)$_3$); and organometallic iridium complexes in which a phenylpyridine derivative having an electron-withdrawing group is a ligand, such as bis[2-(4',6'-difluorophenyl)pyridinato-N,C$^{2'}$]iridium(III) tetrakis(1-pyrazolyl)borate (abbreviation: FIr6), bis[2-(4',6'-difluorophenyl)pyridinato-N,C$^{2'}$]iridium(III) picolinate (abbreviation: FIrpic), bis {2-[3',5'-bis(trifluoromethyl)phenyl]pyridinato-N,C$^{2'}$}iridium(III) picolinate (abbreviation: Ir(CF$_3$ppy)$_2$(pic)), and bis[2-(4',6'-difluorophenyl)pyridinato-N,C$^{2'}$]iridium(III) acetylacetonate (abbreviation: FIr(acac)).

Examples of the substance that has an emission peak in the green or yellow wavelength range include organometallic iridium complexes having a pyrimidine skeleton, such as tris(4-methyl-6-phenylpyrimidinato)iridium(III) (abbreviation: Ir(mppm)$_3$), tris(4-t-butyl-6-phenylpyrimidinato)

iridium(III) (abbreviation: Ir(tBuppm)$_3$), (acetylacetonato) bis(6-methyl-4-phenylpyrimidinato)iridium(III) (abbreviation: Ir(mppm)$_2$(acac)), (acetylacetonato)bis(6-tert-butyl-4-phenylpyrimidinato)iridium(III) (abbreviation: Ir(tBuppm)$_2$(acac)), (acetylacetonato)bis[4-(2-norbornyl)-6-phenylpyrimidinato]iridium(III) (abbreviation: Ir(nbppm)$_2$(acac)), (acetylacetonato)bis[5-methyl-6-(2-methylphenyl)-4-phenylpyrimidinato]iridium(III) (abbreviation: Ir(mpmppm)$_2$(acac)), (acetylacetonato)bis {4,6-dimethyl-2-[6-(2,6-dimethylphenyl)-4-pyrimidinyl-κN3]phenyl-κC}iridium(III) (abbreviation: Ir(dmppm-dmp)$_2$(acac)), (acetylacetonato)bis(4,6-diphenylpyrimidinato)iridium(III) (abbreviation: Ir(dppm)$_2$(acac)); organometallic iridium complexes having a pyrazine skeleton, such as (acetylacetonato)bis(3,5-dimethyl-2-phenylpyrazinato)iridium(III) (abbreviation: Ir(mppr-Me)$_2$(acac)) and (acetylacetonato)bis(5-isopropyl-3-methyl-2-phenylpyrazinato)iridium(III) (abbreviation: Ir(mppr-iPr)$_2$(acac)); organometallic iridium complexes having a pyridine skeleton, such as tris(2-phenylpyridinato-N,C$^{2'}$)iridium(III) (abbreviation: Ir(ppy)$_3$), bis(2-phenylpyridinato-N,C$^{2'}$)iridium(III) acetylacetonate (abbreviation: Ir(ppy)$_2$(acac)), bis(benzo[h]quinolinato)iridium(III) acetylacetonate (abbreviation: Ir(bzq)$_2$(acac)), tris(benzo[h]quinolinato)iridium(III) (abbreviation: Ir(bzq)$_3$), tris(2-phenylquinolinato-N,C$^{2'}$)iridium(III) (abbreviation: Ir(pq)$_3$), and bis(2-phenylquinolinato-N,C$^{2'}$)iridium(III) acetylacetonate (abbreviation: Ir(pq)$_2$(acac)); organometallic iridium complexes such as bis(2,4-diphenyl-1,3-oxazolato-N,C$^{2'}$)iridium(III) acetylacetonate (abbreviation: Ir(dpo)$_2$(acac)), bis {2-[4'-(perfluorophenyl)phenyl]pyridinato-N,C$^{2'}$}iridium(III) acetylacetonate (abbreviation: Ir(p-PF-ph)$_2$(acac)), and bis(2-phenylbenzothiazolato-N,C$^{2'}$)iridium(III) acetylacetonate (abbreviation: Ir(bt)$_2$(acac)); and a rare earth metal complex such as tris(acetylacetonato)(monophenanthroline)terbium(III) (abbreviation: Tb(acac)$_3$(Phen)). Among the materials given above, the organometallic iridium complexes having a pyrimidine skeleton have distinctively high reliability and emission efficiency and are thus particularly preferable.

Examples of the substance that has an emission peak in the yellow or red wavelength range include organometallic iridium complexes having a pyrimidine skeleton, such as (diisobutyrylmethanato)bis[4,6-bis(3-methylphenyl)pyrimidinato]iridium(III) (abbreviation: Ir(5mdppm)$_2$(dibm)), bis[4,6-bis(3-methylphenyl)pyrimidinato](dipivaloylmethanato)iridium(III) (abbreviation: Ir(5mdppm)$_2$(dpm)), and bis[4,6-di(naphthalen-1-yl)pyrimidinato](dipivaloylmethanato)iridium(III) (abbreviation: Ir(dlnpm)$_2$(dpm)); organometallic iridium complexes having a pyrazine skeleton, such as (acetylacetonato)bis(2,3,5-triphenylpyrazinato)iridium (III) (abbreviation: Ir(tppr)$_2$(acac)), bis(2,3,5-triphenylpyrazinato) (dipivaloylmethanato)iridium(III) (abbreviation: Ir(tppr)$_2$(dpm)), and (acetylacetonato)bis[2,3-bis(4-fluorophenyl)quinoxalinato]iridium(III) (abbreviation: Ir(Fdpq)$_2$(acac)); organometallic iridium complexes having a pyridine skeleton, such as tris(1-phenysoquinolinato-N,C$^{2'}$)iridium(III) (abbreviation: Ir(piq)$_3$) and bis(1-phenylisoquinolinato-N,C$^{2'}$)iridium(III) acetylacetonate (abbreviation: Ir(piq)$_2$(acac)); a platinum complex such as 2,3,7,8,12,13,17,18-octaethyl-21H,23H-porphyrin platinum(II) (abbreviation: PtOEP); and rare earth metal complexes such as tris(1,3-diphenyl-1,3-propanedionato)(monophenanthroline)europium(III) (abbreviation: Eu(DBM)$_3$(Phen)) and tris[1-(2-thenoyl)-3,3,3-trifluoroacetonato](monophenanthroline)europium(III) (abbreviation: Eu(TTA)$_3$(Phen)). Among the materials given above, the organometallic iridium complexes having a pyrimidine skeleton have distinctively high reliability and emission efficiency and are thus particularly preferable. Further, the organometallic iridium complexes having a pyrazine skeleton can provide red light emission with favorable chromaticity.

As the material included in the light-emitting layer, any material can be used as long as the material can convert the triplet excitation energy into light emission. As an example of the material that can convert triplet excitation energy into light emission, a thermally activated delayed fluorescence material is given in addition to the phosphorescent material. Therefore, the term "phosphorescent material" in the description can be replaced with the term "thermally activated delayed fluorescence material". The thermally activated delayed fluorescence material is a material having a small energy difference between the singlet excitation energy level and the triplet excitation energy level and has a function of converting the triplet excitation energy into the singlet excitation energy by reverse intersystem crossing. Thus, the thermally activated delayed fluorescence material can up-convert a triplet excited state into a singlet excited state (i.e., reverse intersystem crossing is possible) using a little thermal energy and efficiently exhibit light emission (fluorescence) from the singlet excited state. Conditions for efficiently obtaining thermally activated delayed fluorescence are as follows: the energy difference between the singlet excitation energy level and the triplet excitation energy level is preferably greater than 0 eV and less than or equal to 0.2 eV, more preferably greater than 0 eV and less than or equal to 0.1 eV.

As examples of the thermally activated delayed fluorescence material, a fullerene, a derivative thereof, an acridine derivative such as proflavine, and eosin are given. Furthermore, a metal-containing porphyrin, such as a porphyrin containing magnesium (Mg), zinc (Zn), cadmium (Cd), tin (Sn), platinum (Pt), indium (In), or palladium (Pd), is given.

As the thermally activated delayed fluorescence material composed of one kind of material, a heterocyclic compound including a π-electron rich heteroaromatic ring and a π-electron deficient heteroaromatic ring can also be used. Specifically, 2-(biphenyl-4-yl)-4,6-bis(12-phenylindolo[2,3-α]carbazol-11-yl)-1,3,5-triazine (abbreviation: PIC-TRZ), 2-{4-[3-(N-phenyl-9H-carbazol-3-yl)-9H-carbazol-9-yl]phenyl}-4,6-diphenyl-1,3,5-triazine (abbreviation: PCCzPTzn), 2-[4-(10H-phenoxazin-10-yl)phenyl]-4,6-diphenyl-1,3,5-triazine (abbreviation: PXZ-TRZ), 3-[4-(5-phenyl-5,10-dihydrophenazin-10-yl)phenyl]-4,5-diphenyl-1,2,4-triazole (abbreviation: PPZ-3TPT), 3-(9,9-dimethyl-9H-acridin-10-yl)-9H-xanthen-9-one (abbreviation: ACRXTN), bis[4-(9,9-dimethyl-9,10-dihydroacridine)phenyl]sulfone (abbreviation: DMAC-DPS), or 10-phenyl-10H,10'H-spiro[acridin-9,9'-anthracen]-10'-one (abbreviation: ACRSA) can be used. The heterocyclic compound is preferably used because of having the π-electron rich heteroaromatic ring and the π-electron deficient heteroaromatic ring, for which the electron-transport property and the hole-transport property are high. Note that a substance in which the π-electron rich heteroaromatic ring is directly bonded to the π-electron deficient heteroaromatic ring is particularly preferably used because the donor property of the π-electron rich heteroaromatic ring and the acceptor property of the π-electron deficient heteroaromatic ring are both increased and the difference between the level of the singlet excited state and the level of the triplet excited state becomes small.

[Fluorescent Material]

The fluorescent material is preferably, but not particularly limited to, an anthracene derivative, a tetracene derivative, a chrysene derivative, a phenanthrene derivative, a pyrene derivative, a perylene derivative, a stilbene derivative, an acridone derivative, a coumarin derivative, a phenoxazine derivative, a phenothiazine derivative, or the like, and for example, any of the following materials can be used.

The examples include 5,6-bis[4-(10-phenyl-9-anthryl) phenyl]-2,2'-bipyridine (abbreviation: PAP2BPy), 5,6-bis [4'-(10-phenyl-9-anthryl)biphenyl-4-yl]-2,2'-bipyridine (abbreviation: PAPP2BPy), N,N'-diphenyl-N,N'-bis[4-(9-phenyl-9H-fluoren-9-yl)phenyl]pyrene-1,6-diamine (abbreviation: 1,6FLPAPrn), N,N'-bis(3-methylphenyl)-N, N'-bis[3-(9-phenyl-9H-fluoren-9-yl)phenyl]pyrene-1,6-diamine (abbreviation: 1,6mMemFLPAPrn), N,N'-bis[4-(9-phenyl-9H-fluoren-9-yl)phenyl]-N,N'-bis(4-tert-butylphenyl)pyrene-1,6-diamine (abbreviation: 1,6tBu-FLPAPrn), N,N'-diphenyl-N,N'-bis[4-(9-phenyl-9H-fluoren-9-yl)phenyl]-3,8-dicyclohexylpyrene-1,6-diamine (abbreviation: ch-1,6FLPAPrn), N,N'-bis[4-(9H-carbazol-9-yl)phenyl]-N,N'-diphenylstilbene-4,4'-diamine (abbreviation: YGA2S), 4-(9H-carbazol-9-yl)-4'-(10-phenyl-9-anthryl)triphenylamine (abbreviation: YGAPA), 4-(9H-carbazol-9-yl)-4'-(9,10-diphenyl-2-anthryl)triphenylamine (abbreviation: 2YGAPPA), N,9-diphenyl-N-[4-(10-phenyl-9-anthryl)phenyl]-9H-carbazol-3-amine (abbreviation: PCAPA), perylene, 2,5,8,11-tetra(tert-butyl)perylene (abbreviation: TBP), 4-(10-phenyl-9-anthryl)-4'-(9-phenyl-9H-carbazol-3-yl)triphenylamine (abbreviation: PCBAPA), N,N''-(2-tert-butylanthracene-9,10-diyldi-4,1-phenylene)bis [N,N',N'-triphenyl-1,4-phenylenediamine](abbreviation: DPABPA), N,9-diphenyl-N-[4-(9,10-diphenyl-2-anthryl) phenyl]-9H-carbazol-3-amine (abbreviation: 2PCAPPA), N-[4-(9,10-diphenyl-2-anthryl)phenyl]-N,N',N'-triphenyl-1, 4-phenylenediamine (abbreviation: 2DPAPPA), N,N,N',N', N'',N''',N''',N''''-octaphenyldibenzo[g,p]chrysene-2,7,10,15-tetraamine (abbreviation: DBC1), coumarin 30, N-(9,10-diphenyl-2-anthryl)-N,9-diphenyl-9H-carbazol-3-amine (abbreviation: 2PCAPA), N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N,N',N-triphenyl-1,4-phenylenediamine (abbreviation: 2DPAPA), N-[9, 10-bis(1,1'-biphenyl-2-yl)-2-anthryl]-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), coumarin 6, coumarin 545T, N,N'-diphenylquinacridone (abbreviation: DPQd), rubrene, 2,8-di-tert-butyl-5,11-bis(4-tert-butylphenyl)-6,12-diphenyltetracene (abbreviation: TBRb), Nile red, 5,12-bis(1,1'-biphenyl-4-yl)-6,11-diphenyltetracene (abbreviation: BPT), 2-(2-{2-[4-(dimethylamino)phenyl]ethenyl}-6-methyl-4H-pyran-4-ylidene)propanedinitrile (abbreviation: DCM1), 2-{2-methyl-6-[2-(2,3,6,7-tetrahydro-1H,5H-benzo[ij]quinolizin-9-yl)ethenyl]-4H-pyran-4-ylidene}propanedinitrile (abbreviation: DCM2), N,N,N',N'-tetrakis(4-methylphenyl) tetracene-5,11-diamine (abbreviation: p-mPhTD), 7,14-diphenyl-N,N,N',N'-tetrakis(4-methylphenyl)acenaphtho[1,2-α]fluoranthene-3,10-diamine (abbreviation: p-mPhAFD), 2-{2-isopropyl-6-[2-(1,1,7,7-tetramethyl-2,3,6,7-tetrahydro-1H,5H-benzo[ij]quinolizin-9-yl)ethenyl]-4H-pyran-4-ylidene}propanedinitrile (abbreviation: DCJTI), 2-{2-tert-butyl-6-[2-(1,1,7,7-tetramethyl-2,3,6,7-tetrahydro-1H,5H-benzo[ij]quinolizin-9-yl)ethenyl]-4H-pyran-4-ylidene}propanedinitrile (abbreviation: DCJTB), 2-(2,6-bis{2-[4-(dimethylamino)phenyl]ethenyl}-4H-pyran-4-ylidene)propanedinitrile (abbreviation: BisDCM), 2-{2,6-bis[2-(8-methoxy-1,1,7,7-tetramethyl-2,3,6,7-tetrahydro-1H,5H-benzo[ij]quinolizin-9-yl)ethenyl]-4H-pyran-4-ylidene}propanedinitrile (abbreviation: BisDCJTM), and 5,10,15,20-tetraphenylbisbenzo[5,6]indeno[1,2,3-cd:1',2', 3'-lm]perylene.

[Host Material]

In the light-emitting layer, the light-emitting material is preferably dispersed in the host material. In this case, the weight ratio of the host material to the light-emitting material is larger. A variety of materials can be used as the host material. For example, a material having a function of transporting a hole (a hole-transport material) and a material having a function of transporting an electron (an electron-transport material) can be used. Furthermore, a bipolar material having a hole-transport property and an electron-transport property can be used.

As the host material, a material having a property of transporting more electrons than holes can be used, and a material having an electron mobility of $1 \times 10^{-6}$ cm$^2$/Vs or higher is preferable. A compound including a π-electron deficient heteroaromatic ring skeleton such as a nitrogen-containing heteroaromatic compound, or a zinc- or aluminum-based metal complex can be used, for example, as the material which easily accepts electrons (the material having an electron-transport property). Specific examples include a metal complex having a quinoline ligand, a benzoquinoline ligand, an oxazole ligand, and a thiazole ligand. In addition, a compound such as an oxadiazole derivative, a triazole derivative, a benzimidazole derivative, a quinoxaline derivative, a dibenzoquinoxaline derivative, a phenanthroline derivative, a pyridine derivative, a bipyridine derivative, a pyrimidine derivative, and a triazine derivative can be given.

Specific examples include metal complexes having a quinoline or benzoquinoline skeleton, such as tris(8-quinolinolato)aluminum(III) (abbreviation: Alq), tris(4-methyl-8-quinolinolato)aluminum(III) (abbreviation: Almq$_3$), bis(10-hydroxybenzo[h]quinolinato)beryllium(II) (abbreviation: BeBq$_2$), bis(2-methyl-8-quinolinolato)(4-phenylphenolato) aluminum(III) (abbreviation: BAlq), and bis(8-quinolinolato)zinc(II) (abbreviation: Znq). Alternatively, a metal complex having an oxazole-based or thiazole-based ligand, such as bis[2-(2-benzoxazolyl)phenolato]zinc(II) (abbreviation: ZnPBO) or bis[2-(2-benzothiazolyl)phenolato]zinc(II) (abbreviation: ZnBTZ) can be used. Other than such metal complexes, any of the following can be used: heterocyclic compounds such as 2-(4-biphenylyl)-5-(4-tert-butylphenyl)-1,3,4-oxadiazole (abbreviation: PBD), 1,3-bis[5-(p-tert-butylphenyl)-1,3,4-oxadiazol-2-yl]benzene (abbreviation: OXD-7), 9-[4-(5-phenyl-1,3,4-oxadiazol-2-yl)phenyl]-9H-carbazole (abbreviation: CO11), 3-(4-biphenylyl)-4-phenyl-5-(4-tert-butylphenyl)-1,2,4-triazole (abbreviation: TAZ), 9-[4-(4,5-diphenyl-4H-1,2,4-triazol-3-yl)phenyl]-9H-carbazole (abbreviation: CzTAZ1), 2,2',2''-(1,3,5-benzenetriyl) tris(1-phenyl-1H-benzimidazole) (abbreviation: TPBI), 2-[3-(dibenzothiophen-4-yl)phenyl]-1-phenyl-1H-benzimidazole (abbreviation: mDBTBIm-II), bathophenanthroline (abbreviation: BPhen), and bathocuproine (abbreviation: BCP); heterocyclic compounds having a diazine skeleton such as 2-[3-(dibenzothiophen-4-yl)phenyl]dibenzo[f,h]quinoxaline (abbreviation: 2mDBTPDBq-II), 2-[3'-(dibenzothiophen-4-yl)biphenyl-3-yl]dibenzo[f,h]quinoxaline (abbreviation: 2mDBTBPDBq-II), 2-[3'-(9H-carbazol-9-yl) biphenyl-3-yl]dibenzo[f,h]quinoxaline (abbreviation: 2mCzBPDBq), 2-[4-(3,6-diphenyl-9H-carbazol-9-yl)phenyl]dibenzo[f,h]quinoxaline (abbreviation: 2CzPDBq-III), 7-[3-(dibenzothiophen-4-yl)phenyl]dibenzo[f,h]quinoxaline (abbreviation: 7mDBTPDBq-II), 6-[3-(dibenzothiophen-4-yl)phenyl]dibenzo[f,h]quinoxaline (abbreviation: 6mDBTPDBq-II), 2-[3-(3,9'-bi-9H-carbazol-9-yl)phenyl]dibenzo[f, h]quinoxaline (abbreviation: 2mCzCzPDBq), 4,6-bis[3-(phenanthren-9-yl)phenyl]pyrimidine (abbreviation: 4,6mPnP2Pm), 4,6-bis[3-(4-dibenzothienyl)phenyl]pyrimidine (abbreviation: 4,6mDBTP2Pm-II), and 4,6-bis[3-(9H-carbazol-9-yl)phenyl]pyrimidine (abbreviation: 4,6mCzP2Pm); heterocyclic compounds having a triazine skeleton such as 2-{4-[3-(N-phenyl-9H-carbazol-3-yl)-9H-carbazol-9-yl]phenyl}-4,6-diphenyl-1,3,5-triazine (abbreviation: PCCzPTzn); heterocyclic compounds having a pyridine skeleton such as 3,5-bis[3-(9H-carbazol-9-yl)phenyl] pyridine (abbreviation: 35DCzPPy) or 1,3,5-tri[3-(3-pyridyl)phenyl]benzene (abbreviation: TmPyPB); and heteroaromatic compounds such as 4,4'-bis(5-methylbenzoxazol-2-yl)stilbene (abbreviation: BzOs). Among the heterocyclic compounds, the heterocyclic compounds having a triazine skeleton, a diazine (pyrimidine, pyrazine, pyridazine) skeleton, or a pyridine skeleton are highly reliable and stable and are thus preferably used. In addition, the heterocyclic compounds having the skeletons have a high electron-transport property to contribute to a reduction in driving voltage. Further alternatively, a high molecular compound such as poly(2,5-pyridinediyl) (abbreviation: PPy), poly[(9,9-dihexylfluorene-2,7-diyl)-co-(pyridine-3,5-diyl)](abbreviation: PF-Py), or poly[(9,9-dioctylfluorene-2,7-diyl)-co-(2,2'-bipyridine-6,6'-diyl)](abbreviation: PF-BPy) can be used. The substances described here are mainly substances having an electron mobility of $1\times10^{-6}$ cm$^2$/Vs or higher. Note that other substances may also be used as long as their electron-transport properties are higher than their hole-transport properties.

As the host material, hole-transport materials given below can be used.

A material having a property of transporting more holes than electrons can be used as the hole-transport material, and a material having a hole mobility of $1\times10^{-6}$ cm$^2$/Vs or higher is preferable. Specifically, an aromatic amine, a carbazole derivative, an aromatic hydrocarbon, a stilbene derivative, or the like can be used. Furthermore, the hole-transport material may be a high molecular compound.

Specific examples of the aromatic amine compounds that can be used as the material having a high hole-transport property include N,N'-di(p-tolyl)-N,N'-diphenyl-p-phenylenediamine (abbreviation: DTDPPA), 4,4'-bis[N-(4-diphenylaminophenyl)-N-phenylamino]biphenyl (abbreviation: DPAB), N,N'-bis{4-[bis(3-methylphenyl)amino]phenyl}-N,N'-diphenyl-(1,1'-biphenyl)-4,4'-diamine (abbreviation: DNTPD), and 1,3,5-tris[N-(4-diphenylaminophenyl)-N-phenylamino]benzene (abbreviation: DPA3B).

Specific examples of the carbazole derivative are 3-[N-(4-diphenylaminophenyl)-N-phenylamino]-9-phenylcarbazole (abbreviation: PCzDPA1), 3,6-bis[N-(4-diphenylaminophenyl)-N-phenylamino]-9-phenylcarbazole (abbreviation: PCzDPA2), 3,6-bis[N-(4-diphenylaminophenyl)-N-(1-naphthyl)amino]-9-phenylcarbazole (abbreviation: PCzTPN2), 3-[N-(9-phenylcarbazol-3-yl)-N-phenylamino]-9-phenylcarbazole (abbreviation: PCzPCA1), 3,6-bis[N-(9-phenylcarbazol-3-yl)-N-phenylamino]-9-phenylcarbazole (abbreviation: PCzPCA2), 3-[N-(1-naphthyl)-N-(9-phenylcarbazol-3-yl)amino]-9-phenylcarbazole (abbreviation: PCzPCN1), and the like.

Other examples of the carbazole derivative include 4,4'-di(N-carbazolyl)biphenyl (abbreviation: CBP), 1,3,5-tris[4-(N-carbazolyl)phenyl]benzene (abbreviation: TCPB), 9-[4-(10-phenyl-9-anthryl)phenyl]-9H-carbazole (abbreviation: CzPA), and 1,4-bis[4-(N-carbazolyl)phenyl]-2,3,5,6-tetraphenylbenzene.

Examples of the aromatic hydrocarbon are 2-tert-butyl-9,10-di(2-naphthyl)anthracene (abbreviation: t-BuDNA), 2-tert-butyl-9,10-di(1-naphthyl)anthracene, 9,10-bis(3,5-diphenylphenyl)anthracene (abbreviation: DPPA), 2-tert-butyl-9,10-bis(4-phenylphenyl)anthracene (abbreviation: t-BuDBA), 9,10-di(2-naphthyl)anthracene (abbreviation: DNA), 9,10-diphenylanthracene (abbreviation: DPAnth), 2-tert-butylanthracene (abbreviation: t-BuAnth), 9,10-bis(4-methyl-1-naphthyl)anthracene (abbreviation: DMNA), 2-tert-butyl-9,10-bis[2-(1-naphthyl)phenyl]anthracene, 9,10-bis[2-(1-naphthyl)phenyl]anthracene, 2,3,6,7-tetramethyl-9,10-di(1-naphthyl)anthracene, 2,3,6,7-tetramethyl-9,10-di(2-naphthyl)anthracene, 9,9'-bianthryl, 10,10'-diphenyl-9,9'-bianthryl, 10,10'-bis(2-phenylphenyl)-9,9'-bianthryl, 10,10'-bis[(2,3,4,5,6-pentaphenyl)phenyl]-9,9'-bianthryl, anthracene, tetracene, rubrene, perylene, and 2,5,8,11-tetra(tert-butyl)perylene. Other examples are pentacene and coronene. The aromatic hydrocarbon having a hole mobility of $1\times10^{-6}$ cm$^2$/Vs or higher and having 14 to 42 carbon atoms is particularly preferable.

The aromatic hydrocarbon may have a vinyl skeleton. Examples of the aromatic hydrocarbon having a vinyl group are 4,4'-bis(2,2-diphenylvinyl)biphenyl (abbreviation: DPVBi), 9,10-bis[4-(2,2-diphenylvinyl)phenyl]anthracene (abbreviation: DPVPA), and the like.

Other examples are high molecular compounds such as poly(N-vinylcarbazole) (abbreviation: PVK), poly(4-vinyltriphenylamine) (abbreviation: PVTPA), poly[N-(4-{N'-[4-(4-diphenylamino)phenyl]phenyl-N'-phenylamino}phenyl) methacrylamide] (abbreviation: PTPDMA), and poly[N,N'-bis(4-butylphenyl)-N,N'-bis(phenyl)benzidine] (abbreviation: poly-TPD).

Examples of the material having a high hole-transport property are aromatic amine compounds such as 4,4'-bis[N-(1-naphthyl)-N-phenylamino]biphenyl (abbreviation: NPB or α-NPD), N,N'-bis(3-methylphenyl)-N,N'-diphenyl-[1,1'-biphenyl]-4,4'-diamine (abbreviation: TPD), 4,4',4"-tris(carbazol-9-yl)triphenylamine (abbreviation: TCTA), 4,4',4"-tris[N-(1-naphthyl)-N-phenylamino]triphenylamine (abbreviation: 1'-TNATA), 4,4',4"-tris(N,N-diphenylamino) triphenylamine (abbreviation: TDATA), 4,4',4"-tris[N-(3-methylphenyl)-N-phenylamino]triphenylamine (abbreviation: MTDATA), 4,4'-bis[N-(spiro-9,9'-bifluoren-2-yl)-N-phenylamino]biphenyl (abbreviation: BSPB), 4-phenyl-4'-(9-phenylfluoren-9-yl)triphenylamine (abbreviation: BPAFLP), 4-phenyl-3'-(9-phenylfluoren-9-yl)triphenylamine (abbreviation: mBPAFLP), N-(9,9-dimethyl-9H-fluoren-2-yl)-N-{9,9-dimethyl-2-[N'-phenyl-N'-(9,9-dimethyl-9H-fluoren-2-yl)amino]-9H-fluoren-7-yl}phenylamine (abbreviation: DFLADFL), N-(9,9-dimethyl-2-diphenylamino-9H-fluoren-7-yl)diphenylamine (abbreviation: DPNF), 2-[N-(4-diphenylaminophenyl)-N-phenylamino] spiro-9,9'-bifluorene (abbreviation: DPASF), 4-phenyl-4'-(9-phenyl-9H-carbazol-3-yl)triphenylamine (abbreviation: PCBA1BP), 4,4'-diphenyl-4"-(9-phenyl-9H-carbazol-3-yl) triphenylamine (abbreviation: PCBBi1BP), 4-(1-naphthyl)-4'-(9-phenyl-9H-carbazol-3-yl)triphenylamine (abbreviation: PCBANB), 4,4'-di(1-naphthyl)-4"-(9-phenyl-9H-carbazol-3-yl)triphenylamine (abbreviation: PCBNBB), 4-phenyldiphenyl-(9-phenyl-9H-carbazol-3-yl)amine (abbreviation: PCA1BP), N,N'-bis(9-phenylcarbazol-3-yl)-N,N'-diphenylbenzene-1,3-diamine (abbreviation: PCA2B), N,N',N"-triphenyl-N,N',N"-tris(9-phenylcarbazol-3-yl)benzene-1,3,5-triamine (abbreviation: PCA3B), N-(4-biphenyl)-N-(9,9-dimethyl-9H-fluoren-2-yl)-9-phenyl-9H-carbazol-3-amine (abbreviation: PCBiF), N-(1,1'-biphenyl-4-yl)-N-[4-(9-phenyl-9H-carbazol-3-yl)phenyl]-9,9-dimethyl- 9H-fluor en-2-amine (abbreviation: PCBBiF), 9,9-dimethyl-N-phenyl-N-[4-(9-phenyl-9H-carbazol-3-yl)phenyl]fluoren-2-amine (abbreviation: PCBAF), N-phenyl-N-[4-(9-phenyl-9H-carbazol-3-yl)phenyl]spiro-9,9'-bifluoren-2-amine (abbreviation: PCBASF), 2-[N-(9-phenylcarbazol-3-yl)-N-phenylamino]spiro-9,9'-bifluorene (abbreviation: PCASF), 2,7-bis[N-(4-diphenylaminophenyl)-N-phenylamino]-spiro-9,9'-bifluorene (abbreviation: DPA2SF), N-[4-(9H-carbazol-9-yl)phenyl]-N-(4-phenyl)phenylaniline (abbreviation: YGA1BP), and N,N'-bis[4-(carbazol-9-yl)phenyl]-N,N'-diphenyl-9,9-dimethylfluorene-2,7-diamine (abbreviation: YGA2F). Other examples are amine compounds, carbazole compounds, thiophene compounds, furan compounds, fluorene compounds; triphenylene compounds; phenanthrene compounds, and the like such as 3-[4-(1-naphthyl)-phenyl]-9-phenyl-9H-carbazole (abbreviation: PCPN), 3-[4-(9-phenanthryl)-phenyl]-9-phenyl-9H-carbazole (abbreviation: PCPPn), 3,3'-bis(9-phenyl-9H-carbazole) (abbreviation: PCCP), 1,3-bis(N-carbazolyl)benzene (abbreviation: mCP), 3,6-bis(3,5-diphenylphenyl)-9-phenylcarbazole (abbreviation: CzTP), 3,6-di(9H-carbazol-9-yl)-9-phenyl-9H-carbazole (abbreviation: PhCzGI), 2,8-di(9H-carbazol-9-yl)-dibenzothiophene (abbreviation: Cz2DBT), 4-{3-[3-(9-phenyl-9H-fluoren-9-yl)phenyl]phenyl}dibenzofuran (abbreviation: mmDBFFLBi-II), 4,4',4''-(benzene-1,3,5-triyl)tri(dibenzofuran) (abbreviation: DBF3P-II), 1,3,5-tri(dibenzothiophen-4-yl)-benzene (abbreviated as DBT3P-II), 2,8-diphenyl-4-[4-(9-phenyl-9H-fluoren-9-yl)phenyl]dibenzothiophene (abbreviation: DBTFLP-III), 4-[4-(9-phenyl-9H-fluoren-9-yl)phenyl]-6-phenyldibenzothiophene (abbreviation: DBTFLP-IV), and 4-[3-(triphenylen-2-yl)phenyl]dibenzothiophene (abbreviation: mDBTPTp-II). Among the above compounds, compounds including a pyrrole skeleton, a furan skeleton, a thiophene skeleton, or an aromatic amine skeleton are preferred because of their high stability and reliability. In addition, the compounds having such skeletons have a high hole-transport property to contribute to a reduction in driving voltage.

It is preferable that the host material and the phosphorescent material be selected such that the emission peak of the host material overlaps with an absorption band, specifically an absorption band on the longest wavelength side, of a triplet metal to ligand charge transfer (MLCT) transition of the phosphorescent material. This makes it possible to provide a light-emitting element with drastically improved emission efficiency. Note that in the case where a thermally activated delayed fluorescent material is used instead of the phosphorescent material, it is preferable that the absorption band on the longest wavelength side be a singlet absorption band.

Note that the host material may be a mixture of a plurality of kinds of substances, and in the case of using a mixed host material, it is preferable to mix a material having an electron-transport property with a material having a hole-transport property. By mixing the material having an electron-transport property with the material having a hole-transport property, the carrier transport property of the light-emitting layer can be easily adjusted and a recombination region can be easily controlled. The content ratio (weight ratio) of the material having an electron-transport property to the material having a hole-transport property is preferably 1:9 to 9:1.

An exciplex may be formed by these mixed materials. It is preferable that the combination of the materials be selected so as to form an exciplex that exhibits light emission whose wavelength overlaps with a wavelength of a lowest-energy-side absorption band of the light-emitting material, in which case excitation energy is transferred smoothly from the exciplex to the light-emitting material, light emission can be obtained efficiently from the light-emitting material, and the driving voltage can be reduced.

In the light-emitting layer, a material other than the host material and the light-emitting material may be contained. Besides the above-mentioned materials, an inorganic compound or a high molecular compound (e.g., an oligomer, a dendrimer, and a polymer) may be used.

In the case of using quantum dots as the light-emitting material in the light-emitting layer, the thickness of the light-emitting layer is set to 3 nm to 100 nm, preferably 10 nm to 100 nm, and the light-emitting layer is made to contain 1 volume % to 100 volume % of the quantum dots. Note that it is preferable that the light-emitting layer be composed of the quantum dots. To form a light-emitting layer in which the quantum dots are dispersed as light-emitting materials in host materials, the quantum dots may be dispersed in the host materials, or the host materials and the quantum dots may be dissolved or dispersed in an appropriate liquid medium, and then a wet process (e.g., a spin coating method, a casting method, a die coating method, blade coating method, a roll coating method, an ink-jet method, a printing method, a spray coating method, a curtain coating method, or a Langmuir-Blodgett method) may be employed. For a light-emitting layer containing a phosphorescent substance, a vacuum evaporation method, as well as the wet process, can be suitably employed.

An example of the liquid medium used for the wet process is an organic solvent of ketones such as methyl ethyl ketone and cyclohexanone; fatty acid esters such as ethyl acetate; halogenated hydrocarbons such as dichlorobenzene; aromatic hydrocarbons such as toluene, xylene, mesitylene, and cyclohexylbenzene; aliphatic hydrocarbons such as cyclohexane, decalin, and dodecane; dimethylformamide (DMF); dimethyl sulfoxide (DMSO); or the like.

[Hole-Injection Layer and Hole-Transport Layer]

The hole-injection layer $419_{HIL}$, injects holes to the light-emitting layer $419_{EML(R)}$, the light-emitting layer $419_{EML(G)}$, and the light-emitting layer $419_{EML(B)}$ through the hole-transport layer $419_{HTL}$ having a high hole-transport property, and contains a hole-transport material and an acceptor substance. When a hole-transport material and an acceptor substance are contained, electrons are extracted from the hole-transport material by the acceptor substance to generate holes, and the holes are injected into the light-emitting layer $419_{EML(R)}$, the light-emitting layer $419_{EML(G)}$, and the light-emitting layer $419_{EML(B)}$ through the hole-transport layer $419_{HTL}$. Note that the hole-transport layer $419_{HTL}$ is formed with a hole-transport material.

As the hole-transport materials used for the hole-injection layer $419_{HIL}$ and the hole-transport layer $419_{HTL}$, the above-described hole-transport materials that can be used for the light-emitting layer $419_{EML(R)}$, the light-emitting layer $419_{EML(G)}$, and the light-emitting layer $419_{EML(B)}$ can be used.

Examples of the acceptor substance that is used for the hole-injection layer $419_{HIL}$ include oxides of metals belonging to Groups 4 to 8 of the periodic table. Specifically, molybdenum oxide is particularly preferable.

The hole-injection layers $419_{HIL}$ in the light-emitting elements may be formed with different materials and may have different thicknesses depending on circumstances. The hole-transport layers $419_{HTL}$ in the light-emitting elements may be formed with different materials and may have different thicknesses depending on circumstances.

[Electron-Transport Layer]

For the electron-transport layer $419_{ETL}$, the above-described electron-transport materials for the light-emitting layer $419_{EML(R)}$, the light-emitting layer $419_{EML(G)}$, and the light-emitting layer $419_{EML(B)}$ can be used.

[Electron-Injection Layer]

The electron-injection layer $419_{EIL}$ is a layer containing a substance with a high electron-injection property. For the electron-injection layer $419_{EIL}$, an alkali metal, an alkaline earth metal, or a compound thereof, such as lithium fluoride (LiF), cesium fluoride (CsF), calcium fluoride ($CaF_2$), or lithium oxide ($LiO_x$), can be used. Alternatively, a rare earth metal compound such as erbium fluoride ($ErF_3$) can be used. Electride may also be used for the electron-injection layer $419_{EIL}$. Examples of the electride include a substance in which electrons are added at high concentration to calcium oxide-aluminum oxide.

Alternatively, the electron-injection layer $419_{EIL}$ may be formed using a composite material in which an organic compound and an electron donor (donor) are mixed. The composite material is superior in an electron-injection property and an electron-transport property, since electrons are generated in the organic compound by the electron donor. The organic compound here is preferably a material excellent in transporting the generated electrons; specifically, for example, the substances for forming the electron-transport layer $419_{ETL}$ (e.g., a metal complex or a heteroaromatic compound) can be used. As the electron donor, a substance showing an electron-donating property with respect to the organic compound may be used. Specifically, an alkali metal, an alkaline earth metal, and a rare earth metal are preferable, and lithium, cesium, magnesium, calcium, erbium, ytterbium, and the like are given. Furthermore, an alkali metal oxide or an alkaline earth metal oxide is preferable, and for example, lithium oxide, calcium oxide, barium oxide, and the like can be given. Alternatively, Lewis base such as magnesium oxide can also be used. An organic compound such as tetrathiafulvalene (abbreviation: TTF) can also be used.

The electron-injection layers $419_{EIL}$ in the light-emitting elements may be formed with different materials and may have different thicknesses depending on circumstances. The electron-transport layers $419_{ETL}$ in the light-emitting elements may be formed with different materials and may have different thicknesses depending on circumstances.

<2-2. Method for Manufacturing Display Element>

Next, a method for manufacturing the display element 12 of one embodiment of the present invention is described below with reference to FIG. 61A to 61C and FIGS. 62A and 62B.

FIGS. 61A to 61C and FIGS. 62A and 62B are cross-sectional views illustrating the method for manufacturing the display element 12 of one embodiment of the present invention. The method for manufacturing the display element 12 described below includes first to fifth steps.

[First Step]

Figure 61A:
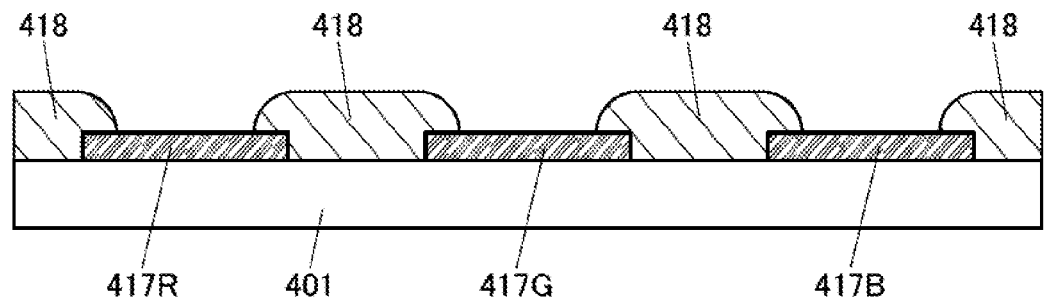
FIGS. 61A to 61C are cross-sectional views illustrating a method for manufacturing a display element.

In a first step, the conductive films (the conductive film 417R, the conductive film 417G, and the conductive film 417B) which function as lower electrodes of the light-emitting elements and the insulating films 418 that cover end portions of the conductive films of the light-emitting elements are formed (see FIG. 61A).

In the first step, there is no possibility of damaging a light-emitting layer containing an organic compound, and thus a variety of micromachining technologies can be employed. In this embodiment, a light-transmitting conductive film is formed over the substrate 401 by a sputtering method, the conductive film is patterned, and then the conductive film is processed into island shapes, whereby the conductive film 417R, the conductive film 417G, and the conductive film 417B are formed.

Next, the insulating films 418 are formed to cover the end portions of the conductive film 417R, the conductive film 417G, and the conductive film 417B. Note that the insulating films 418 have openings that overlap with the conductive films (the conductive film 417R, the conductive film 417G, and the conductive film 417B). The conductive films exposed in the openings function as the lower electrodes of the light-emitting elements.

In this embodiment, in the first step, ITO is used for the conductive films 417R, 417G, and 417B, and an acrylic resin is used for the insulating film 418.

Note that transistors or the like may be formed over the substrate 401 before the first step. The transistors may be electrically connected to the conductive films (the conductive film 417R, the conductive film 417G, and the conductive film 417B).

[Second Step]

Figure 61B:
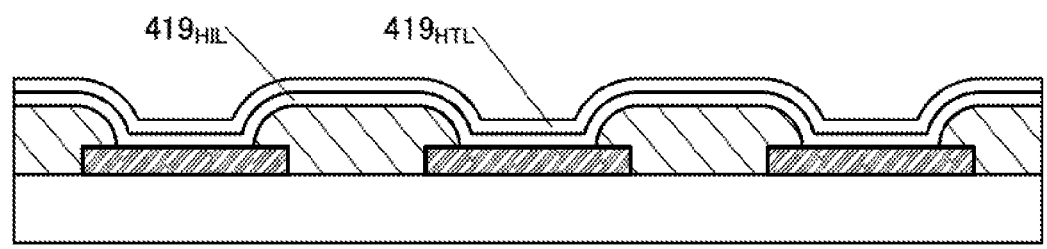

In the second step, the hole-injection layer $419_{HIL}$ and the hole-transport layer $419_{HTL}$ are formed over the conductive films (the conductive film 417R, the conductive film 417G, and the conductive film 417B) and the insulating films 418 (see FIG. 61B).

In the second step, the hole-injection layer $419_{HIL}$ and the hole-transport layer $419_{HTL}$ are formed by evaporation of an organic compound. Note that the hole-injection layer $419_{HIL}$ and the hole-transport layer $419_{HTL}$ can be used in common by the light-emitting elements, leading to a reduced manufacturing cost and improved productivity.

[Third Step]

Figure 61C:
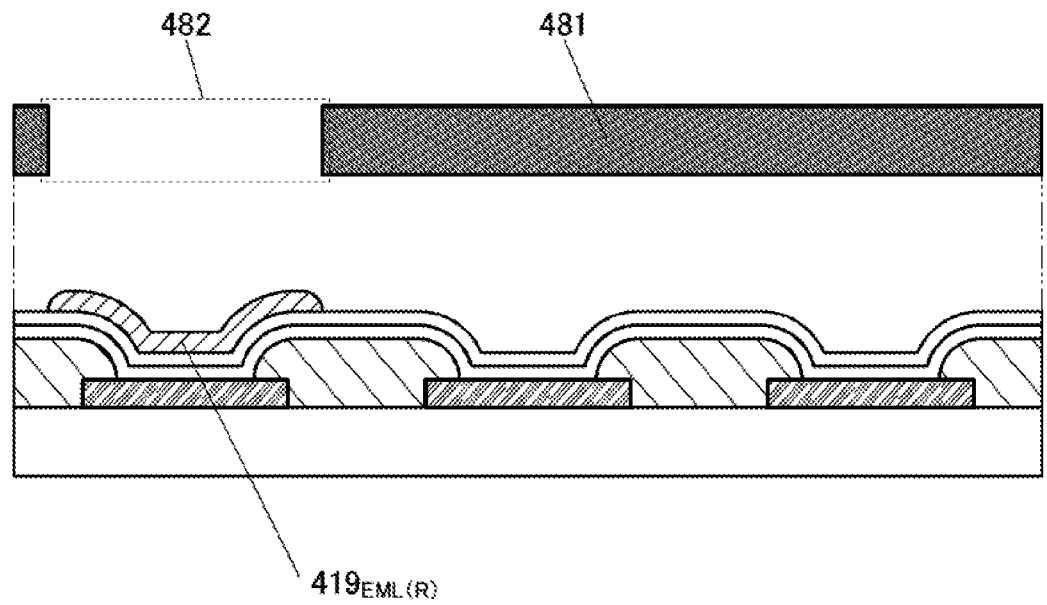

In the third step, the light-emitting layer $419_{EML(R)}$ is formed using a shadow mask 481 (see FIG. 61C).

Note that the shadow mask 481 is a shielding plate provided with an opening 482 and formed of foil of a metal or the like with a thickness greater than or equal to several tens of micrometers or a plate of a metal or the like with a thickness greater than or equal to several hundreds of micrometers.

In the third step, the substrate 401 is introduced into an evaporation apparatus, and the shadow mask 481 is provided on the evaporation source (not illustrated) side. Next, alignment for providing the opening 482 of the shadow mask 481 in a desired position is performed. Here, the opening 482 is disposed to overlap with the conductive film 417R, and an organic compound is deposited above the shadow mask 481, whereby the light-emitting layer $419_{EML(R)}$ is formed.

[Fourth Step]

Figure 62A:
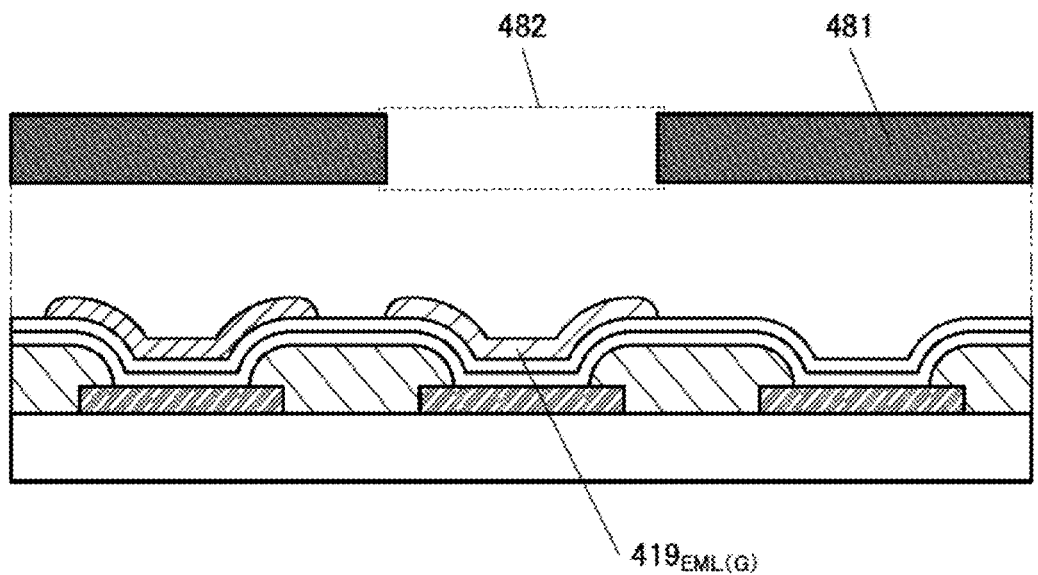
FIGS. 62A and 62B are cross-sectional views illustrating a method for manufacturing a display element.

In the fourth step, the light-emitting layer $419_{EML(G)}$ is formed over the hole-transport layer $419_{HTL}$ (see FIG. 62A).

In the fourth step, the substrate 401 is introduced into an evaporation apparatus, and the shadow mask 481 is provided on the evaporation source (not illustrated) side. Next, alignment for providing the opening 482 of the shadow mask 481 in a desired position is performed. Here, the opening 482 is disposed to overlap with the conductive film 417G, and an organic compound is deposited above the shadow mask 481, whereby the light-emitting layer $419_{EML(G)}$ is formed.

In one embodiment of the present invention, as described in Embodiment 1, a space between adjacent pixels is wide, and thus the margin for separate coloring is wide.

Therefore, a display element with a high manufacturing yield can be provided.

[Fifth Step]

Figure 62B:
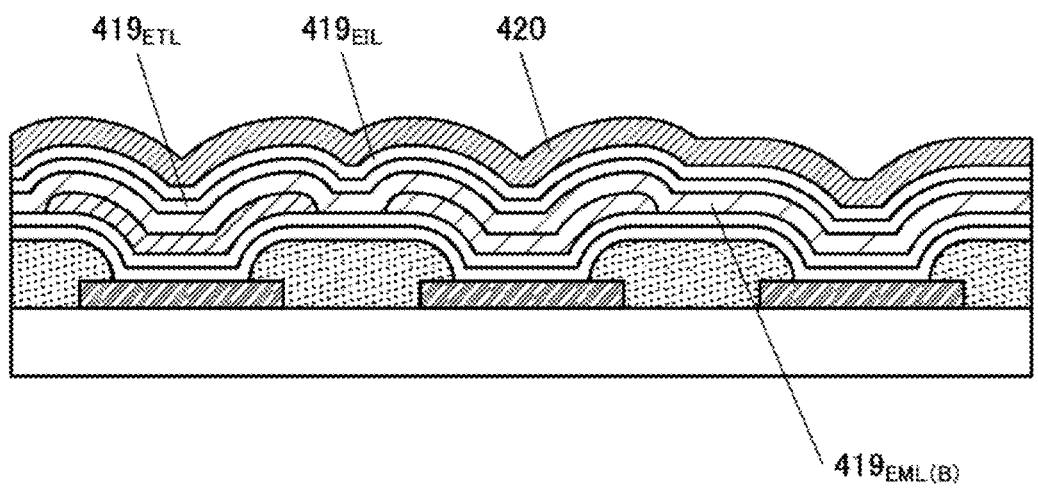

In the fifth step, the light-emitting layer $419_{EML(B)}$, the electron-transport layer $419_{ETL}$, the electron-injection layer $419_{EIL}$, and the conductive film 420 are formed over the hole-transport layer $419_{HTL}$, the light-emitting layer $419_{EML(R)}$, and the light-emitting layer $419_{EML(G)}$ (see FIG. 62B).

Note that the light-emitting layer $419_{EML(B)}$, the electron-transport layer $419_{ETL}$, the electron-injection layer $419_{EIL}$, and the conductive film 420 can be used in common by the light-emitting elements, leading to a reduced manufacturing cost and improved productivity.

Through the above steps, the display element 12 illustrated in FIG. 60 can be manufactured. Note that in this embodiment, a separate coloring process of the light-emitting elements can be two steps, coloring for the light-emitting layer $419_{EML(R)}$ and coloring for the light-emitting layer $419_{EML(G)}$. As a result, a method for manufacturing a display element with high productivity can be provided. Consequently, a method for manufacturing a novel display element in which a decrease in aperture ratio accompanied by fabrication of a high-definition element is suppressed can be provided. Alternatively, a novel display element that can be produced easily can be provided.

This embodiment can be combined as appropriate with any of the other embodiments.

Embodiment 3

In this embodiment, a transistor that can be used for the display device of one embodiment of the present invention is described in detail.

In this embodiment, a transistor with a staggered (top-gate) structure is described with reference to FIGS. 63A to 63C, FIGS. 64A to 64C, FIGS. 65A and 65B, FIGS. 66A and 66B, FIGS. 67A and 67B, FIGS. 68A and 68B, FIGS. 69A and 69B, and FIGS. 70A to 70C.

<3-1. Structure Example 1 of Transistor>

Figure 63A:
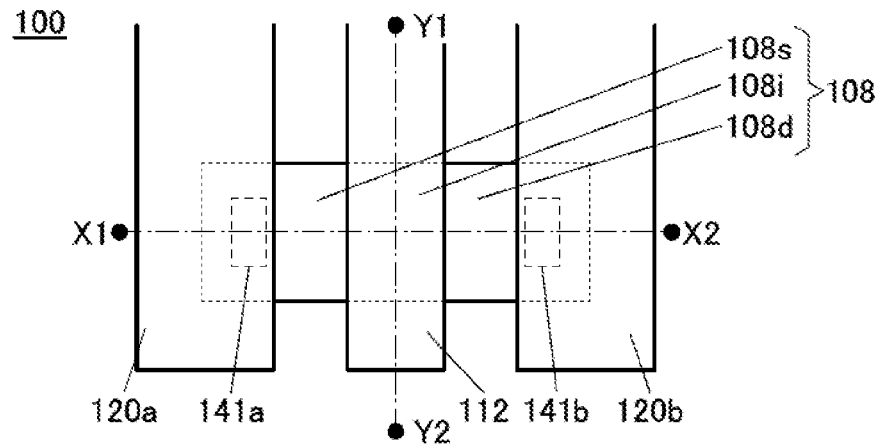
FIGS. 63A to 63C are a top view and cross-sectional views illustrating a semiconductor device.
Figure 63B:
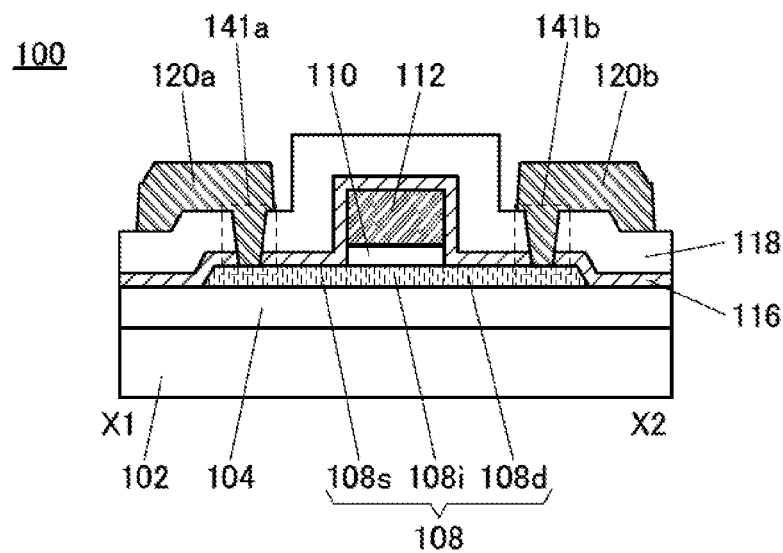
Figure 63C:
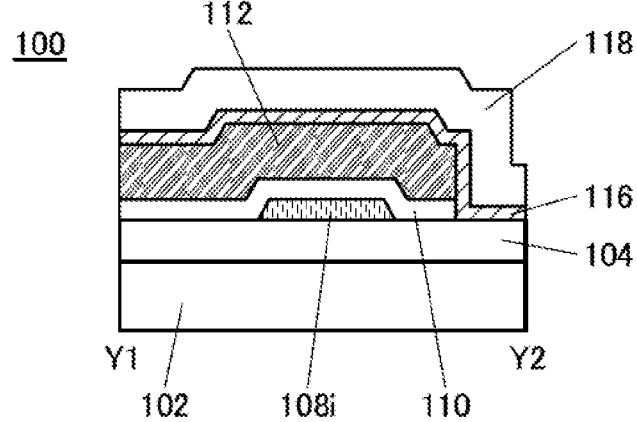

FIG. 63A is a top view of a transistor 100. FIG. 63B is a cross-sectional view taken along a dashed-dotted line X1-X2 in FIG. 63A. FIG. 63C is a cross-sectional view taken along a dashed-dotted line Y1-Y2 in FIG. 63A. For clarity, FIGS. 63A to 63 do not illustrate some components such as an insulating film 110. As in FIG. 63A, some components are not illustrated in some cases in top views of transistors described below. Furthermore, the direction of the dashed-dotted line X1-X2 may be referred to as a channel length (L) direction, and the direction of the dashed-dotted line Y1-Y2 may be referred to as a channel width (W) direction.

The transistor 100 illustrated in FIGS. 63A to 63C includes an insulating film 104 over a substrate 102; a metal oxide film 108 over the insulating film 104; the insulating film 110 over the metal oxide film 108; a conductive film 112 over the insulating film 110; and an insulating film 116 over the insulating film 104, the metal oxide film 108, and the conductive film 112. Note that the metal oxide film 108 includes a channel region 108i overlapping with the conductive film 112, a source region 108s in contact with the insulating film 116, and a drain region 108d in contact with the insulating film 116.

Furthermore, the insulating film 116 contains nitrogen or hydrogen. The insulating film 116 is in contact with the source region 108s and the drain region 108d, so that nitrogen or hydrogen that is contained in the insulating film 116 is added to the source region 108s and the drain region 108d. The source region 108s and the drain region 108d each have a high carrier density when nitrogen or hydrogen is added thereto.

The transistor 100 may further include an insulating film 118 over the insulating film 116, a conductive film 120a electrically connected to the source region 108s through an opening 141a provided in the insulating films 116 and 118, and a conductive film 120b electrically connected to the drain region 108d through an opening 141b provided in the insulating films 116 and 118.

In this specification and the like, the insulating film 104 may be referred to as a first insulating film, the insulating film 110 may be referred to as a second insulating film, the insulating film 116 may be referred to as a third insulating film, and the insulating film 118 may be referred to as a fourth insulating film. The conductive film 112 functions as a gate electrode, the conductive film 120a functions as a source electrode, and the conductive film 120b functions as a drain electrode.

The insulating film 110 functions as a gate insulating film. The insulating film 110 includes an excess oxygen region. Since the insulating film 110 includes the excess oxygen region, excess oxygen can be supplied to the channel region 108i included in the metal oxide film 108. As a result, oxygen vacancies that might be formed in the channel region 108i can be filled with excess oxygen, which can provide a highly reliable semiconductor device.

To supply excess oxygen to the metal oxide film 108, excess oxygen may be supplied to the insulating film 104 that is formed under the metal oxide film 108. However, in that case, excess oxygen contained in the insulating film 104 might also be supplied to the source region 108s and the drain region 108d included in the metal oxide film 108. When excess oxygen is supplied to the source region 108s and the drain region 108d, the resistance of the source region 108s and the drain region 108d might be increased.

In contrast, in the structure in which the insulating film 110 formed over the metal oxide film 108 contains excess oxygen, excess oxygen can be selectively supplied only to the channel region 108i. Alternatively, the carrier density of the source and drain regions 108s and 108d can be selectively increased after excess oxygen is supplied to the channel region 108i and the source and drain regions 108s and 108d, in which case an increase in the resistance of the source and drain regions 108s and 108d can be prevented.

Furthermore, each of the source region 108s and the drain region 108d included in the metal oxide film 108 preferably contains an element that forms an oxygen vacancy or an element that is bonded to an oxygen vacancy. Typical examples of the element that forms an oxygen vacancy or the element that is bonded to an oxygen vacancy include hydrogen, boron, carbon, nitrogen, fluorine, phosphorus, sulfur, chlorine, titanium, and a rare gas. Typical examples of the rare gas element are helium, neon, argon, krypton, and xenon. The element that forms an oxygen vacancy is diffused from the insulating film 116 to the source region 108s and the drain region 108d in the case where the insulating film 116 contains one or more kinds of such elements. In addition or alternatively, the element that forms an oxygen vacancy is added to the source region 108s and the drain region 108d by impurity addition treatment.

An impurity element added to the metal oxide film cuts a bond between a metal element and oxygen in the metal oxide film, so that an oxygen vacancy is formed. Alternatively, when an impurity element is added to the metal oxide film, oxygen bonded to a metal element in the metal oxide film is bonded to the impurity element and detached from the metal element, so that an oxygen vacancy is formed. As a result, the metal oxide film has a higher carrier density, and thus, the conductivity thereof becomes higher.

Next, details of the components of the semiconductor device in FIGS. 63A to 63C are described.

[Substrate]

As the substrate 102, any of a variety of substrates can be used without particular limitation. The substrate 102 can be formed using a material similar to that of the substrates 401, 452, 652, and 670 described in Embodiment 1.

[First Insulating Film]

The insulating film 104 can be formed by a sputtering method, a CVD method, an evaporation method, a pulsed laser deposition (PLD) method, a printing method, a coating method, or the like as appropriate. For example, the insulating film 104 can be formed to have a single-layer structure or stacked-layer structure of an oxide insulating film and/or a nitride insulating film. To improve the properties of the interface with the metal oxide film 108, at least a region of the insulating film 104 which is in contact with the metal oxide film 108 is preferably formed using an oxide insulating film. When the insulating film 104 is formed using an oxide insulating film from which oxygen is released by heating, oxygen contained in the insulating film 104 can be moved to the metal oxide film 108 by heat treatment.

The thickness of the insulating film 104 can be greater than or equal to 50 nm, greater than or equal to 100 nm and less than or equal to 3000 nm, or greater than or equal to 200 nm and less than or equal to 1000 nm. By increasing the thickness of the insulating film 104, the amount of oxygen released from the insulating film 104 can be increased, and interface states at the interface between the insulating film 104 and the metal oxide film 108 and oxygen vacancies included in the channel region 108$i$ of the metal oxide film 108 can be reduced.

For example, the insulating film 104 can be formed to have a single-layer structure or stacked-layer structure of silicon oxide, silicon oxynitride, silicon nitride oxide, silicon nitride, aluminum oxide, hafnium oxide, gallium oxide, a Ga—Zn oxide, or the like. In this embodiment, the insulating film 104 has a stacked-layer structure of a silicon nitride film and a silicon oxynitride film. With the insulating film 104 having such a stack-layer structure including a silicon nitride film as a lower layer and a silicon oxynitride film as an upper layer, oxygen can be efficiently introduced into the metal oxide film 108.

[Metal Oxide Film]

The metal oxide film 108 can be formed using a material similar to that of the metal oxide films 409$a$, 409$b$, and 409$c$ described in Embodiment 1.

[Second Insulating Film]

The insulating film 110 functions as a gate insulating film of the transistor 100. In addition, the insulating film 110 has a function of supplying oxygen to the metal oxide film 108, particularly to the channel region 108$i$. The insulating film 110 can be formed to have a single-layer structure or a stacked-layer structure of an oxide insulating film or a nitride insulating film, for example. To improve the interface properties with the metal oxide film 108, a region which is in the insulating film 110 and in contact with the metal oxide film 108 is preferably formed using at least an oxide insulating film. For example, silicon oxide, silicon oxynitride, silicon nitride oxide, or silicon nitride may be used for the insulating film 110.

The thickness of the insulating film 110 can be greater than or equal to 5 nm and less than or equal to 400 nm, greater than or equal to 5 nm and less than or equal to 300 nm, or greater than or equal to 10 nm and less than or equal to 250 nm.

It is preferable that the insulating film 110 have few defects and typically have as few signals observed by electron spin resonance (ESR) spectroscopy as possible. Examples of the signals include a signal due to an E' center observed at a g-factor of 2.001. Note that the E' center is due to the dangling bond of silicon. As the insulating film 110, a silicon oxide film or a silicon oxynitride film whose spin density of a signal due to the E' center is lower than or equal to $3\times10^{17}$ spins/cm$^3$ and preferably lower than or equal to $5\times10^{16}$ spins/cm$^3$ may be used.

In addition to the above-described signal, a signal due to nitrogen dioxide ($NO_2$) might be observed in the insulating film 110. The signal is divided into three signals according to the N nuclear spin; a first signal, a second signal, and a third signal. The first signal is observed at a g-factor of greater than or equal to 2.037 and less than or equal to 2.039. The second signal is observed at a g-factor of greater than or equal to 2.001 and less than or equal to 2.003. The third signal is observed at a g-factor of greater than or equal to 1.964 and less than or equal to 1.966.

It is suitable to use an insulating film whose spin density of a signal due to nitrogen dioxide ($NO_2$) is higher than or equal to $1\times10^{17}$ spins/cm$^3$ and lower than $1\times10^{18}$ spins/cm$^3$ as the insulating film 110, for example.

Note that a nitrogen oxide ($NO_x$) such as a nitrogen dioxide ($NO_2$) forms a level in the insulating film 110. The level is positioned in the energy gap of the metal oxide film 108. Thus, when nitrogen oxide ($NO_x$) is diffused to the interface between the insulating film 110 and the metal oxide film 108, an electron might be trapped by the level on the insulating film 110 side. As a result, the trapped electron remains in the vicinity of the interface between the insulating film 110 and the metal oxide film 108, leading to a positive shift of the threshold voltage of the transistor. Accordingly, the use of a film with a low nitrogen oxide content as the insulating film 110 can reduce a shift of the threshold voltage of the transistor.

As an insulating film that releases a small amount of nitrogen oxide ($NO_x$), for example, a silicon oxynitride film can be used. The silicon oxynitride film releases more ammonia than nitrogen oxide ($NO_x$) in thermal desorption spectroscopy (TDS); the typical released amount of ammonia is greater than or equal to $1\times10^{18}$ molecules/cm$^3$ and less than or equal to $5\times10^{19}$ molecules/cm$^3$. Note that the released amount of ammonia is the total amount of ammonia released by heat treatment in a range of 50° C. to 650° C. or 50° C. to 550° C. in TDS.

Since nitrogen oxide ($NO_x$) reacts with ammonia and oxygen in heat treatment, the use of an insulating film that releases a large amount of ammonia reduces nitrogen oxide ($NO_x$).

Note that in the case where the insulating film 110 is analyzed by SIMS, nitrogen concentration in the film is preferably lower than or equal to $6\times10^{20}$ atoms/cm$^3$.

The insulating film 110 may be formed using a high-k material such as hafnium silicate ($HfSiO_x$), hafnium silicate to which nitrogen is added ($HfSi_xO_yN_z$), hafnium aluminate to which nitrogen is added ($HfAl_xO_yN_z$), or hafnium oxide. The use of such a high-k material enables a reduction in gate leakage current of a transistor.

[Third Insulating Film]

The insulating film 116 contains nitrogen or hydrogen. The insulating film 116 may contain fluorine. As the insulating film 116, for example, a nitride insulating film can be used. The nitride insulating film can be formed using silicon nitride, silicon nitride oxide, silicon oxynitride, silicon nitride fluoride, silicon fluoronitride, or the like. The hydrogen concentration in the insulating film 116 is preferably higher than or equal to $1\times10^{22}$ atoms/cm$^3$. Furthermore, the insulating film 116 is in contact with the source region 108s and the drain region 108d of the metal oxide film 108. Thus, the concentration of an impurity (nitrogen or hydrogen) in the source region 108s and the drain region 108d in contact with the insulating film 116 is increased, leading to an increase in the carrier density of the source region 108s and the drain region 108d.

[Fourth Insulating Film]

As the insulating film 118, an oxide insulating film can be used. Alternatively, a stack including an oxide insulating film and a nitride insulating film can be used as the insulating film 118. The insulating film 118 can be formed using, for example, silicon oxide, silicon oxynitride, silicon nitride oxide, aluminum oxide, hafnium oxide, gallium oxide, or Ga—Zn oxide.

Furthermore, the insulating film 118 preferably functions as a barrier film against hydrogen, water, and the like from the outside.

The thickness of the insulating film 118 can be greater than or equal to 30 nm and less than or equal to 500 nm, or greater than or equal to 100 nm and less than or equal to 400 nm.

[Conductive Film]

The conductive films 112, 120a, and 120b can be formed by a sputtering method, a vacuum evaporation method, a pulsed laser deposition (PLD) method, a thermal CVD method, or the like. The conductive films 112, 120a, and 120b can be formed using materials similar to those of the conductive films 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 417, 420, and 608 in FIG. 26 and the conductive films 402, 403a, 403b, 403c, 405a, 405b, 405c, 405d, 407a, 407b, 407c, 407d, 407e, 411a, 411b, 411c, 414a, 414b, 414c, 414d, 414e, 414f, 414g, 414h, 417, 420, 422, and 608 in FIG. 27 which are described in Embodiment 1.

The conductive films 112, 120a, and 120b can also be formed using a light-transmitting conductive material such as ITO, indium oxide containing tungsten oxide, indium zinc oxide containing tungsten oxide, indium oxide containing titanium oxide, indium tin oxide containing titanium oxide, indium zinc oxide, or ITSO. It is also possible to have a layered structure formed using the above light-transmitting conductive material and the above metal element.

Note that a metal oxide semiconductor typified by an In—Ga—Zn oxide may be used for the conductive film 112. The metal oxide can have a high carrier density when nitrogen or hydrogen is supplied from the insulating film 116. In other words, the metal oxide functions as an oxide conductor (OC). Accordingly, the metal oxide can be used for a gate electrode.

The conductive film 112 can have, for example, a single-layer structure of an oxide conductor (OC), a single-layer structure of a metal film, or a stacked-layer structure of an oxide conductor (OC) and a metal film.

Note that it is suitable that the conductive film 112 has a single-layer structure of a light-shielding metal film or a stacked-layer structure of an oxide conductor (OC) and a light-shielding metal film because the channel region 108i formed under the conductive film 112 can be shielded from light. In the case where the conductive film 112 has a stacked-layer structure of an oxide semiconductor or an oxide conductor (OC) and a light-shielding metal film, formation of a metal film (e.g., a titanium film or a tungsten film) over the oxide semiconductor or the oxide conductor (OC) produces any of the following effects: the resistance of the oxide semiconductor or the oxide conductor (OC) is reduced by the diffusion of the constituent element of the metal film to the oxide semiconductor or oxide conductor (OC) side, the resistance is reduced by damage (e.g., sputtering damage) during the deposition of the metal film, and the resistance is reduced when oxygen vacancies are formed by the diffusion of oxygen in the oxide semiconductor or the oxide conductor (OC) to the metal film.

The thickness of the conductive films 112, 120a, and 120b can be greater than or equal to 30 nm and less than or equal to 500 nm, or greater than or equal to 100 nm and less than or equal to 400 nm.

<3-2. Structure Example 2 of Semiconductor Device>

Next, a structure of a transistor different from that in FIGS. 63A to 63C is described with reference to FIGS. 64A to 64C.

Figure 64A:
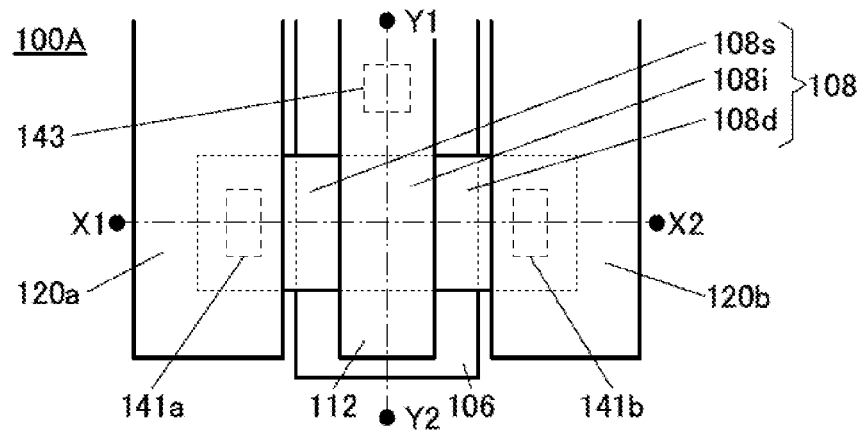
FIGS. 64A to 64C are a top view and cross-sectional views illustrating a semiconductor device.

FIG. 64A is a top view of a transistor 100A. FIG. 64B is a cross-sectional view taken along the dashed-dotted line X1-X2 in FIG. 64A. FIG. 64C is a cross-sectional view taken along the dashed-dotted line Y1-Y2 in FIG. 64A.

Figure 64B:
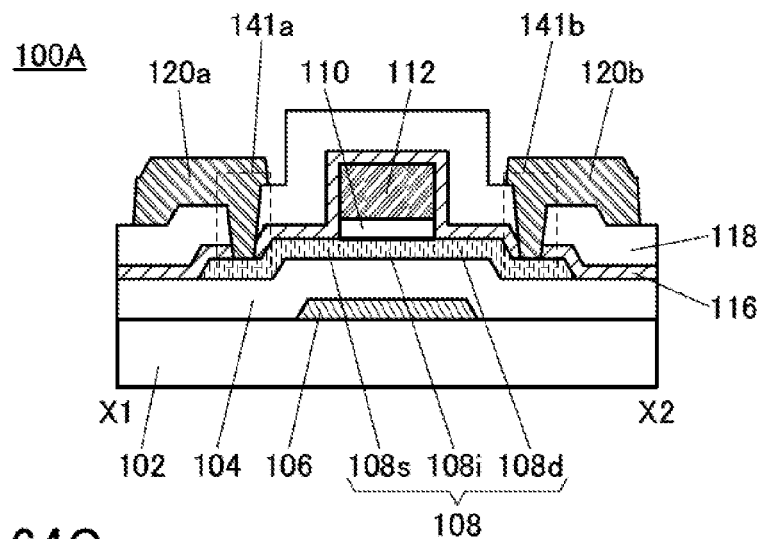
Figure 64C:
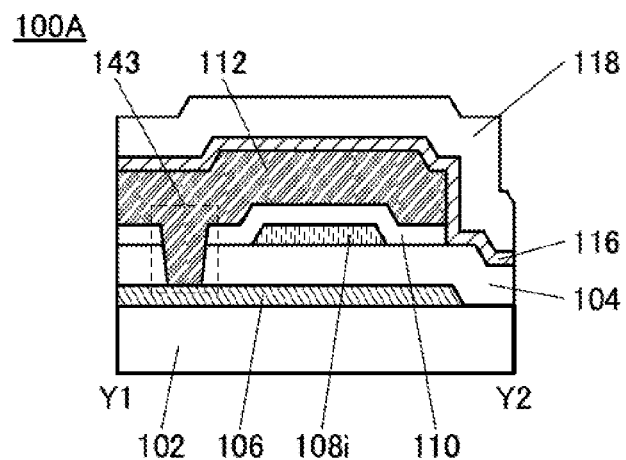

The transistor 100A illustrated in FIGS. 64A to 64C includes a conductive film 106 over the substrate 102; the insulating film 104 over the conductive film 106; the metal oxide film 108 over the insulating film 104; the insulating film 110 over the metal oxide film 108; the conductive film 112 over the insulating film 110; and the insulating film 116 over the insulating film 104, the metal oxide film 108, and the conductive film 112. Note that the metal oxide film 108 includes the channel region 108i overlapping with the conductive film 112, the source region 108s in contact with the insulating film 116, and the drain region 108d in contact with the insulating film 116.

The transistor 100A includes the conductive film 106 and an opening 143 in addition to the components of the transistor 100 described above.

Note that the opening 143 is provided in the insulating films 104 and 110. The conductive film 106 is electrically connected to the conductive film 112 through the opening 143. Thus, the same potential is applied to the conductive film 106 and the conductive film 112. Note that different potentials may be applied to the conductive film 106 and the conductive film 112 without providing the opening 143.

Alternatively, the conductive film 106 may be used as a light-shielding film without providing the opening 143. When the conductive film 106 is formed using a light-shielding material, for example, light irradiating the channel region 108i from the bottom can be reduced.

In the case of the structure of the transistor 100A, the conductive film 106 functions as a first gate electrode (also referred to as a bottom-gate electrode), the conductive film 112 functions as a second gate electrode (also referred to as a top-gate electrode), the insulating film 104 functions as a first gate insulating film, and the insulating film 110 functions as a second gate insulating film.

The conductive film 106 can be formed using a material similar to the above-described materials of the conductive films 112, 120a, and 120b. It is particularly suitable to use a material containing copper for the conductive film 106 because the resistance can be reduced. It is suitable that, for example, each of the conductive films 106, 120a, and 120b has a stacked-layer structure in which a copper film is over a titanium nitride film, a tantalum nitride film, or a tungsten film. In that case, when the transistor 100A is used as a pixel transistor and/or a driving transistor of a display device, parasitic capacitance generated between the conductive films 106 and 120a and between the conductive films 106 and 120b can be reduced. Thus, the conductive films 106, 120a, and 120b can be used not only as the first gate electrode, the source electrode, and the drain electrode of the transistor 100A, but also as power source supply wirings, signal supply wirings, connection wirings, or the like of the display device.

In this manner, unlike the transistor 100 described above, the transistor 100A in FIGS. 64A to 64C has a structure in which a conductive film functioning as a gate electrode is provided over and under the metal oxide film 108. As in the transistor 100A, a semiconductor device of one embodiment of the present invention may have a plurality of gate electrodes.

As illustrated in FIG. 64C, the metal oxide film 108 faces the conductive film 106 functioning as a first gate electrode and the conductive film 112 functioning as a second gate electrode and is positioned between the two conductive films functioning as the gate electrodes.

Furthermore, the length of the conductive film 112 in the channel width direction is larger than the length of the metal oxide film 108 in the channel width direction. In the channel width direction, the whole metal oxide film 108 is covered with the conductive film 112 with the insulating film 110 placed therebetween. Since the conductive film 112 is connected to the conductive film 106 through the opening 143 provided in the insulating films 104 and 110, a side surface of the metal oxide film 108 in the channel width direction faces the conductive film 112 with the insulating film 110 placed therebetween.

In other words, in the channel width direction of the transistor 100A, the conductive films 106 and 112 are connected to each other through the opening 143 provided in the insulating films 104 and 110, and the conductive films 106 and 112 surround the metal oxide film 108 with the insulating films 104 and 110 placed therebetween.

Such a structure enables the metal oxide film 108 included in the transistor 100A to be electrically surrounded by electric fields of the conductive film 106 functioning as a first gate electrode and the conductive film 112 functioning as a second gate electrode. A device structure of a transistor, like that of the transistor 100A, in which electric fields of a first gate electrode and a second gate electrode electrically surround the metal oxide film 108 in which a channel region is formed can be referred to as a surrounded channel (S-channel) structure.

Since the transistor 100A has the S-channel structure, an electric field for inducing a channel can be effectively applied to the metal oxide film 108 by the conductive film 106 or the conductive film 112; thus, the current drive capability of the transistor 100A can be improved and high on-state current characteristics can be obtained. As a result of the high on-state current, it is possible to reduce the size of the transistor 100A. Furthermore, since the transistor 100A has a structure in which the metal oxide film 108 is surrounded by the conductive film 106 and the conductive film 112, the mechanical strength of the transistor 100A can be increased.

When seen in the channel width direction of the transistor 100A, an opening different from the opening 143 may be formed on the side of the metal oxide film 108 on which the opening 143 is not formed.

An opening different from the opening 143 may be formed in the insulating films 104 and 110 on a side opposite to the opening 143 with respect to the metal oxide film 108 in the channel width direction of the transistor 100A in order to electrically connect the conductive film 106 and the conductive film 112. By providing the opening different from the opening 143 in the insulating films 104 and 110, an electric field for inducing a channel can be applied to the metal oxide film 108 also on the side opposite to the opening 143.

When a transistor has a pair of gate electrodes between which a semiconductor film is positioned as in the transistor 100A, one of the gate electrodes may be supplied with a signal A, and the other gate electrode may be supplied with a fixed potential $V_b$. Alternatively, one of the gate electrodes may be supplied with the signal A, and the other gate electrode may be supplied with a signal B. Alternatively, one of the gate electrodes may be supplied with a fixed potential $V_a$, and the other gate electrode may be supplied with the fixed potential $V_b$.

The signal A is, for example, a signal for controlling the on/off state. The signal A may be a digital signal with two kinds of potentials, a potential V1 and a potential V2 (V1>V2). For example, the potential V1 can be a high power supply potential, and the potential V2 can be a low power supply potential. The signal A may be an analog signal.

The fixed potential $V_b$ is, for example, a potential for controlling a threshold voltage $V_{thA}$ of the transistor. The fixed potential $V_b$ may be the potential V1 or the potential V2. In that case, a potential generator circuit for generating the fixed potential $V_b$ is not necessary, which is preferable. The fixed potential $V_b$ may be different from the potential V1 or the potential V2. When the fixed potential $V_b$ is low, the threshold voltage $V_{thA}$ can be high in some cases. As a result, the drain current flowing when the gate-source voltage $V_{gs}$ is 0 V can be reduced, and leakage current in a circuit including the transistor can be reduced in some cases. The fixed potential $V_b$ may be, for example, lower than the low power supply potential. Meanwhile, a high fixed potential $V_b$ can lower the threshold voltage $V_{thA}$ in some cases. As a result, the drain current flowing when the gate-source voltage $V_{gs}$ is a high power supply potential and the operating speed of the circuit including the transistor can be increased in some cases. The fixed potential $V_b$ may be, for example, higher than the low power supply potential.

The signal B is, for example, a signal for controlling the on/off state. The signal B may be a digital signal with two kinds of potentials, a potential V3 and a potential V4 (V3>V4). For example, the potential V3 can be a high power supply potential, and the potential V4 can be a low power supply potential. The signal B may be an analog signal.

When both the signal A and the signal B are digital signals, the signal B may have the same digital value as the signal A. In this case, it may be possible to increase the on-state current of the transistor and the operating speed of the circuit including the transistor. Here, the potential V1 and the potential V2 of the signal A may be different from the potential V3 and the potential V4 of the signal B. For example, if a gate insulating film for the gate to which the signal B is input is thicker than a gate insulating film for the gate to which the signal A is input, the potential amplitude of the signal B (V3-V4) may be larger than the potential amplitude of the signal A (V1-V2). In this manner, the influence of the signal A and that of the signal B on the on/off state of the transistor can be substantially the same in some cases.

When both the signal A and the signal B are digital signals, the signal B may have a digital value different from that of the signal A. In this case, the signal A and the signal B can separately control the transistor, and thus, higher performance can be achieved. The transistor which is, for example, an n-channel transistor can function by itself as a NAND circuit, a NOR circuit, or the like in the following case: the transistor is turned on only when the signal A has the potential V1 and the signal B has the potential V3, or the transistor is turned off only when the signal A has the potential V2 and the signal B has the potential V4. The signal B may be a signal for controlling the threshold voltage $V_{thA}$. For example, the potential of the signal B in a period in which the circuit including the transistor operates may be different from the potential of the signal B in a period in which the circuit does not operate. The potential of the signal B may vary depending on the operation mode of the circuit. In this case, the potential of the signal B is not changed as frequently as the potential of the signal A in some cases.

When both the signal A and the signal B are analog signals, the signal B may be an analog signal having the same potential as the signal A, an analog signal whose potential is a constant times the potential of the signal A, an analog signal whose potential is higher or lower than the potential of the signal A by a constant, or the like. In this case, it may be possible to increase the on-state current of the transistor and the operating speed of the circuit including the transistor. The signal B may be an analog signal different from the signal A. In this case, the signal A and the signal B can separately control the transistor, and thus, higher performance can be achieved.

The signal A may be a digital signal, and the signal B may be an analog signal. Alternatively, the signal A may be an analog signal, and the signal B may be a digital signal.

When both of the gate electrodes of the transistor are supplied with the fixed potentials, the transistor can function as an element equivalent to a resistor in some cases. For example, in the case where the transistor is an n-channel transistor, the effective resistance of the transistor can be sometimes low (high) when the fixed potential $V_a$ or the fixed potential $V_b$ is high (low). When both the fixed potential $V_a$ and the fixed potential $V_b$ are high (low), the effective resistance can be lower (higher) than that of a transistor with only one gate in some cases.

Except for the above-mentioned points, the transistor 100A has a structure and an effect similar to those of the transistor 100 described above.

<3-3. Structure Example 3 of Transistor>

Next, structures of a transistor different from that in FIGS. 64A to 64C are described with reference to FIGS. 65A and 65B, FIGS. 66A and 66B, FIGS. 67A and 67B, FIGS. 68A and 68B, FIGS. 69A and 69B, and FIGS. 70A to 70C.

Figure 65A:
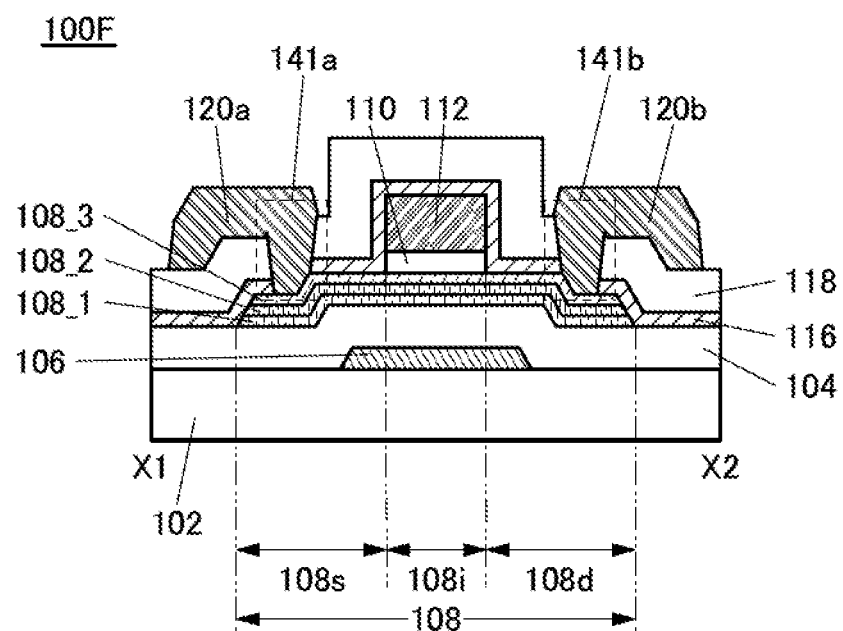
FIGS. 65A and 65B are cross-sectional views illustrating a semiconductor device.
Figure 65B:
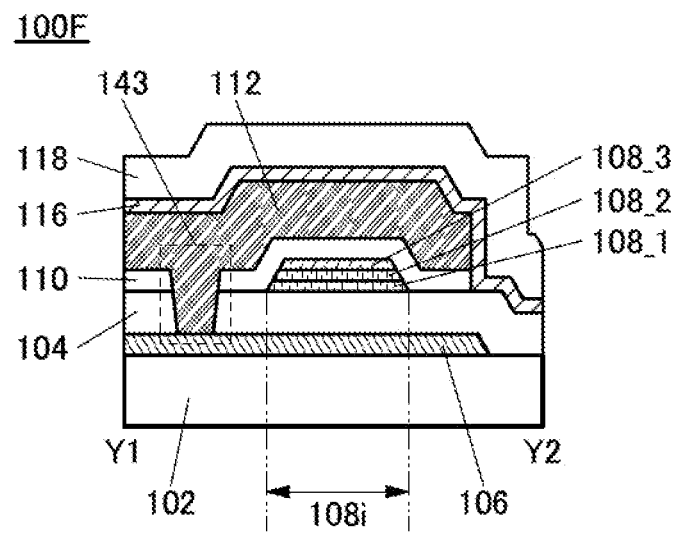
Figure 66A:
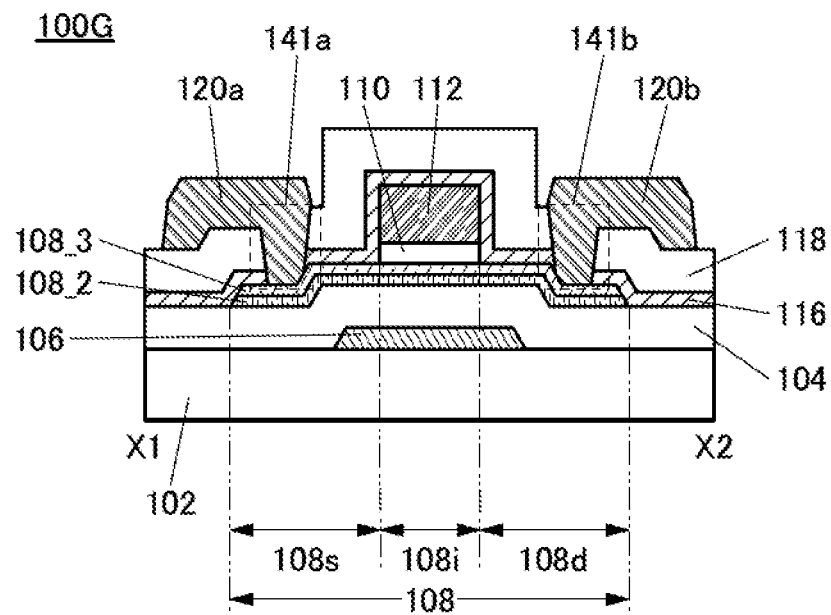
FIGS. 66A and 66B are cross-sectional views illustrating a semiconductor device.
Figure 66B:
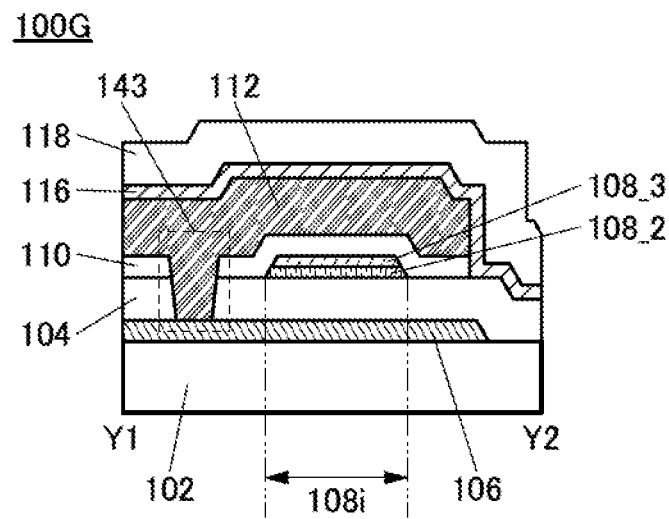
Figure 67A:
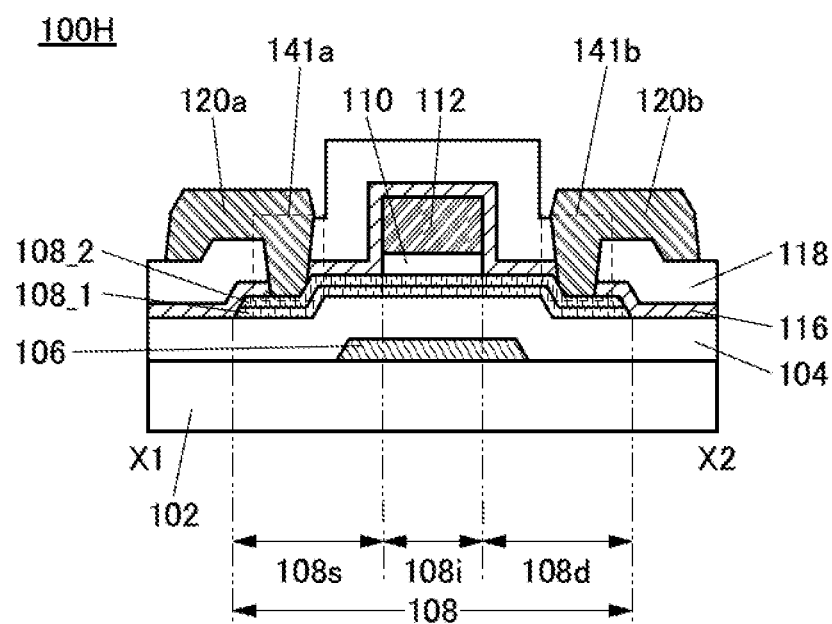
FIGS. 67A and 67B are cross-sectional views illustrating a semiconductor device.
Figure 67B:
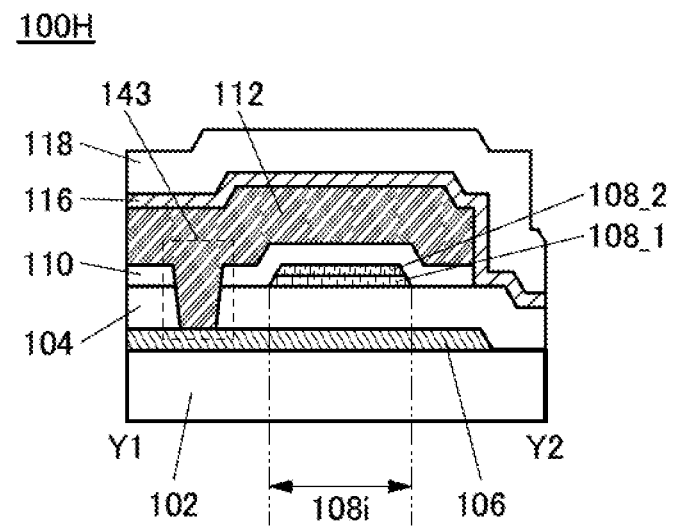
Figure 68A:
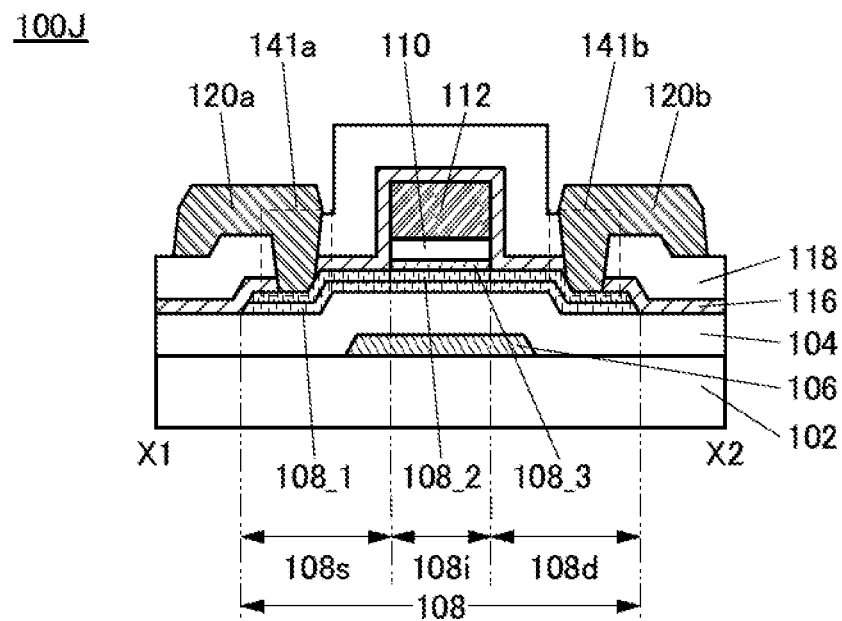
FIGS. 68A and 68B are cross-sectional views illustrating a semiconductor device.
Figure 68B:
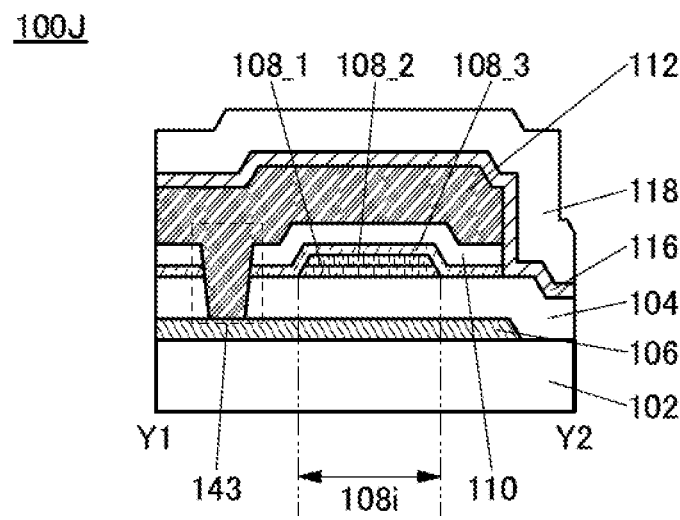
Figure 69A:
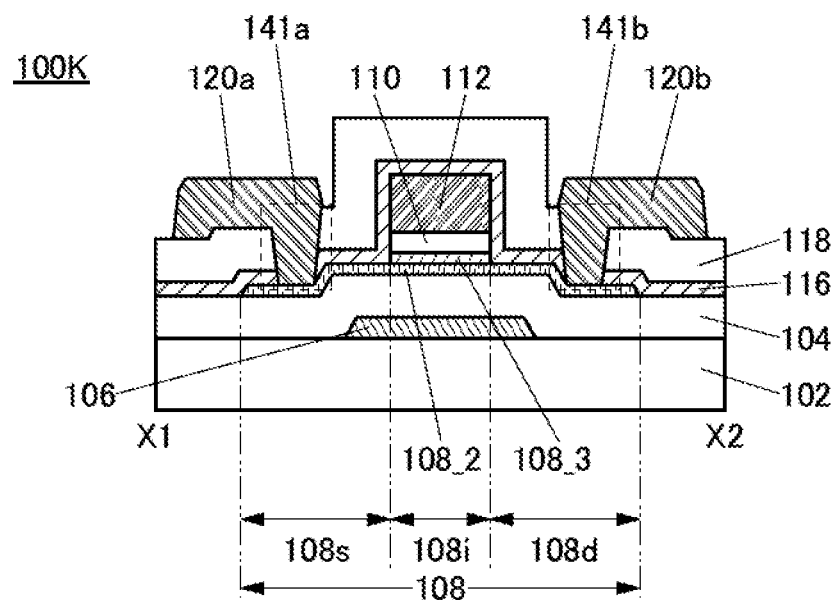
FIGS. 69A and 69B are cross-sectional views illustrating a semiconductor device.
Figure 69B:
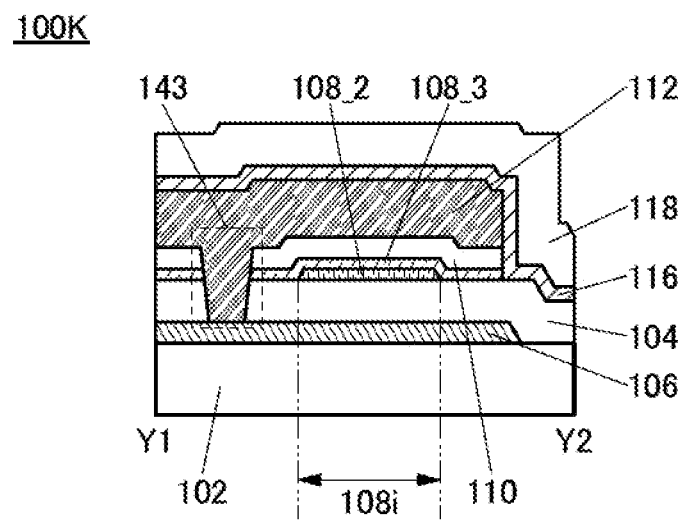

FIGS. 65A and 65B are cross-sectional views of a transistor 100F. FIGS. 66A and 66B are cross-sectional views of a transistor 100G. FIGS. 67A and 67B are cross-sectional views of a transistor 100H. FIGS. 68A and 68B are cross-sectional views of a transistor 100J. FIGS. 69A and 69B are cross-sectional views of a transistor 100K. Note that top views of the transistor 100F, the transistor 100G, the transistor 100H, the transistor 100J, and the transistor 100K are similar to that of the transistor 100A illustrated in FIG. 64A and thus are not described here.

The transistors 100F, 100G, 100H, 100J, and 100K are different from the above-described transistor 100A in the structure of the metal oxide film 108. The other components of the transistors are similar to those of the transistor 100A described above and have similar effects.

The metal oxide film 108 of the transistor 100F illustrated in FIGS. 65A and 65B includes a metal oxide film 108_1 over the insulating film 104, a metal oxide film 108_2 over the metal oxide film 108_1, and a metal oxide film 108_3 over the metal oxide film 108_2. The channel region 108i, the source region 108s, and the drain region 108d each have a three-layer structure of the metal oxide film 108_1, the metal oxide film 108_2, and the metal oxide film 108_3.

The metal oxide film 108 of the transistor 100G illustrated in FIGS. 66A and 66B includes the metal oxide film 108_2 over the insulating film 104, and the metal oxide film 108_3 over the metal oxide film 108_2. The channel region 108i, the source region 108s, and the drain region 108d each have a two-layer structure of the metal oxide film 108_2 and the metal oxide film 108_3.

The metal oxide film 108 of the transistor 100H illustrated in FIGS. 67A and 67B includes the metal oxide film 108_1 over the insulating film 104, and the metal oxide film 108_2 over the metal oxide film 108_1. The channel region 108i, the source region 108s, and the drain region 108d each have a two-layer structure of the metal oxide film 108_1 and the metal oxide film 108_2.

The metal oxide film 108 of the transistor 100J illustrated in FIGS. 68A and 68B includes the metal oxide film 108_1 over the insulating film 104, the metal oxide film 108_2 over the metal oxide film 108_1, and the metal oxide film 108_3 over the metal oxide film 108_2. The channel region 108i has a three-layer structure of the metal oxide film 108_1, the metal oxide film 108_2, and the metal oxide film 108_3. The source region 108s and the drain region 108d each have a two-layer structure of the metal oxide film 108_1 and the metal oxide film 108_2. Note that in the cross section of the transistor 100J in the channel width (W) direction, the metal oxide film 108_3 covers side surfaces of the metal oxide film 108_1 and the metal oxide film 108_2.

The metal oxide film 108 of the transistor 100K illustrated in FIGS. 69A and 69B includes the metal oxide film 108_2 over the insulating film 104, and the metal oxide film 108_3 over the metal oxide film 108_2. The channel region 108i has a two-layer structure of the metal oxide film 108_2 and the metal oxide film 108_3. The source region 108s and the drain region 108d each have a single-layer structure of the metal oxide film 108_2. Note that in the cross section of the transistor 100K in the channel width (W) direction, the metal oxide film 108_3 covers side surfaces of the metal oxide film 108_2.

A side surface of the channel region 108i in the channel width (W) direction or a region in the vicinity of the side surface is easily damaged by processing, resulting in a defect (e.g., oxygen vacancy), or easily contaminated by an impurity attached thereto. Therefore, even when the channel region 108i is substantially intrinsic, stress such as an electric field applied thereto activates the side surface of the channel region 108i in the channel width (W) direction or the region in the vicinity of the side surface and turns it into a low-resistance (n-type) region easily. Moreover, if the side surface of the channel region 108i in the channel width (W) direction or the region in the vicinity of the side surface is an n-type region, a parasitic channel may be formed because the n-type region serves as a carrier path.

Thus, in the transistor 100J and the transistor 100K, the channel region 108i has a stacked-layer structure and side surfaces of the channel region 108i in the channel width (W) direction are covered with one layer of the stacked layers. With such a structure, defects on or in the vicinity of the side surfaces of the channel region 108i can be suppressed or adhesion of an impurity to the side surfaces of the channel region 108i or to regions in the vicinity of the side surfaces can be reduced.

<3-4. Band Structure>

Here, a band structure of the insulating film 104, the metal oxide films 108_1, 108_2, and 108_3, and the insulating film 110, a band structure of the insulating film 104, the metal oxide films 108_2 and 108_3, and the insulating film 110, and a band structure of the insulating film 104, the metal oxide films 108_1 and 108_2, and the insulating film 110 are described with reference to FIGS. 70A to 70C. Note that FIGS. 70A to 70C are each a band structure of the channel region 108i.

Figure 70A:
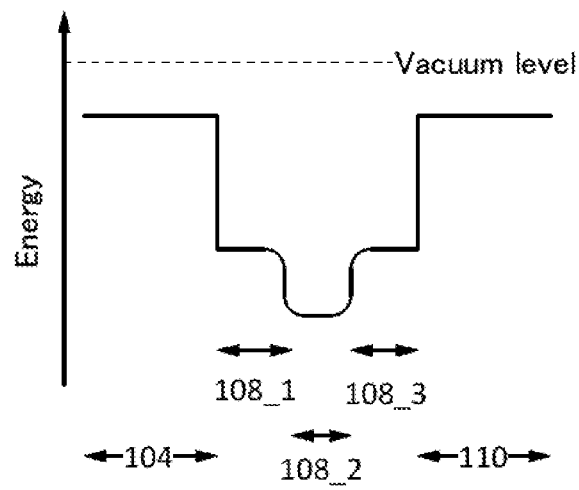
FIGS. 70A to 70C illustrate band structures.

FIG. 70A shows an example of a band structure in the thickness direction of a stack including the insulating film 104, the metal oxide films 108_1, 108_2, and 108_3, and the insulating film 110. FIG. 70B shows an example of a band structure in the thickness direction of a stack including the insulating film 104, the metal oxide films 108_2 and 108_3, and the insulating film 110. FIG. 70C shows an example of a band structure in the thickness direction of a stack including the insulating film 104, the metal oxide films 108_1 and 108_2, and the insulating film 110. For easy understanding, the band structures show the conduction band minimum ($E_c$) of the insulating film 104, the metal oxide films 108_1, 108_2, and 108_3, and the insulating film 110.

In the band structure of FIG. 70A, a silicon oxide film is used as each of the insulating films 104 and 110, a metal oxide film formed using a metal oxide target whose atomic ratio of In to Ga and Zn is 1:3:2 is used as the metal oxide film 108_1, a metal oxide film formed using a metal oxide target whose atomic ratio of In to Ga and Zn is 4:2:4.1 is used as the metal oxide film 108_2, and a metal oxide film formed using a metal oxide target whose atomic ratio of In to Ga and Zn is 1:3:2 is used as the metal oxide film 108_3.

Figure 70B:
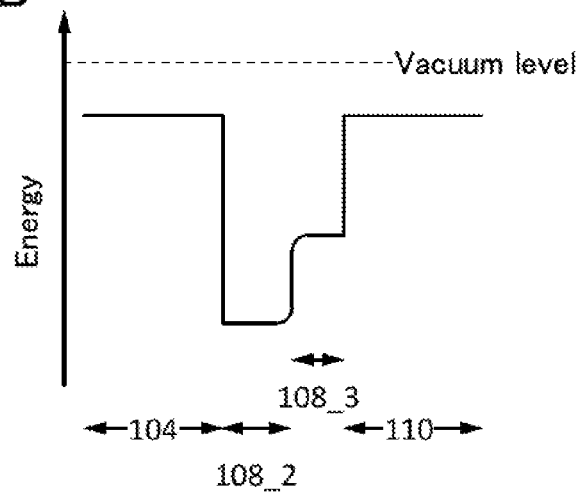
Figure 70C:
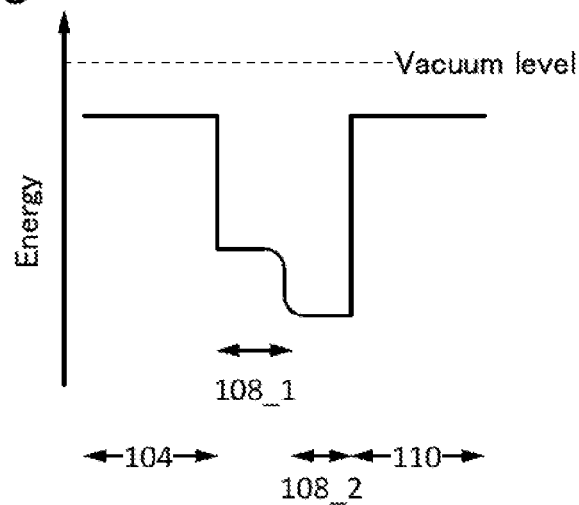

In the band structure of FIG. 70B, a silicon oxide film is used as each of the insulating films 104 and 110, a metal oxide film formed using a metal oxide target whose atomic ratio of In to Ga and Zn is 4:2:4.1 is used as the metal oxide film 108_2, and a metal oxide film formed using a metal oxide target whose atomic ratio of In to Ga and Zn is 1:3:2 is used as the metal oxide film 108_3.

In the band structure of FIG. 70C, a silicon oxide film is used as each of the insulating films 104 and 110, a metal oxide film formed using a metal oxide target whose atomic ratio of In to Ga and Zn is 1:3:2 is used as the metal oxide film 108_1, and a metal oxide film formed using a metal oxide target whose atomic ratio of In to Ga and Zn is 4:2:4.1 is used as the metal oxide film 108_2.

As illustrated in FIG. 70A, the conduction band minimum gradually varies between the metal oxide films 108_1, 108_2, and 108_3. As illustrated in FIG. 70B, the conduction band minimum gradually varies between the metal oxide films 108_2 and 108_3. As illustrated in FIG. 70C, the conduction band minimum gradually varies between the metal oxide films 108_1 and 108_2. In other words, the conduction band minimum is continuously changed or continuously connected. To obtain such a band structure, there exists no impurity, which forms a defect state such as a trap center or a recombination center, at the interface between the metal oxide films 108_1 and 108_2 or the interface between the metal oxide films 108_2 and 108_3.

To form a continuous junction between the metal oxide films 108_1, 108_2, and 108_3, it is necessary to form the films successively without exposure to the air with a multichamber deposition apparatus (sputtering apparatus) provided with a load lock chamber.

With the band structure of FIG. 70A, FIG. 70B, or FIG. 70C, the metal oxide film 108_2 serves as a well, and a channel region is formed in the metal oxide film 108_2 in the transistor with the stacked-layer structure. In such a structure, the metal oxide film 108_2 serves as a main path of a current. That is, the metal oxide film 108_2 functions as a channel region, and the metal oxide films 108_1 and 108_3 function as oxide insulating films. To prevent each of the metal oxide films 108_1 and 108_3 from functioning as part of a channel region, a material having sufficiently low conductivity is used for the metal oxide films 108_1 and 108_3. Thus, the metal oxide films 108_1 and 108_3 can be referred to as oxide insulating films in terms of their properties and functions.

By providing the metal oxide films 108_1 and 108_3, the metal oxide film 108_2 can be distanced away from trap states.

Note that without such a structure, the trap states might be more distant from the vacuum level than the conduction band minimum ($E_c$) of the metal oxide film 108_2 functioning as a channel region, so that electrons are likely to be accumulated in the trap states. When the electrons are accumulated in the trap states, the electrons become negative fixed electric charge, so that the threshold voltage of the transistor is shifted in the positive direction.

Therefore, it is preferable that the trap states be closer to the vacuum level than the conduction band minimum ($E_c$) of the metal oxide film 108_2. For example, the structure illustrated in FIG. 70A, FIG. 70B, or FIG. 70C inhibits accumulation of electrons in the trap states. As a result, the on-state current and the field-effect mobility of the transistor can be increased.

The conduction band minimum of each of the metal oxide films 108_1 and 108_3 is closer to the vacuum level than that of the metal oxide film 108_2. A typical difference between the conduction band minimum of the metal oxide film 108_2 and the conduction band minimum of each of the metal oxide films 108_1 and 108_3 is 0.15 eV or more or 0.5 eV or more and 2 eV or less or 1 eV or less. That is, the difference between the electron affinity of each of the metal oxide films 108_1 and 108_3 and the electron affinity of the metal oxide film 108_2 is 0.15 eV or more or 0.5 eV or more and 2 eV or less or 1 eV or less.

In such a structure, the metal oxide film 108_2 serves as a main path of a current. In other words, the metal oxide film 108_2 serves as a channel region, and the metal oxide films 108_1 and 108_3 function as oxide insulating films. In addition, by providing the metal oxide films 108_1 and 108_3, the metal oxide film 108_2 can be distanced away from trap states.

It is preferable that the metal oxide films 108_1 and 108_3 each include one or more metal elements constituting a part of the metal oxide film 108_2 in which a channel region is formed. With such a structure, interface scattering hardly occurs at the interface between the metal oxide film 108_1 and the metal oxide film 108_2 or at the interface between the metal oxide film 108_2 and the metal oxide film 108_3. Thus, the transistor can have high field-effect mobility because the movement of carriers is not hindered at the interface.

Furthermore, to inhibit generation of a difference in threshold voltage due to the value of the drain voltage, it is preferable to form the metal oxide films 108_1 and 108_3 using a material whose energy level of the conduction band minimum is closer to the vacuum level than that of the metal oxide film 108_2. To prevent each of the metal oxide films 108_1 and 108_3 from functioning as part of a channel region, a material having sufficiently low conductivity is used for the metal oxide films 108_1 and 108_3. Thus, the metal oxide films 108_1 and 108_3 can be referred to as oxide insulating films for such properties and/or functions. Alternatively, a material that has a smaller electron affinity (a difference between the vacuum level and the conduction band minimum) than the metal oxide film 108_2 and has a difference in the conduction band minimum from the metal oxide film 108_2 (band offset) is used for the metal oxide films 108_1 and 108_3. Furthermore, to inhibit generation of a difference in threshold voltage due to the value of the drain voltage, it is preferable to form the metal oxide films 108_1 and 108_3 using a material whose conduction band minimum is closer to the vacuum level than that of the metal oxide film 108_2. For example, a difference between the conduction band minimum of the metal oxide film 108_2 and the conduction band minimum of each of the metal oxide films 108_1 and 108_3 is preferably greater than or equal to 0.15 eV, more preferably greater than or equal to 0.5 eV, and less than or equal to 2 eV, more preferably less than or equal to 1 eV. That is, a difference in the electron affinity between each of the metal oxide films 108_1 and 108_3 and the metal oxide film 108_2 is preferably greater than or equal to 0.15 eV, more preferably greater than or equal to 0.5 eV, and less than or equal to 2 eV, more preferably less than or equal to 1 eV.

It is preferable that the metal oxide films 108_1 and 108_3 not have a spinel crystal structure. This is because if the metal oxide films 108_1 and 108_3 have a spinel crystal structure, constituent elements of the conductive films 120a and 120b might be diffused into the metal oxide film 108_2 at the interface between the spinel crystal structure and another region. Note that each of the metal oxide films 108_1 and 108_3 is preferably a CAAC-OS film described later, in which case a higher blocking property against constituent elements of the conductive films 120a and 120b, for example, copper elements, can be obtained.

Although the example where a metal oxide film formed using a metal oxide target whose atomic ratio of In to Ga and Zn is 1:3:2, is used as each of the metal oxide films 108_1 and 108_3 is described in this embodiment, one embodiment of the present invention is not limited thereto. For example, a metal oxide film formed using a metal oxide target whose atomic ratio of In to Ga and Zn is 1:1:1, 1:1:1.2, 1:3:4, 1:3:6, 1:4:5, 1:5:6, or 1:10:1 may be used as each of the metal oxide films 108_1 and 108_3. Alternatively, metal oxide films formed using a metal oxide target whose atomic ratio of Ga to Zn is 10:1 may be used as the metal oxide films 108_1 and 108_3. In that case, it is suitable that a metal oxide film formed using a metal oxide target whose atomic ratio of In to Ga and Zn is 1:1:1 is used as the metal oxide film 108_2 because the difference between the conduction band minimum of the metal oxide film 108_2 and the conduction band minimum of the metal oxide film 108_1 or 108_3 can be 0.6 eV or more.

When the metal oxide films 108_1 and 108_3 are formed using a metal oxide target whose atomic ratio of In to Ga and Zn is 1:1:1, the atomic ratio of In to Ga and Zn in the metal oxide films 108_1 and 108_3 might be 1:$\beta$1:$\beta$2 (0<$\beta$1≤2, 0<$\beta$2≤2). When the metal oxide films 108_1 and 108_3 are formed using a metal oxide target whose atomic ratio of In to Ga and Zn is 1:3:4, the atomic ratio of In to Ga and Zn in the metal oxide films 108_1 and 108_3 might be 1:$\beta$3:$\beta$4 (1≤$\beta$3≤5, 2≤$\beta$4≤6). When the metal oxide films 108_1 and 108_3 are formed using a metal oxide target whose atomic ratio of In to Ga and Zn is 1:3:6, the atomic ratio of In to Ga and Zn in the metal oxide films 108_1 and 108_3 might be 1:$\beta$5:$\beta$6 (1≤$\beta$5≤5, 4≤$\beta$6≤8).

The structure and method described in this embodiment can be used in appropriate combination with any of the other structures and methods described in the other embodiments.

Embodiment 4

In this embodiment, a transistor that can be used for the display device of one embodiment of the present invention is described in detail.

In this embodiment, an inverted staggered transistor is described with reference to FIGS. 71A to 71C, FIGS. 72A to 72C, FIGS. 73A to 73C, FIGS. 74A to 74C, and FIGS. 75A to 75D.

<4-1. Structure Example 1 of Transistor>

Figure 71A:
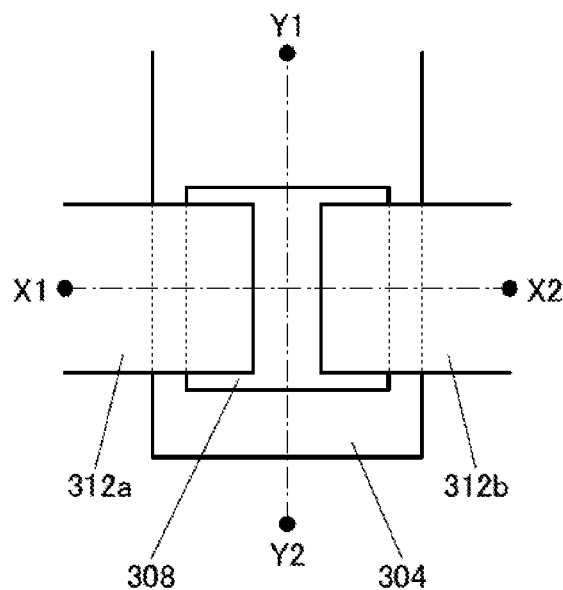
FIGS. 71A to 71C are a top view and cross-sectional views illustrating one embodiment of a transistor.
Figure 71B:
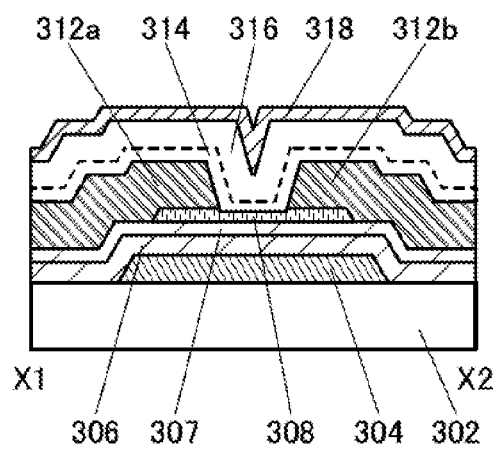
Figure 71C:
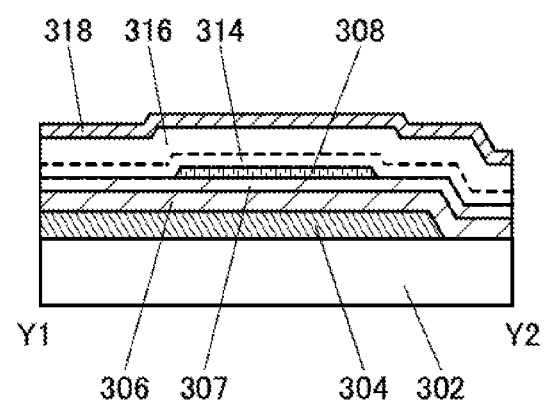

FIG. 71A is a top view of a transistor 300A. FIG. 71B is a cross-sectional view taken along dashed-dotted line X1-X2 in FIG. 71A. FIG. 71C is a cross-sectional view taken along dashed-dotted line Y1-Y2 in FIG. 71A. Note that in FIG. 71A, some components of the transistor 300A (e.g., an insulating film functioning as a gate insulating film) are not illustrated to avoid complexity. The direction of dashed-dotted line X1-X2 may be referred to as a channel length direction, and the direction of dashed-dotted line Y1-Y2 may be referred to as a channel width direction. As in FIG. 71A, some components are not illustrated in some cases in top views of transistors described below.

The transistor 300A includes a conductive film 304 functioning as a gate electrode over a substrate 302, an insulating film 306 over the substrate 302 and the conductive film 304, an insulating film 307 over the insulating film 306, a metal oxide film 308 over the insulating film 307, a conductive film 312a functioning as a source electrode electrically connected to the metal oxide film 308, and a conductive film 312b functioning as a drain electrode electrically connected to the metal oxide film 308. Over the transistor 300A, specifically, over the conductive films 312a and 312b and the metal oxide film 308, an insulating film 314, an insulating film 316, and an insulating film 318 are provided. The insulating films 314, 316, and 318 function as a protective insulating film for the transistor 300A.

<4-2. Structure Example 2 of Transistor>

Figure 72A:
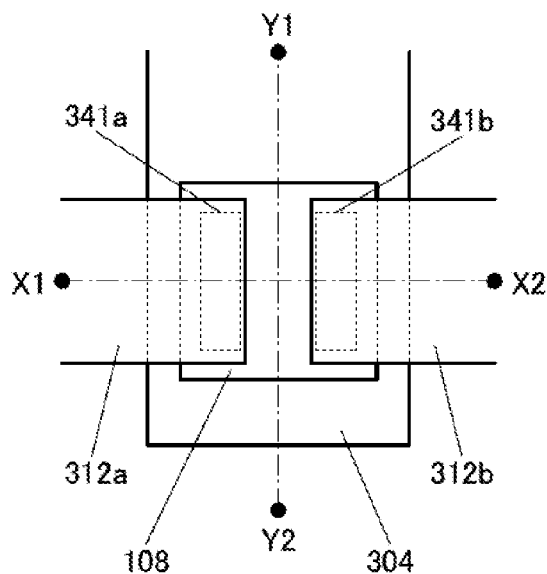
FIGS. 72A to 72C are a top view and cross-sectional views illustrating one embodiment of a transistor.
Figure 72B:
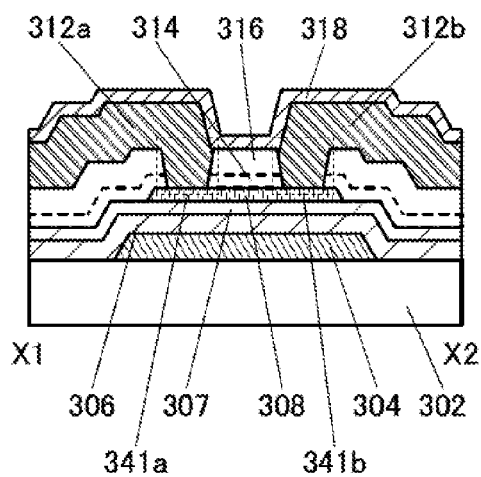
Figure 72C:
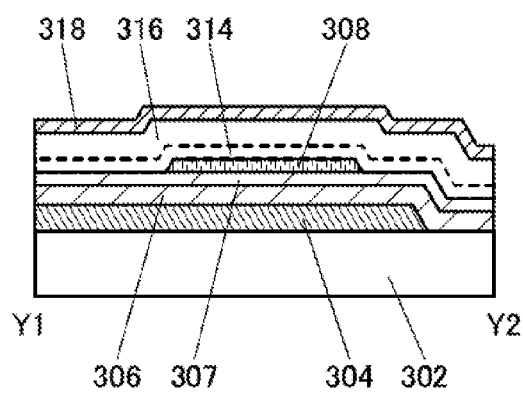

FIG. 72A is a top view of a transistor 300B. FIG. 72B is a cross-sectional view taken along dashed-dotted line X1-X2 in FIG. 72A. FIG. 72C is a cross-sectional view taken along dashed-dotted line Y1-Y2 in FIG. 72A.

The transistor 300B includes the conductive film 304 functioning as a gate electrode over the substrate 302, the insulating film 306 over the substrate 302 and the conductive film 304, the insulating film 307 over the insulating film 306, the metal oxide film 308 over the insulating film 307, the insulating film 314 over the metal oxide film 308, the insulating film 316 over the insulating film 314, the conductive film 312a functioning as a source electrode, and the conductive film 312b functioning as a drain electrode. The conductive film 312a is electrically connected to the metal oxide film 308 through an opening 341a provided in the insulating films 314 and 316. The conductive film 312b is electrically connected to the metal oxide film 308 through an opening 341b provided in the insulating films 314 and 316. Over the transistor 300B, specifically, over the conductive films 312a and 312b and the insulating film 316, the insulating film 318 is provided. The insulating films 314 and 316 function as a protective insulating film for the metal oxide film 308. The insulating film 318 functions as a protective insulating film for the transistor 300B.

The transistor 300A has a channel-etched structure, whereas the transistor 300B in FIGS. 72A to 72C has a channel-protective structure.

<4-3. Structure Example 3 of Transistor>

Figure 73A:
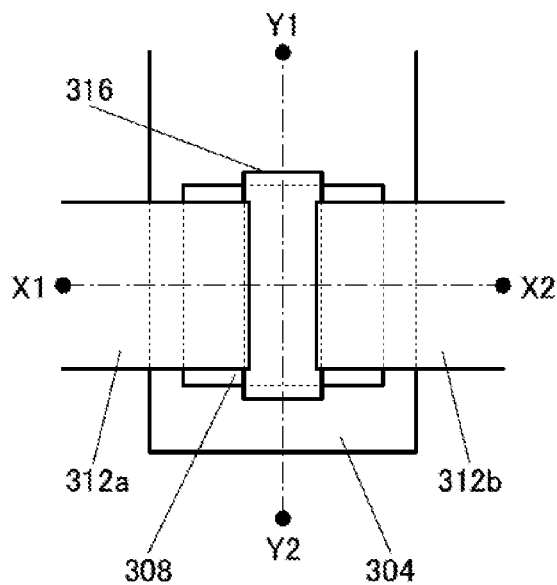
FIGS. 73A to 73C are a top view and cross-sectional views illustrating one embodiment of a transistor.
Figure 73B:
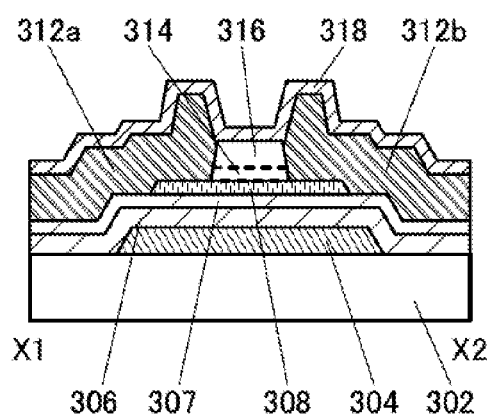
Figure 73C:
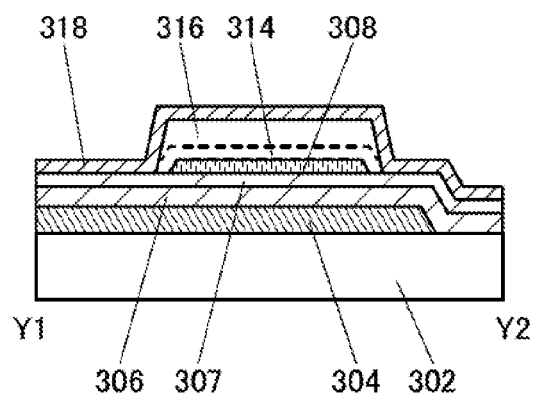

FIG. 73A is a top view of a transistor 300C. FIG. 73B is a cross-sectional view taken along dashed-dotted line X1-X2 in FIG. 73A. FIG. 73C is a cross-sectional view taken along dashed-dotted line Y1-Y2 in FIG. 73A.

The transistor 300C is different from the transistor 300B in FIGS. 72A to 72C in the shapes of the insulating films 314 and 316. Specifically, the insulating films 314 and 316 of the transistor 300C have island shapes and are provided over a channel region of the island-shaped oxide semiconductor film 308 over the insulating film 307. Note that the insulating films 314 and 316 may have a shape that covers at least one edge portion of the channel region of the metal oxide film 308 in the channel width direction as illustrated in FIGS. 73A and 73C. Other components are similar to those of the transistor 300B.

<4-4. Structure Example 4 of Transistor>

Figure 74A:
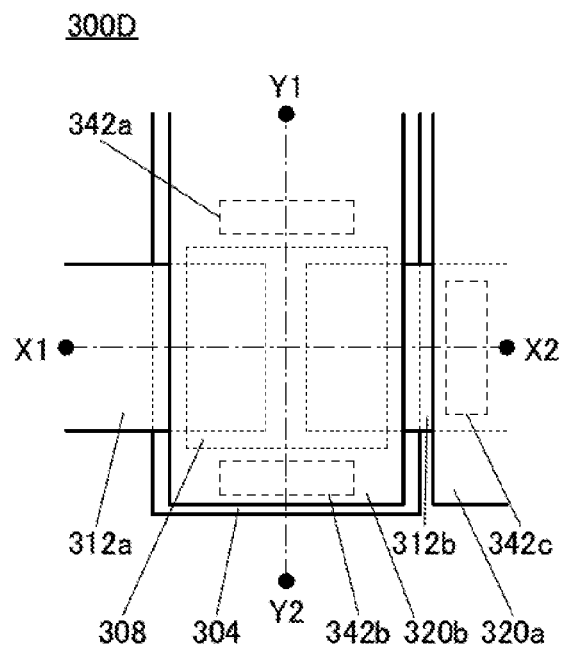
FIGS. 74A to 74C are a top view and cross-sectional views illustrating one embodiment of a transistor.
Figure 74B:
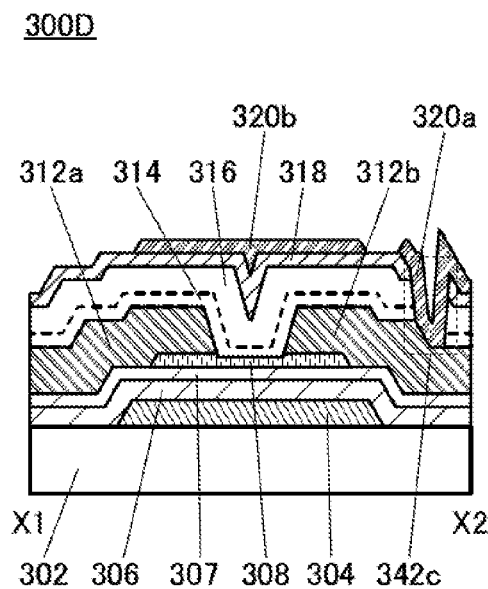
Figure 74C:
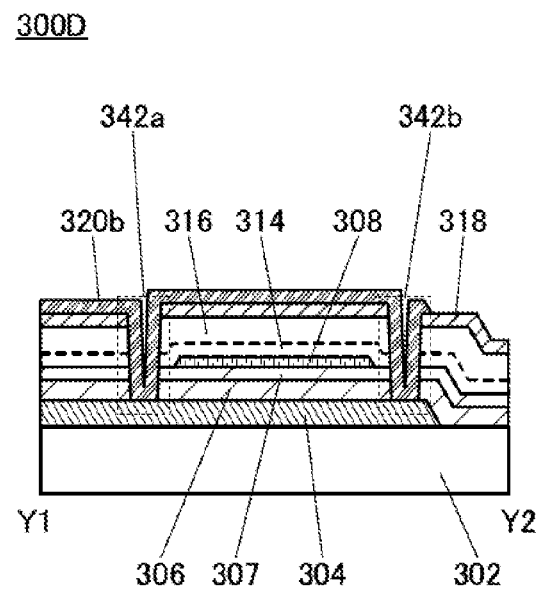

FIG. 74A is a top view of a transistor 300D. FIG. 74B is a cross-sectional view taken along dashed-dotted line X1-X2 in FIG. 74A. FIG. 74C is a cross-sectional view taken along dashed-dotted line Y1-Y2 in FIG. 74A.

The transistor 300D includes the conductive film 304 functioning as a first gate electrode over the substrate 302, the insulating film 306 over the substrate 302 and the conductive film 304, the insulating film 307 over the insulating film 306, the metal oxide film 308 over the insulating film 307, the insulating film 314 over the metal oxide film 308, the insulating film 316 over the insulating film 314, the conductive film 312a functioning as a source electrode, the conductive film 312b functioning as a drain electrode, the insulating film 318 over the conductive films 312a and 312b and the insulating film 316, and a conductive film 320a and a conductive film 320b over the insulating film 318. The conductive films 312a and 312b are electrically connected to the metal oxide film 308.

In the transistor 300D, the insulating films 314, 316, and 318 function as a second gate insulating film of the transistor 300D. Furthermore, the conductive film 320a in the transistor 300D functions as a pixel electrode used for the display device. The conductive film 320a is connected to the conductive film 312b through an opening 342c provided in the insulating films 314, 316, and 318. In the transistor 300D, the conductive film 320b functions as a second gate electrode (also referred to as a back gate electrode).

As illustrated in FIG. 74C, the conductive film 320b is connected to the conductive film 304, which functions as the first gate electrode, in an opening 342a and an opening 342b provided in the insulating films 306, 307, 314, 316, and 318. Thus, the same potential is applied to the conductive film 320b and the conductive film 304.

The structure of the transistor 300D is not limited to that described above, in which the openings 342a and 342b are provided so that the conductive film 320b is connected to the conductive film 304. For example, a structure in which only one of the openings 342a and 342b is provided so that the conductive film 320b is connected to the conductive film 304, or a structure in which the conductive film 320b is not connected to the conductive film 304 without providing the openings 342a and 342b may be employed. Note that in the case where the conductive film 320b is not connected to the conductive film 304, it is possible to apply different potentials to the conductive film 320b and the conductive film 304.

Note that the transistor 300D has the s-channel structure described above.

<4-5. Structure Example 5 of Transistor>

The metal oxide film 308 included in the transistor 300A in FIGS. 71A to 71C may have a stacked-layer structure. FIGS. 75A to 75D illustrate examples of such a case.

Figure 75A:
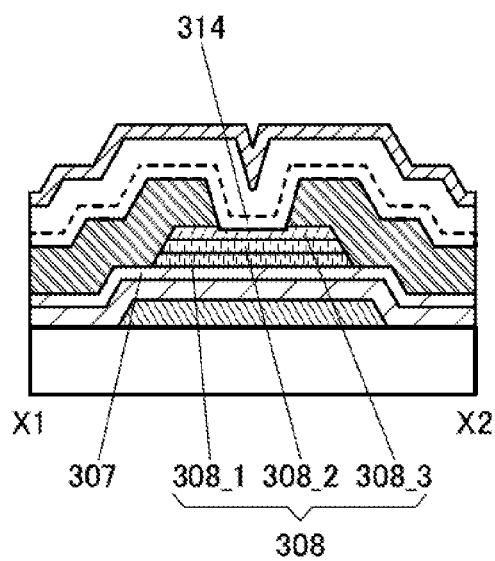
FIGS. 75A to 75D are cross-sectional views illustrating embodiments of transistors.
Figure 75B:
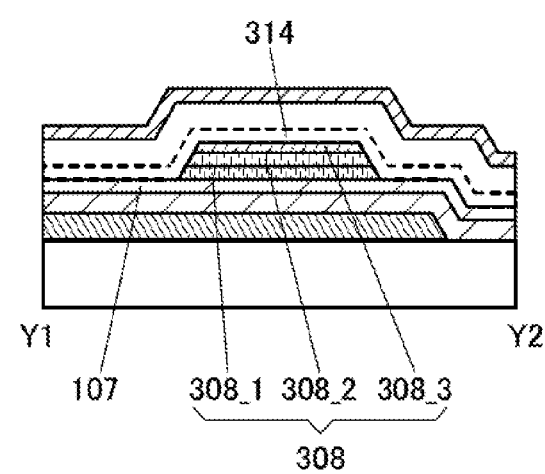
Figure 75C:
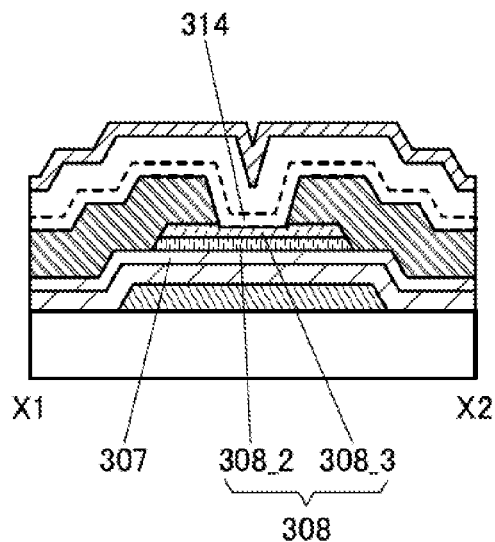
Figure 75D:
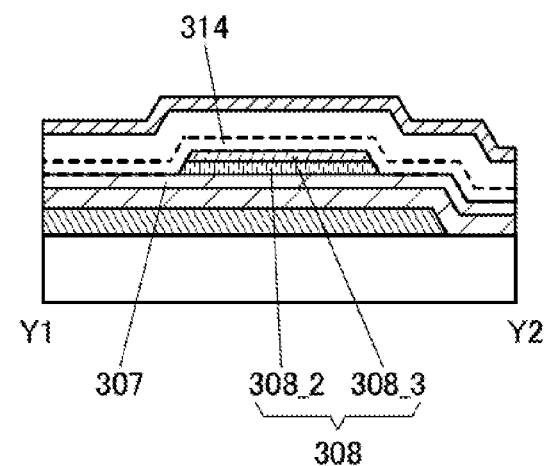

FIGS. 75A and 75B are cross-sectional views of a transistor 300E and FIGS. 75C and 75D are cross-sectional views of a transistor 300F. The top views of the transistors 300E and 300F are similar to that of the transistor 300A illustrated in FIG. 71A.

The metal oxide film 308 of the transistor 300E illustrated in FIGS. 75A and 75B includes a metal oxide film 308_1, a metal oxide film 308_2, and a metal oxide film 308_3. The metal oxide film 308 of the transistor 300F illustrated in FIGS. 75C and 75D includes the metal oxide film 308_2 and the metal oxide film 308_3.

Note that the conductive film 304, the insulating film 306, the insulating film 307, the metal oxide film 308, the metal oxide film 308_1, the metal oxide film 308_2, the metal oxide film 308_3, the conductive film 312a, the conductive film 312b, the insulating film 314, the insulating film 316, the insulating film 318, and the conductive films 320a and 320b can be formed using the materials and formation methods of the conductive film 106, the insulating film 116, the insulating film 314, the metal oxide film 108, the metal oxide film 108_1, the metal oxide film 108_2, the metal oxide film 108_3, the conductive film 120a, the conductive film 120b, the insulating film 104, the insulating film 118, the insulating film 116, and the conductive film 112 described in Embodiment 3.

The structures of the transistors 300A to 300F can be freely combined with each other.

The structure described in this embodiment can be used in appropriate combination with any of the structures described in the other embodiments.

Embodiment 5

<Composition of CAC-OS>

In this embodiment, the composition of a cloud aligned composite OS (CAC-OS) that can be used for a transistor disclosed in one embodiment of the present invention is described.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0), gallium zinc oxide ($Ga_{X4}Zn_{Y4}O_{Z4}$, where X4, Y4, and Z4 are real numbers greater than 0), or the like, and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to the element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not heated intentionally, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%. Here, the phrase "the substrate is not heated intentionally" means that a method in which a substrate is heated on a substrate rear surface side (an opposite side to a film formation side) with a heating wire or the like attached to a mechanism or the like for holding a substrate and a method in which a substrate or a mechanism in contact with the substrate is heated from the outside of a vacuum apparatus with an infrared laser or the like are not used.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices typified by a display.

At least part of this embodiment can be implemented in combination with any of the other embodiments described in this specification as appropriate.

Embodiment 6

In this embodiment, a display module and electronic devices that include the display device of one embodiment of the present invention are described with reference to FIG. 76, FIGS. 77A to 77E, FIGS. 78A to 78E, and FIGS. 79A and 79B.

<6-1. Display Module>

Figure 76:
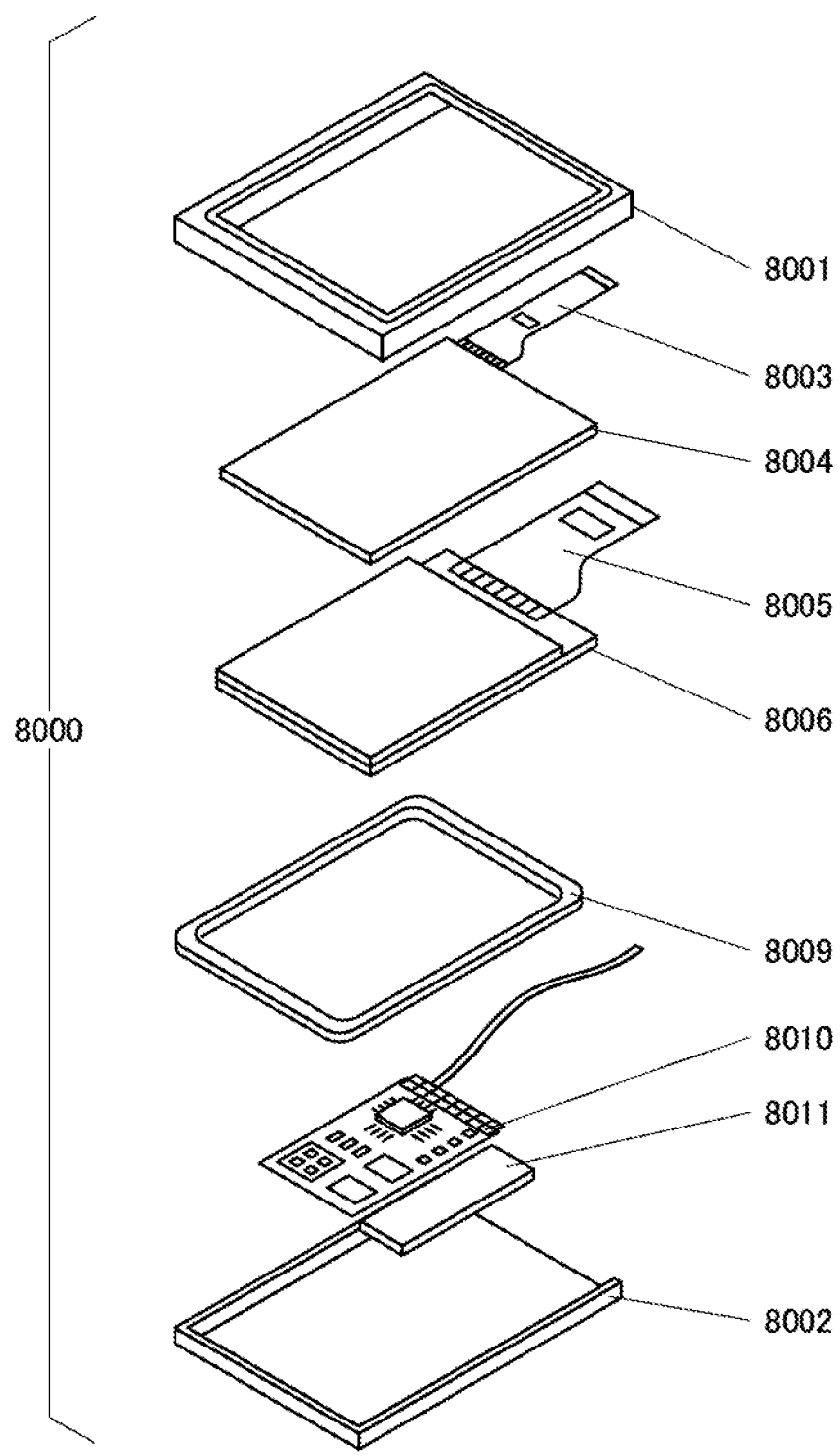
FIG. 76 illustrates a display module.

In a display module 8000 illustrated in FIG. 76, a touch panel 8004 connected to an FPC 8003, a display panel 8006 connected to an FPC 8005, a frame 8009, a printed board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and may overlap with the display panel 8006. Alternatively, a counter substrate (sealing substrate) of the display panel 8006 can have a touch panel function. Alternatively, a photosensor may be provided in each pixel of the display panel 8006 so as to function as an optical touch panel.

The frame 8009 protects the display panel 8006 and functions as an electromagnetic shield for blocking electromagnetic waves generated by the operation of the printed board 8010. The frame 8009 can function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

<6-2. Electronic Device>

FIGS. 77A to 77E and FIGS. 78A to 78E illustrate electronic devices. These electronic devices can include a housing 9000, a display portion 9001, a camera 9002, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 9008, and the like.

The electronic devices illustrated in FIGS. 77A to 77E and FIGS. 78A to 78B can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Note that functions of the electronic devices illustrated in FIGS. 77A to 77E and FIGS. 78A to 78E are not limited thereto, and the electronic devices may have other functions.

The electronic devices illustrated in FIGS. 77A to 77E and FIGS. 78A to 78E are described in detail below.

Figure 77A:
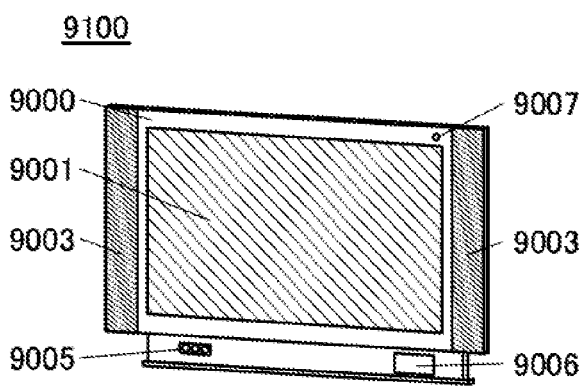
FIGS. 77A to 77E illustrate electronic devices.

FIG. 77A is a perspective view illustrating a television device 9100. The television device 9100 can include the display portion 9001 having a large screen size of, for example, 50 inches or more, 80 inches or more, or 100 inches or more.

FIG. 77B, FIG. 77C, FIG. 77D, and FIG. 77E are perspective views illustrating a portable information terminal 9101, a portable information terminal 9102, a portable information terminal 9103, and a portable information terminal 9104, respectively.

Figure 77B:
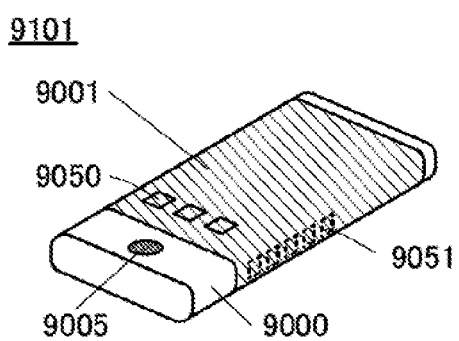

The portable information terminal 9101 illustrated in FIG. 77B has, for example, one or more of a function of a telephone set, a notebook, and an information browsing system. Specifically, the portable information terminal 9101 can be used as a smartphone. Although not illustrated, the speaker 9003, the connection terminal 9006, the sensor 9007, and the like may be provided in the portable information terminal 9101. The portable information terminal 9101 can display characters and image information on its plurality of surfaces. For example, three operation buttons 9050 (also referred to as operation icons or simply icons) can be displayed on one surface of the display portion 9001. Furthermore, information 9051 indicated by dashed rectangles can be displayed on another surface (for example, a side surface) of the display portion 9001. Examples of the information 9051 include notification from a social networking service (SNS), display indicating reception of an e-mail or an incoming call, the title of the e-mail, the SNS, or the like, the sender of the e-mail, the SNS, or the like, the date, the time, remaining battery, and the strength of a received signal. Alternatively, the operation buttons 9050 or the like may be displayed in place of the information 9051. The display portion 9001 of the portable information terminal 9101 partly has a curved surface.

Figure 77D:
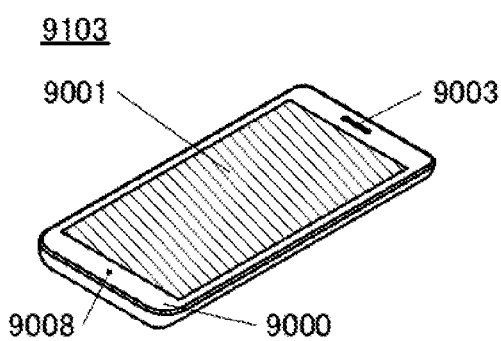
Figure 77C:
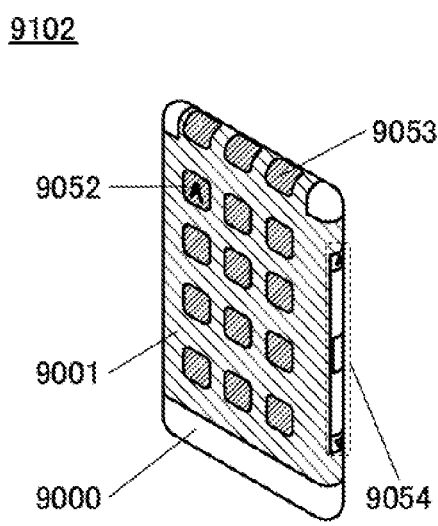

The portable information terminal 9102 illustrated in FIG. 77C has a function of displaying information, for example, on three or more sides of the display portion 9001. Here, information 9052, information 9053, and information 9054 are displayed on different sides. For example, a user of the portable information terminal 9102 can see the display (here, the information 9053) with the portable information terminal 9102 put in a breast pocket of his/her clothes. Specifically, a caller's phone number, name, or the like of an incoming call is displayed in a position that can be seen from above the portable information terminal 9102. Thus, the user can see the display without taking out the portable information terminal 9102 from the pocket and decide whether to answer the call. The display portion 9001 of the portable information terminal 9102 partly has a curved surface.

Unlike in the portable information terminals 9101 and 9102 described above, the display portion 9001 does not have a curved surface in the portable information terminal 9103 illustrated in FIG. 77D.

Figure 77E:
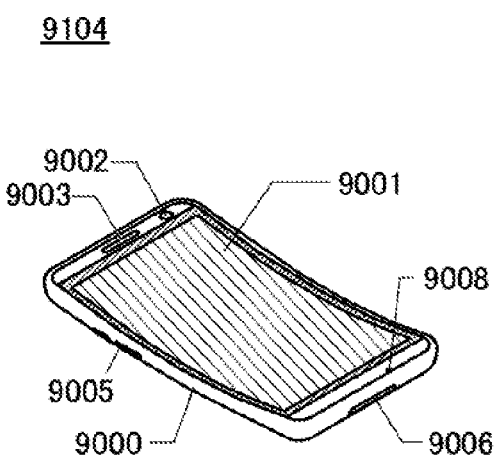

The display portion 9001 of the portable information terminals 9104 illustrated in FIG. 77E is curved. As illustrated in FIG. 77E, it is preferable that the portable information terminal 9104 be provided with a camera 9002 to have a function of taking a still image, a function of taking a moving image, a function of storing the taken image in a memory medium (an external memory medium or a memory medium incorporated in the camera), a function of displaying the taken image on the display portion 9001, or the like.

Figure 78A:
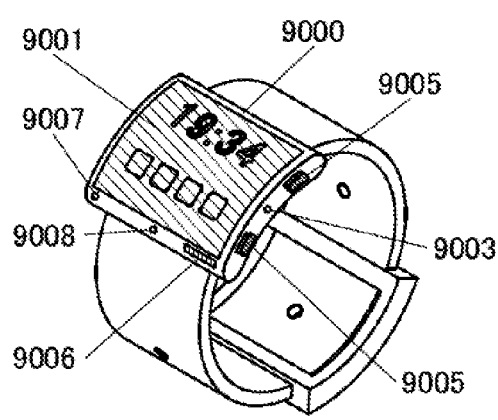
FIGS. 78A to 78E are perspective views illustrating a display device.
Figure 78B:
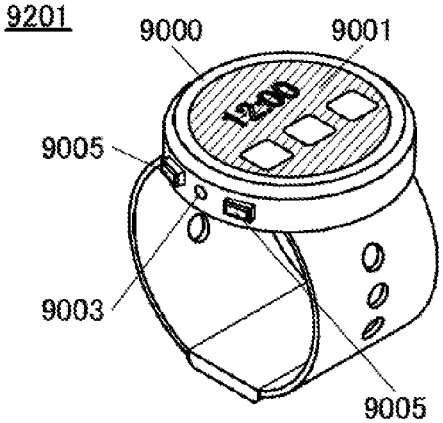

FIG. 78A is a perspective view of a watch-type portable information terminal 9200. FIG. 78B is a perspective view of a watch-type portable information terminal 9201.

The portable information terminal 9200 illustrated in FIG. 78A is capable of executing a variety of applications such as mobile phone calls, e-mailing, viewing and editing texts, music reproduction, Internet communication, and computer games. The display surface of the display portion 9001 is bent, and images can be displayed on the bent display surface. The portable information terminal 9200 can employ near field communication that is a communication method based on an existing communication standard. In that case, for example, mutual communication between the portable information terminal 9200 and a headset capable of wireless communication can be performed, and thus hands-free calling is possible. Moreover, the portable information terminal 9200 includes the connection terminal 9006, and data can be directly transmitted to and received from another information terminal via a connector.

Charging through the connection terminal 9006 is possible. Note that the charging operation may be performed by wireless power feeding without using the connection terminal 9006.

Unlike in the portable information terminal 9200 illustrated in FIG. 78A, the display surface of the display portion 9001 is not curved in the portable information terminal 9201 illustrated in FIG. 78B. Furthermore, the external state of the display portion of the portable information terminal 9201 is a non-rectangular shape (a circular shape in FIG. 78B).

Figure 78C:
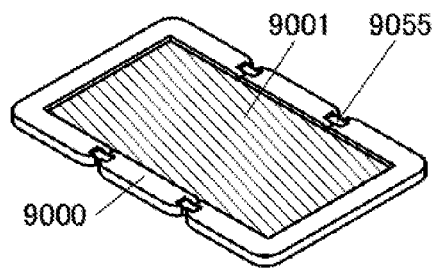
Figure 78D:
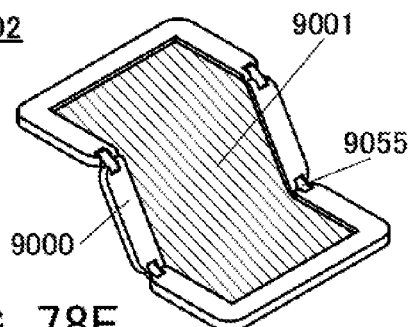
Figure 78E:
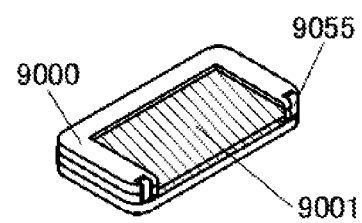

FIGS. 78C, 78D, and 78E are perspective views of a foldable portable information terminal 9202. FIG. 78C is a perspective view illustrating the portable information terminal 9202 that is opened. FIG. 78D is a perspective view illustrating the portable information terminal 9202 that is being opened or being folded. FIG. 78E is a perspective view illustrating the portable information terminal 9202 that is folded.

The folded portable information terminal 9202 is highly portable, and the opened portable information terminal 9202 is highly browsable due to a seamless large display region. The display portion 9001 of the portable information terminal 9202 is supported by three housings 9000 joined together by hinges 9055. By folding the portable information terminal 9202 at a connection portion between two housings 9000 with the hinges 9055, the portable information terminal 9202 can be reversibly changed in shape from opened to folded. For example, the portable information terminal 9202 can be bent with a radius of curvature of greater than or equal to 1 mm and less than or equal to 150 mm.

The display device which is one embodiment of the present invention can be preferably used for the display portion 9001.

Figure 79A:
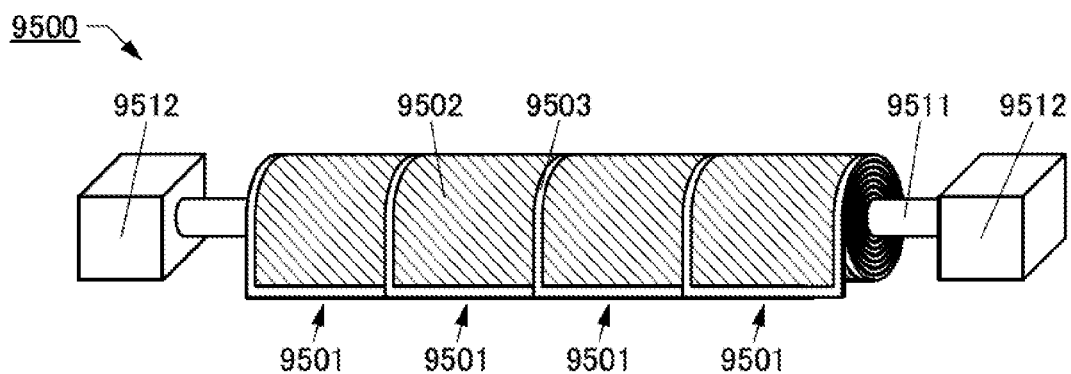
FIGS. 79A and 79B are perspective views illustrating a display device.
Figure 79B:
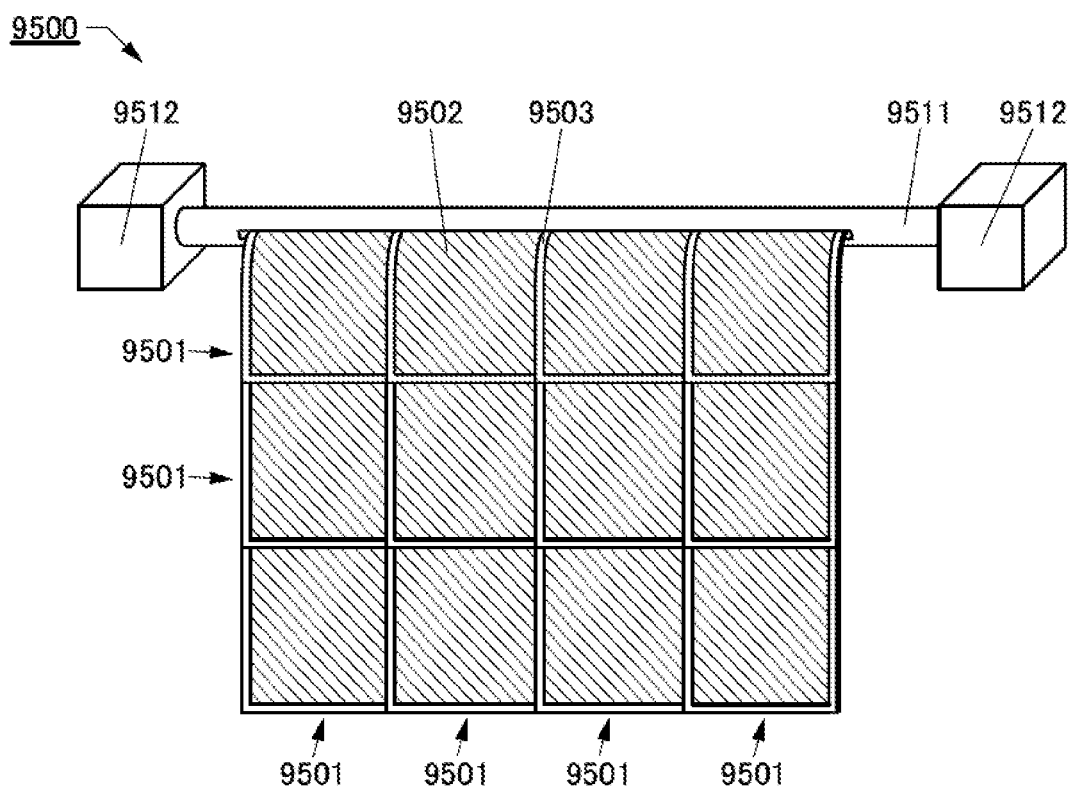

FIGS. 79A and 79B are perspective views of a display device 9500 including a plurality of display panels. Note that the plurality of display panels are wound in the perspective view in FIG. 79A, and are unwound in the perspective view in FIG. 79B.

The display device 9500 illustrated in FIGS. 79A and 79B includes a plurality of display panels 9501, a hinge 9511, and a bearing 9512. The plurality of display panels 9501 each include a display region 9502 and a light-transmitting region 9503.

Each of the plurality of display panels 9501 is flexible. Two adjacent display panels 9501 are provided so as to partly overlap with each other. For example, the light-transmitting regions 9503 of the two adjacent display panels 9501 can be overlapped each other. A display device having a large screen can be obtained with the plurality of display panels 9501. The display device is highly versatile because the display panels 9501 can be wound depending on its use.

Moreover, although the display regions 9502 of the adjacent display panels 9501 are separated from each other in FIGS. 79A and 79B, without limitation to this structure, the display regions 9502 of the adjacent display panels 9501 may overlap with each other without any space so that a continuous display region 9502 is obtained, for example.

The display device of one embodiment of the present invention can be preferably used in the display panel 9501.

Electronic devices described in this embodiment are characterized by having a display portion for displaying some sort of information. Note that the semiconductor device of one embodiment of the present invention can also be used for an electronic appliance that does not have a display portion.

The structure described in this embodiment can be used in appropriate combination with any of the structures described in the other embodiments.

Embodiment 7

In this embodiment, the structure of a data processor including the display device of one embodiment of the present invention is described with reference to FIGS. 80A and 80B.

Figure 80A:
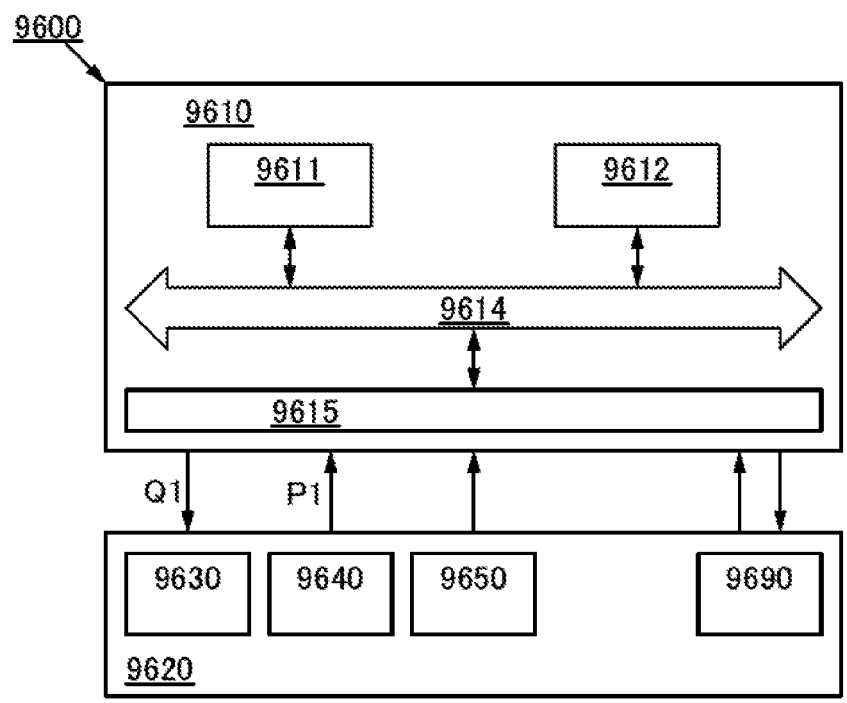
FIGS. 80A and 80B illustrate a structure of a data processor.
Figure 80B:
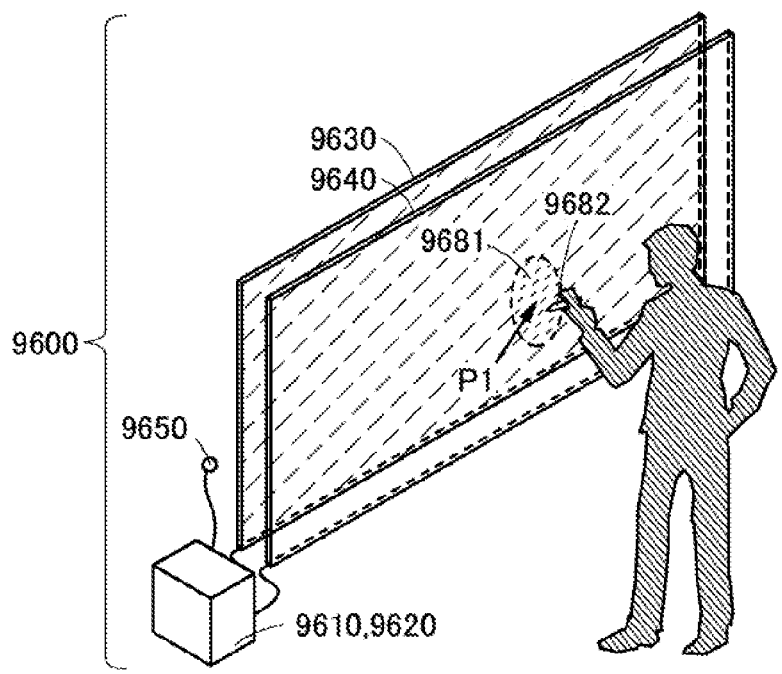

FIG. 80A is a block diagram illustrating the structure of a data processor 9600 including the display device of one embodiment of the present invention. FIG. 80B is a schematic diagram illustrating the data processor 9600 being in operation.

The following describes components of the data processor 9600. In some cases, the components cannot be clearly distinguished from each other and one component also serves as another component or includes part of another component.

<7. Structure Example of Data Processor>

The data processor 9600 includes an arithmetic device 9610 and an input/output device 9620.

[Arithmetic Unit]

The arithmetic device 9610 includes an arithmetic portion 9611, a memory portion 9612, a transmission path 9614, and an input/output interface 9615.

[Arithmetic Portion]

The arithmetic portion 9611 has a function of executing a program.

[Memory Portion]

The memory portion 9612 has a function of storing a program executed by the arithmetic portion 9611, initial information, setting information, an image, or the like. Specifically, a hard disk, a flash memory, a memory including a transistor formed using an oxide semiconductor, or the like can be used as the memory portion 9612.

[Program]

A program is executed by the arithmetic portion 9611 through three steps described below with reference to FIG. 80B, for example.

In a first step, positional data P1 is acquired.

In a second step, a first region 9681 is determined on the basis of the positional data P1.

In a third step, an image (image data Q1) with higher luminance than an image displayed on a region other than the first region 9681 is produced as an image displayed on the first region 9681.

For example, the arithmetic device 9610 determines the first region 9681 on the basis of the positional data P1. The first region 9681 can have, specifically, an elliptical shape, a circular shape, a polygonal shape, a rectangular shape, or the like. A region within a 60-cm radius, preferably within a 5-30-cm radius, from the positional data P1 is determined as the first region 9681, for example.

To produce an image with higher luminance than an image displayed on a region other than the first region 9681 as an image displayed on the first region 9681, the luminance of the image displayed on the first region 9681 is increased to 110% or more, preferably 120% or more and 200% or less, of the luminance of the image displayed on the region other than the first region 9681. Alternatively, the average luminance of the image displayed on the first region 9681 is increased to 110% or more, preferably 120% or more and 200% or less, of the average luminance of the image displayed on the region other than the first region 9681.

As a result of the program, the data processor 9600 can generate the image data Q1 with higher luminance than an image displayed on a region other than the first region 9681 as an image displayed on the first region 9681 on the basis of the positional data P1. Consequently, the data processor 9600 can have high convenience and can provide operators with comfortable operation.

[Input/Output Interface]

The input/output interface 9615 includes a terminal or a wiring. The input/output interface 9615 has a function of supplying data and a function of receiving data. The input/output interface 9615 can be electrically connected to the transmission path 9614 and/or the input/output device 9620, for example.

[Transmission Path]

The transmission path 9614 includes a wiring. The transmission path 9614 has a function of supplying data and a function of receiving data. The transmission path 9614 can be electrically connected to the arithmetic portion 9611, the memory portion 9612, or the input/output interface 9615, for example.

[Input/Output Device]

The input/output device 9620 includes a display portion 9630, an input portion 9640, a sensor portion 9650, and a communication portion 9690.

[Display Portion]

The display portion 9630 includes a display panel. The display panel includes a pixel having a structure including a reflective display element and a transmissive light-emitting element. The luminance of a displayed image can be increased by increasing the reflectance of the reflective display element or the luminance of the light-emitting element with the use of the image data. That is, the display device of one embodiment of the present invention can be preferably used in the display portion 9630.

[Input Portion]

The input portion 9640 includes an input panel. The input panel includes, for example, a proximity sensor. The proximity sensor has a function of sensing a pointer 9682. Note that a finger, a stylus pen, or the like can be used as the pointer 9682. For the stylus pen, a light-emitting element such as a light-emitting diode, a metal piece, a coil, or the like can be used.

As the proximity sensor, a capacitive proximity sensor, an electromagnetic inductive proximity sensor, an infrared proximity sensor, a proximity sensor including a photoelectric conversion element, or the like can be used.

The capacitive proximity sensor includes a conductive film and has a function of sensing the proximity to the conductive film. To determine positional data, for example, a plurality of conductive films are provided in different regions of the input panel and a region where a finger or the like used as the pointer 9682 approaches can be determined in accordance with a change in parasitic capacitance of the conductive films.

The electromagnetic inductive proximity sensor includes a function of sensing the proximity of a metal piece, a coil, or the like to a sensor circuit. To determine positional data, for example, a plurality of oscillation circuits are provided in different regions of the input panel and a region where a metal piece, a coil, or the like included in a stylus pen or the like used as the pointer 9682 approaches can be determined in accordance with a change in the circuit constant of the oscillation circuits.

The photo-detection proximity sensor has a function of sensing the proximity of a light-emitting element. To determine positional data, for example, a plurality of photoelectric conversion elements are provided in different regions of the input panel and a region where a light-emitting element included in a stylus pen or the like used as the pointer 9682 approaches can be determined in accordance with a change in the electromotive force of the photoelectric conversion elements.

[Sensor Portion]

As the sensor portion 9650, an illuminance sensor that senses the environmental brightness, a human motion sensor, or the like can be used.

[Communication Portion]

The communication portion 9690 has a function of supplying data to a network and acquiring data from the network.

The data processor 9600 described above can be used for education, or can be used for a digital signage or a smart television system, for example.

Note that this embodiment can be combined with any of the other embodiments in this specification as appropriate.

EXPLANATION OF REFERENCE

10: pixel, 11: display element, 11$d$: display region, 12: display element, 12$d$: display region, 12B: light-emitting element, 12G: light-emitting element, 12R: light-emitting element, 100: transistor, 100A: transistor, 100F: transistor, 100G: transistor, 100H: transistor, 100J: transistor, 100K: transistor, 102: substrate, 104: insulating film, 106: conductive film, 108: metal oxide film, 108_1: metal oxide film, 108_2: metal oxide film, 108_3: metal oxide film, 108$d$: drain region, 108$i$: channel region, 108$s$: source region, 110: insulating film, 112: conductive film, 116: insulating film, 118: insulating film, 120$a$: conductive film, 120$b$: conductive film, 141$a$: opening, 141$b$: opening, 143: opening, 300A: transistor, 300B: transistor, 300C: transistor, 300D: transistor, 300E: transistor, 300F: transistor, 302: substrate, 304: conductive film, 306: insulating film, 307: insulating film, 308: metal oxide film, 308_1: metal oxide film, 308_2: metal oxide film, 308_3: metal oxide film, 312$a$: conductive film, 312$b$: conductive film, 314: insulating film, 316: insulating film, 318: insulating film, 320$a$: conductive film, 320$b$: conductive film, 341$a$: opening, 341$b$: opening, 342$a$: opening, 342$b$: opening, 342$c$: opening, 401: substrate, 402: conductive film, 403$a$: conductive film, 403$b$: conductive film, 403$c$: conductive film, 404: insulating film, 404$a$: gate driver circuit portion, 405$a$: conductive film; 405$b$: conductive film, 405$c$: conductive film, 405$d$: conductive film, 406: insulating film, 407$a$: conductive film, 407$b$: conductive film, 407$c$: conductive film, 407$d$: conductive film, 407$e$: conductive film, 407$f$: conductive film, 407$g$: conductive film, 408: insulating film, 409$a$: metal oxide film, 409$b$: metal oxide film, 409$c$: metal oxide film, 410$a$: insulating film, 410$b$: insulating film, 410$c$: insulating film, 411$a$: metal oxide film, 411$b$: metal oxide film, 411$c$: metal oxide film, 412: insulating film, 413: insulating film, 414a: conductive film, 414b: conductive film, 414c: conductive film, 414d: conductive film, 414e: conductive film, 414f: conductive film, 414g: conductive film, 414h: conductive film, 416: insulating film, 417: conductive film, 417B: conductive film, 417G: conductive film, 417R: conductive film, 418: insulating film, 419: EL layer, 420: conductive film, 421: conductive film, 422: insulating film, 450: opening, 452: substrate, 454: sealing material, 481: shadow mask, 482: opening, 500: display device, 502: pixel portion, 504a: gate driver circuit portion, 504b: gate driver circuit portion, 506: source driver circuit portion, 508a: external circuit, 508b: external circuit, 602: light-blocking film, 604: color film, 606: insulating film, 608: conductive film, 610a: structure body, 610b: structure body, 618a: alignment film, 618b: alignment film, 620: liquid crystal layer, 622: sealant, 624: conductor, 626: functional film, 652: substrate, 662: light-blocking film, 663: insulating film, 664: electrode, 665: electrode, 666: insulating film, 667: electrode, 668: insulating film, 670: substrate, 672: substrate, 674: bonding material, 681: insulating film, 682: conductive film, 691: touch panel, 692: touch panel, 693: touch panel, 8000: display module, 8001: upper cover, 8002: lower cover, 8003: FPC, 8004: touch panel, 8005: FPC, 8006: display panel, 8009: frame, 8010: printed substrate, 8011: battery, 9000: housing, 9001: display portion, 9002: camera, 9003: speaker, 9005: operation key, 9006: connection terminal, 9007: sensor, 9008: microphone, 9050: operation button, 9051: information, 9052: information, 9053: information, 9054: information, 9055: hinge, 9100: television device, 9101: portable information terminal, 9102: portable information terminal, 9103: portable information terminal, 9104: portable information terminal, 9200: portable information terminal, 9201: portable information terminal, 9202: portable information terminal, 9500: display device, 9501: display panel, 9502: display region, 9503: region, 9511: axis portion, 9512: bearing, 9600: data processor, 9610: arithmetic device, 9611: arithmetic portion, 9612: memory portion, 9614: transmission path, 9615: input/output interface, 9620: input/output device, 9630: display portion, 9640: input portion, 9650: sensor portion, 9681: region, 9682: pointer, 9690: communication portion.

This application is based on Japanese Patent Application serial no. 2016-149771 filed with Japan Patent Office on Jul. 29, 2016, Japanese Patent Application serial no. 2016-149309 filed with Japan Patent Office on Jul. 29, 2016, and Japanese Patent Application serial no. 2016-149618 filed with Japan Patent Office on Jul. 29, 2016, the entire contents of which are hereby incorporated by reference.

The invention claimed is:

1. A display device comprising:
   a first pixel; and
   a second pixel,
   wherein the first pixel and the second pixel are adjacent to each other,
   wherein each of the first pixel and the second pixel comprises a first display region and a second display region,
   wherein the first display region is configured to reflect incident light,
   wherein the second display region is positioned inside the first display region and configured to emit light,
   wherein the second display region comprises at least three pairs of parallel sides, and
   wherein a position of the second display region inside the first display region in the first pixel and a position of the second display region inside the first display region in the second pixel are different from each other.

2. The display device according to claim 1,
   wherein a distance between a side of the second display region in the first pixel which is in a direction perpendicular to a direction in which the first pixel and the second pixel adjoin and which is closer to the second display region in the second pixel and a side of the second display region in the second pixel which is in the direction perpendicular to the direction in which the first pixel and the second pixel adjoin and which is closer to the second display region in the first pixel is greater than or equal to 10 µm and less than or equal to 30 µm in a direction parallel to the direction in which the first pixel and the second pixel adjoin.

3. The display device according to claim 1,
   wherein a distance between a side of the second display region in the first pixel which is in a direction parallel to a direction in which the first pixel and the second pixel adjoin and which is closer to the second display region in the second pixel and a side of the second display region in the second pixel which is in the direction parallel to the direction in which the first pixel and the second pixel adjoin and which is closer to the second display region in the first pixel is greater than or equal to 10 µm and less than or equal to 30 µm in a direction perpendicular to the direction in which the first pixel and the second pixel adjoin.

4. The display device according to claim 1,
   wherein a distance between the second display region in the first pixel and the second display region in the second pixel is greater than or equal to 20 µm.

5. The display device according to claim 1, further comprising:
   a first display element; and
   a second display element,
   wherein the first display element is provided in a position overlapping with the first display region, and
   wherein the second display element is provided in a position overlapping with the second display region.

6. The display device according to claim 5,
   wherein the first display element comprises a liquid crystal layer, and
   wherein the second display element comprises a light-emitting layer.

7. The display device according to claim 5,
   wherein colors of light emitted from the second display element in the first pixel and the second display element in the second pixel are different.

8. The display device according to claim 5,
   wherein the first display element is electrically connected to a first transistor,
   wherein the second display element is electrically connected to a second transistor, and
   wherein the first display element and the second display element are separately controlled.

9. The display device according to claim 8,
   wherein each of the first transistor and the second transistor comprises a metal oxide film in a semiconductor layer.

10. A display device comprising:
    a first pixel;
    a second pixel; and
    a third pixel, wherein the first pixel and the second pixel are adjacent to each other, wherein the first pixel and the third pixel are adjacent to each other, wherein each of the first pixel, the second pixel, and the third pixel comprises a first display region and a second display region, wherein the first display region is configured to reflect light, wherein the second display region is positioned inside the first display region and configured to emit light, wherein a position of the second display region inside the first display region in the first pixel and a position of the second display region inside the first display region in the second pixel are the same, wherein a position of the second display region inside the first display region in the first pixel and a position of the second display region inside the first display region in the third pixel are different from each other, and wherein the second display region comprises at least three pairs of parallel sides.

11. The display device according to claim 10, further comprising:

a first display element; and a second display element, wherein the first display element is provided in a position overlapping with the first display region, and wherein the second display element is provided in a position overlapping with the second display region.

12. The display device according to claim 11, wherein the first display element comprises a liquid crystal layer, and wherein the second display element comprises a light-emitting layer.

13. The display device according to claim 11, wherein colors of light emitted from the second display element in the first pixel and the second display element in the second pixel are different.

14. The display device according to claim 12, wherein the second display element in the first pixel and the second display element in the second pixel have the same structure of the light-emitting layer, and wherein the second display element in the first pixel and the second display element in the third pixel have different structures of the light-emitting layer.

15. The display device according to claim 11, wherein the first display element is electrically connected to a first transistor, wherein the second display element is electrically connected to a second transistor, and wherein the first display element and the second display element are separately controlled.

16. The display device according to claim 15, wherein each of the first transistor and the second transistor comprises a metal oxide film in a semiconductor layer.

17. A display device comprising:

a first pixel;

a second pixel; and a fourth pixel, wherein a linear direction that is parallel to a direction in which the first pixel and the second pixel are provided is an X axis, wherein the second pixel is adjacent to the first pixel in the X-axis direction, wherein the fourth pixel is adjacent to the first pixel in the X-axis direction on a side opposite to a side on which the second pixel is provided, wherein the fourth pixel comprises a first display region and a second display region, wherein the first display region is configured to reflect light, wherein the second display region is configured to emit light, wherein the second display region is positioned inside an outer periphery of the first display region in a horizontal plane of pixel arrangement in a top view of the first display region, wherein a position of the second display region in the first pixel and a position of the second display region in the fourth pixel are different from each other, wherein the position of the second display region in the second pixel and a position of the second display region in the fourth pixel are the same, wherein a planar shape of the second display region is a rhombic shape having two pairs of parallel sides, wherein a pair of parallel lines of the second display region in the first pixel are parallel to a straight line that connects a center of the second display region in the first pixel and a center of the second display region in the second pixel, and wherein another pair of parallel lines of the second display region in the first pixel are parallel to a straight line that connects the center of the second display region in the first pixel and a center of the second display region in the fourth pixel.

18. The display device according to claim 17, further comprising:

a first display element; and a second display element, wherein the first display element is provided in a position overlapping with the first display region, and wherein the second display element is provided in a position overlapping with the second display region.

19. The display device according to claim 18, wherein the first display element comprises a liquid crystal layer, and wherein the second display element comprises a light-emitting layer.

20. The display device according to claim 18, wherein colors of light emitted from the second display element in the first pixel and the second display element in the second pixel are different.

21. The display device according to claim 18, wherein the first display element is electrically connected to a first transistor, wherein the second display element is electrically connected to a second transistor, and wherein the first display element and the second display element are separately controlled.

22. The display device according to claim 21, wherein each of the first transistor and the second transistor comprises a metal oxide film in a semiconductor layer.

* * * * *